United States Patent [19]

Buonomo et al.

[11] Patent Number: 4,591,982
[45] Date of Patent: May 27, 1986

[54] STORAGE SELECTION OVERRIDE APPARATUS FOR A MULTIMICROPROCESSOR IMPLEMENTED DATA PROCESSING SYSTEM

[75] Inventors: Joseph P. Buonomo; Steven R. Houghtalen; Raymond E. Losinger; James W. Valashinas, all of Endicott, N.Y.

[73] Assignee: International Business Machines Corporation, Armonk, N.Y.

[21] Appl. No.: 527,053

[22] Filed: Aug. 29, 1983

[51] Int. Cl.⁴ .................... G06F 9/00; G06F 12/02
[52] U.S. Cl. ................................................ 364/200
[58] Field of Search ... 364/200 MS File, 900 MS File

[56] References Cited

U.S. PATENT DOCUMENTS

| | | | |
|---|---|---|---|
| 3,631,405 | 12/1971 | Hoff et al. | 364/200 |
| 4,079,454 | 3/1978 | Sorenson et al. | 364/200 |
| 4,231,087 | 10/1980 | Hunsberger et al. | 364/200 |
| 4,308,615 | 12/1981 | Koegel et al. | 364/900 X |
| 4,365,294 | 12/1982 | Stokken | 364/200 |
| 4,368,515 | 1/1983 | Nielsen | 364/200 |
| 4,476,522 | 10/1984 | Bushaw et al. | 364/200 |
| 4,485,457 | 11/1984 | Balaska et al. | 364/900 |
| 4,503,491 | 3/1985 | Lushtah et al. | 364/200 |

Primary Examiner—James D. Thomas
Assistant Examiner—Thomas Lee
Attorney, Agent, or Firm—John H. Bouchard; Saul A. Seinberg

[57] ABSTRACT

The performance of a multimicroprocessor implemented data processing system that emulates a mainframe is enhanced by providing a pair of override latches that serve to steer accesses between main and control storage for instruction fetch and operand acquisition in a manner that minimizes the complexity and size of microprocessor interface microcoding. This is achieved by connecting the instruction and operand override latches between a primary microprocessor, a secondary microprocessor, off-chip control storage belonging to the secondary microprocessor, particularly memory mapped private storage therein, and main storage. The override latches are made responsive, via microcode provided for that purpose, to the type and cause of each memory access. The override latches are set or reset by a memory mapped write to a predefined address in the secondary control store after being enabled by control lines responsive to the particular microprocessor action being taken. When set, the instruction override latch directs all expected primary processor main storage instruction fetches to control store. When set, the operand override latch directs all expected primary processor main storage operand accesses to control store. As appropriate for instruction execution, either one or both of the primary or secondary microprocessors can thereby be transparently latched to main or control storage.

3 Claims, 2 Drawing Figures

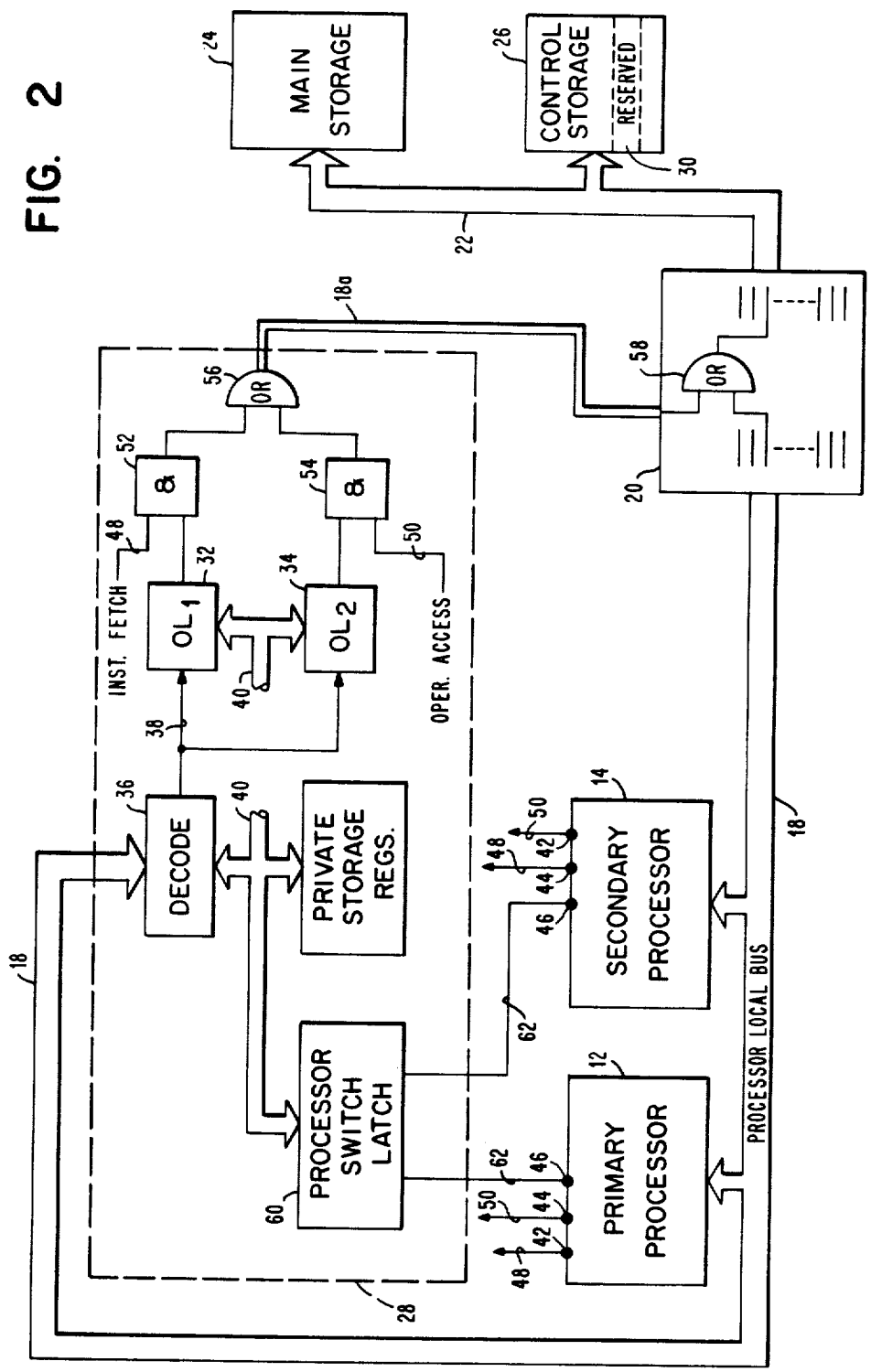

STORAGE SELECTION OVERRIDE APPARATUS FOR A MULTIMICROPROCESSOR IMPLEMENTED DATA PROCESSING SYSTEM

BACKGROUND OF THE INVENTION

1. Field of the Invention

This invention is concerned with storage utilization and selection apparatus and methods for a multi-microprocessor implemented data processing system that emulates a main frame system. More particularly, this invention is directed to improving the performance of such a system insofar as selection between control and main storage is concerned.

2. Description of the Prior Art

The emulation of "mainframe" data processing systems through the use of microprocessors has become a reality. A typical main frame data processing system would be any one of the System/370 (S/370) models available from International Business Machines Corporation. The PC/XT370, a "desktop" System/370, also available from International Business Machines corporation, is one example of such a microprocessor implemented main frame. This particular desktop system is a hardware/software package that allows one to run System/370 application programs in a single user environment, to run as a terminal attached to a main frame host or to a run in a stand-alone mode, as required by the particular application. There are, of course, similar systems available from other manufacturers, all of which systems incorporate many of the same functions as the PC/XT370 although the manner and means of implementation does differ, in varying degrees, from system to system.

Due to revolutionary advances in chip densities and packaging, which have been accompanied by significant reductions in costs, many main frame features can now be implemented directly in a desktop system, while other features require some hardware and/or software assistance in order to make them available. The introduction and use of more powerful microprocessors such as, for example, the 8086 and 8088 from Intel Corporation and the 68000 from Motorola Corporation, added further to the list of functions it would be possible to implement in a desktop mainframe. This new breed of microprocessors is fully capable of running a large, enriched instruction set, such as that of System/370, although several of these microprocessors, working in concert with the aid of additional hardware and/or software support, would be required to effect instruction execution in an acceptable time period. It will also be appreciated that presently available microprocessors, while remarkable for the functions they do offer, are not capable of providing all mainframe capability without system compromise.

Thus, as in all data processing system designs, various trade-offs are made in order to optimize the price and performance of these microprocessor implemented desktop mainframes. One particular trade-off problem is posed by the need or desire to utilize certain mainframe functions and features that would be particularly difficult to provide in a microprocessor implemented desktop mainframe. Another type of trade-off problem is posed by the requirement that all architectural constraints of the emulated mainframe be adhered to so that user programs can be run without concern. One specific implementation problem of concern, due in part to such trade-offs being made, is that of accommodating the power and versatility of the relatively large control storage of a mainframe central processing unit (CPU) in the relatively small control storage of a microprocessing unit (MPU). In the System/370 world, for example, control store on the Model 138 is about 50 times larger than that available on the typical MPU chip. This disparity in control store capacity puts a premium on the amount and type of microcode that is placed into the MPU's control store.

This significant difference in the capacity of mainframe and MPU control storage capacity means that the performance of the MPU implemented mainframe system will be adversely affected each time an instruction or operation needs to be handled by reference outside of an MPU's on-chip control store. This control store capacity related performance problem is further exacerbated in a multi-MPU implemented system whenever the instruction fetching MPU passes control to another MPU for instruction execution or to obtain architectural information that is resident in control store or in the fetching MPU's registers. It should be remembered that in System/370 apparatus, and in many other mainframe systems as well, main storage ie architecturally defined as belonging exclusively to the user. It cannot be contaminated by the system control program itself or by an interprocessor interface and is therefore unavailable for control or scratchpad functions. Further, due to the address bus limitations inherent in current MPUs, there are not sufficient bits to define independent equivalents of the mainframe's virtual and control storage modules, it is not practical to assign one or more of the address lines for the exclusive purpose of steering accesses between main and control storage. Of course, a mainframe system would not have to deal with these problems since it has sufficient addressing capability for its needs and possesses a control store module that is large enough to accommodate all of its microcode and to provide the scratchpad area it requires.

In the multi-MPU implemented mainframe data processing system, the lack of large control storage space can be overcome using specially written microcode to handle the interface between the microprocessors, by hardware assists or through some combination thereof. Further, off-chip control store can be readily provided. This approach would require the use of special and additional microcode to support the enhanced interprocessor interface or hardware assists. However, this additional microcode would require on-chip control store residence which would put less instruction responsive microcode in the fetching microprocessor's control storage, a result that would adversely affect overall system performance. Thus, while it would be possible to accommodate the MPU's smaller control store and compensate for the problems it presents, the performance and/or cost penalties associated with straightforward solutions to that problem are too great to accept.

OBJECTS AND SUMMARY OF THE INVENTION

Accordingly, it is a principal object of the present invention to provide means and a method that will permit a muli-microprocessor implemented mainframe data processing system having limited control storage to optimally emulate a mainframe system having relatively large control storage.

It is also a principal object of the present invention to provide such means and methodology in such a system wherein microprocessor access to main or control storage may be rerouted by override latches to the other storage type to minimize processor interface microcode and enhance system performance.

It is a further object of the present invention to provide means and a method for controlling and steering storage accesses to optimize system performance transparent to the microprocessor seeking said storage access.

It is another object of the present invention to provide means for controlling and steering storage accesses in a multi-microprocessor implemented mainframe data processing system in a manner that does not violate the architectural protective rules concerning mainframe storage accesses.

These and other objects of the present invention are achieved in a multi-processor implemented mainframe emulated data processing system by connecting instruction and operand override latches between a primary microprocessor, a secondary microprocessor, off-chip control storage belonging to the secondary microprocessor and main storage. The override latches are made responsive, via processor interface microcode provided for that purpose and processor control logic means, to the type and cause of each memory access. The override latches are set and reset by a memory mapped write to a predefined address in the secondary control store. When set, the instruction override latch directs all expected main storage instruction fetches by the primary microprocessor to a preselected area in the secondary processor's control store. When set, the operand override latch directs all expected main storage operand access to a preselected area of the secondary precessor's control store. As appropriate for execution performance, either one or both of the primary or secondary microprocessors can thereby be transparently latched to access either main or control storage although such access would not ordinarily be expected.

BRIEF DESCRIPTION OF THE DRAWINGS

The invention will be described further, by way of a preferred example thereof, with reference to the accompanying drawings wherein like reference numerals have been used in the several views to depict like elements, in which:

FIG. 2 schematically depicts, in greater detail and in accordance with the present invention, latching means for steering memory accesses in the FIG. 1 apparatus between main and control storage and some associated logic means.

DESCRIPTION OF THE PREFERRED EMBODIMENT

Figure 1:
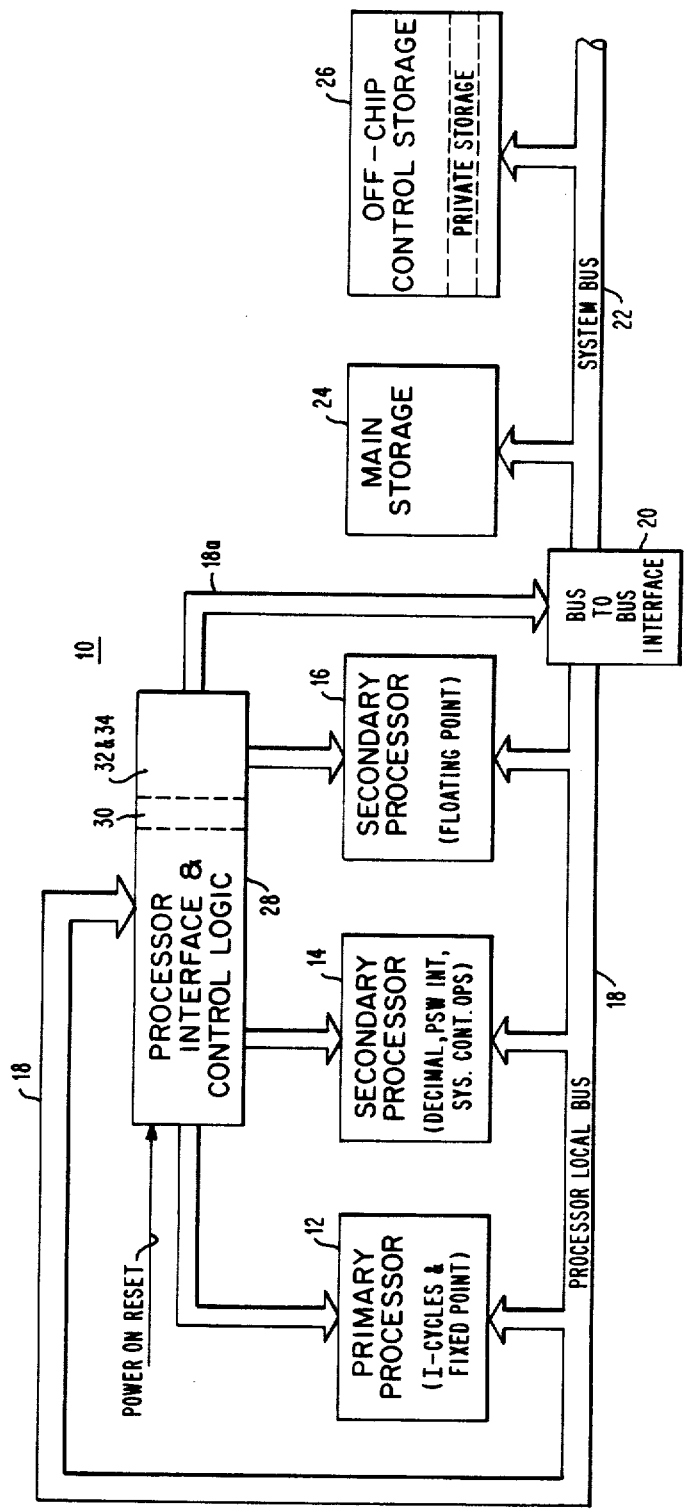
FIG. 1 schematically illustrates a simplified block diagram of a multimicroprocessor implemented mainframe data processing system which includes control and main memory storage.

The present invention is to be explained in the context of a mainframe desktop system that has been implemented with at least two microprocessors. More particularly, this resultant system has been adapted to emulate a System/370 mainframe. For those requiring further information on the instruction set of this mainframe and details of System/370 functions, reference should be made to the IBM System/370 Principles Of Operation (Manual No. GA22-7000), which is available from the IBM Corporation and which is, to the extent necessary, incorporated herein by reference. In addition, those requiring further information on the details of the desktop mainframe referred to herein should refer to Technical Reference Manual For The IBM PC XT/370 entitled "Personal Computer XT/370 Hardware Reference Library, manual number 6361423.

It will be understood by those having skill in this art that mainframe implementation can be achieved by use of only a single microprocessor. Alternatively, a plurality of microprocessors, equal to or different than the number used herein, could be employed to emulate a mainframe system. Further divergence in system configuration is possible as a result of variations in instruction set partitioning schemes and the manner in which the subsets are then emulated. Examples of this multiple microprocessor implementation approach are more completely described in commonly assigned U.S. Pat. application Ser. No. 371,634, now U.S. Pat. No. 4,514,803, filed in the names of Agnew et al on Apr. 26, 1982. In Agnew et al, a System/370 instruction set is partitioned in accordance with several criteria and the subsets thereof are each implemented on one or more of a plurality of microprocessors, but not all necessarily in the same manner.

An illustrative desktop mainframe data processing system 10 is shown in FIG. 1. As depicted in the simplified system block diagram thereof, a primary processing unit 12, and its associated secondary microprocessors 14 and 16 are connected to a local processor bus 18. Local bus 18 is connected, in turn, by bus-to-bus adapter 20 to the system bus 22. Main storage 24 and the secondary control storage 26 are both connected to the system bus 22. The primary processor 12 and secondary processors 14 and 16 are also responsively connected to processor control logic means 28 which incorporates processor control and interface logic and some private storage therefor. Certain aspects of the control logic means 28 shall be discussed hereinafter in greater detail.

In the particular embodiment described herein, primary processor 12 is assigned the responsibility for performing all instruction fetches and operand address calculations for all of the processors used in the system. It also performs execution of all fixed point instructions, contains and maintains the general purpose registers, instruction length codes, condition codes and instruction addresses, recognizes system interrupts and provides indications to the system that a main storage instruction fetch or operand access is required. In addition, primary processor 12 is also able to provide an indication to the system that a change in processor control is needed.

Secondary processor 14 performs execution of all system control instructions, contains and maintains all of the control registers, when necessary performs the service processor function and provides indications to the system of main storage operand access and private storage microcode access. In addition, secondary microprocessor 14 is additionally able to provide the system with an indication that a change in processor control is needed.

Secondary microprocessor 16 performs execution of all floating point instructions, containing and maintaining all of the floating point registers. It also provides the system with an indication of main storage operand access and of a need to alter microprocessor control. Alternatively, these floating point functions can be provided by a a peripheral unit rather than by a microprocessor.

The mainframe instruction set is thus allocated for execution among the several processors. Primary processor 12 is provided with limited on-chip control store that can be utilized to store mainframe instruction responsive microcode and/or microprocessor interface and control microcode. It will be recognized, given the fixed quantity of on-chip control store available, that the instruction responsive microcode and the interface microcode reside in control store at the cost of the other. A greater amount of one type of microcode in on-chip control store residence means that a lesser amount of the other type can be accommodated therein. If a more functional microprocessor interface is desired, with an attendant cost in supporting microcode, there will be less room in control store for instruction responsive microcode. From a performance standpoint, it is best to keep the interface simple and leave as much control store as possible for instruction code. The present invention facilitates and makes this possible. In this embodiment, for example, it has been decided to place microcode for the most frequently used mainframe instructions in the control store of microprocessor 12 and to use a relatively simple intermicroprocessor interface that requires minimal microcode.

A main storage module 24 is attached to system bus 22 and used as needed by the processors 12, 14 and 16. It is assumed that the system bus 22 and the microprocessors 12, 14 and 16 all include 24 bits of addressing to accommodate the addressing structure of the mainframe to be implemented. It may be necessary to slightly modify currently available microprocessors to achieve this addressing capability. The secondary processor 14 uses off-chip control storage module 26, as may be necessary, for its own microcode and scratchpad functions. While secondary processor 16 has no need to use off-chip control store 26, in this embodiment, it could access that module, as might be necessary, to satisfy its microcode and scratchpad needs. Processors 12, 14 and 16 and processor control logic means 28 are interconnected together by and pass information to each other on the processor local bus 18. The microcode required by secondary microprocessor 14 is shown in source form in Appendix A hereof. It includes the code for interfacing the processors as is described hereinafter.

Because all of the available address bits or lines in a microprocessor implemented mainframe will be needed to define and emulate the mainframe's virtual storage, it would not be effective to divide all possible storage defined by the available address bits between virtual main storage and control storage. Since all of the available address lines are needed to define virtual storage, prior to calculation of the real address involved, there is no direct manner of using those same address lines to also identify unique control storage addresses.

Although shown as two separate modules, and they are from a logical standpoint, main storage and control storage are a physically contiguous block of random access memory (RAM), with an exception to be discussed below. The dividing line between storage modules, as described herein, is the dividing line between real main storage and control storage. In this illustrative embodiment, the main storage module 24 runs from address 00000 to address 7FFFF (hexidecimal—hereinafter hex). The control storage module 26 runs from address 80000 to address 9FFFFF (hex). It should be noted that bit 19 of any memory address placed on system bus 22, where bit 23 of the address is the most significant bit thereof, determines which memory module is accessed. If bit 19 of an address is set, then the address sought is 80000 (hex) or higher and will therefore be found in the off-chip control store module 26. If bit 19 is off, then the address sought is 7FFFF (hex) or lower and will therefore be found in the main memory module 26. The addresses used herein have been selected to simplify and facilitate this description. Those having skill in this art will recognize that the address limits for each memory module are a design choice and that the manipulation of more than than one address bit, to steer between main and control storage, may be necessary.

Private store 30, referred to previously, is logically a portion of off-chip control storage 26, but is physically located in the processor control logic means 28 and mapped into a reserved segment 26a of control store 26. The reserved segment 26a of control store 26 is typically about 256 bytes long, although it can be greater. As shall be discussed in connection with FIG. 2, the processor control logic means 28 is connected to bus-to-bus interface 20 via bus feeder 18a. Also physically located in the processor control logic means 28 are a pair of override latches 32 and 34 that serve to steer memory accesses from processors 12 and 14 to either the main memory storage module 24 or to the off-chip control storage module 26 as shall be hereinafter explained in greater detail.

The function of latches 32 and 34 is shown more explicitly in FIG. 2 wherein several system elements not directly pertinent to the present invention have been omitted to enable a more explicit description thereof. The latches are identical standard, off-the-shelf parts available from several vendors under different part numbers. For example, the MC74LS175N latches manufactured by Motorola Inc.'s Semiconductor Products Division would be suitable for use as the latches 32 and 34 as would the SN74LS175J type available from Texas Instruments Inc. There are four latches on each chip, only two of which are used for override purposes. Latch 32 serves as an instruction override latch and is set and reset by a memory mapped write to private store 30. When set, it causes all main storage instruction fetches by primary processor 12 to be directed to a designated area of control store 26 instead of main storage 24. Latch 34 serves as an operand override latch and is also set and reset by a memory mapped write to private store 30. When set, it causes all main storage operand accesses by primary processor 12 or secondary processor 14 to be respectively directed to a designated area of main storage 24 or control store 26. Including override or storage selection latches permits the implementation of many useful functions without requiring modification of other portions of the system, particularly to the on-chip microcode for microprocessor 12. It would also be possible to use override latches to alter all memory accesses by any system microprocessor if that capability were appropriate to the needs of the particular system involved.

The following example of how the latches work and the system context of their operation will best explain their role and usefulness. The interface between the primary and secondary microprocessors 12 and 14 is defined by appropriate microcode stored in control store module 26. On power-up, this microcode is accessed in typical fashion and the secondary microprocessor 14 is thereby given control. As part of this initialization process, secondary microprocessor 14 places startup information for primary microprocessor 12 at predefined control storage 26 addresses and resets override latches 32 and 34, which forces them to a logical 0. Control is then passed to the primary microprocessor 12 by the processor interface code, once the housekeeping chores are accomplished.

The latches are set or reset only by the secondary microprocessor 14 although that function need not be restricted. This action occurs whenever a "write" operation of latch data is attempted to a preassigned address in private store 30 by processor 14. When that occurs, the decode circuit means 36 decodes the address on processor bus 18 and, in response thereto, raises its latch enable line 38 to latches 32 and 34. When enable line 38 is raised, one bit of the data latch information available on data bus input 40 to each latch, and this is a different bit for each latch although the value of the bits may be identical, is thereby gated into the respective latches 32 and 34. If the gated data bit is a logical 0, the latch is said to be reset. If the data bit is a logical 1, the latch is said to be set.

Each of the microprocessors 12 and 14 are provided with a number of input/output (I/O) and control pins, as specified by the manufacturers. Among these are an instruction fetch pin 42, an operand access pin 44 and a bus grant acknowledge (BGACK) pin 46. Signals present on these pins, and the control lines connected thereto, indicate respectively that the particular microprocessor involved is performing an instruction fetch, attempting an operand access or going to an idle state because another device has been granted bus access. Thus, when instruction fetch line 48 is set to a logical high, the microprocessor involved is indicating that it is going to perform an instruction fetch. Likewise, when operand access line 50 goes high, it means that a microprocessor is about to access memory to retrieve an operand. For a purpose to be discussed later, receipt of a signal setting the BGACK pin 46 to a logical 1 or high, indicates that another device has been granted access to bus 18 and forces the receiving processor to an idle state.

Since the instruction fetch and operand access operations are exclusive and do not occur at the same time, only one of the control lines 48 and 50 can be set at the same time. When the latch enable line 38 goes high, data is read into latches 32 and 34. The output of latches 32 and 34 are fed to AND gates 52 and 54 respectively. The other input to AND gate 52 is the instruction fetch control line 48. The other input to AND gate 54 is the operand access control line 50. The output of AND gates 52 and 54 is forwarded, in turn, to OR gate 56. Thus, if either instruction override latch 32 or operand override latch 34 has a logical 1 output and its associated control line is similarly set, then the output of OR gate 56 will be set to a logical 1. The output of OR gate 56 is connected to the input of address OR gate 58. The other input to OR gate 58 is bit 19 of the address being sought in memory. If the output of either AND gate 52 or 54 is set, bit 19 of the memory address is set, thereby forcing a read from or write into the control storage module 26. This is done transparently to the processor in control and works a non-expected access of control storage module 26.

As previously noted, the primary microprocessor 12 is adapted to perform all system instruction fetches. It is also provided with its own on-chip microcode that enables it to directly execute a number of the most frequently used mainframe instructions. As long as it can do so, without assistance from or intervention by secondary processor 14, primary microprocessor 12 will continue to execute its "own" instructions. However, when an interrupt occurs or when primary processor 12 encounters an op code it is not microprogrammed to handle, it initiates a secondary processor call routine that ultimately turns on secondary processor 14.

Transfer of control between primary microprocessor 12 and secondary microprocessor 14 is handled in accordance with microcode provided for that purpose. In the case of primary microprocessor 12 that microcode is resident on-chip. The control transfer routine for secondary microprocessor 14 is found in control storage 26. It will first be assumed that primary microprocessor 12 has control and encounters an op code it cannot handle or that it receives an interrupt. In either event, primary microprocessor 12 responds by storing key information in private store 30. This key information includes the contents of the transferring processor's program counter and program status register and a calling code which indicates the reason why processor control transfer was initiated. If necessary for use by the receiving processor, the transferring processor will also store operands, the current instruction, bus error information or any other required parameters. After this critical status information is stored, the processor control transfer routine then concludes by attempting a write to a predefined address, that of the processor switch latch 60, in private store 30 followed by a read of another predefined private store address. Upon receipt of the write address, decoder 36 determines that latch 60 is being addressed and enables that device causing the BGACK line 62 of the processor relinquishing control to be set and that of the processor getting control to be reset. The following read command is thus never executed, but remains in the input pipeline of the processor that has now relinquished control.

When this control sequence is again invoked, the BGACK pin 46 of the idle processor is reset, causing it to become active and regain control. The first thing that the processor does is complete the read operation it had previously been requested to perform. Depending upon the particular microprocessor regaining control and on the nature of the incident that previously triggered control transfer, the read address may begin a reload of the information stored by the primary microprocessor 14 or it could effect a read of the calling code and initiate responsive action thereto.

The period for which control is relinquished by primary processor 12 may be for only one instruction. This is accomplished by setting the trace bit of the control transferring processor's program status register (PSR) before its contents are placed in private store 30 and then having the control acquiring processor read that information into its own PSR. Alternatively, it is possible to transfer control from the primary processor 12 to the secondary processor 14 after only one or any other number of predetermined instructions have been executed by utilizing an invalid op code that causes an interrupt when encountered. The interrupt, of course, invokes secondary processor control as per system definition.

The entire process of control transfer and utilization of control storage 26 by the primary microprocessor 12, as facilitated by the override latches 32 and 34, would work as follows in the case of a requirement to execute a System/370 execute instruction received by primary processor 12. The System/370 execute instruction causes a target instruction found at the address pointed to by its second operand to be modified by the contents of the general register specified in the register field of the execute instruction, after which the target instruction is executed. It will be appreciated by those having skill in the appertaining art that under System/370 architectural constraints, main memory cannot be used or corrupted by system needs. Thus, the need to store intermediate results or a copy of an instruction, the target instruction in this instance, must be satisfied by control storage utilization only.

The primary processor 12 is in control of the system and fetches its next instruction, which happens to be the execute instruction. This is one of the instructions it is not microprogrammed to handle. It computes the address where the target instruction can be found in main storage 24 and then, knowing from its microcode that it cannot proceed further, primary processor 12 writes that address, the appropriate calling code explaining the reason for control transfer and other pertinent register information into private store 30, before passing control to secondary processor 14. The secondary processor 14 then examines the calling code and, based on its microcoded response to an execute instruction, writes a copy of the subject instruction into control store 26 using the information left in private store 30 by primary processor 12. The second byte of the copied instruction is then ORed with low order byte of the GPR value passed from primary processor 12 and stuffed back into the second byte of the control store copy of the subject or target instruction.

In this example, it is further assumed that the subject instruction is a "move character" instruction that is the target of the original "execute" instruction. The move character instruction is one that has been defined as being executable by primary processor 12. When that fact is recognized by the secondary processor 14 from the op code of the target instruction, it saves the original contents of the program counter passed to it by primary processor 12 and replaces the address of the next instruction primary processor 12 would have fetched, but for control transfer, with an address for the now modified move character instruction. Although that modified instruction is resident in control store 26, address bit 19 of that address is reset to 0. Thus, primary processor 12 will be looking for the move character instruction in main storage 24, rather than in control storage module 26. Note that the present invention allows primary processor 12 to execute one of its directly executable instructions as a target of a System/370 execute instruction without requiring any special and additional on-chip microcode or a great deal of hardware.

Next, secondary processor 14 turns on the trace bit in the program status register location and toggles instruction override latch 32 on. Operand override latch 34 is left off or reset. Secondary processor 14 now does a write to the processor control transfer latch 60 address, thereby passing control back to primary processor 12. Primary processor wakes up when its BGACK pin is set low and immediately completes the read command that was left in its input pipeline. When the defined address is read, along with other private storage information just left for it by secondary processor 14, primary processor 12 is able to start right up without further housekeeping. It sets its instruction fetch line in going out to the main memory where it has been incorrectly told that the move character instruction resides. However, output line 18a of OR gate 56 has now been set by the instruction override latch 32 and the instruction fetch control line 48. This means that bit 19 of the main store address put on bus 18 by primary processor 12 will be set by OR gate 58. This will cause the memory access initiated by primary processor 12 to be directed to control storage 26 without any action being taken on the part of primary processor 12 and transparent thereto.

When the modified move character instruction is fetched, since operand override latch 34 is reset and instruction fetch control line 48 is at a logical 0, the memory access made to actually move data about in accordance with the instruction, is directed to and takes place in main memory module 24. After the move character instruction is executed, since the trace bit in the program status register as returned to primary processor 12 was set, control is again returned to secondary processor 14. It examines the return code and sees a trace bit and execute complete reason for control transfer. In response, secondary processor 14 turns off the instruction override latch 32 and restores the original program counter contents that it had initially received, when the execute instruction was encountered, to private storage 30. Control is again returned to the primary processor 12 which picks up its restored original program counter contents and all other necessary parameter and register information, and fetches the instruction that follows the execute instruction. It should be noted, depending upon the instruction to be executed by primary processor 12 when it receives control that an ensuing memory access can be to control store for both instruction fetch and operand access or for operand access only, in accordance with the output state of the override latches 32 and 34.

Although the present invention has been described in the context of a preferred embodiment thereof, it will be readily apparent to those skilled in the appertaining art, that modifications and variations can be made therein without departing from its spirit and scope. Accordingly, it is not intended that the present invention be limited to the specifics of the foregoing description of the preferred embodiment. Instead, the present invention should be considered as being limited solely by the appended claims, which alone are intended to define its scope.

APPENDIX A

```
EN982023
                        PAGE
         00000000   LISTFL    EQU    0
                    *           WASHINGTON PRIVATE STORAGE MAP
                    *************************************************************
                    *                                                           *
                    *       THE FOLLOWING CODE DEFINES MAJOR AREAS OF WASHINGTON *
                    *       PRIVATE STORAGE. ALL FURTHER DEFINITION OF PRIVATE   *
                    *       STORAGE WILL BE BASED ON THE LABELS DEFINED BELOW.   *
                    *       THERE SHOULD BE NO OTHER DIRECT REFERENCES TO PRIVATE*
                    *       STORAGE ADDRESSES.                                   *
                    *                                                           *
                    *************************************************************
                    *
                    *
                    *-----------------------------------------------------------
         00000000             ORG    $0000          M68000 TRAP/INTERRUPT VECTORS AREA
000000 0100         VECTORS   DS.B   $100           DEFINED IN 'ECODE'
         00000024   TRACEV    EQU    VECTORS+$24    E-ENGINE TRACE VECTOR
         00000080   TRAP0     EQU    VECTORS+$80    E-ENGINE TRAP0 VECTOR
         00000100   END_01    EQU    *
                    *-----------------------------------------------------------
         00000100             ORG    $0100          370 REGISTER INTERCHANGE AREA
000100 00A4         REG_AREA  DS.B   $A4            DEFINED IN 'EQUATES'
         000001A4   END_02    EQU    *
                    *-----------------------------------------------------------
         00000200             ORG    $0200          370 EMULATION MICROCODE AREA
000200 2E00         ECODE     DS.B   $2E00          DEFINED IN 'ECODE'
         00003000   END_03    EQU    *
                    *-----------------------------------------------------------
         00003000             ORG    $3000          370 DECIMAL OPS MICROCODE AREA
003000 0C00         DECIMAL   DS.B   $C00           DEFINED IN 'DECCODE'
         00003C00   END_04    EQU    *
                    *-----------------------------------------------------------
         00003C00             ORG    $3C00          370 OP CODE BRANCH TABLES
003C00 033E         OPTABLES  DS.B   $33E           DEFINED IN 'ECODE'
         00003C00   OPTABLE   EQU    OPTABLES+$0    370 OP CODE TABLE
         00003E00   BETABLE   EQU    OPTABLES+$200  370 OP BUS ERROR TABLE
                    *                               OVERLAYED BY ENTRIES IN OTHER CODE
         00003F3E   END_05    EQU    *
                    *-----------------------------------------------------------
         00004800             ORG    $4800          370 EXTENDED FLOATING POINT MICROCODE
004800 0800         FLTPOINT  DS.B   $800           DEFINED IN 'FCODE'
         00004800   FPRDISP   EQU    FLTPOINT       ENTRY FOR FPR REGISTER FETCH SUB-ROUTINE
         00004868   FPRALTER  EQU    FLTPOINT+$68   ENTRY FOR FPR REGISTER ALTER SUB-ROUTINE
         00005000   END_06    EQU    *
                    *-----------------------------------------------------------
         00005F00             ORG    $5F00          MEMORY-MAPPED HARDWARE REGISTERS
005F00 0100         MEM_MAPD  DS.B   $100           DEFINED IN 'EQUATES'
         00006000   END_07    EQU    *
                    *-----------------------------------------------------------
         00006000             ORG    $6000          A/E ENGINE COMMUNICATIONS AREA
006000 0020         AE_COMM   DS.B   $20            DEFINED IN 'EQUATES'
         00006020   END_08    EQU    *
                    *-----------------------------------------------------------
         00006020             ORG    $6020          PC/PU COMMUNICATIONS AREA
006020 0020         PC_COMM1  DS.B   $20            DEFINED IN 'EQUATES'
         00006040   END_09    EQU    *
                    *-----------------------------------------------------------
         00006040             ORG    $6040          A ENGINE FIXED AREAS
006040 0008         A_ENG     DS.B   $8             DEFINED IN 'EQUATES'
         00006048   END_10    EQU    *
                    *-----------------------------------------------------------
         00006048             ORG    $6048          PC/PU COMMUNICATIONS AREA
006048 0058         PC_COMM2  DS.B   $58            DEFINED IN 'EQUATES'
         000060A0   END_11    EQU    *
                    *-----------------------------------------------------------
         000060C0             ORG    $60C0          E ENGINE WORK AREAS
0060C0 0140         E_WORK    DS.B   $140           DEFINED IN 'EQUATES'
         00006200   END_12    EQU    *
                    *-----------------------------------------------------------
         00006200             ORG    $6200          BUS ERROR CONTROL BLOCK
006200 000A         BUS_ERRC  DS.B   $A             DEFINED IN 'EQUATES'
         0000620A   END_13    EQU    *
                    *-----------------------------------------------------------
```

```
                00006240             ORG     $6240           DECIMAL WORK AREA
006240 0080                 DEC_WORK DS.B    $80             DEFINED IN 'DECCODE'
                000062C0             END_14  EQU     *
                *---------------------------------------------------------------
                000062C0             ORG     $62C0           EXTENDED FLOATING POINT WORK AREA
0062C0 0028                 XFP_WORK DS.B    $28             DEFINED IN 'FCODE'
                000062E8             END_15  EQU     *
                *---------------------------------------------------------------
                00006300             ORG     $6300           SIO/TIO DEVICE CONTROL BLOCK
006300 0100                 CHAN_DCB DS.B    $100            DEFINED IN 'DEBUG'
                00006400             END_16  EQU     *
                *---------------------------------------------------------------
                00006600             ORG     $6600
006600 0100                          DS.B    $100            M68000 STACK
                00006700             STACKST EQU     *       START OF STACK
                00006700             END_17  EQU     *
                *---------------------------------------------------------------
                00006800             ORG     $6800            M68000 REGISTER SAVE AREA
006800 0040                 M68_SAVE DS.B    $40             DEFINED IN 'ECODE'
                00006840             END_18  EQU     *
                *---------------------------------------------------------------
                00007000             ORG     $7000
                00007000    ALT_DISP EQU     *               DEBUG ALTER/DISPLAY ENTRY
                00007000    DEBUG_CD EQU     *               SIO/TIO EMULATION FOR DEBUG CARD
                00007000    DIAGNOST EQU     *               POSSIBLE DIAGNOSTIC CODE
007000 1000                          DS.B    $1000           DEFINED IN 'DEBUG'
                00008000             END_19  EQU     *
                *---------------------------------------------------------------

****************************************************************
                *                                                               *
                *       THE REMAINDER OF THE EQUATES ARE PRINTED ONLY IF THE FILE *
                *       BEING ASSEMBLED IS THE 'EQUATES' FILE.                  *
                *                                                               *
                ****************************************************************
                             IFNE    LISTFL
                             LIST
                             ENDC
                             IFEQ    LISTFL
                             PAGE
                00000000             ORG     VECTORS
000000 00006700             DC.L    STACKST         INITIAL STACK POINTER
000004 00002586             DC.L    RESET           INITIAL PROGRAM COUNTER
000008 000014DA             DC.L    BUSERROR        E-ENGINE 370 STORAGE ACCESS ERROR
00000C 00001B24             DC.L    ADRERROR        E-ENGINE ADDRESSING ERROR
000010 00001B2C             DC.L    ILLINSTR        E-ENGINE ILLEGAL INSTRUCTION
000014 00001B34             DC.L    ZERODIV         E-ENGINE DIVIDE BY ZERO
000018 00001B3C             DC.L    CHKINST         E-ENGINE CHK INSTRUCTION TRAP
00001C 00001B44             DC.L    TRAPV           E-ENGINE TRAPV INSTRUCTION TRAP
000020 00001B4C             DC.L    PRIVVIOL        E-ENGINE PRIVILEGE VIOLATION
000024 00001B54             DC.L    ETRACE          E-ENGINE TRACE ACTIVE
                *
                *       ETRACE MAY BE OVERLAYED BY DEBUG CARD A/D OR BY SUPERTRACE CODE
                *
000028 00001B5C             DC.L    LINE1010        E-ENGINE UNIMPLEMENTED INSTRUCTION
00002C 0000276A             DC.L    SUPERTR         E-ENGINE SUPER TRACE
000030 00001B6C             DC.L    INTR_ERR        30
000034 00001B6C             DC.L    INTR_ERR
000038 00001B6C             DC.L    INTR_ERR
00003C 00001B6C             DC.L    INTR_ERR
000040 00001B6C             DC.L    INTR_ERR        40
000044 00001B6C             DC.L    INTR_ERR
000048 00001B6C             DC.L    INTR_ERR
00004C 00001B6C             DC.L    INTR_ERR
000050 00001B6C             DC.L    INTR_ERR        50
000054 00001B6C             DC.L    INTR_ERR
000058 00001B6C             DC.L    INTR_ERR
00005C 00001B6C             DC.L    INTR_ERR
000060 00001B6C             DC.L    INTR_ERR        60
000064 00001B6C             DC.L    INTR_ERR
000068 00001B6C             DC.L    INTR_ERR
00006C 00001B6C             DC.L    INTR_ERR
000070 00001B6C             DC.L    INTR_ERR        70
000074 00001B6C             DC.L    INTR_ERR
```

```
000078 00001B6C              DC.L    INTR_ERR
00007C 00001B6C              DC.L    INTR_ERR
000080 00001B6C              DC.L    INTR_ERR         80    TRAP0
                  *
                  *    THE ABOVE TRAP0 VECTOR MAY BE OVERLAYED BY DEBUG CARD A/D CODE
                  *
000084 00001B6C              DC.L    INTR_ERR
000088 00001B6C              DC.L    INTR_ERR
00008C 00001B6C              DC.L    INTR_ERR
000090 00001B6C              DC.L    INTR_ERR         90
000094 00001B6C              DC.L    INTR_ERR
000098 00001B6C              DC.L    INTR_ERR
00009C 00001B6C              DC.L    INTR_ERR
0000A0 00001B6C              DC.L    INTR_ERR         A0
0000A4 00001B6C              DC.L    INTR_ERR
0000A8 00001B6C              DC.L    INTR_ERR
0000AC 00001B6C              DC.L    INTR_ERR
0000B0 00001B6C              DC.L    INTR_ERR         B0
0000B4 00001B6C              DC.L    INTR_ERR
0000B8 00001B6C              DC.L    INTR_ERR
0000BC 00001B6C              DC.L    INTR_ERR
0000C0 00001B6C              DC.L    INTR_ERR         C0
0000C4 00001B6C              DC.L    INTR_ERR
0000C8 00001B6C              DC.L    INTR_ERR
0000CC 00001B6C              DC.L    INTR_ERR
0000D0 00001B6C              DC.L    INTR_ERR         D0
0000D4 00001B6C              DC.L    INTR_ERR
0000D8 00001B6C              DC.L    INTR_ERR
0000DC 00001B6C              DC.L    INTR_ERR
0000E0 00001B6C              DC.L    INTR_ERR         E0
0000E4 00001B6C              DC.L    INTR_ERR
0000E8 00001B6C              DC.L    INTR_ERR
0000EC 00001B6C              DC.L    INTR_ERR
0000F0 00001B6C              DC.L    INTR_ERR         F0
0000F4 00001B6C              DC.L    INTR_ERR
0000F8 00001B6C              DC.L    INTR_ERR
0000FC 4EF81B1C              JMP     BR_TO_ZERO       CATCH ANY BRANCHES TO THE VECTOR TAB
                  *
                  *
                  * * * * * * * * * * * * * * * * * * * * * * * * * * * * * * *
                  *                                                             *
                  *    THE ABOVE INSTRUCTION WILL BE REACHED IF THERE IS A BRANCH  *
                  *    TO A FW ADDRESS BOUNDARY ( 00, 04, 08, ETC ) IN THE RANGE  *
                  *    FROM 0000 TO 00FC. A BRANCH TO A HW ADDRESS BOUNDARY     *
                  *    ( 02, 06, ETC ) WILL PROBABLY REACH THIS INSTRUCTION ALSO,  *
                  *    BUT THIS IS DEPENDENT UPON HOW THE ADDRESSES IN THE VECTOR  *
                  *    TABLE DECODE INTO VALID INSTRUCTIONS.                    *
                  *                                                             *
                  * * * * * * * * * * * * * * * * * * * * * * * * * * * * * * *

00000200                     ORG     ECODE
                  * * * * * * * * * * * * * * * * * * * * * * * * * * * * * * *
                  *                                                             *
                  *    EXIT POINT TO THE A-ENGINE                              *
                  *                                                             *
                  *    THE FOLLOWING LABELS ARE USED AS EXIT POINTS TO SWITCH  *
                  *    CONTROL FROM THE E-ENGINE TO THE A-ENGINE. REGISTER D2  *
                  *    CONTAINS A RETURN CODE WHICH IS WRITTEN TO THE OBATCH REG *
                  *    TO SWITCH ENGINES AND TO INDICATE TO THE A-ENGINE THE   *
                  *    CONDITIONS WHICH WERE ENCOUNTERED DURING THE PREVIOUS   *
                  *    E-ENGINE OPERATION. THE FOLLOWING RETURN CODES MAY BE SET. *
                  *                                                             *
                  *    000X - GOOD COMPLETION, SET 370 COND CODE TO 'X'        *
                  *    4500 - BUS ERROR DURING CLCL OR MVCL INSTRUCTION        *
                  *    4949 - FIXED POINT DIVIDE EXCPT, CVB INSTRUCTION        *
                  *    4A43 - DECIMAL OVERFLOW EXCPT, SET 370 COND CODE TO '3' *
                  *    4C0X - EXPONENT OVERFLOW EXCPT, SET 370 COND CODE TO 'X' *
                  *    5D0X - EXPONENT UNDERFLOW EXCPT, SET 370 COND CODE TO 'X' *
                  *    5E00 - SIGNIFICANCE EXCPT, SET 370 COND CODE TO '0'     *
                  *    9696 - SPECIFICATION EXCPT DURING A DECIMAL INSTRUCTION *
                  *    A7A7 - BUS ERROR DURING A DECIMAL OR FLT PT INSTRUCTION *
                  *    C0C0 - A PSW SWAP OCCURRED, CLEAR TPENDING IF ON        *
                  *    C600 - SPECIFICATION EXCPT                              *
                  *    C7C7 - DATA EXCPT                                       *
                  *    C900 - FIXED POINT DIVIDE EXCPT                         *
```

```
*       CBCB - DECIMAL DIVIDE EXCPT                                  *
*       CC00 - EXPONENT OVERFLOW EXCPT                               *
*       CD00 - EXPONENT UNDERFLOW EXCPT                              *
*       CE00 - SIGNIFICANCE EXCPT                                    *
*                                                                    *
**********************************************************************
*
000200 7400         RETURN   MOVEQ   #0,D2           SET 0000 RETURN CODE
000202 31C25FF0     RETURNEX MOVE.W  D2,ENGINE_A     SWITCH TO A-ENGINE CONTROL

**********************************************************************
*                                                                    *
*       RETURN POINT FROM THE A-ENGINE                               *
*                                                                    *
*       THE A-ENGINE RETURNS CONTROL TO THE E-ENGINE TO HANDLE       *
*       VARIOUS FUNCTIONS WHICH ARE NOT IMPLEMENTED IN THE A-ENGINE. *
*       THESE INCLUDE SOME 370 INSTRUCTIONS AND VARIOUS CONTROL,     *
*       ERROR AND EXCEPTION CONDITIONS. THE INSTRUCTION OR EXCEPTION *
*       CODE IS IN THE OBATCH REGISTER AND IS USED TO ACCESS THE     *
*       APPROPRIATE ROUTINE VIA AN OPERATION TABLE. SOME OF THE      *
*       CODES ARE A WRAP OF THE RETURN CODE WHICH HAD BEEN SENT TO   *
*       THE A-ENGINE. THE FOLLOWING EXCEPTION CODES MAY BE PRESENT.  *
*                                                                    *
*       4500 - BUS ERROR DURING CLCL OR MVCL INSTRUCTION             *
*       4949 - FIXED POINT DIVIDE EXCPT, CVB INSTRUCTION             *
*       4A43 - DECIMAL OVERFLOW EXCPT                                *
*       4C0X - EXPONENT OVERFLOW EXCPT                               *
*       5D0X - EXPONENT UNDERFLOW EXCPT                              *
*       5E00 - SIGNIFICANCE EXCPT                                    *
*       9696 - SPECIFICATION EXCPT DURING A DECIMAL INSTRUCTION      *
*       A000 - 370 ACCESS EXCPT, IFETCH 1ST HW OR ODD PC             *
*       A100 - 370 ACCESS EXCPT, IFETCH 2ND OR 3RD HW                *
*       A200 - 370 ACCESS EXCPT, OPERAND OR PRIVATE STORE            *
*       A300 - PSR TRACE - INST STEP, PER OR EXECUTE                 *
*       A400 - INTERRUPT ACCEPTED                                    *
*       A500 - ERRONEOUS A-ENGINE 'RESET' RETURN                     *
*       A600 - A-ENGINE MICROCODE BRANCH ERROR                       *
*       A7A7 - BUS ERROR DURING A DECIMAL OR FLT PT INSTRUCTION      *
*       C0C0 - A PSW SWAP OCCURRED                                   *
*       C100 - OPERATION EXCPT                                       *
*       C600 - SPECIFICATION EXCPT                                   *
*       C7C7 - DATA EXCPT                                            *
*       C800 - FIXED POINT OVERFLOW EXCPT                            *
*       C900 - FIXED POINT DIVIDE EXCPT                              *
*       CBCB - DECIMAL DIVIDE EXCPT                                  *
*       CC00 - EXPONENT OVERFLOW EXCPT                               *
*       CD00 - EXPONENT UNDERFLOW EXCPT                              *
*       CE00 - SIGNIFICANCE EXCPT                                    *
*                                                                    *
**********************************************************************
*
000206 7600              MOVEQ    0,D3
000208 3E385FF0          MOVE.W   OBATCH,D7       GET OP CODE FROM QUATCH
00020C 16385FF0          MOVE.B   OBATCH,D3
000210 30385FB0          MOVE.W   BER_REG,D0      CHECK IF A-ENGINE BUS ERROR
000214 6B08              BMI.S    A_BERR          BRANCH IF ONE IS PENDING
           *             MOVE.L   INSTSAVE,INSTSAVE2  'TRACE LAST THREE INSTRUCTIONS'
000216 E34B              LSL.W    1,D3            MULTIPLY BY 2 FOR DISPLACEMENT
000218 32753000          MOVE.W   0(A5,D3),A1     GO TO PROPER ROUTINE
00021C 4ED1              JMP      (A1)

**********************************************************************
*                                                                    *
*       ROUTINE TO HANDLE A-ENGINE BUS ERRORS                        *
*                                                                    *
*       PRIORITY OF ERRORS:                                          *
*               (1) PAT PARITY                                       *
*               (2) ODD PC                                           *
*               (3) REAL ADDRESS OUT OF BOUNDS                       *
*               (4) VIRTUAL ADDRESS OUT OF BOUNDS                    *
*               (5) PAGE FAULT                                       *
*               (6) OFF BOUNDARY                                     *
*                                                                    *
**********************************************************************
*
```

```
00021E 31FCC2FF601A  A_BERR    MOVE.W    #B_ERR,INSTSAVE    SAVE 'BUS ERROR' OCCURRENCE
000224 4EB8147E                JSR       BUS_ERR            ANALYZE ERROR, AND FILL OUT BECB
000228 4A42                    TST.W     D2                 IF IT WAS A DLAT-MISS WHICH WAS
00022A 67D6                    BEQ.S     RETURNEX              RESOLVED, GO BACK TO RERUN CYCLE
00022C 0C420015                CMPI.W    #MACHCHK,D2        IF NOT MACHINE CHECK, GO TO BAGIT
000230 6648                    BNE.S     A_BAGIT
                      *
000232 0800000D                BTST      OFFB_BIT,D0        IS THIS AN OFF-BOUNDARY ERROR?
000236 6642                    BNE.S     A_BAGIT            IF NOT, MUST BE REAL MACHINE CHECK
                      *
000238 31FCC3FF601A            MOVE.W    #OB_ERR,INSTSAVE   SAVE 'OFF BOUNDARY'
00023E 22786202                MOVEA.L   BECB_ADR,A1        GET OFF BOUNDARY ADDRESS
000242 D3FC80000000            ADDA.L    #MS_ACC,A1
000248 08000008                BTST      RD_WRT,D0          CHECK IF IT WAS A READ CYCLE
00024C 6624                    BNE.S     OB_WRT             BRANCH FOR WRITE
                      *
00024E 11D96208                MOVE.B    (A1)+,WORK1        FETCH HIGH BYTE
000252 11D96209                MOVE.B    (A1)+,WORK1+1      FETCH LOW BYTE
000256 34386208                MOVE.W    WORK1,D2           PUT DATA INTO D2; RETURNS IN OBATCH
                      *
00025A 72EF          RET_OB    MOVEQ     #$EF,D1            SET OFF-BOUNDARY BIT = 0 = ON
                      *                                        A-ENGINE WILL RERUN THE BUS CYCLE
00025C C2386106      RET_BAG   AND.B     SAVE_CNTL,D1
000260 4A3860E8                TST.B     EXECFLAG           ARE WE IN EXECUTE?
000264 6704                    BEQ.S     RET_OB1            NO, OK
000266 00010001                ORI.B     #INSTOV,D1         MAKE SURE NOT TO RESET INST OVERRIDE
00026A 11C15FE1      RET_OB1   MOVE.B    D1,SYS_CNTL
00026E 4EF80202                JMP       RETURNEX           D2 HAS DATA IF IT WAS A READ
                      *
000272 13470001      OB_WRT    MOVE.B    D7,1(A1)           MOVE THIS BYTE FIRST FOR PRETEST
000276 1283                    MOVE.B    D3,(A1)            DATA WAS IN OBATCH REGISTER
000278 60E0                    BRA.S     RET_OB
                      *
00027A 72DF          A_BAGIT   MOVEQ     #$DF,D1            SET BAGIT BIT = 0 = ON
00027C 60DE                    BRA.S     RET_BAG               FORCE BUS ERROR TO A-ENGINE
```

```
***********************************************
*                                              *
*                                              *
*   E-ENGINE REGISTER CONTENTS AT ENTRY TO E-CYCLE ROUTINES   *
*                                              *
*                                              *
*   D0 - BUS ERROR REGISTER                    *
*                                              *
*   D3 - INSTRUCTION BYTE SHIFT LEFT 1 BIT (X'00000???')   *
*                                              *
*   D7 - INSTRUCTION HALFWORD FROM OBATCH      *
*                                              *
* * A0 - ADDRESS OF PSR (X'6000')              *
*                                              *
* * A5 - ADDRESS OF OP TABLE (X'3C00')         *
*                                              *
*   A7 - STACK POINTER                         *
*                                              *
*                                              *
* * THESE REGISTERS MAY NOT BE CHANGED AT ANY TIME!   *
*                                              *
***********************************************

***********************************************
*                                              *
*        B2 INSTRUCTION DECODE                 *
*                                              *
***********************************************
```

```
                      *
00027E 4243          B2OPS     CLR.W     D3
000280 1607                    MOVE.B    D7,D3              GET SECOND BYTE OF INSTRUCTION
000282 0C03001E                CMPI.B    #$1E,D3            TEST IF GREATER THAN X'1E'
                      *                                        (HIGHEST VALID INSTRUCTION)
000286 6200209C                BHI       OPEXCP1
00028A E34B                    LSL.W     1,D3               MULTIPLY BY 2 FOR DISPLACEMENT
00028C 45F80296                LEA       B2OPTAB,A2         GET ADDRESS OF OP DECODE TABLE
000290 32723000                MOVEA.W   0(A2,D3),A1
000294 4ED1                    JMP       (A1)               GO TO ROUTINE
                      *
       00000296      B2OPTAB   EQU       *
```

```
000296 2324               DC    OPEXCP1        INVALID IN E-ENGINE    CONCS    B200 E
000298 2324               DC    OPEXCP1        INVALID IN E-ENGINE    DISCS    B201 E
00029A 1262               DC    STIDP          STORE CPUID            STIDP    B202 E
00029C 2324               DC    OPEXCP1        INVALID IN E-ENGINE    STIDC    B203 E
00029E 0ED2               DC    SCK            SET CLOCK              SCK      B204 E
0002A0 10D4               DC    STCK           STORE CLOCK            STCK     B205 E
0002A2 0EF6               DC    SCKC           SET CLOCK COMPARATOR   SCKC     B206 E
0002A4 110E               DC    STCKC          STORE CLOCK COMPARATOR STCKC    B207 E
0002A6 0FC2               DC    SPT            SET CPU TIMER          SPT      B208 E
0002A8 12E0               DC    STPT           STORE CPU TIMER        STPT     B209 E
0002AA 0F5C               DC    SPKA           SET PSW KEY FROM ADDR  SPKA     B20A E
0002AC 0984               DC    IPK            INSERT PSW KEY         IPK      B20B E
0002AE 2324               DC    OPEXCP1        INVALID IN E-ENGINE    PBINT    B20C E
0002B0 0E4E               DC    PTLB           PURGE TLB              PTLB     B20D E
              *     INVALID IF MANOPS ADDRESS STOP NOT SET UP          EXL      B20E E
0002B2 1D88               DC    ADSTOP         MANOPS ADDRESS STOP             B20E E
              *     INVALID IF PER ADDRESS STOP NOT SET UP             ACCW     B20F E
0002B4 214E               DC    PER_ADST       PER ADDRESS STOP                B20F E
0002B6 2324               DC    OPEXCP1        INVALID IN E-ENGINE    SPX      B210 E
0002B8 2324               DC    OPEXCP1        INVALID IN E-ENGINE    STPX     B211 E
0002BA 2324               DC    OPEXCP1        INVALID IN E-ENGINE    STAP     B212 E
0002BC 0E6A               DC    RRB            RESET REFERENCE BIT    RRB      B213 E
0002BE 2324               DC    OPEXCP1        INVALID IN E-ENGINE             B214 E
0002C0 2324               DC    OPEXCP1        INVALID IN E-ENGINE             B215 E
0002C2 2324               DC    OPEXCP1        INVALID IN E-ENGINE             B216 E
0002C4 2324               DC    OPEXCP1        INVALID IN E-ENGINE             B217 E
0002C6 2324               DC    OPEXCP1        INVALID IN E-ENGINE    PC       B218 E
0002C8 2324               DC    OPEXCP1        INVALID IN E-ENGINE    SAC      B219 E
0002CA 2324               DC    OPEXCP1        INVALID IN E-ENGINE             B21A E
0002CC 2324               DC    OPEXCP1        INVALID IN E-ENGINE             B21B E
0002CE 2324               DC    OPEXCP1        INVALID IN E-ENGINE             B21C E
0002D0 0B34               DC    MAD            MAKE ADDRESSABLE       MAD      B21D E
0002D2 0BA0               DC    MUN            MAKE UNADDRESSABLE     MUN      B21E E
              *
              *
              *                                INVALID IN E-ENGINE    B21F - B2FF E

****************************************************************
              *                                                              *
              *     CS  (BA)  COMPARE AND SWAP INSTRUCTION                   *
              *                                                              *
              ****************************************************************
              *
         000002D4   CS    EQU    *
0002D4 31C7601A            MOVE.W  D7,INSTSAVE        SAVE INSTRUCTION HALFWORD
0002D8 7203                MOVEQ   #3,D1
0002DA C2386019            AND.B   OP2_EA+3,D1        IS OPERAND 2 ON FULLWORD BOUNDARY?
0002DE 6600209C            BNE     SPECEX             NO, SPECIFICATION EXCEPTION
0002E2 28786016            MOVEA.L OP2_EA,A4
0002E6 D9FC80000000        ADDA.L  #MS_ACC,A4
              *
0002EC 2614                MOVE.L  (A4),D3            GET OPERAND 2 FROM MAIN STORAGE
0002EE 021000CF            ANDI.B  #CC_RST,(A0)       SET CONDITION CODE TO ZERO
              *
0002F2 B6B86006            CMP.L   R1,D3              COMPARE REGISTER WITH OPERAND 2
0002F6 670C                BEQ.S   CS1                BRANCH IF EQUAL
              *
0002F8 21C36006            MOVE.L  D3,R1              MOVE OPERAND 2 TO REGISTER
0002FC 00100010            ORI.B   #CC1,(A0)          SET CONDITION CODE 1
000300 4EF80200            JMP     RETURN
              *
              *
000304 28B8600A   CS1      MOVE.L  R3,(A4)            MOVE REGISTER 3 TO STORAGE, CC=0
000308 4EF80200            JMP     RETURN
              *
              ****************************************************************
              *                                                              *
              *     CDS (BB)  COMPARE DOUBLE AND SWAP INSTRUCTION            *
              *                                                              *
              ****************************************************************
              *
         0000030C   CDS   EQU    *
00030C 3207                MOVE.W  D7,D1
```

```
00030E 31C7601A              MOVE.W   D7,INSTSAVE      SAVE INSTRUCTION HALFWORD
000312 2438600A              MOVE.L   RR3_EVEN,D2      SAVE CONTENTS
000316 2638600E              MOVE.L   RR1_EVEN,D3
00031A 28386006              MOVE.L   RR1_ODD,D4       GET CONTENTS OF DOUBLEWORD REGISTER
00031E 21C36006              MOVE.L   D3,RR2E_RET      SAVE REGISTERS IN CASE OF ABORT
000322 21C4600A              MOVE.L   D4,RR2O_RET
000326 02010011              ANDI.B   #$11,D1          TEST IF ODD REGISTERS
00032A 66002050              BNE      SPECEX           SPECIFICATION EXCEPTION IF ODD
00032E 7207                  MOVEQ    #7,D1
000330 C2386019              AND.B    OP2_EA+3,D1      IS OPERAND 2 ON DOUBLEWORD BOUNDARY?
000334 66002046              BNE      SPECEX           NO, SPECIFICATION EXCEPTION
000338 28786016              MOVEA.L  OP2_EA,A4
00033C D9FC80000000          ADDA.L   #MS_ACC,A4
                       *
000342 2A1C                  MOVE.L   (A4)+,D5         GET FIRST HALF FROM MAIN STORAGE
000344 2C14                  MOVE.L   (A4),D6          GET SECOND HALF FROM MAIN STORAGE
                       *
000346 021000CF              ANDI.B   #CC_RST,(A0)     SET CONDITION CODE TO ZERO
00034A BA83                  CMP.L    D3,D5            COMPARE REGISTER WITH OPERAND 2
00034C 6710                  BEQ.S    CDS1             BRANCH IF EQUAL
                       *
00034E 21C56006       CDS3   MOVE.L   D5,RR2E_RET      MOVE OPERAND 2 TO REGISTER
000352 21C6600A              MOVE.L   D6,RR2O_RET      MOVE OPERAND 2 TO REGISTER
                       *
000356 00100010              ORI.B    #CC1,(A0)        SET CONDITION CODE 1 (NOT EQUAL)
00035A 4EF80200              JMP      RETURN
                       *
                       *
00035E BC84           CDS1   CMP.L    D4,D6            COMPARE SECOND WORD
000360 66EC                  BNE.S    CDS3             IF NOT EQUAL, LOAD OPER2, SET CC1
                       *
000362 28B86012              MOVE.L   RR3_ODD,(A4)     MOVE SECOND REGISTER TO STORAGE
000366 2902                  MOVE.L   D2,-(A4)         MOVE REGISTER TO STORAGE, FIX ADDR
000368 4EF80200              JMP      RETURN

* * * * * * * * * * * * * * * * * * * * * * * * * * * * * * * *
*                                                              *
*   CLM  (BD) COMPARE LOGICAL CHARACTERS UNDER MASK INSTRUCTION *
*                                                              *
*                                                              *
* * * * * * * * * * * * * * * * * * * * * * * * * * * * * * * *
                       *
       0000036C       CLM    EQU      *
00036C 31C7601A              MOVE.W   D7,INSTSAVE      SAVE INSTRUCTION
000370 0247000F              ANDI.W   #$000F,D7        GET MASK ONLY
000374 E34F                  LSL.W    1,D7             MAKE IT A BR TABLE DISPLACEMENT
                       *
000376 45F86012              LEA      R1X,A2           GET OPERAND 1 ADDRESS
00037A 28786016              MOVEA.L  OP2_EA,A4        GET OPERAND 2 MS ADDRESS
00037E D9FC80000000          ADDA.L   #MS_ACC,A4
                       *
000384 4EFB7002              JMP      CLMTABLE(D7)     GO TO APPROPRIATE MASK ROUTINE
                       *
       00000388              RORG     *
       00000388       CLMTABLE EQU    *                BRANCH TABLE BASE ADDRESS
       00000388              ORG      *
000388 603E                  BRA.S    CLM00            CLM MASK 0
00038A 6042                  BRA.S    CLM01            CLM MASK 1
00038C 6054                  BRA.S    CLM02            CLM MASK 2
00038E 6042                  BRA.S    CLM03            CLM MASK 3
000390 6064                  BRA.S    CLM04            CLM MASK 4
000392 6042                  BRA.S    CLM05            CLM MASK 5
000394 6054                  BRA.S    CLM06            CLM MASK 6
000396 6042                  BRA.S    CLM07            CLM MASK 7
000398 6018                  BRA.S    CLM08            CLM MASK 8
00039A 6042                  BRA.S    CLM09            CLM MASK 9
00039C 6054                  BRA.S    CLM0A            CLM MASK A
00039E 6046                  BRA.S    CLM0B            CLM MASK B
0003A0 600C                  BRA.S    CLM0C            CLM MASK C
0003A2 604A                  BRA.S    CLM0D            CLM MASK D
0003A4 6004                  BRA.S    CLM0E            CLM MASK E
                       *
0003A6 B50C           CLM0F  CMPM.B   (A4)+,(A2)+      COMPARE 4 BYTES ENTRY, CLM MASK F
0003A8 660C                  BNE.S    CLMCCNE
```

```
0003AA B50C      CLM0E    CMPM.B   (A4)+,(A2)+      COMPARE 3 BYTES ENTRY
0003AC 6608               BNE.S    CLMCCNE
0003AE B50C      CLM0C    CMPM.B   (A4)+,(A2)+      COMPARE 2 BYTES ENTRY
0003B0 6604               BNE.S    CLMCCNE
0003B2 B50C      CLM08    CMPM.B   (A4)+,(A2)+      COMPARE 1 BYTE ENTRY
                 *
0003B4 6714      CLMCC    BEQ.S    CLM00X           GO TO SET COND CODE 0
0003B6 6304      CLMCCNE  BLS.S    CLMCC1
0003B8 7E20               MOVEQ    #CC2,D7          SET CONDITION CODE 2
0003BA 6002               BRA.S    CLMRTN
                 *
0003BC 7E10      CLMCC1   MOVEQ    #CC1,D7          SET CONDITION CODE 1
0003BE 021000CF  CLMRTN   ANDI.B   #CC_RST,(A0)     CLEAR PSR COND CODE
0003C2 8F10               OR.B     D7,(A0)          SET NEW PSR COND CODE
0003C4 4EF80200           JMP      RETURN
                 *
                 *
0003C8 B014      CLM00    CMP.B    (A4),D0          PRETEST EVEN THOUGH MASK IS ZERO
0003CA 7E00      CLM00X   MOVEQ    #CC0,D7          SET CONDITION CODE 0
0003CC 60F0               BRA.S    CLMRTN
                 *
                 *
0003CE 564A      CLM01    ADDQ.W   #3,A2
0003D0 60E0               BRA.S    CLM08            GO TO COMPARE 1 BYTE
                 *
                 *
0003D2 544A      CLM03    ADDQ.W   #2,A2
0003D4 60D8               BRA.S    CLM0C            GO TO COMPARE 2 BYTES
                 *
                 *
0003D6 524A      CLM05    ADDQ.W   #1,A2
0003D8 6018               BRA.S    CLM0A            GO TO COMPARE 2 BYTES
                 *
                 *
0003DA 524A      CLM07    ADDQ.W   #1,A2
0003DC 60CC               BRA.S    CLM0E            GO TO COMPARE 3 BYTES
                 *
                 *
0003DE B50C      CLM09    CMPM.B   (A4)+,(A2)+      COMPARE 2 BYTES
0003E0 66D4               BNE.S    CLMCCNE
0003E2 544A      CLM02    ADDQ.W   #2,A2
0003E4 60CC               BRA.S    CLM08            GO TO COMPARE 1 BYTE
                 *
                 *
0003E6 B50C      CLM0B    CMPM.B   (A4)+,(A2)+      COMPARE 3 BYTES
0003E8 66CC               BNE.S    CLMCCNE
0003EA 524A      CLM06    ADDQ.W   #1,A2
0003EC 60C0               BRA.S    CLM0C            GO TO COMPARE 2 BYTES
                 *
                 *
0003EE B50C      CLM0D    CMPM.B   (A4)+,(A2)+      COMPARE 3 BYTES
0003F0 66C4               BNE.S    CLMCCNE
0003F2 B50C      CLM0A    CMPM.B   (A4)+,(A2)+      COMPARE 2 BYTES
0003F4 66C0               BNE.S    CLMCCNE
0003F6 524A      CLM04    ADDQ.W   #1,A2
0003F8 60B8               BRA.S    CLM08            GO TO COMPARE 1 BYTE

****************************************
*                                       *
*   CLCL (OF)  COMPARE LOGICAL LONG     *
*                                       *
*                                       *
*                    LABEL    CONTENTS  *
*                    -----    --------  *
*      INPUT:  AT COMM+8  RR1_ODD   (R1+1) - OP1 LENGTH    *
*                     +C  RR2_EVEN  (R2)   - OP2 ADDRESS   *
*                     +10 RR1_EVEN  (R1)   - OP1 ADDRESS   *
*                     +14 RR2_ODD   (R2+1) - PAD, OP2 LENGTH *
*                                       *
*                                       *
*      OUTPUT: AT COMM+8  RR2RTN_E  (R2)     *
*                     +C  RR2RTN_O  (R2+1)   *
*                     +10 RR1RTN_E  (R1)     *
*                     +14 RR1RTN_O  (R1+1)   *
```

```
         *
         *           ALSO CONDITION CODE SET IN PSR                          *
         *                                                                    *
         ************************************************************
         *
         000003FA    CLCL       EQU     *
0003FA 31C7601A                 MOVE.W  D7,INSTSAVE          SAVE INSTRUCTION
0003FE 22386006                 MOVE.L  RR1_ODD,D1           SHUFFLE REGISTERS TO RETURN ADDRESSES
000402 21F8600A6006             MOVE.L  RR2_EVEN,RR2E_RET
000408 21F86012600A             MOVE.L  RR2_ODD,RR2O_RET
00040E 21C16012                 MOVE.L  D1,RR1O_RET
         *
000412 11F8600A60E0             MOVE.B  RR2O_RET,RR2O_SAV    SAVE OP2 PAD BYTE
000418 11F8601260DE             MOVE.B  RR1O_RET,RR1O_SAV    SAVE OP1 LENGTH REG HI-BYTE
         *
00041E 7400                     MOVEQ   #0,D2
000420 11C2600E                 MOVE.B  D2,RR1E_RET          CLEAR OP1 ADDRESS HI-BYTE
000424 11C26006                 MOVE.B  D2,RR2E_RET          CLEAR OP2 ADDRESS HI-BYTE
000428 11C26012                 MOVE.B  D2,RR1O_RET          CLEAR HI-BYTE OF OP1 LENGTH REGISTER
00042C 11C2600A                 MOVE.B  D2,RR2O_RET          CLEAR HI-BYTE OF OP2 LENGTH REGISTER
         *
000430 2A386012                 MOVE.L  RR1O_RET,D5          GET OP1 COUNT
000434 2C38600A                 MOVE.L  RR2O_RET,D6          GET OP2 COUNT
000438 287C80000000             MOVEA.L #MS_ACC,A4           GET MAIN STORAGE ADDRESSES
00043E 2C4C                     MOVEA.L A4,A6
000440 D9F8600E                 ADDA.L  RR1E_RET,A4          OP1 MS ADDRESS
000444 DDF86006                 ADDA.L  RR2E_RET,A6          OP2 MS ADDRESS
         *
000448 BC85                     CMP.L   D5,D6                COMPARE OPERAND COUNTS
00044A 5BF860E6                 SMI     CLCL_SW              SET FLAG, 'FF' OP1 >, '00' OP2 >
00044E 6A04                     BPL.S   CLCL_1               BR IF OP2 COUNT > OP1 COUNT
000450 CB46                     EXG     D5,D6                EXCHANGE REGISTERS, OP2 CNT TO D5
000452 C94E                     EXG     A4,A6                EXCHANGE REGISTERS, OP2 TO A4
         *
         *           LARGER OPERAND COUNT/ADDRESS IN D6/A6
         *           USE D5 FOR COUNT TO COMPARE OP1/OP2 FIELDS
         *
000454 2805         CLCL_1      MOVE.L  D5,D4                GET COMPARE WORKING COUNT
000456 670000EC                 BEQ     CLCLPAD1             IF ZERO, GO TO DO PAD COMPARE
         *
00045A 7401                     MOVEQ   #1,D2                TEST OP1/OP2 ADDRESS BOUNDARIES
00045C 300C                     MOVE.W  A4,D0
00045E C042                     AND.W   D2,D0
000460 320E                     MOVE.W  A6,D1
000462 C242                     AND.W   D2,D1
000464 B141                     EOR.W   D0,D1                IF BOUNDARIES ARE UNEQUAL,
000466 666E                     BNE.S   CLCBYTE              COMPARE BYTES
000468 4A40                     TST.W   D0                   IF BOTH ON EVEN BOUNDARY, GO
00046A 670C                     BEQ.S   CLCFULL              GO COMPARE FULLWORDS
         *
00046C 7602                     MOVEQ   #$2,D3               SET UP FOR 1-BYTE COMPARE, D2 IS 1
         *                                                   NECESSARY FOR BUS ERROR HANDLING
00046E B90E                     CMPM.B  (A6)+,(A4)+          COMPARE BYTE TO ALIGN ON HW BNDRY
000470 664E                     BNE.S   CLCBNEQ              BR IF NON-COMPARE
000472 5384                     SUBQ.L  #1,D4                ADJUST WORKING COUNT
000474 670000BA                 BEQ     CLCLPAD              BR IF ZERO, GO TO CHECK PADDING
         *
000478 263C00000080 CLCFULL     MOVE.L  #$80,D3              OPERATION BYTE COUNT IS X'80'
00047E B883         CLCMPF1     CMP.L   D3,D4                TEST REMAINING WORKING COUNT
000480 6D18                     BLT.S   CLCMPF3              BR IF LESS THAN X'80' BYTES LEFT
000482 741F                     MOVEQ   #$1F,D2              LOOP COUNT FOR 4-BYTE COMPARE
000484 B98E         CLCMPF2     CMPM.L  (A6)+,(A4)+          COMPARE 4 BYTES
000486 56CAFFFC                 DBNE    D2,CLCMPF2
00048A 6624                     BNE.S   CLCFNEQ              BR IF NON-COMPARE
00048C 9883                     SUB.L   D3,D4                ADJUST WORKING COUNT
         *
         *           LEAVE TO HANDLE AN INTERRUPT?
         *
00048E 72F8                     MOVEQ   #$F8,D1              INTERRUPT REGISTER MASK
000490 82385F90                 OR.B    CC_INT_REG,D1        WAIT FOR ANY KIND OF INTERRUPT
000494 4601                     NOT.B   D1                   COMPLEMENT BITS
000496 67E6                     BEQ.S   CLCMPF1              BR IF NO, COMPARE MORE FULLWORDS
000498 605C                     BRA.S   CLCLINTR             GO TO CLEAN UP FOR INTERRUPT
         *
         *           X'00' TO X'7F' BYTES LEFT FOR FULLWORD COMPARE
         *
```

```
00049A 2404            CLCMPF3   MOVE.L   D4,D2              GET FULLWORD COMPARE COUNT
00049C 024200FC                  ANDI.W   #$FC,D2
0004A0 677E                      BEQ.S    CLCMPB4            IF NONE, JUST COMPARE BYTES
0004A2 2602                      MOVE.L   D2,D3              MAKE THE OPERATION BYTE COUNT
0004A4 E44A                      LSR.W    2,D2               MAKE FW LOOP COUNT
0004A6 5342                      SUBQ.W   #1,D2
0004A8 B98E            CLCMPF4   CMPM.L   (A6)+,(A4)+        COMPARE REMAINING FULLWORDS
0004AA 56CAFFFC                  DBNE     D2,CLCMPF4
0004AE 676E                      BEQ.S    CLCMPB3            BR IF COMPARE, TEST FOR ANY MORE
                      *
                      *          FW NON-COMPARE
                      *
0004B0 598C            CLCFNEQ   SUBQ.L   #4,A4              RESTORE ADDRESSES
0004B2 598E                      SUBQ.L   #4,A6
0004B4 5242                      ADDQ.W   #1,D2              RESTORE NON-COMPARE BYTE COUNT
0004B6 E54A                      LSL.W    #2,D2
0004B8 5342                      SUBQ.W   #1,D2
0004BA B90E            CLCFNEQ1  CMPM.B   (A6)+,(A4)+        COMPARE 1 BYTE
0004BC 56CAFFFC                  DBNE     D2,CLCFNEQ1        CONTINUE TIL BYTE IS FOUND
                      *
                      *          BYTE NON-COMPARE
                      *
0004C0 55C7            CLCBNEQ   SCS      D7                 SET FLAG, 'FF' SOURCE>DEST, '00' D>S
0004C2 5242                      ADDQ.W   #1,D2              ADJUST NON-COMPARE COUNT
0004C4 9642                      SUB.W    D2,D3              GET COMPARE COUNT FOR THIS LOOP
0004C6 9883                      SUB.L    D3,D4              CALCULATE # BYTES LEFT TO COMPARE
0004C8 BF3860E6                  EOR.B    D7,CLCL_SW         TEST FOR COND CODE RESULT
0004CC 6604                      BNE.S    CLCBNEQ1           BR TO SET CC1
0004CE 7E20                      MOVEQ    #CC2,D7            SET CONDITION CODE 2
0004D0 6036                      BRA.S    CLINTR3            GO TO INTERRUPT EXIT
                      *
0004D2 7E10            CLCBNEQ1  MOVEQ    #CC1,D7            SET CONDITION CODE 1
0004D4 6032                      BRA.S    CLINTR3            GO TO INTERRUPT EXIT
0004D6 263C00000080    CLCBYTE   MOVE.L   #$80,D3            OPERATION BYTE COUNT IS X'80'
0004DC B883            CLCMPB1   CMP.L    D3,D4              TEST REMAINING WORKING COUNT
0004DE 6D40                      BLT.S    CLCMPB4            BR IF LESS THAN X'80' BYTES LEFT
0004E0 747F                      MOVEQ    #$7F,D2            LOOP COUNT FOR BYTE COMPARE
0004E2 B90E            CLCMPB2   CMPM.B   (A6)+,(A4)+        COMPARE 1 BYTE
0004E4 56CAFFFC                  DBNE     D2,CLCMPB2
0004E8 66D6                      BNE.S    CLCBNEQ            BR IF NON-COMPARE, END OF OP
0004EA 9883                      SUB.L    D3,D4              ADJUST WORKING COUNT
                      *
                      *          LEAVE TO HANDLE AN INTERRUPT?
                      *
0004EC 72F8                      MOVEQ    #$F8,D1            INTERRUPT REGISTER MASK
0004EE 82385F90                  OR.B     CC_INT_REG,D1      WAIT FOR ANY KIND OF INTERRUPT
0004F2 4601                      NOT.B    D1                 COMPLEMENT BITS
0004F4 67E6                      BEQ.S    CLCMPB1            BR IF NO, COMPARE MORE
                      *
0004F6 4A3860E8        CLCLINTR  TST.B    EXECFLAG
0004FA 6706                      BEQ.S    CLINTR1
0004FC 59B860EC                  SUBQ.L   #4,SAV_PCEX
000500 6004                      BRA.S    CLINTR2
000502 55B86002        CLINTR1   SUBQ.L   #2,PC
000506 7E00            CLINTR2   MOVEQ    #CC0,D7            SET CONDITION CODE 0
000508 9A84            CLINTR3   SUB.L    D4,D5              CALCULATE # BYTES WHICH COMPARED
00050A 9BB8600A                  SUB.L    D5,RR20_RET        ADJUST OP2 COUNT/ADDRESS
00050E DBB86006                  ADD.L    D5,RR2E_RET
000512 9BB86012                  SUB.L    D5,RR10_RET        ADJUST OP1 COUNT/ADDRESS
000516 DBB8600E                  ADD.L    D5,RR1E_RET
00051A 4EF805E6                  JMP      CLCLEND            GO TO END OF OP
                      *
                      *          X'00' TO X'7F' BYTES LEFT FOR BYTE COMPARE
                      *
00051E 9883            CLCMPB3   SUB.L    D3,D4              ADJUST WORKING COUNT
000520 2604            CLCMPB4   MOVE.L   D4,D3              MAKE THE OPERATION BYTE COUNT
000522 670C                      BEQ.S    CLCLPAD            IF ZERO, CHECK IF PADDING NECESSARY
000524 2404                      MOVE.L   D4,D2              MAKE LOOP COUNT
000526 5342                      SUBQ.W   #1,D2
000528 B90E            CLCMPB5   CMPM.B   (A6)+,(A4)+        COMPARE 1 BYTE
00052A 56CAFFFC                  DBNE     D2,CLCMPB5
00052E 6690                      BNE.S    CLCBNEQ            BR IF NON-COMPARE, END OF OP
                      *
                      *          OP1/OP2 COMPARE DONE, COMPARE REST OF LARGER OP TO PAD
                      *
```

```
000530 9BB8600A    CLCLPAD   SUB.L   D5,RR20_RET    ADJUST OP2 COUNT/ADDRESS
000534 DBB86006              ADD.L   D5,RR2E_RET
000538 9BB86012              SUB.L   D5,RR10_RET    ADJUST OP1 COUNT/ADDRESS
00053C DBB8600E              ADD.L   D5,RR1E_RET
000540 9C85                  SUB.L   D5,D6          COUNT OF BYTES TO COMPARE WITH PAD
000542 7A00                  MOVEQ   #$0,D5         MAKE COMPARE COUNT 0 FOR BUS ERROR
                  *
000544 7E00      CLCLPAD1    MOVEQ   #CC0,D7        SET CONDITION CODE 0, ALL COMPARED
000546 2806                  MOVE.L  D6,D4          GET PAD COMPARE WORKING COUNT
000548 6700009C              BEQ     CLCLEND        BR IF ZERO, NO MORE BYTES TO COMPARE
                  *
00054C 303860E0              MOVE.W  RR20_SAV,D0    GET PAD CHARACTER IN ALL BYTES
000550 103860E0              MOVE.B  RR20_SAV,D0      FOR FW COMPARE
000554 3200                  MOVE.W  D0,D1
000556 4840                  SWAP    D0
000558 3001                  MOVE.W  D1,D0
                  *
00055A 7401                  MOVEQ   #$1,D2         TEST OPERAND BOUNDARY
00055C 320E                  MOVE.W  A6,D1
00055E C202                  AND.B   D2,D1
000560 670C                  BEQ.S   CLPFULL        BR IF ON HW BOUNDARY
                  *
000562 7602                  MOVEQ   #$2,D3         SET UP FOR 1-BYTE COMPARE, D2 IS 1
                  *                                   NECESSARY FOR BUS ERROR
000564 B01E                  CMP.B   (A6)+,D0       COMPARE BYTE TO ALIGN ON HW BOUNDARY
000566 660000AC              BNE     CLPBNEQ
00056A 5384                  SUBQ.L  #1,D4          ADJUST WORKING COUNT
00056C 6B5E                  BMI.S   CLDONE         BRANCH IF ZERO, END OF OP
                  *
00056E 263C000000C0 CLPFULL  MOVE.L  #$C0,D3        OPERATION BYTE COUNT IS X'C0'
000574 B883      CLPADF1     CMP.L   D3,D4          TEST REMAINING WORKING COUNT
000576 6D2A                  BLT.S   CLPADF3        BR IF LESS THAN X'C0' BYTES LEFT
000578 742F                  MOVEQ   #$2F,D2        LOAD 4-BYTE LOOP COUNT
00057A B09E      CLPADF2     CMP.L   (A6)+,D0       COMPARE 4 BYTES TO THE PAD CHARACTER
00057C 56CAFFFC              DBNE    D2,CLPADF2
000580 66000084              BNE     CLPFNEQ        BR IF NON-COMPARE
000584 9883                  SUB.L   D3,D4          ADJUST WORKING COUNT
                  *
                  *           LEAVE TO HANDLE AN INTERRUPT?
                  *
000586 72F8                  MOVEQ   #$F8,D1        INTERRUPT REGISTER MASK
000588 82385F90              OR.B    CC_INT_REG,D1  WAIT FOR ANY KIND OF INTERRUPT
00058C 4601                  NOT.B   D1             COMPLEMENT BITS
00058E 67E4                  BEQ.S   CLPADF1        NO, CONTINUE WITH NEXT UNIT OF OP
000590 4A3860E8              TST.B   EXECFLAG
000594 6706                  BEQ.S   CLINTR4
000596 59B860EC              SUBQ.L  #4,SAV_PCEX
00059A 6030                  BRA.S   CLDONE
00059C 55B86002  CLINTR4     SUBQ.L  #2,PC
0005A0 602A                  BRA.S   CLDONE
                  *
                  *
                  *           X'00' TO X'BF' BYTES LEFT FOR FULLWORD COMPARE
                  *
0005A2 2404      CLPADF3     MOVE.L  D4,D2          GET FULLWORD COMPARE COUNT
0005A4 024200FC              ANDI.W  #$FC,D2
0005A8 6710                  BEQ.S   CLPADB1        IF NONE, JUST COMPARE BYTES
0005AA 2602                  MOVE.L  D2,D3          MAKE THE OPERATION BYTE COUNT
0005AC E44A                  LSR.W   2,D2           MAKE FW LOOP COUNT
0005AE 5342                  SUBQ.W  #1,D2
0005B0 B09E      CLPADF4     CMP.L   (A6)+,D0       COMPARE REMAINING FULLWORDS TO PAD
0005B2 56CAFFFC              DBNE    D2,CLPADF4
0005B6 664E                  BNE.S   CLPFNEQ        BR IF NON-COMPARE
0005B8 9883                  SUB.L   D3,D4          ADJUST WORKING COUNT
                  *
0005BA 2604      CLPADB1     MOVE.L  D4,D3          MAKE OPERATION BYTE COUNT, 0-3 BYTES
0005BC 670E                  BEQ.S   CLDONE         BR IF ZERO, END OF OP
0005BE 2404                  MOVE.L  D4,D2          MAKE LOOP COUNT
0005C0 5342                  SUBQ.W  #1,D2
0005C2 B01E      CLPADB2     CMP.B   (A6)+,D0       COMPARE 1 BYTE
0005C4 56CAFFFC              DBNE    D2,CLPADB2
0005C8 664A                  BNE.S   CLPBNEQ        BR IF NON-COMPARE, END OF OP
                  *
0005CA 9883      CLPADEND    SUB.L   D3,D4          CALCULATE # BYTES WHICH COMPARED
0005CC 9C84      CLDONE      SUB.L   D4,D6
```

```
0005CE  4A3860E6                  TST.B     CLCL_SW             DETERMINE WHICH OPERAND TO UPDATE
0005D2  660A                      BNE.S     CLDONE1
                        *
0005D4  9DB8600A                  SUB.L     D6,RR2O_RET         UPDATE OP2 REGISTERS
0005D8  DDB86006                  ADD.L     D6,RR2E_RET
0005DC  6008                      BRA.S     CLCLEND
                        *
0005DE  9DB86012      CLDONE1     SUB.L     D6,RR1O_RET         UPDATE OP1 REGISTERS
0005E2  DDB8600E                  ADD.L     D6,RR1E_RET
                        *
0005E6  7200          CLCLEND     MOVEQ     #0,D1
0005E8  11C1600E                  MOVE.B    D1,RR1E_RET         ENSURE HIGH BYTES OF REGISTERS OK
0005EC  11F860DE6012              MOVE.B    RR1O_SAV,RR1O_RET
0005F2  11C16006                  MOVE.B    D1,RR2E_RET
0005F6  11F860E0600A              MOVE.B    RR2O_SAV,RR2O_RET
0005FC  021000CF                  ANDI.B    #CC_RST,(A0)        RESET COND CODE IN PSR
000600  8F10                      OR.B      D7,(A0)             SET NEW COND CODE IN PSR
000602  4EF80200                  JMP       RETURN
                        *
                        *         FW NON-COMPARE
                        *
000606  598E          CLPFNEQ     SUBQ.L    #4,A6               RESTORE ADDRESS
000608  5242                      ADDQ.W    #1,D2               RESTORE NON-COMPARE BYTE COUNT
00060A  E54A                      LSL.W     2,D2
00060C  5342                      SUBQ.W    #1,D2
00060E  B01E          CLPFNEQ1    CMP.B     (A6)+,D0            COMPARE 1 BYTE
000610  56CAFFFC                  DBNE      D2,CLPFNEQ1         CONTINUE TIL BYTE IS FOUND
                        *
                        *         BYTE NON-COMPARE
                        *
000614  55C7          CLPBNEQ     SCS       D7                  SET FLAG, 'FF' SOURCE>DEST, '00' D>S
000616  5242                      ADDQ.W    #1,D2               ADJUST NON-COMPARE COUNT
000618  9642                      SUB.W     D2,D3               GET COMPARE BYTE COUNT FOR THIS LOOP
00061A  123860E6                  MOVE.B    CLCL_SW,D1          TEST FOR COND CODE RESULT
00061E  BF01                      EOR.B     D7,D1
000620  6604                      BNE.S     CLPBNEQ1            BR TO SET CC1
000622  7E20                      MOVEQ     #CC2,D7             SET CONDITION CODE 2
000624  60A4                      BRA.S     CLPADEND            GO TO UPDATE OPERAND
                        *
000626  7E10          CLPBNEQ1    MOVEQ     #CC1,D7             SET CONDITION CODE 1
000628  60A0                      BRA.S     CLPADEND            GO TO UPDATE OPERAND
                        *************************************
                        *                                    *
                        *         DIAGNOSE  INSTRUCTION      *
                        *                                    *
                        *         DIAGNOSE INSTRUCTIONS IN THE RANGE OF X'0F00' TO X'0FFF' *
                        *         WILL BE USED BY CP/CMS FOR VARIOUS SYSTEM REQUESTS TO   *
                        *         THE PC. ANY OTHER EFFECTIVE ADDRESS WILL RESULT IN      *
                        *         SPECIFICATION EXCEPTION.                                *
                        *                                    *
                        *************************************
                        *
        0000062A      DIAG        EQU       *
00062A  31C7601A                  MOVE.W    D7,INSTSAVE         SAVE INSTRUCTION HALFWORD
00062E  083800006031              BTST      PSW_PROB,PSW+1      TEST IF IN SUPERVISOR STATE
000634  66001CF2                  BNE       PRIVEX              IF NOT, PRIVILEGED EXCEPTION
                        *
000638  0C780F006018              CMPI.W    #$0F00,OP2_EA+2     IS IT LESS THAN X'0F00'?
00063E  6B08                      BMI.S     DIAGSPEC
000640  0C7810006018              CMPI.W    #$1000,OP2_EA+2     IS IT MORE THAN X'0FFF'?
000646  6B04                      BMI.S     DIAG1
000648  4EF8237C      DIAGSPEC    JMP       SPECEX
                        *
00064C  7204          DIAG1       MOVEQ     #$04,D1             SET BY-PASS PAT BIT FOR NO TRANSLATE
00064E  82386106                  OR.B      SAVE_CNTL,D1              TO ACCESS LOW STORE
000652  11C15FE1                  MOVE.B    D1,SYS_CNTL
000656  227C80000048              MOVEA.L   #ACAW,A1            CAW POINTS TO PC CONTROL BLOCK
00065C  45F86054                  LEA       PCIB_OUT,A2
000660  32385F90      DIAG1A      MOVE.W    CC_INT_REG,D1       WAIT UNTIL PREVIOUS INTERRUPT TO PC
000664  6BFA                      BMI.S     DIAG1A                    IS PROCESSED
000666  2611                      MOVE.L    (A1),D3             SAVE PCIB ADDRESS
000668  2483                      MOVE.L    D3,(A2)             PUT ADDRESS INTO PCIB_OUT FOR PC
00066A  14BC0080                  MOVE.B    #$80,(A2)           PUT 'FLAG' INTO PCIB_OUT BYTE
00066E  11FC007F5F90              MOVE.B    #INT_8088,INTR_REG  SET INTR REQUEST TO PC
000674  32385F90      DIAGWAIT    MOVE.W    CC_INT_REG,D1       WAIT WHILE THE PC PROCESSES THE
```

```
000678 6BFA                    BMI.S      DIAGWAIT              INTERRUPT
               *
00067A 1412                    MOVE.B     (A2),D2               GET CONDITION CODE BITS SET BY PC
00067C 021000CF                ANDI.B     #CC_RST,(A0)          CLEAR CONDITION CODE,
000680 8510                    OR.B       D2,(A0)                 SET NEW CONDITION CODE
000682 0C020010                CMPI.B     #CC1,D2
000686 6606                    BNE.S      DIAG_END
               *
000688 7C00                    MOVEQ      #$00,D6               CLEAR UPPER HALF OF CSW
00068A 2306                    MOVE.L     D6,-(A1)
00068C 2303                    MOVE.L     D3,-(A1)              PUT PCIB ADDR INTO LOWER HALF OF CSW
00068E 11F861065FE1 DIAG_END   MOVE.B     SAVE_CNTL,SYS_CNTL    RESTORE ORIGINAL SYS CONTROL REG
000694 4EF80200                JMP        RETURN

*
               ************************************************************
               *                                                          *
               *   ED   (DE)  EDIT INSTRUCTION                            *
               *   EDMK (DF)  EDIT AND MARK INSTRUCTION                   *
               *                                                          *
               *   THE EDMK INSTRUCTION IS DISTINGUISHED FROM THE ED      *
               *   INSTRUCTION BY ROTATING THE LOW-ORDER BIT OF THE INSTRUCTION *
               *   TO BIT 31 OF D3. IF A SIGNIFICANT DIGIT IS FOUND,      *
               *   THE ADDRESS OF THE DIGIT IS LOADED INTO GPR 1.         *
               *                                                          *
               *   SWITCH BYTE - D0, HIGH ORDER BYTE OF HALFWORD          *
               *               X'80' - SIGNIFICANCE INDICATOR             *
               *               X'40' - DIGIT 1 MARKER                     *
               *                                                          *
               *   CONDITION CODE BYTE - D0, LOW ORDER OF HALFWORD        *
               *                                                          *
               ************************************************************
               *
       00000698 ED              EQU        *
       00000698 EDMK            EQU        *
000698 31C7601A                 MOVE.W     D7,INSTSAVE           SAVE INSTRUCTION HALFWORD
00069C E49B                     ROR.L      2,D3                  SET 'EDIT AND MARK' SWITCH (BIT 31)
00069E 7000                     MOVEQ      #$00,D0               CLEAR SWITCH REGISTER
0006A0 247C80000000             MOVEA.L    #MS_ACC,A2            SET UP MS ACCESS BIT
0006A6 284A                     MOVEA.L    A2,A4
0006A8 D5F86012                 ADDA.L     SSOP1_EA,A2           GET OPERAND 1 EFFECTIVE ADDRESS
0006AC D9F8600E                 ADDA.L     SSOP2_EA,A4           GET OPERAND 2 EFFECTIVE ADDRESS
0006B0 1607                     MOVE.B     D7,D3                 GET LENGTH FROM INSTRUCTION
0006B2 7EF0                     MOVEQ      #$F0,D7               SET UP ZONE MASK
0006B4 72FA                     MOVEQ      #$FA,D1               SET UP SIGN MASK
               *
0006B6 14323000                 MOVE.B     0(A2,D3),D2           PRETEST OP1 LO-ORDER BYTE
               *
               *   PRETEST OPERAND 2 LO-ORDER/HI-ORDER BYTES
               *   OPERAND 2 COULD CONCEIVABLY BE AS LONG AS OPERAND 1.....
               *
0006BA 50F860E7                 ST         PRETEST               SET PRETEST SWITCH
0006BE 1414                     MOVE.B     (A4),D2               PRETEST OP2 HI-ORDER BYTE
0006C0 4A3860E7                 TST.B      PRETEST
0006C4 6A10                     BPL.S      EDPRETST              GO THROUGH 'DRY RUN' IF ACCESS ERR
               *
0006C6 50F860E7                 ST         PRETEST               SET PRETEST SWITCH
0006CA 4DF43000                 LEA        0(A4,D3),A6
0006CE 1416                     MOVE.B     (A6),D2               PRETEST OP2 LO-ORDER BYTE
               *
            ******  IGNORE THIS ACCESS EXCEPTION IF IT EXISTS; A TEST RUN THROUGH
            ******  THE DATA ACTUALLY USED NEEDS TO BE MADE TO CHECK IF THE ACCESS
            ******  EXCEPTION IS REALLY A CORRECT INDICATION.
               *
0006D0 4A3860E7                 TST.B      PRETEST               TEST IF NO ACCESS EXCEPTIONS
0006D4 6B26                     BMI.S      ED1                   GO DO INSTRUCTION IF OK
               *
            ***  GO THROUGH THIS LOOP SEARCHING FOR CHARACTERS WHICH ARE REPLACED
            ***  BY SOURCE DIGITS TO SEE HOW MANY BYTES OF OPERAND 2 ARE NEEDED.
               *
0006D6 3803    EDPRETST         MOVE.W     D3,D4                 COPY LENGTH FOR PRETEST
0006D8 264A                     MOVEA.L    A2,A3                 COPY OP1 ADDRESS FOR PRETEST
0006DA 224C                     MOVEA.L    A4,A1                 COPY OP2 ADDRESS FOR PRETEST
0006DC 141B    EDLOOP1          MOVE.B     (A3)+,D2              GET PATTERN CHARACTER
0006DE 04020020                 SUBI.B     #$20,D2               DIGIT SELECT CHARACTER (X'20') ?
0006E2 6704                     BEQ.S      EDTEST1               BR IF YES
```

```
0006E4 5302                  SUBQ.B   #1,D2         SIGNIFICANCE STARTER CHAR (X'21') ?
0006E6 660E                  BNE.S    EDTEST        BR IF NO
0006E8 BF00       EDTEST1    EOR.B    D7,D0         CHANGE/TEST DIGIT SWITCH
0006EA 670A                  BEQ.S    EDTEST        RETURN IF SW WAS ON, NOW OFF
0006EC 1419                  MOVE.B   (A1)+,D2      TEST IF LO-DIGIT IS SIGN
0006EE 8407                  OR.B     D7,D2
0006F0 B401                  CMP.B    D1,D2
0006F2 6A02                  BPL.S    EDTEST        BR IF NO, DIGIT 1 SWITCH IS ON
0006F4 7000                  MOVEQ    #$00,D0       RESET DIGIT SWITCH
0006F6 51CCFFE4   EDTEST     DBRA     D4,EDLOOP1    LOOP UNTIL BYTE COUNT IS EXHAUSTED
0006FA 7000                  MOVEQ    #$00,D0       CLEAR SWITCHES
                  *
       000006FC   ED1        EQU      *             COME HERE IF NO ACCESS EXCEPTIONS
0006FC 51F860E7              SF       PRETEST       RESET PRETEST SWITCH
000700 1812                  MOVE.B   (A2),D4       GET FILL CHARACTER FROM PATTERN FIELD
                  *
                  *          PATTERN FIELD FETCH LOOP
                  *
000702 1412       EDLOOP2    MOVE.B   (A2),D2       GET PATTERN CHARACTER
000704 0C020020              CMPI.B   #$20,D2       IS IT A DIGIT SELECT CHARACTER
000708 6734                  BEQ.S    DIGITSEL      BR IF YES
00070A 0C020021              CMPI.B   #$21,D2       IS IT A SIGNIFICANCE STARTER CHAR
00070E 672E                  BEQ.S    SIGNIFST      BR IF YES
000710 0C020022              CMPI.B   #$22,D2       IS IT A FIELD SEPARATOR CHARACTER?
000714 6604                  BNE.S    ED2           BR IF NO
000716 02407F00              ANDI.W   #$7F00,D0     CLEAR COND CODE, SIGNIFICANCE IND
00071A 4A40       ED2        TST.W    D0            TEST SIGNIFICANCE INDICATOR
00071C 6B02                  BMI.S    ED3           IF ON, STORE MESSAGE CHARACTER
00071E 1404                  MOVE.B   D4,D2         MOVE FILL CHAR FOR STORE
000720 14C2       ED3        MOVE.B   D2,(A2)+      STORE MESSAGE/FILL CHARACTER
000722 51CBFFDE   ED4        DBRA     D3,EDLOOP2
                  *
000726 021000CF              ANDI.B   #CC_RST,(A0)  CLEAR CONDITION CODE BITS
00072A 0200000F              ANDI.B   #$0F,D0       ANYTHING STORED IN FIELD
00072E 670A                  BEQ.S    EDRTN         BR IF NO, CONDITION CODE 0
000730 7E10                  MOVEQ    #CC1,D7       SET COND CODE 1
000732 4A40                  TST.W    D0            WAS LAST FIELD GREATER THAN ZERO?
000734 6B02                  BMI.S    ED5           BR IF SIGNIFICANCE ON
000736 DE07                  ADD.B    D7,D7         MAKE IT CC2 FOR > 0
000738 8F10       ED5        OR.B     D7,(A0)       SET COND CODE 1/2 INTO PSR
00073A 4EF80200   EDRTN      JMP      RETURN
       0000073E   SIGNIFST   EQU      *
00073E 0840000E   DIGITSEL   BCHG     DIGIT1N,D0    TEST/CHANGE DIGIT SWITCH
000742 6704                  BEQ.S    ED10          IF OFF, GO TO FETCH NEW BYTE
000744 1A06                  MOVE.B   D6,D5         COPY SAVED LO-DIGIT
000746 6010                  BRA.S    ED11          GO TO PROCESS LO-DIGIT
                  *
                  *          FETCH NEW SOURCE BYTE, DIGIT INDICATOR ALREADY TURNED ON
                  *
000748 1C1C       ED10       MOVE.B   (A4)+,D6      GET NEW SOURCE BYTE
00074A 1A06                  MOVE.B   D6,D5         GET HI-DIGIT
00074C E80D                  LSR.B    4,D5          REPOSITION IT
00074E 8A07                  OR.B     D7,D5         MAKE HI-DIGIT ZONED
000750 BA01                  CMP.B    D1,D5         TEST IF HI-DIGIT ALPHA CHARACTER
000752 6A001C2C              BPL      DATAEX        BR IF YES
000756 8C07                  OR.B     D7,D6         MAKE LO-DIGIT ZONED
                  *
000758 4A40       ED11       TST.W    D0            IS SIGNIFICANCE INDICATOR ON?
00075A 6B14                  BMI.S    ED12          YES, GO STORE CHARACTER
00075C BA07                  CMP.B    D7,D5         IS THIS BYTE A ZERO
00075E 672A                  BEQ.S    ED15          YES, STORE FILL CHARACTER
                  *
000760 4A83                  TST.L    D3            IS THIS AN EDIT AND MARK INSTR?
000762 6A0C                  BPL.S    ED12          NO, GO STORE CHARACTER
                  *
                  *          STORE ADDRESS FOR EDIT AND MARK
                  *
000764 14386006              MOVE.B   GPR1,D2       SAVE HIGH ORDER BYTE
000768 21CA6006              MOVE.L   A2,GPR1       STORE ADDRESS OF SIGNIFICANT CHAR
00076C 11C26006              MOVE.B   D2,GPR1       RESTORE HIGH ORDER BYTE IN REG
                  *
                  *          STORE ZONED SOURCE CHARACTER
                  *
000770 14C5       ED12       MOVE.B   D5,(A2)+      STORE ZONED CHARACTER
000772 8005                  OR.B     D5,D0         SAVE FOR CONDITION CODE
```

```
000774 00408000      ED13        ORI.W      #$8000,D0            TURN ON SIGNIFICANCE INDICATOR
000778 BC01                      CMP.B      D1,D6                IS LOW ORDER DIGIT A SIGN CHARACTER?
00077A 6BA6                      BMI.S      ED4                  NO, RETURN TO PATTERN LOOP
                 *
                 *               TEST SIGN DIGIT TO CONTROL SIGNIFICANCE INDICATOR
                 *
00077C E20E                      LSR.B      #1,D6                TEST IF SIGN LO-BIT ON
00077E 6404                      BCC.S      ED14                 BR IF OFF, PLUS SIGN (A, C OR E)
000780 5206                      ADDQ.B     #1,D6                TEST FOR 'F' (X'7F'), A PLUS SIGN
000782 6A10                      BPL.S      ED16                 BR IF NOT 'F', SIGN WAS 'B' OR 'D'
000784 02403FFF      ED14        ANDI.W     #$3FFF,D0            PLUS, TURN OFF SIGNIF AND DIGIT SW
000788 6098                      BRA.S      ED4                  RETURN TO PATTERN LOOP
                 *
                 *               STORE FILL CHARACTER
                 *
00078A 14C4         ED15         MOVE.B     D4,(A2)+             STORE FILL CHARACTER
00078C E20A                      LSR.B      1,D2                 SIGNIFICANCE OR DIGIT ?
00078E 65E4                      BCS.S      ED13                 BR IF SIGNIFICANCE STARTER
000790 BC01                      CMP.B      D1,D6                IS LOW ORDER DIGIT A SIGN CHARACTER?
000792 6B8E                      BMI.S      ED4                  NO, RETURN TO PATTERN LOOP
000794 0240BFFF     ED16         ANDI.W     #$BFFF,D0            TURN OFF DIGIT SWITCH
000798 6088                      BRA.S      ED4                  RETURN TO PATTERN LOOP
                 ****************************************
                 *                                      *
                 *    EX  (44)  EXECUTE INSTRUCTION     *
                 *                                      *
                 ****************************************
                 *
00079A 4EF8237C     SPECEXCP JMP    SPECEX
00079E 4EF8232C     EXECEXCP JMP    EXECEX
                 *
                 *
       000007A2    EX       EQU    *
0007A2 31C7601A             MOVE.W    D7,INSTSAVE             SAVE INSTRUCTION HALFWORD
0007A6 47F860D0             LEA       INST370,A3              GET ADDRESS OF TEMPORARY COPY AREA
0007AA 244B                 MOVEA.L   A3,A2
0007AC 28786016             MOVEA.L   OP2_EA,A4               GET OPERAND ADDRESS
0007B0 D9FC80000000         ADDA.L    #MS_ACC,A4
0007B6 320C                 MOVE.W    A4,D1
0007B8 02410001             ANDI.W    #0001,D1                IS THE EFFECTIVE ADDRESS EVEN
0007BC 66DC                 BNE.S     SPECEXCP                NO, SPECIFICATION EXCEPTION
                 *
0007BE 34DC                 MOVE.W    (A4)+,(A2)+             GET FIRST HALFWORD OF INSTRUCTION
0007C0 1A13                 MOVE.B    (A3),D5
0007C2 0C050044             CMPI.B    #EXEC,D5                IS SUBJECT INSTRUCTION AN EXECUTE?
0007C6 67D6                 BEQ.S     EXECEXCP                YES, EXECUTE EXCEPTION
                 *
0007C8 020500C0             ANDI.B    #$C0,D5
0007CC 670C                 BEQ.S     EX1                     BRANCH IF RR OP
0007CE 6A08                 BPL.S     EX3                     BRANCH IF HIGH-ORDER OFF (QUAD 2)
                 *
0007D0 02050040             ANDI.B    #$40,D5                 IS SUBJECT INSTRUCTION SS?
0007D4 6702                 BEQ.S     EX3                     NO, GET HALFWORD
                 *
0007D6 34DC                 MOVE.W    (A4)+,(A2)+             IF SS INSTR, GET 2 HALFWORDS
                 *
0007D8 34DC        EX3      MOVE.W    (A4)+,(A2)+             MOVE ANOTHER HALFWORD OF SUBJECT
0007DA 024700F0    EX1      ANDI.W    #$00F0,D7
0007DE 6708                 BEQ.S     EX7                     IF R1 IS ZERO, NO CHANGE TO SUBJECT
                 *
0007E0 12386015             MOVE.B    R1X+3,D1
0007E4 833860D1             OR.B      D1,INST370+1            OR REGISTER CONTENTS INTO INSTR.
0007E8 21F8600260EC EX7     MOVE.L    PC,SAV_PCEX             SAVE CURRENT STATUS
0007EE 3A10                 MOVE.W    (A0),D5                 GET PSR
0007F0 31C560FC             MOVE.W    D5,SAV_PSREX
0007F4 50F860E8             ST        EXECFLAG                SET 'EXECUTE' FLAG AND STEERING
0007F8 7201                 MOVEQ     #INSTOV,D1              SET IFETCH OVERIDE BIT = 1 TO ALLOW
0007FA 82386106             OR.B      SAVE_CNTL,D1               IFETCH FROM PRIVATE STORAGE
0007FE 11C15FE1             MOVE.B    D1,SYS_CNTL
000802 21CB6002             MOVE.L    A3,PC                   POINT PC TO 370 INSTRUCTION
000806 0005001E             ORI.B     #TR_MASK+L7_MASK,D5  TURN ON TRACE BIT IN PSR AND MASK
                 *                                              OUT INTERRUPTS
00080A 08850005             BCLR      PSR_EBIT,D5             MAKE SURE EXECUTE BIT IS OFF
00080E 3085                 MOVE.W    D5,(A0)
```

```
000810 4EB80200              JSR       RETURN             GO EXECUTE TARGET INSTRUCTION
              *                                           (STACK ADDRESS OF EXRETURN)
              *
              *
000814 11F861065FE1 EXRETURN MOVE.B    SAVE_CNTL,SYS_CNTL RESTORE ORIGINAL SYS CONTROL REG
00081A 723F              MOVEQ     #ILC_RST,D1
00081C C210              AND.B     (A0),D1                GET PSR HIGH BYTE, RESET ILC
00081E 00010080          ORI.B     #ILC_MSK,D1            SET BIT FOR ILC = 2 (EXECUTE)
              *
000822 3A3C0200          MOVE.W    #$200,D5               LOAD LENGTH OF OPTABLE, TO POINT TO
000826 1A3860D0          MOVE.B    INST370,D5              BETABLE + INSTRUCTION DISPLACEMENT
00082A 7403              MOVEQ     #03,D2
00082C C4355000          AND.B     0(A5,D5),D2            CHECK FOR BRANCH INSTRUCTIONS
000830 6732              BEQ.S     EX5                    BRANCH IF NOT TO RESTORE PC
000832 0C020002          CMPI.B    #02,D2                 THIS BRANCH NEEDS SPECIAL HANDLING?
000836 6B24              BMI.S     EX8                    NO, CHECK 'SUCCESSFUL BRANCH LATCH'
000838 671A              BEQ.S     EX9                    FOR BCTR, CHECK R2 FIELD
              *
00083A 21F860EC01A0 FIXREG MOVE.L  SAV_PCEX,GPR           STORE POINTER TO EXECUTE INSTR +4
000840 11C101A0          MOVE.B    D1,GPR                 PUT LINK INFORMATION INTO REGISTER
000844 383C00F0          MOVE.W    #$00F0,D4
000848 C853              AND.W     (A3),D4                GET REGISTER NUMBER FROM INSTRUCTION
              *
00084A 4EB81882          JSR       L                      PUT CORRECT ADDRESS INTO TARGET REG
              *
00084E 0C050045          CMPI.B    #$45,D5                TEST FOR BAL INSTRUCTION
000852 6716              BEQ.S     EX6                    DON'T TOUCH PC
              *
000854 7A0F         EX9  MOVEQ     #$0F,D5                COME HERE FOR BCTR OR BALR
000856 CA3860D1          AND.B     INST370+1,D5           FIND OUT IF R2 IS ZERO
00085A 6708              BEQ.S     EX5                    IF SO, POINT TO EXECUTE'S NSI
              *
              *
00085C 083800056001 EX8  BTST      PSR_EBIT,PSR+1
000862 6606              BNE.S     EX6
              *
000864 21F860EC6002 EX5  MOVE.L    SAV_PCEX,PC            RESTORE PC TO EXECUTE +4
              *
00086A 1081         EX6  MOVE.B    D1,(A0)
00086C 11F860FD6001      MOVE.B    SAV_PSREX+1,PSR+1      PUT SAVED STATUS INTO PSR
000872 423860E8          CLR.B     EXECFLAG
000876 083800005F90      BTST      FP_INTR,CC_INT_REG     WAS THERE A CORNROW EXCEPTION
00087C 6604              BNE.S     EX_END                 BR IF NO
              *
00087E 4EF818F8          JMP       FP_TEST                GO TO TEST FOR CORNROW EXCEPTION
              *
000882 083800046001 EX_END BTST    PSR_TRACE,PSR+1        TEST FOR ISTEP/PER/ADSTOP
000888 6700F976          BEQ       RETURN                 BR IF NONE, TPEND IS ALREADY OFF
00088C 4E75              RTS                              RETURN TO 'IENDTSTP'
              * * * * * * * * * * * * * * * * * * * * * * * * * * * * * * * *
              *                                                              *
              *  ICM  (BF)  INSERT CHARACTERS UNDER MASK INSTRUCTION         *
              *                                                              *
              *    _____          *
              *   4        4     4    44   4         4                       *
              *   4  'BF'  4 R1  4 M3 44 B2  4    D2      4                  *
              *   4        4     4    44   4         4                       *
              *    _____          *
              *                                                              *
              * * * * * * * * * * * * * * * * * * * * * * * * * * * * * * * *
              *
       0000088E        ICM  EQU       *
00088E 31C7601A          MOVE.W    D7,INSTSAVE            SAVE INSTRUCTION
000892 0247000F          ANDI.W    #$000F,D7              GET MASK ONLY
000896 E34F              LSL.W     1,D7                   MAKE IT A BR TABLE DISPLACEMENT
              *
000898 21F860126006 ICM_RTRY MOVE.L R1X,R1                MOVE OPERAND 1 REGISTER FOR RETURN
00089E 28786016          MOVEA.L   OP2_EA,A4              GET OPERAND 2 MS ADDRESS
0008A2 D9FC80000004      ADDA.L    #MS_ACC+4,A4
0008A8 102CFFFC          MOVE.B    -4(A4),D0              PRE-TEST OP2 LO-ORDER ADDRESS
              *
0008AC 4EFB703C          JMP       ICMTABLE(D7)           GO TO APPROPRIATE MASK ROUTINE
              *
              *
0008B0 11C06009     ICM01 MOVE.B   D0,R1+3                MOVE BYTE TO RETURN REGISTER
```

```
0008B4 6024                       BRA.S    ICMCC         GO TO SET CONDITION CODE
                        *
                        *
0008B6 11C06008   ICM02  MOVE.B   D0,R1+2       MOVE BYTE TO RETURN REGISTER
0008BA 601E              BRA.S    ICMCC         GO TO SET CONDITION CODE
                        *
                        *
0008BC 45F8600A   ICM03  LEA      R1+4,A2       GET OPERAND 1 BYTE ADDRESS
0008C0 554C       ICM03_1 SUBQ.W  #2,A4         ADJUST OPERAND 2 ADDRESS
0008C2 6052              BRA.S    ICMD02        GO TO MOVE 2 BYTES TO RETURN
                        *
                        *
0008C4 11C06007   ICM04  MOVE.B   D0,R1+1       MOVE BYTE TO RETURN REGISTER
0008C8 6010              BRA.S    ICMCC         GO TO SET CONDITION CODE
                        *
                        *
0008CA 45F86009   ICM06  LEA      R1+3,A2       GET OPERAND 1 BYTE ADDRESS
0008CE 60F0              BRA.S    ICM03_1       GO TO MOVE 2 BYTES TO RETURN
                        *
                        *
0008D0 45F86008   ICM0C  LEA      R1+2,A2       GET OPERAND 1 BYTE ADDRESS
0008D4 60EA              BRA.S    ICM03_1       GO TO MOVE 2 BYTES TO RETURN
                        *
                        *
0008D6 11C06006   ICM08  MOVE.B   D0,R1         MOVE BYTE TO RETURN REGISTER
0008DA 674E       ICMCC  BEQ.S    ICM00         BR IF BYTE ZERO, SET CC0
0008DC 6A48              BPL.S    ICMCC2        BR IF BYTE PLUS, SET CC2
0008DE 7E10       ICMCC1 MOVEQ    #CC1,D7       SET CONDITION CODE 1
0008E0 021000CF   ICMRTN ANDI.B   #CC_RST,(A0)  CLEAR PSR COND CODE
EN985023                                        PAGE 31       APPENDIX A
0008E4 8F10              OR.B     D7,(A0)       SET NEW COND CODE IN PSR
0008E6 4EF80200          JMP      RETURN
                        *
                        *
       000008EA          RORG     *
       000008EA   ICMTABLE EQU    *             BRANCH TABLE BASE ADDRESS
       000008EA          ORG      *
0008EA 603E              BRA.S    ICM00         ICM MASK 0
0008EC 60C2              BRA.S    ICM01         ICM MASK 1
0008EE 60C6              BRA.S    ICM02         ICM MASK 2
0008F0 60CA              BRA.S    ICM03         ICM MASK 3
0008F2 60D0              BRA.S    ICM04         ICM MASK 4
0008F4 6038              BRA.S    ICM05         ICM MASK 5
0008F6 60D2              BRA.S    ICM06         ICM MASK 6
0008F8 603C              BRA.S    ICM07         ICM MASK 7
0008FA 60DA              BRA.S    ICM08         ICM MASK 8
0008FC 6040              BRA.S    ICM09         ICM MASK 9
0008FE 604E              BRA.S    ICM0A         ICM MASK A
000900 6054              BRA.S    ICM0B         ICM MASK B
000902 60CC              BRA.S    ICM0C         ICM MASK C
000904 6066              BRA.S    ICM0D         ICM MASK D
000906 6074              BRA.S    ICM0E         ICM MASK E
                        *
                        *
000908 45F8600A   ICM0F  LEA      R1+4,A2       GET OPERAND 1 BYTE ADDRESS
00090C 1524              MOVE.B   -(A4),-(A2)   MOVE BYTE TO RETURN REGISTER
00090E 56C0              SNE      D0            SAVE BYTE CONDITION, Z '00', NZ 'FF'
000910 1524       ICMD03 MOVE.B   -(A4),-(A2)   MOVE BYTE TO RETURN REGISTER
000912 56C1              SNE      D1            SAVE BYTE CONDITION AGAIN
000914 8001              OR.B     D1,D0         ACCUMULATE BYTE CONDITIONS
000916 1524       ICMD02 MOVE.B   -(A4),-(A2)   MOVE BYTE TO RETURN REGISTER
000918 56C1              SNE      D1            SAVE BYTE CONDITION AGAIN
00091A 8001              OR.B     D1,D0         ACCUMULATE BYTE CONDITIONS
00091C 1524       ICMD01 MOVE.B   -(A4),-(A2)   MOVE BYTE TO RETURN REGISTER
00091E 6BBE              BMI.S    ICMCC1        BR IF LAST BYTE MINUS, SET CC1
000920 6604              BNE.S    ICMCC2        BR IF NOT ZERO, SET CC2
000922 4A00              TST.B    D0
000924 6704              BEQ.S    ICM00         BR IF ALL BYTES ZERO, CC0
000926 7E20       ICMCC2 MOVEQ    #CC2,D7       SET CONDITION CODE 2
000928 60B6              BRA.S    ICMRTN
                        *
                        *
00092A 7E00       ICM00  MOVEQ    #CC0,D7       SET CONDITION CODE 0
00092C 60B2              BRA.S    ICMRTN
                        *
```

```
*
00092E 45F8600A     ICM05    LEA      R1+4,A2           GET OPERAND 1 BYTE ADDRESS
000932 554C                  SUBQ.W   #2,A4             ADJUST OPERAND 2 ADDRESS
000934 602C                  BRA.S    ICM0B_1           GO TO MOVE 3 BYTES TO RETURN
                    *
                    *
000936 45F8600A     ICM07    LEA      R1+4,A2           GET OPERAND 1 BYTE ADDRESS
00093A 534C                  SUBQ.W   #1,A4             ADJUST OPERAND 2 ADDRESS
00093C 60D2                  BRA.S    ICMD03            GO TO MOVE 3 BYTES TO RETURN
                    *
                    *
```

EN985023                                                PAGE  32       APPENDIX A

```
00093E 45F8600A     ICM09    LEA      R1+4,A2           GET OPERAND 1 BYTE ADDRESS
000942 554C                  SUBQ.W   #2,A4             ADJUST OPERAND 2 ADDRESS
000944 1524                  MOVE.B   -(A4),-(A2)       MOVE BYTE TO RETURN
000946 56C1                  SNE      D1                SAVE BYTE CONDITION, Z '00', NZ 'FF'
000948 8001                  OR.B     D1,D0             ACCUMULATE BYTE CONDITIONS
00094A 554A                  SUBQ.W   #2,A2             ADJUST OPERAND 1 ADDRESS
00094C 60CE                  BRA.S    ICMD01            GO TO MOVE 1 BYTE TO RETURN
                    *
                    *
00094E 45F86009     ICM0A    LEA      R1+3,A2           GET OPERAND 1 BYTE ADDRESS
000952 554C                  SUBQ.W   #2,A4             ADJUST OPERAND 2 ADDRESS
000954 600C                  BRA.S    ICM0B_1           GO TO MOVE 2 BYTES TO RETURN
                    *
                    *
000956 45F8600A     ICM0B    LEA      R1+4,A2           GET OPERAND 1 BYTE ADDRESS
00095A 534C                  SUBQ.W   #1,A4             ADJUST OPERAND 2 ADDRESS
00095C 1524                  MOVE.B   -(A4),-(A2)       MOVE BYTE TO RETURN
00095E 56C1                  SNE      D1                SAVE BYTE CONDITION, Z '00', NZ 'FF'
000960 8001                  OR.B     D1,D0             ACCUMULATE BYTE CONDITIONS
000962 1524         ICM0B_1  MOVE.B   -(A4),-(A2)       MOVE BYTE TO RETURN
000964 56C1                  SNE      D1                SAVE BYTE CONDITION AGAIN
000966 8001                  OR.B     D1,D0             ACCUMULATE BYTE CONDITIONS
000968 534A                  SUBQ.W   #1,A2             ADJUST OPERAND 2 ADDRESS
00096A 60B0                  BRA.S    ICMD01            GO TO MOVE 1 BYTE TO RETURN
                    *
                    *
00096C 45F8600A     ICM0D    LEA      R1+4,A2           GET OPERAND 1 BYTE ADDRESS
000970 534C                  SUBQ.W   #1,A4             ADJUST OPERAND 2 ADDRESS
000972 1524                  MOVE.B   -(A4),-(A2)       MOVE BYTE TO RETURN
000974 56C1                  SNE      D1                SAVE BYTE CONDITION, Z '00', NZ 'FF'
000976 8001                  OR.B     D1,D0             ACCUMULATE BYTE CONDITIONS
000978 534A                  SUBQ    #1,A2             ADJUST OPERAND 2 ADDRESS
00097A 609A                  BRA.S    ICMD02            GO TO MOVE 2 BYTES TO RETURN
                    *
00097C 45F86009     ICM0E    LEA      R1+3,A2           GET OPERAND 1 BYTE ADDRESS
000980 534C                  SUBQ.W   #1,A4             ADJUST OPERAND 2 ADDRESS
000982 608C                  BRA.S    ICMD03            GO TO MOVE 3 BYTES TO RETURN
```

EN985023                                                PAGE  33       APPENDIX A

```
                    PAGE
***********************************************
*                                              *
*    IPK  (B20B)  INSERT PSW KEY INSTRUCTION   *
*                                              *
***********************************************
*
       00000984    IPK       EQU      *
000984 31C7601A              MOVE.W   D7,INSTSAVE       SAVE INSTRUCTION HALFWORD
000988 083800006031          BTST     PSW_PROB,PSW+1    TEST IF IN SUPERVISOR STATE
00098E 66001998              BNE      PRIVEX            IF NOT, PRIVILEGED EXCEPTION
                    *
000992 72F0                  MOVEQ    #$F0,D1
000994 C2386031              AND.B    PSW+1,D1          GET KEY BITS FROM PSW
000998 11C1600D              MOVE.B   D1,GPR2+3         PUT INTO LOW BYTE OF REGISTER
00099C 4EF80200              JMP      RETURN
                    *
```

```
*****************************************
*                                        *
*  ISK (09)  INSERT STORAGE KEY INSTRUCTION *
*                                        *
*        --------------------            *
*        * '09' * R1 * R2 *              *
*        --------------------            *
*                                        *
*   EXIT: PSR, PC AND R2 ARE UNCHANGED.  *
*         R1 CONTAINS THE STORAGE KEY FOR ISK. *
*                                        *
*****************************************

000009A0      ISK     EQU     *
0009A0 31C7601A                     MOVE.W  D7,INSTSAVE          SAVE INSTRUCTION HALFWORD
0009A4 083800006031                 BTST    PSW_PROB,PSW+1       TEST FOR PRIVILEGED OP EXCEPTION
0009AA 6600197C                     BNE     PRIVEX               BR IF PROBLEM STATE
                             *
0009AE 2438600A                     MOVE.L  R3,D2                GET R2 FIELD LO-WORD
0009B2 780F                         MOVEQ   #$0F,D4              TEST R2 DATA FOR SPECIFICATION EXCP
0009B4 C802                         AND.B   D2,D4                BITS 28-31 NOT ZERO
0009B6 660019C4                     BNE     SPECEX               BR IF NOT ZERO
                             *
0009BA 0C8200400000                 CMPI.L  #VIRT_STR,D2         CHECK IF ADDRESS IS IN VIRTUAL RANGE
0009C0 6A001940                     BPL     PAGE_FLT
                             *
0009C4 0242F000      ISK2           ANDI.W  #$F000,D2            ENSURE LAST THREE DIGITS ARE 0
0009C8 068200800000                 ADDI.L  #PAT,D2              TURN ON PAT BIT
0009CE 2442                         MOVEA.L D2,A2                MOVE ADDRESS
0009D0 7208                         MOVEQ   #$08,D1              SET PAT_MOD BIT = 1 TO ALLOW
0009D2 82386106                     OR.B    SAVE_CNTL,D1            PAT ACCESS
0009D6 11C15FE1                     MOVE.B  D1,SYS_CNTL
0009DA 1412                         MOVE.B  (A2),D2              GET KEY BYTE
0009DC 6B001072                     BMI     BUSERR
0009E0 11F861065FE1                 MOVE.B  SAVE_CNTL,SYS_CNTL   RESTORE ORIGINAL SYS CONTROL REG
                             *
0009E6 08020002                     BTST    2,D2                 IS THE PAGE FAULT BIT ON?
0009EA 66001990                     BNE     SPECEX
0009EE 02020003                     ANDI.B  #$03,D2              ONLY REFERENCE AND CHANGE BITS VALID
0009F2 E30A                         LSL.B   1,D2                 SHIFT THEM INTO CORRECT POSITION
0009F4 083800036031                 BTST    PSW_EC,PSW+1         IS THIS EC MODE? IF YES, STORE
0009FA 6602                         BNE.S   ISK1                    7-BIT KEY (4-BITS,F,R,C)
0009FC 4202                         CLR.B   D2                   IN BC MODE, KEY IS ZERO
0009FE 11C26009      ISK1           MOVE.B  D2,R1+3              STORE KEY INTO LOW BYTE OF REGISTER
000A02 4EF80200                     JMP     RETURN
                             *
```

```
*****************************************
*                                        *
*  LCTL (B7)  LOAD CONTROL INSTRUCTION   *
*                                        *
*****************************************

00000A06     LCTL    EQU     *
000A06 31C7601A                    MOVE.W  D7,INSTSAVE           SAVE INSTRUCTION HALFWORD
000A0A 083800006031                BTST    PSW_PROB,PSW+1        IN SUPERVISOR STATE?
000A10 66001916                    BNE     PRIVEX                NO, PRIVILEGED EXCEPTION
000A14 7203                        MOVEQ   #03,D1                TEST FOR ALIGNMENT OF OPERAND ON
000A16 C2386019                    AND.B   OP2_EA+3,D1           FULLWORD BOUNDARY; SPECIFICATION
000A1A 66001960                    BNE     SPECEX                   EXCEPTION IF NOT.
                           *
000A1E 4241                        CLR.W   D1
000A20 43F80100                    LEA     CREG0,A1              POINT TO CONTROL REGISTER 0
000A24 2A11                        MOVE.L  (A1),D5               SAVE REGISTER 0
000A26 1207                        MOVE.B  D7,D1                 GET R1 AND R3 FROM INSTRUCTION
000A28 3401                        MOVE.W  D1,D2
000A2A 020100F0                    ANDI.B  #$F0,D1               D1 HAS REGISTER 1
000A2E E409                        LSR.B   2,D1
000A30 0202000F                    ANDI.B  #$0F,D2               D2 HAS REGISTER 3
000A34 E50A                        LSL.B   2,D2
                           *
```

```
000A36 B441                   CMP.W    D1,D2              COMPARE THE REGISTERS; IF D2 IS LESS
000A38 6B3E                   BMI.S    LCTL1              THAN D1, WE MUST WRAP FROM 15 TO 0
000A3A 3802                   MOVE.W   D2,D4              CALCULATE NUMBER OF BYTES FOR
000A3C 9841                   SUB.W    D1,D4                 PREFETCHING FROM MAIN STORAGE
            *
000A3E 28786016                MOVEA.L  OP2_EA,A4
000A42 D9FC80000000            ADDA.L   #MS_ACC,A4
000A48 10344003       LCTL3   MOVE.B   3(A4,D4),D0         GET LAST BYTE FROM OP 2 ADDRESS
            *                                               IF NO ERRORS, GO AHEAD
000A4C 239C1000       LCTLOOP MOVE.L   (A4)+,0(A1,D1)      LOAD ONE CONTROL REGISTER
000A50 5841                   ADDQ.W   #4,D1               UPDATE D1 BY 4 (LENGTH IN BYTES)
000A52 B441                   CMP.W    D1,D2               HAVE WE REACHED REQUESTED NUMBER?
000A54 6AF6                   BPL.S    LCTLOOP             IF NOT, CONTINUE LOOPING
000A56 08010010               BTST     SW1,D1              TEST IF WE MUST WRAP FROM REG15 TO 0
000A5A 6706                   BEQ.S    LCTLMSK             BRANCH IF BIT IS OFF
000A5C 4842                   SWAP     D2                  RESTORE ENDING REGISTER
000A5E 7200                   MOVEQ    #0,D1               START AGAIN AT REG 0 ***** THIS
            *                                               ALSO RESETS SW1!!! ***
000A60 60EA                   BRA.S    LCTLOOP             CONTINUE IN LOOP UNTIL DONE
            *
000A62 BA780102       LCTLMSK CMP.W    CREG0+2,D5          HAVE EXTERNAL MASKS CHANGED?
000A66 670C                   BEQ.S    LCTLEND
000A68 083800006030           BTST     PSW_EXT,PSW         ARE EXTERNAL INTERRUPTS MASKED ON?
000A6E 6704                   BEQ.S    LCTLEND
000A70 4EB817E0               JSR      EX_INT              GO CHECK IF PSW SWAP
            *
000A74 4EF80200       LCTLEND JMP      RETURN              INSTRUCTION IS COMPLETE
            *
            *
            *
000A78 7840           LCTL1   MOVEQ    #$40,D4
000A7A 9841                   SUB.W    D1,D4               CALCULATE NUMBER OF BYTES TO BE
000A7C D842                   ADD.W    D2,D4               TRANSFERRED FOR PRE-FETCH OF STORAGE
000A7E 4842                   SWAP     D2                  SAVE ENDING REGISTER
000A80 343C003C               MOVE.W   #$003C,D2           MAKE REGISTER 15 LAST REGISTER
000A84 08C10010               BSET     SW1,D1              SET WRAP SWITCH
000A88 60BE                   BRA.S    LCTL3               GO PREFETCH AND LOOP UNTIL REG 15
```

```
                      PAGE
*************************************************
*                                                *
*     LPSW (82)   LOAD PSW INSTRUCTION            *
*                                                *
*     NEW PSW ADDRESS POINTED TO BY FIRST OPERAND *
*                                                *
*     EXIT:  NEW PSW POINTED TO BY INSTRUCTION IS LOADED AS *
*            CURRENT PSW                          *
*     ERROR: ACCESS EXCEPTIONS, SPECIFICATION EXCEPTION IF *
*            EC MODE PSW HAS INCORRECT FORMAT     *
*                                                *
*************************************************
*
          00000A8A     LPSW    EQU     *
000A8A 31C7601A                MOVE.W  D7,INSTSAVE         SAVE INSTRUCTION HALFWORD
000A8E 083800006031            BTST    PSW_PROB,PSW+1
000A94 66001892                BNE     PRIVEX
000A98 7207                    MOVEQ   #$07,D1             LOAD MASK BYTE TO TEST FOR
000A9A C2386019                AND.B   OP2_EA+3,D1             DOUBLEWORD BOUNDARY
000A9E 660018DC                BNE     SPECEX              IF NOT, SPECIFICATION EXCEPTION
            *
000AA2 28786016                MOVEA.L OP2_EA,A4           GET OPERAND 1 ADDRESS
```

```
000AA6 D9FC80000000              ADDA.L    #MS_ACC,A4
                       *
000AAC 4EB824C8                   JSR      PSW_LOAD          VERIFY PSW AND LOAD IT
                       *
000AB0 08D00007                   BSET     PSR_ILC0,(A0)     PUT ILC OF 2 INTO PSR
                       *
000AB4 4EF81EEA                   JMP      IENDLPSW          GO TO END OF INSTRUCTION
                       *
```

EN985023                                          PAGE 38        APPENDIX A

```
                       PAGE
***********************************************
*                                              *
*   LRA  (B1)  LOAD REAL ADDRESS INSTRUCTION   *
*                                              *
*   LOAD REAL ADDRESS FROM PAT - WHEN CONTROL REG 1 IS ZERO  *
*                                              *
***********************************************
                       *
000AB8 31C7601A        LRA       MOVE.W    D7,INSTSAVE       SAVE INSTRUCTION HALFWORD
000ABC 21F860126006              MOVE.L    R1X,R1            MOVE REGISTER FOR RETURN
000AC2 083800006031              BTST      PSW_PROB,PSW+1
000AC8 6600185E                  BNE       PRIVEX
                       *
                       *
000ACC 4AB80104        LRA1      TST.L     CREG1             IF CONTROL REGISTER 1 IS NOT ZERO,
000AD0 660018FE                  BNE       TRANSPEX             SET TRANSLATE SPEC EXCEPTION
000AD4 7208                      MOVEQ     #$08,D1           SET PAT_MOD BIT = 1 TO ALLOW
000AD6 82386106                  OR.B      SAVE_CNTL,D1         PAT ACCESS
000ADA 11C15FE1                  MOVE.B    D1,SYS_CNTL
                       *
000ADE 22386016                  MOVE.L    OP2_EA,D1         GET OPERAND
000AE2 3401                      MOVE.W    D1,D2
000AE4 0C8100400000              CMPI.L    #VIRT_STR,D1      CHECK 4 MEG VIRTUAL BOUNDARY
000AEA 6A3E                      BPL.S     S_LRACC2          SET CONDITION CODE 2 IF EXCEEDED
                       *
000AEC 028100FFF000              ANDI.L    #$00FFF000,D1     ENSURE EXTRA BITS ARE OFF
000AF2 068100800000              ADDI.L    #PAT,D1           TURN ON BIT 23
000AF8 2241                      MOVEA.L   D1,A1
000AFA 7200                      MOVEQ     #$0,D1
000AFC 3211                      MOVE.W    (A1),D1           GET PAT ENTRY
000AFE 6B000F50                  BMI       BUSERR            CHECK FOR PAT PARITY ERROR
000B02 0801000A                  BTST      PF_BIT,D1
000B06 6622                      BNE.S     S_LRACC2
000B08 0241007F                  ANDI.W    #$007F,D1         AND OFF UNNECESSARY BITS
000B0C E149                      LSL.W     8,D1              ALIGN ADDRESS PROPERLY
000B0E E989                      LSL.L     4,D1              ALIGN ADDRESS PROPERLY
000B10 028200000FFF              ANDI.L    #$00000FFF,D2     ISOLATE DISPLACEMENT
000B16 D282                      ADD.L     D2,D1
000B18 21C16006                  MOVE.L    D1,R1
000B1C 021000CF                  ANDI.B    #CC_RST,(A0)      CLEAR CONDITION CODE BITS (CC0)
000B20 11F861065FE1   SLRADONE   MOVE.B    SAVE_CNTL,SYS_CNTL  RESTORE ORIGINAL SYS CONTROL REG
000B26 4EF80200                  JMP       RETURN
                       *
                       *
000B2A 021000CF        S_LRACC2  ANDI.B    #CC_RST,(A0)      CLEAR CONDITION CODE BITS
000B2E 00100020                  ORI.B     #CC2,(A0)         SET CONDITION CODE 2
000B32 60EC                      BRA.S     SLRADONE
                       *
```

EN985023                                          PAGE 39        APPENDIX A

```
                       PAGE
***********************************************
*                                              *
*   MAD  (B21D)  MAKE ADDRESSABLE INSTRUCTION  *
*                                              *
*   VIRTUAL ADDRESS IN OPERAND 2, REAL ADDRESS IN GPR2  *
*                                              *
***********************************************
                       *
        00000B34       MAD       EQU       *
000B34 31C7601A                  MOVE.W    D7,INSTSAVE       SAVE INSTRUCTION HALFWORD
000B38 083800006031              BTST      PSW_PROB,PSW+1
000B3E 660017E8                  BNE       PRIVEX
                       *
000B42 4AB80104                  TST.L     CREG1
```

```
000B46 660017DC              BNE     OPEXCP1
              *
000B4A 26386016               MOVE.L  OP2_EA,D3         GET OPERAND
000B4E 0C8300400000           CMPI.L  #VIRT_STR,D3      CHECK IF ADDRESS IS IN VIRTUAL RANGE
000B54 6A0017B4               BPL     ADDR_ERR
              *
000B58 7208                   MOVEQ   #$08,D1           SET PAT_MOD BIT = 1 TO ALLOW
000B5A 82386106               OR.B    SAVE_CNTL,D1         PAT ACCESS
000B5E 11C15FE1               MOVE.B  D1,SYS_CNTL
              *
000B62 028300FFF000           ANDI.L  #$00FFF000,D3     ENSURE EXTRA BITS ARE OFF
000B68 068300800000           ADDI.L  #PAT,D3           TURN ON BIT 23
000B6E 2243                   MOVEA.L D3,A1
000B70 2438600A               MOVE.L  GPR2,D2           GET REAL ADDRESS
000B74 0C8200058000           CMPI.L  #MAIN_STR,D2      CHECK IF IT'S OUTSIDE STORAGE RANGE
000B7A 6A001854               BPL     TRANSPEX          YES, SET TRANSLATION SPEC EXCEPTION
000B7E E98A                   LSL.L   4,D2
000B80 4842                   SWAP    D2
000B82 024200FF               ANDI.W  #$00FF,D2         GET RID OF EXTRA BITS
              *
000B86 0CB800058000
       6016                   CMPI.L  #MAIN_STR,OP2_EA  CHECK IF WE NEED TO SET THE
000B8E 6B04                   BMI.S   MAD1                  'REAL OUT OF BOUNDS' BIT IN PAT
000B90 00420800               ORI.W   #$0800,D2             ENTRY
000B94 3282           MAD1    MOVE.W  D2,(A1)
000B96 11F861065FE1           MOVE.B  SAVE_CNTL,SYS_CNTL  RESTORE ORIGINAL SYS CONTROL REG
000B9C 4EF80200               JMP     RETURN
              *
```

```
                                                        PAGE  40          APPENDIX A
                      PAGE
* * * * * * * * * * * * * * * * * * * * * * * * * * * * * * * * * * * * * *
*                                                                         *
*      MUN  (B21E)   MAKE UNADDRESSABLE INSTRUCTION                       *
*                                                                         *
* * * * * * * * * * * * * * * * * * * * * * * * * * * * * * * * * * * * * *
              *
              00000BA0   MUN   EQU     *
000BA0 31C7601A               MOVE.W  D7,INSTSAVE       SAVE INSTRUCTION HALFWORD
000BA4 083800006031           BTST    PSW_PROB,PSW+1
000BAA 6600177C               BNE     PRIVEX
              *
000BAE 4AB80104               TST.L   CREG1             IF CONTROL REGISTER 1 DOES NOT
000BB2 66001770               BNE     OPEXCP1              CONTAIN ZERO, OP CHECK
              *
000BB6 26386016               MOVE.L  OP2_EA,D3         GET OPERAND
000BBA 0C8300400000           CMPI.L  #VIRT_STR,D3      CHECK IF ADDRESS IS IN VIRTUAL RANGE
000BC0 6A001748               BPL     ADDR_ERR
              *
000BC4 7208                   MOVEQ   #$08,D1           SET PAT_MOD BIT = 1 TO ALLOW
000BC6 82386106               OR.B    SAVE_CNTL,D1          PAT ACCESS
000BCA 11C15FE1               MOVE.B  D1,SYS_CNTL
              *
000BCE 028300FFF000           ANDI.L  #$00FFF000,D3     ENSURE EXTRA BITS ARE OFF
000BD4 068300800000           ADDI.L  #PAT,D3           TURN ON BIT 23
000BDA 2243                   MOVEA.L D3,A1
000BDC 343C0400               MOVE.W  #$0400,D2         PAGE FAULT BIT
              *
000BE0 0CB800058000
       6016                   CMPI.L  #MAIN_STR,OP2_EA  CHECK IF THIS ADDRESS IS OUTSIDE
000BE8 6B04                   BMI.S   MUN1                  THE MAIN STORAGE RANGE
000BEA 00420800               ORI.W   #$0800,D2         IF YES, SET 'REAL OUT OF BOUNDS' BIT
              *
000BEE 3282           MUN1    MOVE.W  D2,(A1)           INVALIDATE ENTRY
000BF0 11F861065FE1           MOVE.B  SAVE_CNTL,SYS_CNTL  RESTORE ORIGINAL SYS CONTROL REG
000BF6 4EF80200               JMP     RETURN
```

```
                                                        PAGE  41          APPENDIX A
                      PAGE
* * * * * * * * * * * * * * * * * * * * * * * * * * * * * * * * * * * * * *
*                                                                         *
*      MC  (AF)   MONITOR CALL INSTRUCTION                                *
*                                                                         *
* * * * * * * * * * * * * * * * * * * * * * * * * * * * * * * * * * * * * *
              *
              00000BFA   MC    EQU     *
000BFA 31C7601A               MOVE.W  D7,INSTSAVE       SAVE INSTRUCTION HALFWORD
```

```
000BFE 3807              MOVE.W   D7,D4
000C00 024700F0          ANDI.W   #$00F0,D7     TEST IF HIGH-ORDER BITS ARE 0
000C04 66001776          BNE      SPECEX        SPECIFICATION EXCEPTION IF NOT
                *
000C08 720F              MOVEQ    #$0F,D1       GET IBM BIT NUMBER
000C0A C841              AND.W    D1,D4
000C0C 9244              SUB.W    D4,D1         SUBTRACT IT FROM 'F' FOR MOT BIT #
000C0E 36380122          MOVE.W   CREG8+2,D3
000C12 0303              BTST     D1,D3         IS THIS CLASS INTERRUPT ALLOWED?
000C14 6700F5EA          BEQ      RETURN        IF NOT MASKED ON, NO PROG CHECK
                *
000C18 247C80000094      MOVEA.L  #AMONCLAS,A2  GET MAIN STORE ADDR FOR CLASS CODE
000C1E 7204              MOVEQ    #$04,D1       SET BY-PASS PAT BIT FOR NO TRANSLATE
000C20 82386106          OR.B     SAVE_CNTL,D1        TO ACCESS LOW STORE
000C24 11C15FE1          MOVE.B   D1,SYS_CNTL
000C28 3484              MOVE.W   D4,(A2)       PUT MONITOR CLASS AT LOC. X'94'
000C2A 257860160008      MOVE.L   OP2_EA,8(A2)  PUT MONITOR CODE AT X'9C'
000C30 7440              MOVEQ    #$0040,D2     MONITOR CALL PROGRAM INTERRUPT CODE
000C32 4EF823E2          JMP      PROGCHK       GO SWAP PSWS
                *
```

```
                                                PAGE 42       APPENDIX A
EN985023
        PAGE
* * * * * * * * * * * * * * * * * * * * * * * * * * * * * * * * * * * * *
*                                                                       *
*       MVCIN  (E8)  MOVE CHARACTER INVERSE INSTRUCTION                  *
*                                                                       *
*                                                                       *
* * * * * * * * * * * * * * * * * * * * * * * * * * * * * * * * * * * * *
*
*
       00000C36     MVCIN    EQU     *              MOVE INVERSE - E8
000C36 31C7601A              MOVE.W  D7,INSTSAVE    SAVE INSTRUCTION
000C3A 7200                  MOVEQ   #$00,D1        GET LOOP COUNT
000C3C 1207                  MOVE.B  D7,D1
000C3E 227C80000000          MOVEA.L #MS_ACC,A1     SET UP MS ACCESS
000C44 2449                  MOVEA.L A1,A2
000C46 D3F86012              ADDA.L  SSOP1_EA,A1    GET OP1 MS ADDRESS
000C4A 1E311000              MOVE.B  0(A1,D1),D7    PRETEST LAST OP1 ADDRESS
000C4E D5F8600E              ADDA.L  SSOP2_EA,A2    GET OP2 MS ADDRESS
000C52 264A                  MOVEA.L A2,A3          PRETEST LAST OP2 ADDRESS
000C54 97C1                  SUBA.L  D1,A3
000C56 1E13                  MOVE.B  (A3),D7
000C58 528A                  ADDQ.L  #1,A2          ADJUST OP2 ADDRESS FOR MOVE
                *
000C5A 12E2         MVCINLP  MOVE.B  -(A2),(A1)+    MOVE EACH CHARACTER
000C5C 51C9FFFC              DBRA    D1,MVCINLP
000C60 4EF80200              JMP     RETURN
```

```
                                                PAGE 43       APPENDIX A
EN985023
        PAGE
* * * * * * * * * * * * * * * * * * * * * * * * * * * * * * * * * * * * *
*                                                                       *
*       MVCL  (0E)  MOVE CHARACTER LONG                                  *
*                                                                       *
*                                                                       *
*                            LABEL      CONTENTS                        *
*                            -----      --------                        *
*       INPUT:  AT COMM+8    RR1_ODD    (R1+1) - OP1 LENGTH              *
*                      +C    RR2_EVEN   (R2)   - OP2 ADDRESS             *
*                      +10   RR1_EVEN   (R1)   - OP1 ADDRESS             *
*                      +14   RR2_ODD    (R2+1) - PAD, OP2 LENGTH         *
*                                                                       *
*                                                                       *
*       OUTPUT: AT COMM+8    REG3       (R2)                             *
*                      +C    REG4       (R2+1)                           *
*                      +10   REG1       (R1)                             *
*                      +14   REG2       (R1+1)                           *
*                                                                       *
*                                                                       *
*       MOVES DATA FROM OPERAND 2 LOCATION TO OPERAND 1 LOCATION         *
*       ALSO SETS CONDITION CODE IN THE PSR                              *
*                                                                       *
* * * * * * * * * * * * * * * * * * * * * * * * * * * * * * * * * * * * *
```

```
            00000C64    MVCL    EQU     *
000C64 31C7601A                 MOVE.W  D7,INSTSAVE         SAVE INSTRUCTION
000C68 22386006                 MOVE.L  RR1_ODD,D1
000C6C 21F8600A6006             MOVE.L  RR2_EVEN,RR2E_RET   MOVE REGISTERS TO CORRECT LOCATION
000C72 21F86012600A             MOVE.L  RR2_ODD,RR20_RET        FOR RETURN
000C78 21C16012                 MOVE.L  D1,RR10_RET
        *
000C7C 11F8600A60E0             MOVE.B  RR20_RET,RR20_SAV   SAVE PAD BYTE
000C82 11F8601260DE             MOVE.B  RR10_RET,RR10_SAV   SAVE OP1 LENGTH REG HI-BYTE
        *
000C88 7400                     MOVEQ   #0,D2
000C8A 11C2600E                 MOVE.B  D2,RR1E_RET         CLEAR OP1 ADDRESS HI-BYTE
000C8E 11C26006                 MOVE.B  D2,RR2E_RET         CLEAR OP2 ADDRESS HI-BYTE
000C92 11C26012                 MOVE.B  D2,RR10_RET         CLEAR HI-BYTE OF OP1 LENGTH REGISTER
000C96 11C2600A                 MOVE.B  D2,RR20_RET         CLEAR HI-BYTE OF OP2 LENGTH REGISTER
        *
000C9A 2A386012                 MOVE.L  RR10_RET,D5         GET OP1 COUNT
000C9E 2C38600A                 MOVE.L  RR20_RET,D6         GET OP2 COUNT
000CA2 287C80000000             MOVEA.L #MS_ACC,A4          GET MAIN STORAGE ADDRESSES
000CA8 2C4C                     MOVEA.L A4,A6
000CAA D9F8600E                 ADDA.L  RR1E_RET,A4         OP1 MS ADDRESS
000CAE DDF86006                 ADDA.L  RR2E_RET,A6         OP2 MS ADDRESS

PAGE
000CB2 BC85                     CMP.L   D5,D6               COMPARE OPERAND COUNTS
000CB4 6604                     BNE.S   MVCL1               BR IF NOT EQUAL
000CB6 7E00                     MOVEQ   #CC0,D7             SET COND CODE 0, OP1 = OP2
000CB8 600C                     BRA.S   MVCL3
        *
000CBA 6B06    MVCL1            BMI.S   MVCL2               BR IF MINUS, OP1 LARGER SET CC2
000CBC 7E10                     MOVEQ   #CC1,D7             SET COND CODE 1, OP2 GT OP1
000CBE 2C05                     MOVE.L  D5,D6               MOVE COUNT TO PAD COUNT, NO PAD
000CC0 6004                     BRA.S   MVCL3
        *
000CC2 7E20    MVCL2            MOVEQ   #CC2,D7             SET COND CODE 2, OP1 GT OP2
000CC4 CD45                     EXG.L   D6,D5               MOVE COUNT TO D5, PAD COUNT TO D6
        *
000CC6 2805    MVCL3            MOVE.L  D5,D4               MOVE WORKING COUNT
000CC8 670000CE                 BEQ     MVCLPAD             IF ZERO, CHECK PADDING
        *
        *       TEST FOR DESTRUCTIVE OVERLAP - NO MOVEMENT TAKES PLACE IF
        *       AN ADDRESS IS USED AS SOURCE AFTER IT HAS BEEN MODIFIED.
        *
000CCC 223C81000000             MOVE.L  ##81000000,D1       SET UP 16MB MS ADDRESS
000CD2 43F648FF                 LEA     -1(A6,D4.L),A1      GET LAST ADDRESS OF SOURCE
000CD6 93C1                     SUBA.L  D1,A1               IS IT ABOVE 16 MB? (WRAPPED)
000CD8 6C08                     BGE.S   MVCL4               BRANCH IF YES (WRAPPED 16MB)
        *
000CDA D3C1                     ADDA.L  D1,A1               RESTORE VALID LAST ADDRESS
000CDC B3CC                     CMPA.L  A4,A1               IS THE 1ST DEST ADDR > LAST SOURCE
000CDE 6B10                     BMI.S   MVCL7               BR IF YES, NO OVERLAP
000CE0 6004                     BRA.S   MVCL5               GO TO TEST 1ST SOURCE ADDR
        *
000CE2 B3CC    MVCL4            CMPA.L  A4,A1               IS THE 1ST DEST ADDR > LAST SOURCE
000CE4 6A04                     BPL.S   MVCL6               BR IF NO, OVERLAP, SET CC3
000CE6 BDCC    MVCL5            CMPA.L  A4,A6               IS THE 1ST DEST ADDR <= 1ST SOURCE
000CE8 6A06                     BPL.S   MVCL7               BR IF YES, NO OVERLAP
        *
000CEA 7E30    MVCL6            MOVEQ   #CC3,D7             SET CONDITION CODE 3 FOR DESTRUCTIVE
000CEC 4EF80E2E                 JMP     MVCLEND                 OVERLAP, DON'T MOVE.
        *
000CF0 7401    MVCL7            MOVEQ   #1,D2
000CF2 300C                     MOVE.W  A4,D0
000CF4 C042                     AND.W   D2,D0               CHECK IF BOTH ADDRESSES ARE ON
000CF6 320E                     MOVE.W  A6,D1                   EVEN OR ODD BYTE BOUNDARIES
000CF8 C242                     AND.W   D2,D1
000CFA B141                     EOR.W   D0,D1               IF BOUNDARIES ARE UNEQUAL,
000CFC 666A                     BNE.S   MVCLBYTE                MOVE BYTES
000CFE 4A40                     TST.W   D0                  IF BOTH ON EVEN BOUNDARY, GO
000D00 670A                     BEQ.S   MVCLFULL                MOVE FULLWORDS
        *
000D02 7602                     MOVEQ   #$2,D3              SET UP FOR 1-BYTE MOVE, D2 IS 1
        *                                                   NECESSARY FOR BUS ERROR HANDLING
```

```
000D04 18DE                  MOVE.B    (A6)+,(A4)+       MOVE BYTE TO ALIGN ON HW BOUNDARY
000D06 5384                  SUBQ.L    #1,D4             ADJUST WORKING COUNT
000D08 6700008E              BEQ       MVCLPAD           BR IF ZERO, GO CHECK PADDING
                  *
000D0C 263C00000080 MVCLFULL MOVE.L    #$80,D3           OPERATION BYTE COUNT IS X'80'
000D12 B883         MVCLF1   CMP.L     D3,D4             TEST REMAINING WORKING COUNT

000D14 6D3C                  BLT.S     MVCLF3            BRANCH IF LESS THAN X'80' BYTES LEFT
000D16 741F                  MOVEQ     #$1F,D2           LOAD LOOP COUNT
000D18 28DE         MVCLF2   MOVE.L    (A6)+,(A4)+       MOVE 4 BYTES
000D1A 51CAFFFC              DBRA      D2,MVCLF2
000D1E 9883                  SUB.L     D3,D4             ADJUST WORKING COUNT
                  *
000D20 72F8                  MOVEQ     #$F8,D1           INTERRUPT REGISTER MASK
000D22 82385F90              OR.B      CC_INT_REG,D1     WAIT FOR ANY KIND OF INTERRUPT
000D26 4601                  NOT.B     D1                COMPLEMENT BITS
000D28 67E8                  BEQ.S     MVCLF1            BR IF NO, MOVE MORE FULLWORDS
                  *
000D2A 9A84         MVCLINTR SUB.L     D4,D5             CALCULATE # BYTES MOVED
000D2C 9BB8600A              SUB.L     D5,RR2O_RET       ADJUST OP2 COUNT/ADDRESS
000D30 DBB86006              ADD.L     D5,RR2E_RET
000D34 9BB86012              SUB.L     D5,RR1O_RET       ADJUST OP1 COUNT/ADDRESS
000D38 DBB8600E              ADD.L     D5,RR1E_RET
000D3C 4A3860E8              TST.B     EXECFLAG
000D40 6708                  BEQ.S     MVINTR1
000D42 59B860EC              SUBQ.L    #4,SAV_PCEX
000D46 4EF80E2E              JMP       MVCLEND
000D4A 55B86002     MVINTR1  SUBQ.L    #2,PC
000D4E 4EF80E2E              JMP       MVCLEND
                  *
                  *          X'00' TO X'7F' BYTES LEFT FOR FULLWORD MOVE
                  *
000D52 2404         MVCLF3   MOVE.L    D4,D2             GET FULLWORD MOVE COUNT
000D54 024200FC              ANDI.W    #$FC,D2
000D58 6730                  BEQ.S     MVCLB4            IF NONE, JUST MOVE BYTES
000D5A 2602                  MOVE.L    D2,D3             MAKE THE OPERATION BYTE COUNT
000D5C E44A                  LSR.W     2,D2              MAKE FW LOOP COUNT
000D5E 5342                  SUBQ.W    #1,D2
000D60 28DE         MVCLF4   MOVE.L    (A6)+,(A4)+       MOVE REMAINING FULLWORDS
000D62 51CAFFFC              DBRA      D2,MVCLF4
000D66 6020                  BRA.S     MVCLB3            GO TO DO ANY REMAINING BYTES

000D68 263C00000080 MVCLBYTE MOVE.L    #$80,D3           OPERATION BYTE COUNT IS X'80'
000D6E B883         MVCLB1   CMP.L     D3,D4             TEST REMAINING WORKING COUNT
000D70 6D18                  BLT.S     MVCLB4            BRANCH IF LESS THAN X'80' BYTES LEFT
000D72 747F                  MOVEQ     #$7F,D2           LOOP COUNT FOR BYTE MOVE
000D74 18DE         MVCLB2   MOVE.B    (A6)+,(A4)+       MOVE 1 BYTE
000D76 51CAFFFC              DBRA      D2,MVCLB2
000D7A 9883                  SUB.L     D3,D4             ADJUST WORKING COUNT
                  *
000D7C 72F8                  MOVEQ     #$F8,D1           INTERRUPT REGISTER MASK
000D7E 82385F90              OR.B      CC_INT_REG,D1     WAIT FOR ANY KIND OF INTERRUPT
000D82 4601                  NOT.B     D1                COMPLEMENT BITS
000D84 67E8                  BEQ.S     MVCLB1            NO, CONTINUE WITH NEXT UNIT OF OP
000D86 60A2                  BRA.S     MVCLINTR          OTHERWISE GO HANDLE INTERRUPT FIRST
                  *
                  *          X'00' TO X'7F' BYTES LEFT FOR BYTE MOVE
                  *
000D88 9883         MVCLB3   SUB.L     D3,D4             ADJUST WORKING COUNT
000D8A 2604         MVCLB4   MOVE.L    D4,D3             MAKE THE OPERATION BYTE COUNT
000D8C 670A                  BEQ.S     MVCLPAD           BR IF ZERO, TEST FOR PADDING
000D8E 2404                  MOVE.L    D4,D2             MAKE LOOP COUNT
000D90 5342                  SUBQ.W    #1,D2
000D92 18DE         MVCLB5   MOVE.B    (A6)+,(A4)+       MOVE 1 BYTE
000D94 51CAFFFC              DBRA      D2,MVCLB5
```

```
EN981023                                           PAGE 47        APPENDIX A
                           PAGE
 000D98 9BB8600A   MVCLPAD SUB.L   D5,RR20_RET    ADJUST OP2 COUNT/ADDRESS
 000D9C DBB86006           ADD.L   D5,RR2E_RET
 000DA0 9BB86012           SUB.L   D5,RR10_RET    ADJUST OP1 COUNT/ADDRESS
 000DA4 DBB8600E           ADD.L   D5,RR1E_RET
 000DA8 9C85               SUB.L   D5,D6
 000DAA 7A00               MOVEQ   #$0,D5         PAD FLAG FOR BUS ERROR
                    *
 000DAC 2806               MOVE.L  D6,D4          GET PAD MOVE WORKING COUNT
 000DAE 677E               BEQ.S   MVCLEND        BR IF ZERO, NO MORE BYTES TO MOVE
                    *
 000DB0 303860E0           MOVE.W  RR20_SAV,D0    GET PAD CHARACTER IN ALL BYTES
 000DB4 103860E0           MOVE.B  RR20_SAV,D0      FOR FW MOVE
 000DB8 3200               MOVE.W  D0,D1
 000DBA 4840               SWAP    D0
 000DBC 3001               MOVE.W  D1,D0
                    *
 000DBE 7401               MOVEQ   #$1,D2         TEST OPERAND BOUNDARY
 000DC0 320C               MOVE.W  A4,D1
 000DC2 C242               AND.W   D2,D1
 000DC4 6708               BEQ.S   MVPFULL        BR IF ON HW BOUNDARY
                    *
 000DC6 7602               MOVEQ   #$2,D3         SET UP FOR 1-BYTE MOVE, D2 IS 1
                    *                              NECESSARY FOR BUS ERROR HANDLING
 000DC8 18C0               MOVE.B  D0,(A4)+       MOVE FIRST PAD CHARACTER TO ALIGN
 000DCA 5384               SUBQ.L  #1,D4          ADJUST WORKING COUNT
 000DCC 6B56               BMI.S   MVCLDONE       BR IF ZERO, END OF OP
                    *
 000DCE 263C000000C0 MVPFULL MOVE.L #$C0,D3       OPERATION BYTE COUNT IS X'C0'
 000DD4 B883       MVCLPF1 CMP.L   D3,D4          TEST REMAINING WORKING COUNT
 000DD6 6D26               BLT.S   MVCLPF3        BRANCH IF LESS THAN X'C0' BYTES LEFT
 000DD8 742F               MOVEQ   #$2F,D2        LOAD LOOP COUNT
 000DDA 28C0       MVCLPF2 MOVE.L  D0,(A4)+       MOVE 4 BYTES
 000DDC 51CAFFFC           DBRA    D2,MVCLPF2
 000DE0 9883               SUB.L   D3,D4          ADJUST WORKING COUNT
                    *
 000DE2 72F8               MOVEQ   #$F8,D1        INTERRUPT REGISTER MASK
 000DE4 82385F90           OR.B    CC_INT_REG,D1  WAIT FOR ANY KIND OF INTERRUPT
 000DE8 4601               NOT.B   D1             COMPLEMENT BITS
 000DEA 67E8               BEQ.S   MVCLPF1        NO, CONTINUE WITH NEXT UNIT OF OP
 000DEC 4A3860E8           TST.B   EXECFLAG
 000DF0 6706               BEQ.S   MVINTR2
 000DF2 59B860EC           SUBQ.L  #4,SAV_PCEX
 000DF6 602C               BRA.S   MVCLDONE
 000DF8 55B86002   MVINTR2 SUBQ.L  #2,PC
 000DFC 6026               BRA.S   MVCLDONE
                    *

EN981023                                           PAGE 48        APPENDIX A
                           PAGE
                    *
                    *      X'00' TO X'BF' BYTES LEFT FOR BYTE MOVE
                    *
 000DFE 2404       MVCLPF3 MOVE.L  D4,D2          GET FULLWORD MOVE COUNT
 000E00 020200FC           ANDI.B  #$FC,D2
 000E04 670E               BEQ.S   MVCLPB1        IF NONE, JUST MOVE BYTES
 000E06 2602               MOVE.L  D2,D3          MAKE OPERATION BYTE COUNT
 000E08 E44A               LSR.W   2,D2           MAKE FW LOOP COUNT
 000E0A 5342               SUBQ.W  #1,D2
 000E0C 28C0       MVCLPF4 MOVE.L  D0,(A4)+       PAD REMAINING FULLWORDS
 000E0E 51CAFFFC           DBRA    D2,MVCLPF4
 000E12 9883               SUB.L   D3,D4          ADJUST WORKING COUNT
                    *
 000E14 2604       MVCLPB1 MOVE.L  D4,D3          MAKE OPERATION BYTE COUNT, 0-3 BYTES
 000E16 670C               BEQ.S   MVCLDONE       BR IF ZERO, END OF OP
 000E18 2404               MOVE.L  D4,D2          MAKE LOOP COUNT
 000E1A 5342               SUBQ.W  #1,D2
 000E1C 18C0       MVCLPB2 MOVE.B  D0,(A4)+       MOVE 1 BYTE
 000E1E 51CAFFFC           DBRA    D2,MVCLPB2     PAD REMAINING BYTES
                    *
 000E22 9883       MVPADEND SUB.L  D3,D4          CALCULATE #BYTES MOVED
 000E24 9C84       MVCLDONE SUB.L  D4,D6
 000E26 9DB86012           SUB.L   D6,RR10_RET    UPDATE OP1 COUNT/ADDRESS REGISTERS
 000E2A DDB8600E           ADD.L   D6,RR1E_RET
```

```
000E2E 7200           MVCLEND  MOVEQ   #0,D1
000E30 11C1600E                MOVE.B  D1,RR1E_RET         ENSURE HIGH BYTES OF REGISTERS OK
000E34 11F860DE6012            MOVE.B  RR1O_SAV,RR1O_RET
000E3A 11C16006                MOVE.B  D1,RR2E_RET
000E3E 11F860E0600A            MOVE.B  RR2O_SAV,RR2O_RET
                       *
000E44 021000CF                ANDI.B  #CC_RST,(A0)        RESET COND CODE IN PSR
000E48 8F10                    OR.B    D7,(A0)             SET NEW COND CODE IN PSR
000E4A 4EF80200                JMP     RETURN
```

```
* * * * * * * * * * * * * * * * * * * * * * * * * * * * * * * * *
*                                                                *
*    PTLB  (B20D)  PURGE TLB                                     *
*                                                                *
* * * * * * * * * * * * * * * * * * * * * * * * * * * * * * * * *
*
        00000E4E       PTLB     EQU     *
000E4E 31C7601A                MOVE.W  D7,INSTSAVE         SAVE INSTRUCTION HALFWORD
000E52 083800006031            BTST    PSW_PROB,PSW+1      TEST FOR PRIVILEGED OP EXCEPTION
000E58 660014CE                BNE     PRIVEX              BR IF PROBLEM STATE
                       *
000E5C 4AB80104                TST.L   CREG1
000E60 6604                    BNE.S   PTLB1               IF CONTROL REG 1 IS 0, JUST
000E62 4EB81F4E                JSR     PURGE                  PURGE THE PAT
000E66 4EF80200       PTLB1    JMP     RETURN
                       *
```

```
* * * * * * * * * * * * * * * * * * * * * * * * * * * * * * * * *
*                                                                *
*    RRB  (B213)   RESET REFERENCE BIT INSTRUCTION               *
*                                                                *
*                                                                *
* * * * * * * * * * * * * * * * * * * * * * * * * * * * * * * * *
*
        00000E6A       RRB      EQU     *
000E6A 31C7601A                MOVE.W  D7,INSTSAVE         SAVE INSTRUCTION HALFWORD
000E6E 083800006031            BTST    PSW_PROB,PSW+1      TEST FOR PRIVILEGED OP EXCEPTION
000E74 660014B2                BNE     PRIVEX              BR IF PROBLEM STATE
                       *
000E78 24386016                MOVE.L  OP2_EA,D2           GET STORAGE ADDRESS
000E7C 0C8200400000            CMPI.L  #VIRT_STR,D2
000E82 6A00147E                BPL     PAGE_FLT
000E86 0242F000                ANDI.W  #$F000,D2           ENSURE LAST THREE DIGITS ARE 0
000E8A 068200800000            ADDI.L  #PAT,D2             TURN ON PAT BIT
000E90 2442                    MOVEA.L D2,A2               MOVE ADDRESS
000E92 7608                    MOVEQ   #$08,D3             SET PAT_MOD BIT = 1 TO ALLOW
000E94 86386106                OR.B    SAVE_CNTL,D3           PAT ACCESS
000E98 11C35FE1                MOVE.B  D3,SYS_CNTL
000E9C 1412                    MOVE.B  (A2),D2             GET PAT HIGH BYTE
000E9E 3612                    MOVE.W  (A2),D3             GET PAT ENTRY
000EA0 6B000BAE                BMI     BUSERR              CHECK PAT PARITY
000EA4 0243FDFF                ANDI.W  #$FDFF,D3           RESET THE REFERENCE BIT
000EA8 3483                    MOVE.W  D3,(A2)             PUT PAT ENTRY BACK
                       *
000EAA 08020002                BTST    2,D2                CHECK IF PAGE FAULT BIT IS ON
000EAE 660014CC                BNE     SPECEX              SET SPECIFICATION EXCEPTION
000EB2 11F861065FE1            MOVE.B  SAVE_CNTL,SYS_CNTL  RESTORE TRANSLATE STATE
000EB8 72CF                    MOVEQ   #CC_RST,D1
000EBA C210                    AND.B   (A0),D1             CLEAR CONDITION CODE
000EBC E20A                    LSR.B   1,D2                CHECK 'CHANGE' BIT
000EBE 6404                    BCC.S   RRB1
000EC0 00010010                ORI.B   #CC1,D1             IF ON, SET CC BIT
000EC4 E20A           RRB1     LSR.B   1,D2                CHECK 'REFERENCE' BIT
000EC6 6404                    BCC.S   RRB2                CC3 GETS SET IF BOTH BITS ARE ON.
000EC8 00010020                ORI.B   #CC2,D1             IF ON, SET CC BIT
000ECC 1081           RRB2     MOVE.B  D1,(A0)             PUT BACK INTO PSR
000ECE 4EF80200                JMP     RETURN
```

```
*********************************************************
*                                                       *
*   SCK  (B204)  SET CLOCK INSTRUCTION                  *
*                                                       *
*                                                       *
*********************************************************

00000ED2    SCK       EQU      *
000ED2 31C7601A                  MOVE.W   D7,INSTSAVE        SAVE INSTRUCTION
000ED6 083800006031              BTST     PSW_PROB,PSW+1     TEST IF IN PROBLEM STATE
000EDC 6600144A                  BNE      PRIVEX             BR IF YES, THIS IS PRIV OP
000EE0 7207                      MOVEQ    #$07,D1
000EE2 C2386019                  AND.B    OP2_EA+3,D1        TEST FOR DOUBLEWORD BOUNDARY
000EE6 66001494                  BNE      SPECEX
                         *
                         *-----------------------------------------------------------------
                         *  CONTROL IS NOT PASSED TO THE PC FOR THIS INSTRUCTION, AND
                         *  IT IS ACTUALLY 'NOOPED'; CONDITION CODE 1 IS ALWAYS SET.
                         *-----------------------------------------------------------------
                         *
000EEA 021000CF                  ANDI.B   #CC_RST,(A0)       CLEAR CONDITION CODE
000EEE 00100010                  ORI.B    #CC1,(A0)          SET CONDITION CODE FOR CLOCK SECURED
                         *
000EF2 4EF80200                  JMP      RETURN             GO DO THE NEXT INSTRUCTION
                         *
```

```
*********************************************************
*                                                       *
*   SCKC  (B206)  SET CLOCK COMPARATOR INSTRUCTION      *
*                                                       *
*                                                       *
*********************************************************

00000EF6    SCKC      EQU      *
000EF6 31C7601A                  MOVE.W   D7,INSTSAVE        SAVE INSTRUCTION
000EFA 083800006031              BTST     PSW_PROB,PSW+1     TEST IF IN PROBLEM STATE
000F00 66001426                  BNE      PRIVEX             BR IF YES, THIS IS PRIV OP
000F04 7207                      MOVEQ    #$07,D1
000F06 C2386019                  AND.B    OP2_EA+3,D1        TEST FOR DOUBLEWORD BOUNDARY
000F0A 66001470                  BNE      SPECEX
                         *
000F0E 28786016                   MOVEA.L OP2_EA,A4          GET THE ADDRESS OF THE DATA
000F12 D9FC80000000               ADDA.L  #MS_ACC,A4         SET THE 370 BIT ON
000F18 21DC606C                   MOVE.L  (A4)+,TIM_DATA
000F1C 21D46070                   MOVE.L  (A4),TIM_DAT2      PUT CLOCK DATA INTO TIMER PCIB
000F20 11FC00036061               MOVE.B  #03,TIMER_CB+1     'SET CLOCK COMPARATOR' COMMAND
000F26 4EB826C2                   JSR     TIMERS
                         *
000F2A 08B800076105 TIME_EN0     BCLR     #7,IO_INT_PND+1    CHECK IF WE STACKED AN INTERRUPT
000F30 6712                      BEQ.S    TIME_EN1             WHILE WAITING FOR TIMER RESPONSE
000F32 363C0500                  MOVE.W   #$0500,D3          SET UP COUNTER
000F36 32385F90     TIME_EN2     MOVE.W   CC_INT_REG,D1
000F3A 08010009                  BTST     PC_INTR,D1         WAIT FOR INTERRUPT FROM PC
000F3E 6704                      BEQ.S    TIME_EN1
000F40 51CBFFF4                  DBRA     D3,TIME_EN2        IF NO INTR, WAIT UP TO 10 MILLISEC
                         *
000F44 11F860686102 TIME_EN1     MOVE.B   INTR_VEC,EXT_INT_PND  COPY INTERRUPT VECTOR FROM PCIB
000F4A 670C                      BEQ.S    SCKC_END           IF NO INTR PENDING, DONE
000F4C 083800006030              BTST     PSW_EXT,PSW        CHECK EXTERNAL INTERRUPT MASK BIT
000F52 6704                      BEQ.S    SCKC_END           IF OFF, DONE
000F54 4EB817E0                  JSR      EX_INT             SEE IF WE TAKE EXTERNAL INTERRUPT
000F58 4EF80200     SCKC_END     JMP      RETURN             GO DO THE NEXT INSTRUCTION
                         *
```

```
*****************************************************
*                                                   *
*   SPKA (B20A)  SET PSW KEY FROM ADDRESS INSTRUCTION *
*                                                   *
*                                                   *
*****************************************************
*
            00000F5C    SPKA    EQU     *
000F5C 31C7601A                 MOVE.W  D7,INSTSAVE         SAVE INSTRUCTION HALFWORD
000F60 083800006031              BTST    PSW_PROB,PSW+1      TEST FOR PRIVILEGED OP EXCEPTION
000F66 660013C0                  BNE     PRIVEX              BRANCH IF PROBLEM STATE
            *
000F6A 72F0                      MOVEQ   #$F0,D1
000F6C C2386019                  AND.B   OP2_EA+3,D1         GET KEY BITS
000F70 0238000F6031              ANDI.B  #$0F,PSW+1          ZERO ALL KEY BITS IN CURRENT PSW
000F76 83386031                  OR.B    D1,PSW+1            SET NEW BITS
000F7A 4EF80200                  JMP     RETURN
            *
```

```
*****************************************************
*                                                   *
*   SPM (04)  SET PROGRAM MASK INSTRUCTION           *
*                                                   *
*     TIMINGS:                                       *
*                                                   *
*****************************************************
*
            00000F7E    SPM     EQU     *
000F7E 31C7601A                 MOVE.W  D7,INSTSAVE         SAVE INSTRUCTION
000F82 723F                     MOVEQ   #$3F,D1             GET COND CODE AND MASK BITS FROM OP 1
000F84 C2386006                 AND.B   R1,D1
000F88 11C16047                 MOVE.B  D1,PRGMMASK         SAVE IN A-ENGINE MASK ACCESS AREA
000F8C 31FC76005FA2             MOVE.W  #FP_SMSK,FP_CMD     SET MASK IN FP PROCESSOR
000F92 31F860465FA0             MOVE.W  FP_MASK,FP_DATA
000F98 74C0                     MOVEQ   #$C0,D2             PSR/PSW RESET MASK
000F9A C5386000                 AND.B   D2,PSR              UPDATE PSR WITH NEW CC AND MASK
000F9E 83386000                 OR.B    D1,PSR
000FA2 083800036031             BTST.B  PSW_EC,PSW+1        IS THIS EC MODE
000FA8 670C                     BEQ.S   SPM_BC              NO, BRANCH
            *
000FAA C5386032                 AND.B   D2,PSW+2            UPDATE EC PSW WITH NEW CC AND MASK
000FAE 83386032                 OR.B    D1,PSW+2
000FB2 4EF80200                 JMP     RETURN
            *
000FB6 C5386034    SPM_BC       AND.B   D2,PSW+4            UPDATE BC PSW WITH NEW CC AND MASK
000FBA 83386034                 OR.B    D1,PSW+4
000FBE 4EF80200                 JMP     RETURN
            *
```

```
*****************************************************
*                                                   *
*   SPT (B208)  SET CPU TIMER INSTRUCTION            *
*                                                   *
*                                                   *
*****************************************************
*
            00000FC2    SPT     EQU     *
000FC2 31C7601A                 MOVE.W  D7,INSTSAVE         SAVE INSTRUCTION
000FC6 083800006031              BTST    PSW_PROB,PSW+1      TEST IF IN PROBLEM STATE
000FCC 6600135A                  BNE     PRIVEX              BR IF YES, THIS IS PRIV OP
000FD0 7207                     MOVEQ   #$07,D1
000FD2 C2386019                 AND.B   OP2_EA+3,D1         TEST FOR DOUBLEWORD BOUNDARY
000FD6 660013A4                 BNE     SPECEX
            *
000FDA 28786016                 MOVEA.L OP2_EA,A4           GET THE ADDRESS OF THE DATA
000FDE D9FC80000000             ADDA.L  #MS_ACC,A4          SET THE 370 BIT ON
000FE4 21DC606C                 MOVE.L  (A4)+,TIM_DATA
```

```
000FE8 21D46070         MOVE.L  (A4),TIM_DAT2       PUT CLOCK DATA INTO TIMER PCIB
000FEC 11FC00056061     MOVE.B  #05,TIMER_CB+1      'SET CPU TIMER' COMMAND
000FF2 4EB826C2         JSR     TIMERS
                *
000FF6 4EF80F2A         JMP     TIME_END            GO SEE IF THERE IS AN EXTERNAL
                *                                   INTERRUPT PENDING
```

EN985023                                     PAGE    56         APPENDIX A
                    PAGE
```
********************************************
*                                          *
*   SSK (08)  SET STORAGE KEY INSTRUCTION  *
*       0             15                   *
*       ----------------------             *
*       * '08' * R1 * R2 *                 *
*       ----------------------             *
*                                          *
********************************************
*
         00000FFA   SSK    EQU     *
000FFA 31C7601A            MOVE.W  D7,INSTSAVE         SAVE INSTRUCTION HALFWORD
000FFE 083800006031        BTST    PSW_PROB,PSW+1      TEST FOR PRIVILEGED OP EXCEPTION
001004 66001322            BNE     PRIVEX              BR IF PROBLEM STATE
                *
001008 2438600A            MOVE.L  R3,D2               GET STORAGE ADDRESS
00100C 780F                MOVEQ   #$0F,D4             TEST R2 DATA FOR SPECIFICATION EXCP
00100E C802                AND.B   D2,D4                 BITS 28-31 NOT ZERO
001010 6600136A            BNE     SPECEX              BR IF NOT ZERO
                *
001014 0C8200400000        CMPI.L  #VIRT_STR,D2        CHECK UPPER LIMIT OF VIRTUAL STORAGE
00101A 6A0012E6            BPL     PAGE_FLT
00101E 7206                MOVEQ   #$06,D1             TURN OFF ALL BIT REF AND CHANGE BITS
001020 C2386009            AND.B   R1+3,D1             GET KEY BYTE
001024 EF49                LSL.W   7,D1                PUT INTO HIGHER BYTE
001026 0242F000            ANDI.W  #$F000,D2           ENSURE LAST THREE DIGITS ARE 0
00102A 068200800000        ADDI.L  #PAT,D2             TURN ON PAT BIT
001030 2442                MOVE.L  D2,A2               MOVE ADDRESS
001032 7608                MOVEQ   #$08,D3             SET PAT_MOD BIT = 1 TO ALLOW
001034 86386106            OR.B    SAVE_CNTL,D3           PAT ACCESS
001038 11C35FE1            MOVE.B  D3,SYS_CNTL
00103C 3412                MOVE.W  (A2),D2             GET PAT HALFWORD
00103E 6B000A10            BMI     BUSERR
                *
001042 0802000A            BTST    10,D2               IS THIS PAGE VALID?
001046 66001334            BNE     SPECEX              IF NOT, SPEC CHECK
00104A 0242FCFF            ANDI.W  #$FCFF,D2           TURN OFF REFERENCE AND CHANGE BITS
00104E 8441                OR.W    D1,D2
001050 3482                MOVE.W  D2,(A2)             WRITE KEY BYTE
001052 11F861065FE1        MOVE.B  SAVE_CNTL,SYS_CNTL  RESTORE SYS CONTROL REGISTER
                *
001058 4EF80200            JMP     RETURN
                *
```

EN985023                                     PAGE    57         APPENDIX A
                    PAGE
```
********************************************
*                                          *
*   SSM (80)  SET SYSTEM MASK INSTRUCTION  *
*                                          *
********************************************
*
         0000105C   SSM    EQU     *
00105C 31C7601A            MOVE.W  D7,INSTSAVE         SAVE INSTRUCTION HALFWORD
001060 083800006031        BTST    PSW_PROB,PSW+1      TEST IF IN PROBLEM STATE; MUST BE
001066 660012C0            BNE     PRIVEX                IN SUPERVISOR STATE TO EXECUTE
00106A 083800060100        BTST    SSMSUPR,CREG0       IS SET SYS MASK SUPPRESS BIT ON?
001070 66001362            BNE     SPOPEXCP            YES, PROGRAM CHECK
                *
001074 28786016            MOVEA.L OP2_EA,A4
001078 D9FC80000000        ADDA.L  #MS_ACC,A4
00107E 11D46030            MOVE.B  (A4),PSW            GET BYTE FROM MAIN STORE
```

```
             00001082   TESTMASK EQU    *
001082 08F800026106       BSET   BYP_PAT,SAVE_CNTL TURN OFF TRANS FLAG IN SHADOW BYTE
001088 083800036031       BTST   PSW_EC,PSW+1     EC OR BC MODE?
00108E 6734                BEQ.S  SSM_BC           BR IF BC MODE
                   *
001090 72B8                MOVEQ  #$B8,D1          GET MASK FOR PSW BYTE 1
001092 C2386030            AND.B  PSW,D1           ALL BITS SHOULD BE ZERO
001096 6704                BEQ.S  SSM_EC
001098 4EF82374            JMP    SPECEX2          SPECIFICATION EXCEPTION
                   *
00109C 11F860306131 SSM_EC MOVE.B PSW,PER_XLAT     PER - SAVE TRANSLATE BIT FOR PER
0010A2 083800026030       BTST   PSW_XLAT,PSW     TEST FOR TRANSLATE BIT IN NEW PSW
0010A8 6706                BEQ.S  SSM_NX           BR IF OFF
0010AA 08B800026106       BCLR   BYP_PAT,SAVE_CNTL TURN ON TRANS FLAG IN SHADOW BYTE
0010B0 427860E2    SSM_NX CLR.W  IOMASK           CLEAR I/O MASK REGISTER
0010B4 083800016030       BTST   PSW_IO,PSW       I/O INTERRUPTS MASKED OFF
0010BA 670E                BEQ.S  SSM_END          BR IF YES, FINISH PSW LOAD
0010BC 31F8010860E2       MOVE.W CREG2,IOMASK     SET IOMASK FROM CTRL REG
0010C2 6006                BRA.S  SSM_END          FINISH MASK LOAD
                   *
0010C4 11F8603060E2 SSM_BC MOVE.B PSW,IOMASK      SET IOMASK FROM THE PSW
0010CA 11F861065FE1 SSM_END MOVE.B SAVE_CNTL,SYS_CNTL SET TRANS IN THE SYS CONTROL REG
0010D0 4EF81EB0            JMP    IENDTSTP         GO TO TEST FOR PER AND INTERRUPTS
                   *
```

```
***********************************************
*                                             *
*   STCK  (B205)  STORE CLOCK INSTRUCTION     *
*                 CC0 - CLOCK IN SET STATE    *
*                 CC1 - NOT SET               *
*                 CC2 - ERROR STATE           *
*                 CC3 - NOT OPERATIONAL       *
*                                             *
***********************************************
*
             000010D4   STCK     EQU    *
0010D4 31C7601A            MOVE.W D7,INSTSAVE      SAVE INSTRUCTION
0010D8 28786016            MOVEA.L OP2_EA,A4       GET OPERAND ADDRESS
0010DC D9FC80000000        ADDA.L #MS_ACC,A4
0010E2 4A14                TST.B  (A4)             PRETEST FIRST AND
0010E4 4A2C0007            TST.B  7(A4)              LAST BYTE
0010E8 11FC00026061        MOVE.B #02,TIMER_CB+1  'STORE CLOCK' COMMAND
0010EE 4EB826C2            JSR    TIMERS
                   *
0010F2 7207                MOVEQ  #7,D1
0010F4 43F8606C            LEA    TIM_DATA,A1
0010F8 18D9         STCK1  MOVE.B (A1)+,(A4)+      GET CLOCK DATA FROM TIMER PCIB
0010FA 51C9FFFC            DBRA   D1,STCK1
0010FE 1010                MOVE.B (A0),D0
001100 020000CF            ANDI.B #CC_RST,D0       CLEAR CONDITION CODE
001104 80386054            OR.B   PCIB_OUT,D0      SET CONDITION CODE
001108 1080                MOVE.B D0,(A0)
00110A 4EF80F2A            JMP    TIME_END         GO SEE IF THERE IS AN EXTERNAL
                   *                                 INTERRUPT PENDING
```

```
***********************************************
*                                             *
*   STCKC (B207)  STORE CLOCK COMPARATOR INSTRUCTION *
*                                             *
***********************************************
*
             0000110E   STCKC    EQU    *
00110E 31C7601A            MOVE.W D7,INSTSAVE      SAVE INSTRUCTION
```

```
001112 083800006031          BTST    PSW_PROB,PSW+1      TEST IF IN PROBLEM STATE
001118 6600120E              BNE     PRIVEX              BR IF YES, THIS IS PRIV OP
00111C 7207                  MOVEQ   #$07,D1
00111E C2386019              AND.B   OP2_EA+3,D1         TEST FOR DOUBLEWORD BOUNDARY
001122 66001258              BNE     SPECEX
                        *
001126 28786016              MOVEA.L OP2_EA,A4           GET THE ADDRESS OF THE DATA
00112A D9FC80000000          ADDA.L  #MS_ACC,A4          SET THE 370 BIT ON
001130 4A14                  TST.B   (A4)                PRETEST FIRST AND
001132 4A2C0007              TST.B   7(A4)                LAST BYTE
001136 11FC00046061          MOVE.B  #04,TIMER_CB+1      'STORE CLOCK COMPARATOR' COMMAND
00113C 4EB826C2              JSR     TIMERS
                        *
001140 28F8606C              MOVE.L  TIM_DATA,(A4)+
001144 28B86070              MOVE.L  TIM_DAT2,(A4)       GET CLOCK DATA FROM TIMER PCIB
001148 4EF80F2A              JMP     TIME_END            GO SEE IF THERE IS AN EXTERNAL
                        *                                  INTERRUPT PENDING
```

EN98%023                                              . PAGE   60         APPENDIX A1
                         PAGE
```
* * * * * * * * * * * * * * * * * * * * * * * * * * * * * * * * * * * *
*                                                                     *
*      STCM  (BE)  STORE CHARACTERS UNDER MASK INSTRUCTION             *
*                                                                     *
*                                                                     *
* * * * * * * * * * * * * * * * * * * * * * * * * * * * * * * * * * * *
*
        0000114C         STCM        EQU     *
00114C 31C7601A                      MOVE.W  D7,INSTSAVE         SAVE INSTRUCTION
001150 0247000F                      ANDI.W  #$000F,D7           GET MASK ONLY
001154 673E                          BEQ.S   STCM00              BRANCH IF MASK IS ZERO, RETURN
001156 E34F                          LSL.W   1,D7                  MAKE IT A BR TABLE DISPLACEMENT
                        *
001158 45F86012                      LEA     RIX,A2              GET OPERAND 1 ADDRESS
00115C 28786016                      MOVEA.L OP2_EA,A4           GET OPERAND 2 MS ADDRESS
001160 D9FC80000000                  ADDA.L  #MS_ACC,A4
                        *
001166 4EFB7002                      JMP     STCTABLE(D7)        GO TO APPROPRIATE MASK ROUTINE
                        *
        0000116A                     RORG    *
        0000116A         STCTABLE    EQU     *                   BRANCH TABLE BASE ADDRESS
        0000116A                     ORG     *
00116A 6028                          BRA.S   STCM00              STC MASK 0
00116C 6054                          BRA.S   STCM01              STC MASK 1
00116E 605C                          BRA.S   STCM02              STC MASK 2
001170 6026                          BRA.S   STCM03              STC MASK 3
001172 6034                          BRA.S   STCM04              STC MASK 4
001174 602A                          BRA.S   STCM05              STC MASK 5
001176 6034                          BRA.S   STCM06              STC MASK 6
001178 603A                          BRA.S   STCM07              STC MASK 7
00117A 6016                          BRA.S   STC1                STC MASK 8
00117C 603E                          BRA.S   STCM09              STC MASK 9
00117E 6046                          BRA.S   STCM0A              STC MASK A
001180 604E                          BRA.S   STCM0B              STC MASK B
001182 6056                          BRA.S   STCM0C              STC MASK C
001184 605A                          BRA.S   STCM0D              STC MASK D
001186 6064                          BRA.S   STCM0E              STC MASK E
                        *
001188 B02C0003         STCM0F       CMP.B   3(A4),D0            PRETEST
00118C 18DA                          MOVE.B  (A2)+,(A4)+         STORE 4 BYTE ENTRY
00118E 18DA             STC3         MOVE.B  (A2)+,(A4)+         STORE 3 BYTE ENTRY
001190 18DA             STC2         MOVE.B  (A2)+,(A4)+         STORE 2 BYTE ENTRY
001192 1892             STC1         MOVE.B  (A2),(A4)           STORE 1 BYTE ENTRY
001194 4EF80200         STCM00       JMP     RETURN
                        *
                        *
001198 B02C0001         STCM03       CMP.B   1(A4),D0            PRETEST
00119C 544A                          ADDQ.W  #2,A2               ADJUST OPERAND 1 ADDRESS
00119E 60F0                          BRA.S   STC2                GO TO STORE 2 BYTES
                        *
                        *
0011A0 B02C0001         STCM05       CMP.B   1(A4),D0            PRETEST
0011A4 524A                          ADDQ.W  #1,A2               ADJUST OPERAND 1 ADDRESS
0011A6 18DA                          MOVE.B  (A2)+,(A4)+         STORE 1 BYTE
0011A8 524A             STCM04       ADDQ.W  #1,A2               ADJUST OPERAND 1 ADDRESS
```

```
                                                                    PAGE   61          APPENDIX A
EN983023
0011AA 60E6                     BRA.S    STC1         GO TO STORE 1 BYTE
               *
               *
0011AC B02C0001   STCM06        CMP.B    1(A4),D0     PRETEST
0011B0 524A                     ADDQ.W   #1,A2        ADJUST OPERAND 1 ADDRESS
0011B2 60DC                     BRA.S    STC2         GO TO STORE 2 BYTES
               *
               *
0011B4 B02C0002   STCM07        CMP.B    2(A4),D0     PRETEST
0011B8 524A                     ADDQ.W   #1,A2        ADJUST OPERAND 1 ADDRESS
0011BA 60D2                     BRA.S    STC3         GO TO STORE 3 BYTES
               *
               *
0011BC B02C0001   STCM09        CMP.B    1(A4),D0     PRETEST
0011C0 18D2                     MOVE.B   (A2),(A4)+   STORE 1 BYTE
0011C2 564A       STCM01        ADDQ.W   #3,A2        ADJUST OPERAND 1 ADDRESS
0011C4 60CC                     BRA.S    STC1         GO TO STORE 1 BYTE
               *
               *
0011C6 B02C0001   STCM0A        CMP.B    1(A4),D0     PRETEST
0011CA 18D2                     MOVE.B   (A2),(A4)+   STORE 1 BYTE
0011CC 544A       STCM02        ADDQ.W   #2,A2        ADJUST OPERAND 1 ADDRESS
0011CE 60C2                     BRA.S    STC1         GO TO STORE 1 BYTE
               *
               *
0011D0 B02C0002   STCM0B        CMP.B    2(A4),D0     PRETEST
0011D4 18D2                     MOVE.B   (A2),(A4)+   STORE 1 BYTE
0011D6 544A                     ADDQ.W   #2,A2        ADJUST OPERAND 1 ADDRESS
0011D8 60B6                     BRA.S    STC2         GO TO STORE 2 BYTES
               *
               *
0011DA B02C0001   STCM0C        CMP.B    1(A4),D0     PRETEST
0011DE 60B0                     BRA.S    STC2         GO TO STORE 2 BYTES
               *
               *
0011E0 B02C0002   STCM0D        CMP.B    2(A4),D0     PRETEST
0011E4 18DA                     MOVE.B   (A2)+,(A4)+  STORE 2 BYTES
0011E6 18DA                     MOVE.B   (A2)+,(A4)+
0011E8 524A                     ADDQ.W   #1,A2        ADJUST OPERAND 1 ADDRESS
0011EA 60A6                     BRA.S    STC1         GO TO STORE 1 BYTE
               *
               *
0011EC B02C0002   STCM0E        CMP.B    2(A4),D0     PRETEST
0011F0 609C                     BRA.S    STC3         GO TO STORE 3 BYTES

EN983023                                                            PAGE   62          APPENDIX A
                                PAGE
               * * * * * * * * * * * * * * * * * * * * * * * * * * * * * * * *
               *                                                              *
               *    STCTL  (B6)   STORE CONTROL INSTRUCTION                   *
               *                                                              *
               * * * * * * * * * * * * * * * * * * * * * * * * * * * * * * * *
               *
        000011F2  STCTL         EQU      *
0011F2 31C7601A                 MOVE.W   D7,INSTSAVE      SAVE INSTRUCTION HALFWORD
0011F6 083800006031              BTST    PSW_PROB,PSW+1   ARE WE IN SUPERVISOR STATE?
0011FC 6600112A                 BNE      PRIVEX           PRIVILEGED EXCEPTION IF NOT
001200 7203                     MOVEQ    #03,D1           TEST FOR ALIGNMENT OF OPERAND ON
001202 C2386019                 AND.B    OP2_EA+3,D1      FULLWORD BOUNDARY; SPECIFICATION
001206 66001174                 BNE      SPECEX             EXCEPTION IF NOT.
               *
00120A 4241                     CLR.W    D1
00120C 43F80100                 LEA      CREG0,A1         POINT TO CONTROL REGISTER 0
001210 1207                     MOVE.B   D7,D1            GET R1 AND R3 FROM INSTRUCTION
001212 3401                     MOVE.W   D1,D2
001214 020100F0                 ANDI.B   #$F0,D1          D1 HAS REGISTER 1
001218 E409                     LSR.B    2,D1
00121A 0202000F                 ANDI.B   #$0F,D2          D2 HAS REGISTER 3
00121E E50A                     LSL.B    2,D2
001220 28786016                 MOVEA.L  OP2_EA,A4
001224 D9FC80000000             ADDA.L   #MS_ACC,A4       TURN ON BIT 31
               *
00122A B441                     CMP.W    D1,D2            COMPARE THE REGISTERS; IF D2 IS LESS
```

```
00122C 6B1C                    BMI.S    STCTL1           THAN D1, WE MUST WRAP FROM 15 TO 0
00122E 3802                    MOVE.W   D2,D4            CALCULATE NUMBER OF BYTES FOR
001230 9841                    SUB.W    D1,D4               PREFETCHING FROM MAIN STORAGE
001232 10344003       STCTL3   MOVE.B   3(A4,D4),D0      GET LAST BYTE FROM OP 2 ADDRESS
       *                                                    IF NO ERRORS, GO AHEAD
001236 28F11000       STCLOOP  MOVE.L   0(A1,D1),(A4)+   STORE ONE CONTROL REGISTER
00123A 5841                    ADDQ.W   #4,D1            UPDATE D1 BY 4 (LENGTH IN BYTES)
00123C B441                    CMP.W    D1,D2            HAVE WE REACHED REQUESTED NUMBER?
00123E 6AF6                    BPL.S    STCLOOP          IF NOT, CONTINUE LOOPING
001240 08010010                BTST     SW1,D1           TEST IF WE MUST WRAP FROM REG15 TO 0
001244 6616                    BNE.S    STCTL2           BRANCH IF BIT IS ON
001246 4EF80200                JMP      RETURN           INSTRUCTION IS COMPLETE
       *
00124A 7840           STCTL1   MOVEQ    #$40,D4
00124C 9841                    SUB.W    D1,D4            CALCULATE NUMBER OF BYTES TO BE
00124E D842                    ADD.W    D2,D4            TRANSFERRED FOR PRE-FETCH OF STORAGE
001250 4842                    SWAP     D2               SAVE ENDING REGISTER
001252 343C003C                MOVE.W   #$003C,D2        MAKE REGISTER 15 LAST REGISTER
001256 08C10010                BSET     SW1,D1           SET WRAP SWITCH
00125A 60D6                    BRA.S    STCTL3           GO PREFETCH AND LOOP UNTIL REG 15
       *
00125C 4842           STCTL2   SWAP     D2               RESTORE ENDING REGISTER
00125E 7200                    MOVEQ    #0,D1            START AGAIN AT REG 0  ***** THIS
                                                            ALSO RESETS SW1!!!  ***
001260 60D4                    BRA.S    STCLOOP          CONTINUE IN LOOP UNTIL DONE
       *
```

```
*****************************************
*                                        *
*  STIDP  (B202)  STORE CPU ID INSTRUCTION *
*                                        *
*****************************************

00001262        STIDP   EQU      *
001262 31C7601A                MOVE.W   D7,INSTSAVE      SAVE INSTRUCTION HALFWORD
001266 083800006031            BTST     PSW_PROB,PSW+1   ARE WE IN SUPERVISOR STATE?
00126C 660010BA                BNE      PRIVEX           NO, PRIVILEGED EXCEPTION
001270 7207                    MOVEQ    #07,D1           TEST FOR ALIGNMENT OF OPERAND ON
001272 C2386019                AND.B    OP2_EA+3,D1      DOUBLEWORD BOUNDARY; SPECIFICATION
001276 66001104                BNE      SPECEX              EXCEPTION IF NOT.
       *
00127A 28786016                MOVEA.L  OP2_EA,A4        GET OPERAND1 ADDRESS
00127E D9FC80000000            ADDA.L   #MS_ACC,A4
001284 4A2C0007                TST.B    7(A4)            PRETEST
001288 28FC00000000            MOVE.L   #$00000000,(A4)+ SERIAL NUMBER
00128E 28BC51600000            MOVE.L   #$51600000,(A4)  MODEL NUMBER
001294 4EF80200                JMP      RETURN
       *
001266 083800006031            BTST     PSW_PROB,PSW+1   ARE WE IN SUPERVISOR STATE?
00126C 660010BA                BNE      PRIVEX           NO, PRIVILEGED EXCEPTION
001270 7207                    MOVEQ    #07,D1           TEST FOR ALIGNMENT OF OPERAND ON
001272 C2386019                AND.B    OP2_EA+3,D1      DOUBLEWORD BOUNDARY; SPECIFICATION
001276 66001104                BNE      SPECEX              EXCEPTION IF NOT.
       *
00127A 28786016                MOVEA.L  OP2_EA,A4        GET OPERAND1 ADDRESS
00127E D9FC80000000            ADDA.L   #MS_ACC,A4
001284 4A2C0007                TST.B    7(A4)            PRETEST
001288 28FC00000000            MOVE.L   #$00000000,(A4)+ SERIAL NUMBER
00128E 28BC51600000            MOVE.L   #$51600000,(A4)  MODEL NUMBER
001294 4EF80200                JMP      RETURN
       *
```

```
*****************************************
*                                        *
*  STNSM (AC) STORE THEN AND SYSTEM MASK INSTRUCTION *
*                                        *
*****************************************
```

```
            00001298    STNSM    EQU      *
001298 31C7601A                  MOVE.W   D7,INSTSAVE         SAVE INSTRUCTION HALFWORD
00129C 083800006031              BTST     PSW_PROB,PSW+1      ARE WE IN SUPERVISOR STATE?
0012A2 66001084                  BNE      PRIVEX              NO, PRIVILEGED EXCEPTION
                         *
0012A6 28786016                  MOVEA.L  OP2_EA,A4           GET OPERAND1 ADDRESS
0012AA D9FC80000000              ADDA.L   #MS_ACC,A4
0012B0 18B86030                  MOVE.B   PSW,(A4)            STORE FIRST BYTE OF PSW AT OPERAND1
0012B4 CF386030                  AND.B    D7,PSW              AND IMMEDIATE BYTE INTO THE PSW
0012B8 4EF81082                  JMP      TESTMASK            GO CHECK IF PSW IS VALID
                                                              GO TO RETURN WHEN OP IS COMPLETE
                         *
                         *
                         *
                         *
                         *
                         *
                         ************************************************
                         *                                              *
                         *  STOSM  (AD)  STORE THEN AND SYSTEM MASK INSTRUCTION  *
                         *                                              *
                         ************************************************
                         *
            000012BC    STOSM    EQU      *
0012BC 31C7601A                  MOVE.W   D7,INSTSAVE         SAVE INSTRUCTION HALFWORD
0012C0 083800006031              BTST     PSW_PROB,PSW+1      ARE WE IN SUPERVISOR STATE?
0012C6 66001060                  BNE      PRIVEX              NO, PRIVILEGED EXCEPTION
                         *
0012CA 28786016                  MOVE.L   OP2_EA,A4           GET OPERAND1 ADDRESS
0012CE D9FC80000000              ADDA.L   #MS_ACC,A4
0012D4 18B86030                  MOVE.B   PSW,(A4)            STORE FIRST BYTE OF PSW AT OPERAND1
0012D8 8F386030                  OR.B     D7,PSW              OR IT INTO THE PSW
0012DC 4EF81082                  JMP      TESTMASK            GO CHECK IF PSW IS VALID
                                                              GO TO RETURN WHEN OP IS COMPLETE
                         *
                         *
                         ************************************************
                         *                                              *
                         *  STPT  (B209)  STORE CPU TIMER INSTRUCTION    *
                         *                                              *
                         ************************************************
                         *
            000012E0    STPT     EQU      *
0012E0 31C7601A                  MOVE.W   D7,INSTSAVE         SAVE INSTRUCTION
0012E4 083800006031              BTST     PSW_PROB,PSW+1      TEST IF IN PROBLEM STATE
0012EA 6600103C                  BNE      PRIVEX              BR IF YES, THIS IS PRIV OP
0012EE 7207                      MOVEQ    #$07,D1
0012F0 C2386019                  AND.B    OP2_EA+3,D1         TEST FOR DOUBLE WORD BOUNDARY
0012F4 66001086                  BNE      SPECEX
                         *
0012F8 28786016                  MOVEA.L  OP2_EA,A4           GET OPERAND ADDRESS
0012FC D9FC80000000              ADDA.L   #MS_ACC,A4          SET 370 BIT
001302 4A14                      TST.B    (A4)                PRETEST FIRST AND
001304 4A2C0007                  TST.B    7(A4)                 LAST BYTE
001308 11FC00066061              MOVE.B   #06,TIMER_CB+1      'STORE CPU TIMER' COMMAND
00130E 4EB826C2                  JSR      TIMERS
                         *
001312 28F8606C                  MOVE.L   TIM_DATA,(A4)+
001316 28B86070                  MOVE.L   TIM_DAT2,(A4)       GET CLOCK DATA FROM TIMER PCIB
00131A 4EF80F2A                  JMP      TIME_END            GO SEE IF THERE IS AN EXTERNAL
                                                              INTERRUPT PENDING
                         *
                         ************************************************
                         *                                              *
                         *  SVC  (0A)  SUPERVISOR CALL INSTRUCTION       *
                         *                                              *
                         *    EXIT:  PSW STORED AS SVC OLD, SVC NEW IS NOW CURRENT. *
                         *                                              *
                         ************************************************
```

```
              0000131E    SVC     EQU     *
00131E 31C7601A                   MOVE.W  D7,INSTSAVE           SAVE INSTRUCTION HALFWORD
001322 4A3860E8                   TST.B   EXECFLAG              EXECUTE IN PROGRESS?
001326 6710                       BEQ.S   SVCOK
001328 21F860EC6002               MOVE.L  SAV_PCEX,PC           RESTORE PROGRAM COUNTER
00132E 30B860FC                   MOVE.W  SAV_PSREX,(A0)
001332 423860E8                   CLR.B   EXECFLAG
001336 584F                       ADDQ.W  #4,A7                 ADJUST STACK POINTER PAST EX RETURN
001338 024700FF    SVCOK          ANDI.W  #$00FF,D7             GET INTERRUPTION CODE FROM INSTR
00133C 7204                       MOVEQ   #$04,D1               SET BY-PASS PAT BIT FOR NO TRANSLATE
00133E 82386106                   OR.B    SAVE_CNTL,D1              TO ACCESS LOW STORE
001342 11C15FE1                   MOVE.B  D1,SYS_CNTL
001346 247C80000020               MOVE.L  #ASUPVOLD,A2          GET MAIN STORAGE ADDRESS FOR OLD PSW
00134C 287C80000060               MOVE.L  #ASUPVNEW,A4          GET MAIN STORAGE ADDRESS FOR NEW PSW
001352 083800036031               BTST    PSW_EC,PSW+1
001358 6618                       BNE.S   SVCEC
            *
00135A 21F860026034 SVCBC          MOVE.L  PC,PSW+4              GET PROGRAM COUNTER
001360 11D06034                   MOVE.B  (A0),PSW+4            MOVE ILC, CC, AND PROGRAM MASK
001364 24F86030                   MOVE.L  PSW,(A2)+             STORE CURRENT PSW AS OLD
001368 24B86034                   MOVE.L  PSW+4,(A2)
00136C 3547FFFE                   MOVE.W  D7,-2(A2)             STORE INT CODE INTO OLD PSW
001370 602A                       BRA.S   SVC1                  GET NEW PSW, CONTINUE
            *
001372 11F860036035 SVCEC          MOVE.B  PC+1,PSW+5            MOVE PROGRAM COUNTER
001378 31F860046036               MOVE.W  PC+2,PSW+6
00137E 723F                       MOVEQ   #$3F,D1
001380 C210                       AND.B   (A0),D1               MOVE CC AND PROGRAM MASK
001382 11C16032                   MOVE.B  D1,PSW+2
            *
001386 24F86030                   MOVE.L  PSW,(A2)+             STORE CURRENT PSW AS OLD
00138A 24B86034                   MOVE.L  PSW+4,(A2)
00138E 3947002A                   MOVE.W  D7,SVCINT-SVCNEW(A4)  INTERRUPT CODE
001392 72C0                       MOVEQ   #$C0,D1
001394 C210                       AND.B   (A0),D1               GET ILC FROM PSR
001396 E719                       ROL.B   3,D1
001398 19410029                   MOVE.B  D1,SVCILC-SVCNEW(A4)  ILC
            *
00139C 4EF81F10    SVC1           JMP     IENDSVC               GO TO LOAD PSW AND END
```

```
* * * * * * * * * * * * * * * * * * * * * * * * * * * * * * * * * *
*                                                                 *
*    TS  (93)   TEST AND SET INSTRUCTION                          *
*                                                                 *
* * * * * * * * * * * * * * * * * * * * * * * * * * * * * * * * * *

000013A0    TS      EQU     *
0013A0 31C7601A                   MOVE.W  D7,INSTSAVE           SAVE INSTRUCTION
0013A4 28786016                   MOVEA.L OP2_EA,A4             GET OPERAND 2 MS ADDRESS
0013A8 D9FC80000000               ADDA.L  #MS_ACC,A4
0013AE 7E00                       MOVEQ   #CC0,D7               SET CONDITION CODE 0
0013B0 4A14                       TST.B   (A4)                  TEST HI-ORDER BIT OF OPERAND 2
0013B2 50D4                       ST      (A4)                  TURN ALL BITS ON
0013B4 6A02                       BPL.S   TS1                   BR IF HI-ORDER BIT WAS OFF, CC0
0013B6 7E10                       MOVEQ   #CC1,D7               SET CONDITION CODE 1
0013B8 021000CF    TS1            ANDI.B  #CC_RST,(A0)          CLEAR COND CODE IN PSR
0013BC 8F10                       OR.B    D7,(A0)               SET NEW COND CODE IN PSR
0013BE 4EF80200                   JMP     RETURN
```

```
* * * * * * * * * * * * * * * * * * * * * * * * * * * * * * * * * *
*                                                                 *
*    TR  (DC)   TRANSLATE INSTRUCTION                             *
*                                                                 *
* * * * * * * * * * * * * * * * * * * * * * * * * * * * * * * * * *

000013C2    TR      EQU     *
0013C2 31C7601A                   MOVE.W  D7,INSTSAVE           SAVE INSTRUCTION
0013C6 247C80000000               MOVEA.L #MS_ACC,A2            SET UP FOR MAIN STORAGE ACCESS
```

```
0013CC 284A              MOVEA.L  A2,A4
0013CE D9F86012           ADDA.L   SSOP1_EA,A4     GET OPERAND 1 MS ADDRESS
0013D2 D5F8600E           ADDA.L   SSOP2_EA,A2     GET OPERAND 2 MS ADDRESS
0013D6 7600               MOVEQ    #$0,D3
0013D8 1607               MOVE.B   D7,D3           GET LENGTH FROM INSTRUCTION
0013DA 3803               MOVE.W   D3,D4           SAVE LENGTH
                 *
                 * * * * * * * * * * * * * * * * * * * * * * * * * * * *
                 *
0013DC 12343000           MOVE.B   0(A4,D3),D1     PRETEST END OF OP1
0013E0 50F860E7           ST       PRETEST         SET PRETEST SWITCH TO 'FF'
0013E4 1212               MOVE.B   (A2),D1         PRETEST 1ST AND LAST BYTES OF OPER 2
0013E6 4A3860E7           TST.B    PRETEST
0013EA 6A12               BPL.S    TRTEST
                 *
0013EC 43EA00FF           LEA      255(A2),A1
0013F0 50F860E7           ST       PRETEST
0013F4 1211               MOVE.B   (A1),D1
                 *
                 *
                 ****** IGNORE THIS ACCESS EXCEPTION IF IT EXISTS;  A TEST RUN THROUGH
                 ****** THE DATA ACTUALLY USED NEEDS TO BE MADE TO CHECK IF THE ACCESS
                 ****** EXCEPTION IS REALLY A CORRECT INDICATION.
                 *
                 * * * * * * * * * * * * * * * * * * * * * * * * * * * *
                 *
0013F6 7200               MOVEQ    #$0,D1
0013F8 4A3860E7           TST.B    PRETEST         TEST IF NO ACCESS EXCEPTIONS
0013FC 6B0C               BMI.S    TR1             GO DO INSTRUCTION IF OK
                 *
0013FE 224C      TRTEST   MOVEA.L  A4,A1           GO THROUGH THE MOTIONS TO SEE IF ALL
                 *                                  THE BYTES WE NEED ARE IN STORAGE
001400 1219      TRLOOP1  MOVE.B   (A1)+,D1        GET BYTE FROM OPERAND 1
001402 12321000            MOVE.B   0(A2,D1),D1    SEE IF 'TRANSLATABLE'; IF NO ACCESS
001406 51CCFFF8            DBRA     D4,TRLOOP1     EXCEPTION, SEARCH THROUGH OP1
                 *
00140A 51F860E7  TR1      SF       PRETEST         SET PRETEST TO '00'
00140E 1214      TRLOOP2  MOVE.B   (A4),D1         DO INSTRUCTION HERE - GET
001410 18F21000            MOVE.B   0(A2,D1),(A4)+ BYTE; STORE IN OPERAND 1 LOCATION
001414 51CBFFF8            DBRA     D3,TRLOOP2     CONTINUE TILL BYTE COUNT RUNS OUT
                 *
001418 4EF80200           JMP      RETURN          DONE; CONDITION CODE UNCHANGED
                 *

EN982023                                            PAGE   69        APPENDIX A
                           PAGE
                 * * * * * * * * * * * * * * * * * * * * * * * * * * * *
                 *                                                     *
                 *    TRT  (DD)  TRANSLATE AND TEST INSTRUCTION        *
                 *                                                     *
                 *                                                     *
                 * * * * * * * * * * * * * * * * * * * * * * * * * * * *
                 *
       0000141C  TRT      EQU      *
00141C 31C7601A           MOVE.W   D7,INSTSAVE     SAVE INSTRUCTION
001420 247C80000000        MOVEA.L  #MS_ACC,A2     SET UP FOR MAIN STORAGE ACCESS
001426 284A               MOVEA.L  A2,A4
001428 D9F86012           ADDA.L   SSOP1_EA,A4     GET OPERAND 1 MS ADDRESS
00142C D5F8600E           ADDA.L   SSOP2_EA,A2     GET OPERAND 2 MS ADDRESS
001430 7600               MOVEQ    #$0,D3
001432 1607               MOVE.B   D7,D3           LOAD LENGTH FROM INSTRUCTION
                 *
001434 7A00               MOVEQ    #$0,D5
001436 1A1C      TRTLOOP  MOVE.B   (A4)+,D5        GET BYTE FROM FIRST OPERAND
001438 1A325000            MOVE.B   0(A2,D5),D5    USE AS DISPLACEMENT INTO TABLE
00143C 56CBFFF8            DBNE     D3,TRTLOOP     CONTINUE IN LOOP IF CHARACTER NOT 0
                 *                                  OR BYTE COUNT NOT EXHAUSTED
                 *
001440 6604               BNE.S    TRT1            BRANCH IF LAST BYTE NOT ZERO
001442 7E00               MOVEQ    #CC0,D7         SET COND CODE 0
001444 601C               BRA.S    TRT_RTN
                 *
001446 12386006  TRT1     MOVE.B   GPR1,D1         SAVE HIGH-ORDER BYTE OF R1
00144A 538C               SUBQ.L   #1,A4           BACK UP ADDRESS
00144C 21CC6006           MOVE.L   A4,GPR1         STORE UPDATED ARGUMENT ADDRESS
```

```
001450 11C16006            MOVE.B  D1,GPR1         RESTORE HIGH-ORDER BYTE
001454 11C5600D            MOVE.B  D5,GPR2+3       PUT FUNCTION BYTE INTO R2
                   *
001458 4A43               TST.W    D3              WAS THE NON-ZERO BYTE THE LAST BYTE?
00145A 6704               BEQ.S    TRT2            BRANCH IF YES
00145C 7E10               MOVEQ    #CC1,D7         SET CC1; NON-ZERO BYTE FOUND
00145E 6002               BRA.S    TRT_RTN           BEFORE END OF ARGUMENT
                   *
001460 7E20        TRT2    MOVEQ    #CC2,D7         SET CC2; LAST BYTE NON-ZERO BYTE
001462 021000CF    TRT_RTN ANDI.B   #CC_RST,(A0)    CLEAR COND CODE IN PSR
001466 8F10                OR.B    D7,(A0)         SET NEW COND CODE IN PSR
001468 4EF80200            JMP     RETURN
```

```
                                                   PAGE    70       APPENDIX A
                    PAGE
        * * * * * * * * * * * * * * * * * * * * * * * * * * * * * * * * *
        *                                                               *
        *       IO INSTRUCTIONS                                          *
        *       OP TABLE (SIOSIOF,TIOCLRIO ONLY)                         *
        *       OVERLAYED BY PCIO OR PCACIA MODULE                      *
        *                                                               *
        * * * * * * * * * * * * * * * * * * * * * * * * * * * * * * * * *
        *
        *
        0000146C    SIOSIOF  EQU     *          I/O INSTRUCTIONS
        0000146C    TIOCLRIO EQU     *
        0000146C    HIOHDV   EQU     *
        0000146C    TCHCLRCH EQU     *
00146C 31C7601A             MOVE.W  D7,INSTSAVE     SAVE INSTRUCTION HALFWORD
001470 083800006031         BTST    PSW_PROB,PSW+1  TEST FOR PROBLEM STATE
001476 66000EB0             BNE     PRIVEX          IF YES, GO TO PRIV EXCP
        *
        *           FALL THROUGH TO OPERATION EXCEPTION
        *
        * * * * * * * * * * * * * * * * * * * * * * * * * * * * * * * * *
        *                                                               *
        *       DECIMAL OPS                                              *
        *       OP TABLE OVERLAYED BY DECCODE MODULE                     *
        *                                                               *
        * * * * * * * * * * * * * * * * * * * * * * * * * * * * * * * * *
        0000147A    CVD     EQU     *
        0000147A    CVB     EQU     *
        0000147A    AP      EQU     *
        0000147A    SUBDEC  EQU     *
        0000147A    CP      EQU     *
        0000147A    MP      EQU     *
        0000147A    DP      EQU     *
        0000147A    SRP     EQU     *
        0000147A    ZAP     EQU     *
        * * * * * * * * * * * * * * * * * * * * * * * * * * * * * * * * *
        *                                                               *
        *       FLOATING POINT EXTENDED OPS                              *
        *       OP TABLE OVERLAYED BY FCODE MODULE                       *
        *                                                               *
        * * * * * * * * * * * * * * * * * * * * * * * * * * * * * * * * *
        *
        *
        0000147A    MXR     EQU     *       FLOATING-POINT EXTENDED INSTRUCTIONS
        0000147A    MXDR    EQU     *
        0000147A    AXR     EQU     *
        0000147A    SXR     EQU     *
        0000147A    LRDR    EQU     *
        0000147A    LRER    EQU     *
        0000147A    MXD     EQU     *
00147A 4EF82324             JMP     OPEXCP1
```

```
                                                   PAGE    71       APPENDIX A
                    PAGE
        * * * * * * * * * * * * * * * * * * * * * * * * * * * * * * * * *
        *                                                               *
        *       BUS ERROR SUBROUTINE    ( D0 HAS BUS ERROR REGISTER )    *
        *                                                               *
        *       COME HERE ON ANY BUS ERROR TO ANALYZE ERROR REGISTER     *
        *                                                               *
        * * * * * * * * * * * * * * * * * * * * * * * * * * * * * * * * *
```

```
00147E 22385FCE      BUS_ERR  MOVE.L   ADDR_REG,D1           GET FAILING ADDRESS
001482 0800000B               BTST     PAT_PAR,D0            PAT PARITY ERROR?
001486 6604                   BNE.S    BUS1
001488 7416                   MOVEQ    #PAR_CHK,D2           SET MACHINE CHECK CODE
00148A 6026                   BRA.S    BE_DONE
                    *
00148C 0800000C     BUS1      BTST     ODD_PC,D0             ODD PROGRAM COUNTER?
001490 6604                   BNE.S    BUS2
001492 7406                   MOVEQ    #PC_ODD,D2            SET ODD PC
001494 601C                   BRA.S    BE_DONE
                    *
001496 0800000A     BUS2      BTST     REAL_OOB,D0           REAL ADDRESS OUT OF BOUNDS?
00149A 6604                   BNE.S    BUS3
00149C 7405                   MOVEQ    #INV_ADDR,D2          SET INVALID ADDRESS
00149E 6012                   BRA.S    BE_DONE
                    *
0014A0 0800000E     BUS3      BTST     VIRT_OOB,D0           VIRTUAL ADDRESS OUT OF BOUNDS?
0014A4 6604                   BNE.S    BUS4
0014A6 7411         BE_PGXLT  MOVEQ    #PAGE_EXC,D2          SET PAGE TRANSLATION EXCEPTION
0014A8 6008                   BRA.S    BE_DONE
                    *
0014AA 08000009     BUS4      BTST     PG_FAULT,D0           PAGE FAULT?
0014AE 67F6                   BEQ.S    BE_PGXLT              BR TO SET PG XLATE XCPT
                    *
0014B0 7415         BUS5      MOVEQ    #MACHCHK,D2           IF NONE OF THE ABOVE, SET MACHINE CK
0014B2 31C06206     BE_DONE   MOVE.W   D0,BECB_BER
0014B6 31C26200               MOVE.W   D2,BECB               FILL IN BUS ERROR CONTROL BLOCK
0014BA 21C16202               MOVE.L   D1,BECB_ADR           SAVE FAILING ADDRESS
0014BE 42386202               CLR.B    BECB_ADR              CLEAR BITS 31-24
0014C2 7204                   MOVEQ    #$04,D1               SET BY-PASS PAT BIT FOR NO TRANSLATE
0014C4 82386106               OR.B     SAVE_CNTL,D1             TO ACCESS LOW STORE
0014C8 11C15FE1               MOVE.B   D1,SYS_CNTL
0014CC 4A3980000000           TST.B    MS_ACC                CLEAR BUS ERROR REG (ACCESS 370 0)
0014D2 11F861065FE1           MOVE.B   SAVE_CNTL,SYS_CNTL    RESTORE ORIGINAL
0014D8 4E75                   RTS
                    *
                    *************************************
                    *                                   *
                    *  B U S   E R R O R   R O U T I N E S
                    *                                   *
                    *   COME HERE WHEN E-ENGINE GETS A BUS ERROR *
                    *                                   *
                    *************************************
                    *
       000014DA     BUSERROR  EQU      *                     COME HERE FROM VECTOR SWAP
0014DA 48E7E000               MOVEM.L  D0-D2,-(A7)           SAVE REGISTERS
0014DE 30385FB0               MOVE.W   BER_REG,D0            READ BUS ERROR REGISTER
0014E2 4EB8147E               JSR      BUS_ERR               GET BUS ERROR CONTROL BLOCK FILLED
                    *
0014E6 4CDF0007               MOVEM.L  (A7)+,D0-D2           RESTORE REGISTERS
0014EA 4A3860E7               TST.B    PRETEST               IS PRETEST SWITCH SET?
0014EE 6648                   BNE.S    BUSPRTST              YES, RETURN TO ROUTINE
0014F0 083800036038           BTST     PST_RESET,PUSTAT      IS A RESET IN PROGRESS?
0014F6 6644                   BNE.S    BERET                 YES, RETURN TO ROUTINE
0014F8 11F861065FE1           MOVE.B   SAVE_CNTL,SYS_CNTL    RESTORE ORIGINAL SYS CONTROL REG
0014FE 303C0200               MOVE.W   #$200,D0              LOAD LENGTH OF 'OPTABLE'
001502 1038601A               MOVE.B   INSTSAVE,D0           GET SAVED INSTRUCTION
                    *
001506 12350000               MOVE.B   0(A5,D0),D1           GET ENTRY OF 'BETABLE'
00150A 6B7A                   BMI.S    BEFPDEC               GO TO A-ENGINE TO GET PC AND PSR
00150C 020100F0               ANDI.B   #$F0,D1               ANY OTHER SPECIAL CONDITIONS?
001510 664E                   BNE.S    BERSPEC               BR IF YES
                    *
       00001512     BUSERRET  EQU      *
001512 DEFC000E               ADDA.W   #14,A7                STRAIGHTEN OUT SYSTEM STACK
                    *
001516 31FC66005FA2 BUSERRA7  MOVE.W   #FP_INIT,FP_CMD       REINITIALIZE FLOATING POINT CHIP
00151C 31FC76005FA2           MOVE.W   #FP_SMSK,FP_CMD          AFTER BUS ERROR
001522 31F860465FA0           MOVE.W   FP_MASK,FP_DATA
001528 34386200               MOVE.W   BECB,D2               GET BUS ERROR CODE
00152C 0C420015               CMPI.W   #$0015,D2             IS IT MACHINE CHECK?
001530 6B000EB0               BMI      PROGCHK               NO, SWAP PROGRAM CHECK PSWS
001534 4EF81A54               JMP      MACH_CHK
                    *
```

```
001538 423860E7    BUSPRTST CLR.B    PRETEST         SET ERROR, RESET SWITCH, RETURN
00153C 504F        BERET    ADDQ.W   #8,A7           STRAIGHTEN OUT SYSTEM STACK
00153E 4E73                 RTE                      GET RETURN ADDRESS FROM STACK
                   *
001540 0C38004E6006 BUSERRA1 CMPI.B  #$4E,R1         TEST FOR CONVERT TO BINARY OR
001546 6712                 BEQ.S    BEUPDPC             CONVERT TO DECIMAL OPS...
001548 0C38004F6006         CMPI.B   #$4F,R1             THEY NEED PC UPDATED ON A100 CODE
00154E 670A                 BEQ.S    BEUPDPC
                   *
001550 72C0        BUSERRA2 MOVEQ    #$C0,D1         GET ILC OF FAILING INSTRUCTION
001552 C210                 AND.B    (A0),D1
001554 0C0100C0             CMPI.B   #$C0,D1         IS IT IN QUADRANT 4?
001558 66BC                 BNE.S    BUSERRA7        NO, PC MATCHES ILC
00155A 54B86002    BEUPDPC  ADDQ.L   #2,PC           OTHERWISE LINE UP PC
00155E 60B6                 BRA.S    BUSERRA7
                   *
001560 E309        BERSPEC  LSL.B    1,D1            IF IT'S MVCL OR CLCL,
001562 6B2E                 BMI.S    BECLML              FIRST NEED SPECIAL HANDLING
001564 E309                 LSL.B    1,D1
001566 6B14                 BMI.S    BEEXCP
001568 0C0000C3             CMPI.B   #$C3,D0         IS IT AN A-ENGINE OFF-BOUNDARY
00156C 6604                 BNE.S    BEINVOP         BR IF NO, ERROR
00156E 4EF8027A             JMP      A_BAGIT         HANDLE PAGE-FAULT ON A-OFF-BOUNDARY
                   *
001572 31FC4010605C BEINVOP MOVE.W   #$4010,REFCODE
001578 4EF81B72             JMP      HARDSTOP
                   *
       0000157C    BEEXCP   EQU      *
00157C 31FC4020605C         MOVE.W   #$4020,REFCODE
001582 4EF81B72             JMP      HARDSTOP
                   *
                   *
                   *
                   *
001586 343CA7A7    BEFPDEC  MOVE.W   #$A7A7,D2       SPECIAL RETURN CODE
00158A DEFC000E             ADDA.W   #14,A7          STRAIGHTEN OUT STACK
00158E 4EF80202             JMP      RETURNEX        (CONTROL WILL RETURN TO THE E-ENGINE
                   *                                  WHEN A-ENGINE SEES BAD RETURN CODE)
                   *
                   *
                   *
001592 08000000    BECLML   BTST     0,D0            WAS IT MVCL OR CLCL?
001596 660A                 BNE.S    BECLCL          BRANCH IF CLCL
001598 3E3C2000             MOVE.W   #$2000,D7
00159C 50F860E6             ST       CLCL_SW
0015A0 6004                 BRA.S    BECLML1
0015A2 3E3C00C0    BECLCL   MOVE.W   #$00C0,D7
0015A6 322F0006    BECLML1  MOVE.W   6(A7),D1        GET FAILING INSTRUCTION FROM STACK
0015AA 5242                 ADDQ.W   #1,D2           ADJUST LOOP COUNT
0015AC C247                 AND.W    D7,D1           FIND SIZE FIELD
0015AE 6702                 BEQ.S    BECLML2         BRANCH IF BYTE COMPARE
                   *
0015B0 E54A                 LSL.W    2,D2            MAKE FW COUNT BYTE COUNT
0015B2 9642        BECLML2  SUB.W    D2,D3           FIND COUNT ALREADY COMPARED
0015B4 9883                 SUB.L    D3,D4           SUBTRACT TO FIND TOTAL COUNT LEFT
                   *
0015B6 4A85                 TST.L    D5              WERE WE PADDING?
0015B8 6714                 BEQ.S    BECLML4         YES, ADJUST ONLY ONE OPERAND
                   *
0015BA 9A84        BECLML3  SUB.L    D4,D5           FIND TOTAL COUNT COMPARED
0015BC DBB8600E             ADD.L    D5,RR1E_RET     ADJUST ADDRESS REGISTER OF OP1
0015C0 DBB86006             ADD.L    D5,RR2E_RET     ADJUST ADDRESS REGISTER OF OP2
                   *
0015C4 9BB86012             SUB.L    D5,RR1O_RET     ADJUST COUNT OF OP1
0015C8 9BB8600A             SUB.L    D5,RR2O_RET     ADJUST COUNT OF OP2
0015CC 601A                 BRA.S    BECLML6
                   *
0015CE 9C84        BECLML4  SUB.L    D4,D6           FIND TOTAL COUNT PADDED
0015D0 4A3860E6             TST.B    CLCL_SW         WAS OP2 LONGER THAN OP1?
0015D4 660A                 BNE.S    BECLML5         NO, GO ADJUST OP1
                   *
0015D6 DDB86006             ADD.L    D6,RR2E_RET     ADJUST ADDRESS OF OP2
0015DA 9DB8600A             SUB.L    D6,RR2O_RET     ADJUST COUNT OF OP2
```

```
0015DE 6008                        BRA.S    BECLML6
              *
0015E0 DDB8600E       BECLML5  ADD.L    D6,RR1E_RET        ADJUST ADDRESS OF OP1
0015E4 9DB86012                SUB.L    D6,RR1O_RET        ADJUST COUNT OF OP1
              *
0015E8 7200           BECLML6  MOVEQ    #0,D1
0015EA 11C1600E                MOVE.B   D1,RR1E_RET        ENSURE HIGH BYTES OF REGISTERS OK
0015EE 11F860DE6012            MOVE.B   RR1O_SAV,RR1O_RET
0015F4 11C16006                MOVE.B   D1,RR2E_RET
0015F8 11F860E0600A            MOVE.B   RR2O_SAV,RR2O_RET
0015FE 7204                    MOVEQ    #$04,D1            SET BY-PASS PAT BIT FOR NO TRANSLATE
001600 82386106                OR.B     SAVE_CNTL,D1            TO ACCESS LOW STORE
001604 11C15FE1                MOVE.B   D1,SYS_CNTL
001608 227C80000028            MOVEA.L  #APROGOLD,A1
00160E 4A11                    TST.B    (A1)               ACCESS MAIN STORE TO RESET BUS ERROR
              *
001610 343C4500                MOVE.W   #$4500,D2          RETURN TO PRIMARY WITH POS. RETURN
001614 4EF80202                JMP      RETURNEX                CODE; RETURN TO 'BUSERRET' TO CONT
              *
              ***********************************************
              *                                             *
              *     DIAGNOSTIC ROUTINE FOR PU HARDWARE      *
              *     TESTS PAT, MAIN STORAGE, AND FLOATING-POINT ENGINE    *
              *                                             *
              ***********************************************
              *
              *
              *
              00001618         FP_DIAG  EQU      *              SUBROUTINE TO DIAGNOSE CORNROW
001618 43F85FA0                LEA      FP_DATA,A1
00161C 31FC64405FA2            MOVE.W   #FP_EXCH,FP_CMD    TELL CORNROW TO SAVE ITS REGISTERS
001622 31FC6440165A            MOVE.W   #FP_EXCH,SAVE      SAVE COMMAND WE TRIED TO DO
001628 31F85F90165C            MOVE.W   CC_INT_REG,STAT    READ STATUS
              *
00162E 31FC2001605C            MOVE.W   #$2001,REFCODE     SET DIAGNOSTIC PROGRESS CODE
001634 45F8165E                LEA      DIAGSEED,A2
001638 31FC68005FA2            MOVE.W   #LD_FPR0,FP_CMD    LOAD FP REG 0 WITH DIAGNOSE SEED
00163E 31FC6800165A            MOVE.W   #LD_FPR0,SAVE      SAVE COMMAND
001644 329A                    MOVE.W   (A2)+,(A1)
001646 329A                    MOVE.W   (A2)+,(A1)
001648 329A                    MOVE.W   (A2)+,(A1)
00164A 329A                    MOVE.W   (A2)+,(A1)
              *
00164C 31FC64025FA2            MOVE.W   #FP_CHK,FP_CMD     TELL CORNROW TO DO CHECK INSTR
001652 31FC6402165A            MOVE.W   #FP_CHK,SAVE       SAVE COMMAND
001658 601C                    BRA.S    DIAG_PU            CONTINUE WITH OTHER DIAGNOSTICS,
                                                                CHECK CORNROW LATER.
              *
              *
00165A 0000           SAVE     DC       0
00165C 0000           STAT     DC       0
00165E 00000000       DIAGSEED DC.L     0              LOAD FP REG0 (BEFORE DIAGNOSE)
001662 00000000                DC.L     0
001666 00000000       DIAGDATA DC.L     0              STORE FP REG0 (AFTER DIAGNOSE)
00166A 00000000                DC.L     0
00166E 00000000       DIAGCODE DC.L     0              STORE FP REG2
001672 00000000                DC.L     0
              *
              *
              *
              *
              *
              00001676         DIAG_PU  EQU      *
001676 08F800036038            BSET     PST_RESET,PUSTAT   SET INFORMATION BIT IN CASE OF BUS
                                                                ERROR (TO RETURN TO THIS ROUTINE)
              *
              *
              *     PAT TEST -
              *     STORE FFFF INTO EACH PAT ENTRY, READ BACK, CHECK PARITY AND DATA
              *
00167C 31FC2002605C            MOVE.W   #$2002,REFCODE     SET DIAGNOSTIC PROGRESS CODE
001682 227C00800000            MOVEA.L  #PAT,A1
001688 243C00001000            MOVE.L   #$00001000,D2      ADDRESS INCREMENT FOR NEXT ENTRY
00168E 363C03FF                MOVE.W   #$3FF,D3           NUMBER OF PAT ENTRIES
001692 303CFFFF                MOVE.W   #$FFFF,D0          SET FIRST PATTERN
001696 323C8F7F                MOVE.W   #$8F7F,D1          SET MASK PATTERN
```

```
EN98%023
00169A 3C3C0F7F              MOVE.W    #$0F7F,D6
00169E 7808                   MOVEQ     #$08,D4          SET PAT_MOD BIT = 1 TO ALLOW
0016A0 88386106               OR.B      SAVE_CNTL,D4        PAT ACCESS
0016A4 11C45FE1               MOVE.B    D4,SYS_CNTL
                         *
0016A8 3280          DIAGPU1  MOVE.W    D0,(A1)          STORE DATA INTO PAT ENTRY
0016AA 3A01                   MOVE.W    D1,D5            GET MASK
0016AC CA51                   AND.W     (A1),D5          AND PAT ENTRY INTO MASK
0016AE 6B5E                   BMI.S     PAT_ERR          CHECK FOR PAT PARITY
0016B0 BA46                   CMP.W     D6,D5            CHECK THAT DATA COMPARES
0016B2 6662                   BNE.S     PAT_DATA         BRANCH IF NOT
                         *
0016B4 D3C2                   ADDA.L    D2,A1            POINT TO NEXT PAT ENTRY
0016B6 51CBFFF0               DBRA      D3,DIAGPU1       CONTINUE THROUGH ALL ENTRIES
                         *
                         *
                         *   STORE 5555 INTO EACH PAT ENTRY, READ BACK, CHECK PARITY AND DATA
                         *
0016BA 227C00800000           MOVEA.L   #PAT,A1
0016C0 363C03FF               MOVE.W    #$3FF,D3         NUMBER OF PAT ENTRIES
0016C4 303C5555               MOVE.W    #$5555,D0        SET SECOND PATTERN
0016C8 3C3C0555               MOVE.W    #$0555,D6        DATA FOR COMPARE
                         *
0016CC 3280          DIAGPU2  MOVE.W    D0,(A1)          STORE DATA INTO PAT ENTRY
0016CE 3A01                   MOVE.W    D1,D5            GET MASK
0016D0 CA51                   AND.W     (A1),D5          AND PAT ENTRY INTO MASK
0016D2 6B3A                   BMI.S     PAT_ERR          CHECK FOR PAT PARITY
0016D4 BA46                   CMP.W     D6,D5            CHECK THAT DATA COMPARES
0016D6 663E                   BNE.S     PAT_DATA         BRANCH IF NOT
                         *
0016D8 D3C2                   ADDA.L    D2,A1            POINT TO NEXT PAT ENTRY
0016DA 51CBFFF0               DBRA      D3,DIAGPU2       CONTINUE THROUGH ALL ENTRIES
                         *
                         *
                         *   STORE AAAA INTO EACH PAT ENTRY, READ BACK, CHECK PARITY AND DATA
                         *
0016DE 227C00800000           MOVEA.L   #PAT,A1
0016E4 363C03FF               MOVE.W    #$3FF,D3         NUMBER OF PAT ENTRIES
0016E8 303CAAAA               MOVE.W    #$AAAA,D0        SET THIRD PATTERN
0016EC 3C3C0A2A               MOVE.W    #$0A2A,D6        DATA FOR COMPARE
                         *
0016F0 3280          DIAGPU3  MOVE.W    D0,(A1)          STORE DATA INTO PAT ENTRY
0016F2 3A01                   MOVE.W    D1,D5            GET MASK
0016F4 CA51                   AND.W     (A1),D5          AND PAT ENTRY INTO MASK
0016F6 6B16                   BMI.S     PAT_ERR          CHECK FOR PAT PARITY
0016F8 BA46                   CMP.W     D6,D5            CHECK THAT DATA COMPARES
0016FA 661A                   BNE.S     PAT_DATA         BRANCH IF NOT
                         *
0016FC D3C2                   ADDA.L    D2,A1            POINT TO NEXT PAT ENTRY
0016FE 51CBFFF0               DBRA      D3,DIAGPU3       CONTINUE THROUGH ALL ENTRIES
                         *
                         *
001702 4EB81F4E               JSR       PURGE            GO LOAD UP PAT CORRECTLY
001706 31FC2005605C           MOVE.W    #$2005,REFCODE   SET DIAGNOSTIC PROGRESS CODE
00170C 601A                   BRA.S     DIAG_PU4         BRANCH AROUND ERROR ROUTINES
                         *
                         *
       0000170E      PAT_ERR  EQU       *
00170E 31FC2003605C           MOVE.W    #$2003,REFCODE   SET DIAGNOSTIC ERROR CODE
001714 600E                   BRA.S     DIAGE
       00001716      PAT_DATA EQU       *
001716 31FC2004605C           MOVE.W    #$2004,REFCODE   SET DIAGNOSTIC ERROR CODE
00171C 6006                   BRA.S     DIAGE
       0000171E      MAIN_ERR EQU       *
00171E 31FC2006605C           MOVE.W    #$2006,REFCODE   SET DIAGNOSTIC ERROR CODE
001724 4EF817D6      DIAGE    JMP       DIAGEND
                         *
                         *
                         *   MAIN STORE TEST -
                         *     STORE ALL 01010101 IN FULLWORDS
                         *
001728 223C01010101  DIAG_PU4 MOVE.L    #$01010101,D1
00172E 247C80000000           MOVE.L    #ARSTRT_N,A2     LOAD MAIN STORE ADDRESS 0
001734 42786200               CLR.W     BECB
001738 2481          DIAGPU4  MOVE.L    D1,(A2)          STORE DATA
```

```
00173A 241A                  MOVE.L   (A2)+,D2          READ DATA
00173C 4A786200               TST.W    BECB              COME HERE ON STORE BUS ERROR
001740 4A786200               TST.W    BECB              COME HERE ON READ BUS ERROR
001744 67F2                   BEQ.S    DIAGPU4           CONTINUE UNTIL BUS ERROR
               *
001746 0C7800056200           CMPI.W   #$0005,BECB       CHECK FOR ADDRESSING EXCEPTION
00174C 66D0                   BNE.S    MAIN_ERR
               *
               *
               *     STORE ALL FFFFFFFF IN FULLWORDS
               *
00174E 72FF                   MOVE.L   #$FFFFFFFF,D1
001750 247C80000000           MOVE.L   #ARSTRT_N,A2      LOAD MAIN STORE ADDRESS 0
001756 42786200               CLR.W    BECB
00175A 2481         DIAGPU5   MOVE.L   D1,(A2)           STORE DATA
00175C 241A                   MOVE.L   (A2)+,D2          READ DATA
00175E 4A786200               TST.W    BECB              COME HERE ON STORE BUS ERROR
001762 4A786200               TST.W    BECB              COME HERE ON READ BUS ERROR
001766 67F2                   BEQ.S    DIAGPU5           CONTINUE UNTIL BUS ERROR
               *
001768 0C7800056200           CMPI.W   #$0005,BECB       CHECK FOR ADDRESSING EXCEPTION
00176E 66AE                   BNE.S    MAIN_ERR
               *
001770 08B800036038           BCLR     PST_RESET,PUSTAT
001776 31FC2007605C           MOVE.W   #$2007,REFCODE
00177C 31F85F90165C           MOVE.W   CC_INT_REG,STAT   READ CORNROW STATUS
               *
001782 43F85FA0               LEA      FP_DATA,A1
001786 45F81666               LEA      DIAGDATA,A2
00178A 31FC60005FA2           MOVE.W   #ST_FPR0,FP_CMD   GET CONTENTS OF FP REG2 AFTER DIAG
001790 31FC6000165A           MOVE.W   #ST_FPR0,SAVE     SAVE COMMAND
001796 34D1                   MOVE.W   (A1),(A2)+
001798 34D1                   MOVE.W   (A1),(A2)+
00179A 34D1                   MOVE.W   (A1),(A2)+
00179C 34D1                   MOVE.W   (A1),(A2)+
               *
00179E 31FC60205FA2           MOVE.W   #ST_FPR2,FP_CMD   GET CONTENTS OF FP REG6 AFTER DIAG
EN98 023
0017A4 31FC6020165A           MOVE.W   #ST_FPR2,SAVE     SAVE COMMAND
0017AA 34D1                   MOVE.W   (A1),(A2)+
0017AC 34D1                   MOVE.W   (A1),(A2)+
0017AE 34D1                   MOVE.W   (A1),(A2)+
0017B0 34D1                   MOVE.W   (A1),(A2)+
               *
0017B2 31FC64405FA2           MOVE.W   #FP_EXCH,FP_CMD   TELL CORNROW TO RESTORE SAVED REGS
0017B8 31FC6440165A           MOVE.W   #FP_EXCH,SAVE     SAVE COMMAND
0017BE 31F85F90165C           MOVE.W   CC_INT_REG,STAT
               *
               *
0017C4 31FC2009605C           MOVE.W   #$2009,REFCODE    SET DIAGNOSTIC GOOD COMPLETION
0017CA 4AB8166E               TST.L    DIAGCODE          CHECK RETURN CODE
0017CE 6706                   BEQ.S    DIAGEND           IF ZERO, TEST RAN OK
0017D0 31FC2008605C           MOVE.W   #$2008,REFCODE    SET FP DIAG ERROR REFERENCE CODE
0017D6 11FC00FD5F90 DIAGEND   MOVE.B   #PC_RESET,INTR_REG  RESET PC INTERRUPT
0017DC 4EF818D2               JMP      STOP_LP           GO TO WAIT FOR AN INTERRUPT
               *
               **************************************************
               *                                                 *
               *    EX_INT :  SUBROUTINE TO CHECK PENDING EXTERNAL *
               *              INTERRUPTS AGAINST CURRENT MASKS.   *
               *                                                 *
               *    EXIT :  - RETURNS TO CALLER IF NO INTERRUPT   *
               *                                                 *
               *            - UNSTACKS RETURN ADDRESS, GOES TO EXTERNAL *
               *              INTERRUPT HANDLER (EXT_INTR) IF INTERRUPT *
               *              TO BE PRESENTED.                   *
               *                                                 *
               **************************************************
               *
         000017E0  EX_INT     EQU      *
0017E0 4A786102               TST.W    EXT_INT_PND       ANY EXTERNAL INTERRUPTS PENDING?
0017E4 6602                   BNE.S    EXMASK
0017E6 4E75        EX_RET     RTS                        IF NOT, RETURN
               *
```

```
0017E8 36380102      EXMASK   MOVE.W   CREG0+2,D3         GET EXTERNAL MASKS FROM CONTROL REG
0017EC C6786102               AND.W    EXT_INT_PND,D3     COMPARE WITH PENDING INTERRUPTS
0017F0 67F4                   BEQ.S    EX_RET             IF NONE MATCH, RETURN
               *---------------------------------------------------------------
               *     AN INTERRUPT CONDITION EXISTS WHICH IS MASKED ON; RETURN TO
               *     THE CALLING SUBROUTINE WILL NOT BE MADE.
               *---------------------------------------------------------------
0017F2 584F                   ADDQ.W   #4,A7              UNSTACK RETURN ADDRESS
0017F4 4EB82476               JSR      FETCHPSW           GET CURRENT PSW CONTENTS
0017F8 4A03                   TST.B    D3                 INTERRUPT KEY? (OTHERS NOT SUPPORTED
               *                                             AT THIS TIME)
0017FA 6708                   BEQ.S    EXINT1
0017FC 42386103               CLR.B    EXT_INT_PND+1      CLEAR PENDING INTERRUPT
001800 7440                   MOVEQ    #$0040,D2          LOAD INTERRUPT KEY CODE
001802 600C                   BRA.S    EXT_INTR           GO TAKE EXTERNAL INTERRUPT
               *
               *
001804 343C1004     EXINT1    MOVE.W   #$1004,D2          LOAD CLOCK COMPARATOR CODE
001808 0803000B               BTST     #CCOMP,D3          CLOCK COMPARATOR INTERRUPT PENDING?
00180C 6602                   BNE.S    EXT_INTR
00180E 5242                   ADDQ.W   #1,D2              MAKE IT CPU TIMER CODE

*****************************************************
               *                                                   *
               *           EXTERNAL INTERRUPTS                     *
               *                                                   *
               *****************************************************
               *
               *
001810 7204     EXT_INTR MOVEQ    #$04,D1            SET BY-PASS PAT BIT FOR NO TRANSLATE
001812 82386106               OR.B     SAVE_CNTL,D1            TO ACCESS LOW STORE
001816 11C15FE1               MOVE.B   D1,SYS_CNTL
00181A 247C80000018           MOVEA.L  #AEXTROLD,A2       GET MAIN STORAGE ADDRESS FOR OLD PSW
001820 287C80000058           MOVEA.L  #AEXTRNEW,A4       GET MAIN STORAGE ADDRESS FOR NEW PSW
001826 24F86030               MOVE.L   PSW,(A2)+          STORE CURRENT PSW AS OLD
00182A 24B86034               MOVE.L   PSW+4,(A2)
00182E 083800036031           BTST     PSW_EC,PSW+1
001834 6708                   BEQ.S    EXBCCODE
001836 3942002E               MOVE.W   D2,EXINT-EXNEW(A4)
               *
00183A 4EF81EF6     EXT1      JMP      IENDINT            GO TO LOAD PSW AND END
               *
               *
00183E 3502     EXBCCODE MOVE.W   D2,-(A2)           STORE INTERRUPTION CODE
001840 60F8                   BRA.S    EXT1

*****************************************************
               *                                                   *
               *     STORE/LOAD REGISTER SUBROUTINES               *
               *                                                   *
               *     THESE ROUTINES WILL GENERATE APPROPRIATE INSTRUCTIONS, TURN *
               *     ON THE TRACE BIT IN THE PSR, AND STORE/LOAD GPR CONTENTS    *
               *     TO/FROM PRIVATE STORE.                                      *
               *                                                   *
               *     FOR 'ST' AND 'L' FUNCTIONS                                  *
               *     ENTRY: GPR NO. IN D4  (FOUR HIGH ORDER BITS).               *
               *            FOR 'L' DATA FOR GPR IS AT LABEL 'GPR'.              *
               *     EXIT : FOR 'ST' DATA FROM GPR IS AT LABEL 'GPR'.            *
               *                                                   *
               *     FOR 'GPRALTER' AND 'GPRDISP' FUNCTIONS                      *
               *     ENTRY: FOR 'GPRALTER' DATA FOR GPRS IS AT LABEL 'GPRSAVE'.  *
               *     EXIT : FOR 'GPRDISP' DATA FROM GPRS IS AT LABEL 'GPRSAVE'.  *
               *                                                   *
               *****************************************************
               *
001842 11C460C1     ST        MOVE.B   D4,ST_INST+1
001846 21F8600260F4           MOVE.L   PC,SAV_PC
00184C 21FC000060C0
       6002                   MOVE.L   #ST_INST,PC
001854 31D060F8     GPRACC    MOVE.W   (A0),SAV_PSR
001858 0038001E6001           ORI.B    #TR_MASK+L7_MASK,PSR+1  MAKE SURE WE TAKE NO INTERRUPTS
00185E 7003                   MOVEQ    #INSTOV+OPEROV,D0  SET IFETCH AND OPRND OVERIDE BITS
001860 80386106               OR.B     SAVE_CNTL,D0            TO ALLOW PRIVATE STORE ACCESS
001864 11C05FE1               MOVE.B   D0,SYS_CNTL
001868 343CC0C0               MOVE.W   #$C0C0,D2          FORCE A-ENGINE TO TOP
00186C 4EB80202               JSR      RETURNEX
               *
```

```
001870 11F861065FE1          MOVE.B   SAVE_CNTL,SYS_CNTL   RESET STORAGE OVERRIDE
001876 21F860F46002          MOVE.L   SAV_PC,PC
00187C 30B860F8              MOVE.W   SAV_PSR,(A0)
001880 4E75                  RTS
                      *
001882 11C460C9      L       MOVE.B   D4,L_INST+1
001886 21F8600260F4          MOVE.L   PC,SAV_PC
00188C 21FC000060C8
       6002                  MOVE.L   #L_INST,PC
001894 60BE                  BRA.S    GPRACC
                      *
       00001896      GPRALTER EQU     *
001896 21F8600260F4          MOVE.L   PC,SAV_PC
00189C 21FC000060CC
       6002                  MOVE.L   #LM_INST,PC
0018A4 60AE                  BRA.S    GPRACC
                      *
       000018A6      GPRDISP  EQU     *
0018A6 21F8600260F4          MOVE.L   PC,SAV_PC
0018AC 21FC000060C4
       6002                  MOVE.L   #STM_INST,PC
0018B4 609E                  BRA.S    GPRACC
```

```
*************************************************************
*                                                           *
*     INTERRUPT HANDLER                                     *
*                                                           *
*     INTERUPT - ENTERED WHEN THE A-ENGINE DETECTS AN INTERRUPT. *
*                THE PC IS ADJUSTED.                        *
*     STOP_LP  - ENTERED FROM 'DIAG' OR 'RESET' TO WAIT FOR A PC *
*                INTERRUPT. ALSO FOR DEBUG CARD INTERRUPT.  *
*     WAIT_LP  - ENTERED FROM 'STOP' OR 'WAIT' TO WAIT FOR A PC *
*                INTERRUPT. ALSO FOR DEBUG CARD INTERRUPT.  *
*                                                           *
*     FOR WASHINGTON, THESE ARE THE INTERRUPTS...           *
*         IPL 2 - ALTER/DISPLAY AND ADDRESS COMPARE  RESET = 5F8D *
*               - (DEBUG CARD ONLY)                         *
*         IPL 1 - PC INTERRUPT                       RESET = 5F90 *
*         IPL 0 - 8087I (CORNROW) INTERRUPT                 *
*               - EXT INT KEY (DEBUG CARD ONLY)      RESET = 5F8C *
*                                                           *
*************************************************************
```

```
       000018B6      INTERUPT EQU     *
0018B6 0250FFF1              ANDI.W   #$FFF1,(A0)          GET BACK TO LEVEL 0 TO ALLOW INTRPTS
0018BA 55B86002              SUBQ.L   #2,PC
0018BE 323CF8FF              MOVE.W   #$F8FF,D1            TEST INTERRUPT REGISTER FOR PC,
0018C2 82785F90              OR.W     CC_INT_REG,D1           CORNROW OR DEBUG REQUEST
0018C6 4641                  NOT.W    D1
0018C8 6628                  BNE.S    INTERPTA             IF NONE ARE ON, MACHINE CHECK
0018CA 343C3010      INT_ERR MOVE.W   #$3010,D2            SPURIOUS A-ENGINE DETECTED INTERRUPT
0018CE 4EF81A54              JMP      MACH_CHK
                      *
       000018D2      STOP_LP  EQU     *
0018D2 08F800076038          BSET     PST_STOP,PUSTAT
0018D8 4A386048              TST.B    CONFIG               CHECK CONFIG BYTE FOR PC MANOPS
0018DC 6A08                  BPL.S    WAIT_LP              IF REQUEST NOT FROM THERE, WAIT
0018DE 42786022              CLR.W    MANOP_CB+2           SET GOOD RETURN CODE
0018E2 4EF81DE4              JMP      INTR_PC              GO INTERRUPT THE PC
                      *
0018E6 323CF9FF      WAIT_LP MOVE.W   #$F9FF,D1            TEST INTERRUPT REGISTER FOR
0018EA 82785F90              OR.W     CC_INT_REG,D1           PC OR DEBUG REQUEST
0018EE 4641                  NOT.W    D1
0018F0 67F4                  BEQ.S    WAIT_LP              LOOP UNTIL REQUEST DETECTED
                      *
                      *     TEST FOR IPL0 INTERRUPT - CORNROW OR DEBUG CARD
                      *
0018F2 08010008      INTERPTA BTST    EX_INTR,D1           TEST FOR IPL0 INTERRUPT
0018F6 6750                  BEQ.S    INT3                 BR IF NOT IPL0
0018F8 31FC74005FA2  FP_TEST MOVE.W   #FP_PAC,FP_CMD       ISSUE 'POLL AND CLEAR' TO CORNROW
0018FE 34385FA0              MOVE.W   FP_DATA,D2              TO GET EXCEPTION DATA
001902 4A02                  TST.B    D2                   TEST FOR ANY EXCEPTION
001904 660C                  BNE.S    FP_EXCP              BR IF CORNROW INTERRUPT
                      *
```

```
001906 4EF82F00            JMP     IPLOTST         TEST FOR EXT INT FROM DEBUG CARD
                    *                              RETURN TO 'IPL0_ERR' IF THE DEBUG
                    *                              CARD IS NOT INSTALLED.
                    *-----------------------------------------------------------------
                    *
00190A 343C3011   IPL0_ERR MOVE.W  #$3011,D2       SET SPURIOUS IPL0 ERROR
00190E 4EF81A54            JMP     MACH_CHK
                    *
                    * * * * * * * * * * * * * * * * * * * * * * * * * * * * * *
                    *                                                         *
                    *       FLOATING-POINT CHIP EXCEPTION ROUTINE             *
                    *                                                         *
                    * * * * * * * * * * * * * * * * * * * * * * * * * * * * * *
001912 31FC76005FA2 FP_EXCP MOVE.W #FP_SMSK,FP_CMD  SET MASK IN FP PROCESSOR
001918 31F860465FA0         MOVE.W FP_MASK,FP_DATA
00191E E20A                 LSR.B  1,D2
001920 6404                 BCC.S  FP_1            BRANCH IF NOT SIGNIFICANCE
001922 740E                 MOVEQ  #$0E,D2
001924 6016                 BRA.S  FP_PROG
001926 E20A        FP_1     LSR.B  1,D2
001928 6404                 BCC.S  FP_2            BRANCH IF NOT EXPONENT UNDERFLOW
00192A 740D                 MOVEQ  #$0D,D2
00192C 600E                 BRA.S  FP_PROG
00192E E20A        FP_2     LSR.B  1,D2
001930 6404                 BCC.S  FP_3            BRANCH IF NOT FLOATING POINT DIVIDE
001932 740F                 MOVEQ  #$0F,D2
001934 6006                 BRA.S  FP_PROG
001936 E20A        FP_3     LSR.B  1,D2
001938 6406                 BCC.S  FP_4            BR IF NOT EXPONENT OVERFLOW
00193A 740C                 MOVEQ  #$0C,D2         EXPONENT OVERFLOW
00193C 4EF823E2    FP_PROG  JMP    PROGCHK
                    *
                    *       SPURIOUS CORNROW EXCEPTION INTERRUPT
                    *
001940 343C3040    FP_4     MOVE.W #$3040,D2       SET SPURIOUS CORNROW INTERRUPT
001944 4EF81A54             JMP    MACH_CHK
                    *
                    *       TEST FOR IPL1 INTERRUPT - PC INTERRUPT
                    *
001948 08010009    INT3     BTST   PC_INTR,D1      IS IT A PC INTERRUPT? (IPL1)
00194C 660C                 BNE.S  INTFRPC         BR IF YES
                    *
                    *       TEST FOR IPL2 INTERRUPT - DEBUG CARD ONLY
                    *
                    *-----------------------------------------------------------------
00194E 4EF82F08    INT4     JMP    IPL2TST         TEST FOR A/D OR ACS FROM DEBUG CARD
                    *                              RETURN TO 'IPL2_ERR' IF THE DEBUG
                    *                              CARD IS NOT INSTALLED.
                    *-----------------------------------------------------------------
                    *
001952 343C3012    IPL2_ERR MOVE.W #$3012,D2       SET SPURIOUS IPL2 ERROR
001956 4EF81A54             JMP    MACH_CHK
                    *
                    * * * * * * * * * * * * * * * * * * * * * * * * * * * * * *
                    *                                                         *
                    *               PC INTERRUPT ROUTINE                      *
                    *                                                         *
                    * * * * * * * * * * * * * * * * * * * * * * * * * * * * * *
                    *
00195A 22786050    INTFRPC  MOVEA.L PCIB_IN,A1
00195E B3FC00058000          CMPA.L #MAIN_STR,A1   IS THE PCIB IN PRIVATE STORE?
001964 6B58                  BMI.S  INT3A          BR IF NO, DIAG PC INTERRUPT
                    *
                    *       PC INTERRUPT FOR TIMERS/MANOPS
                    *
001966 11FC00806050         MOVE.B #GO_AHEAD,PCIB_IN SET CONDITION CODE BIT FOR PC
00196C 93FC00058000         SUBA.L #MAIN_STR,A1    SO IT CAN TRANSFER THE PCIB
001972 4A386050    INTWAIT  TST.B  PCIB_IN         WAIT FOR PC TO SEE CONDITION CODE
001976 66FA                 BNE.S  INTWAIT         AND RESET IT TO ZERO
001978 0C110005             CMPI.B #$05,(A1)      IS THIS A TIMER PCIB?
00197C 670A                 BEQ.S  TIMERINT
00197E 0C110004             CMPI.B #$04,(A1)      IS THIS A MANOP PCIB?
001982 665E                 BNE.S  RESINT
001984 4EF81B94             JMP    MANOPINT        GO TO MANOP INTERRUPT ROUTINE
                    *
```

```
                00001988    TIMERINT EQU    *
001988 0C2900FF0001          CMPI.B  #$FF,1(A1)      IS THIS AN ASYNCHRONOUS INTR
00198E 6622                  BNE.S   TMRRQERR        BR IF NO, ERRONEOUS TIMER REQUEST
001990 11E900086102          MOVE.B  8(A1),TMR_INT_PND  SET PENDING INTERRUPTS
001996 11FC00FD5F90          MOVE.B  #PC_RESET,INTR_REG
00199C 4A386038              TST.B   PUSTAT          ARE WE IN STOPPED STATE?
0019A0 6B00FF44              BMI     WAIT_LP         YES, WAIT FOR A START INTERRUPT
0019A4 083800006030          BTST    #PSW_EXT,PSW    CHECK IF INTERRUPTS ARE MASKED ON
0019AA 673C                  BEQ.S   INT_RTN         GO TO TEST FOR WAIT
0019AC 4EB817E0              JSR     EX_INT          SEE IF ANY CAN BE PRESENTED
0019B0 6036                  BRA.S   INT_RTN         GO TO TEST FOR WAIT

000019B2    TMRRQERR EQU    *
*-------------------------------------------------------------------
0019B2 4EB82F30              JSR     TMR_SIO         TEST FOR ASYNCHRONOUS IO INTERRUPT
                     *                               RETURN HERE IF THE SIO EMULATION CODE
                     *                               IS NOT PRESENT OR THE TIMER CODE IS
                     *                               NOT '20' OR '21'.
*-------------------------------------------------------------------
                     *
0019B6 343C3050              MOVE.W  #$3050,D2       SET ERRONEOUS TIMER REQUEST ERROR
0019BA 4EF81A54              JMP     MACH_CHK
                     *
                     *       PC INTERRUPT FOR DIAGNOSE INITIATED IO OPERATIONS
                     *
0019BE 4A386038    INT3A     TST.B   PUSTAT          ARE WE IN STOPPED STATE?
0019C2 6B06                  BMI.S   INT3B           YES, STACK INTERRUPT
0019C4 4A3860E2              TST.B   IOMASK          CHECK IF ANY I/O INTERRUPTS ENABLED
0019C8 662C                  BNE.S   PCIO_INT        BR IF YES, CAUSE IO INTERRUPT
                     *
                     *       STACK IO INTERRUPT
                     *
0019CA 11FC00906051 INT3B    MOVE.B  #MASK_NIO,PCIB_IN+1   DISABLE I/O INTERRUPTS IN MASK
0019D0 11FC00406050          MOVE.B  #STACK,PCIB_IN  SET CONDITION CODE BIT FOR PC
0019D6 003800806104          ORI.B   #$80,IO_INT_PND SET 'I/O INTERRUPT PENDING'
0019DC 4A386050    INTWAIT2  TST.B   PCIB_IN         WAIT FOR PC TO SEE CONDITION CODE
0019E0 66FA                  BNE.S   INTWAIT2         AND RESET IT TO ZERO
0019E2 11FC00FD5F90 RESINT   MOVE.B  #PC_RESET,INTR_REG  RESET PC INTERRUPT
0019E8 083800056038 INT_RTN  BTST    PST_WAIT,PUSTAT IS WAIT ON ?
0019EE 6600FEF6              BNE     WAIT_LP         BR IF YES, RETURN TO WAIT LOOP
0019F2 4EF81EE2              JMP     IENDNTR         GO TO END TO RETURN TO A-ENGINE
                     *
0019F6 11FC00806050 PCIO_INT MOVE.B  #GO_AHEAD,PCIB_IN  SET CONDITION CODE BIT FOR PC
0019FC 4A386050    INTWAIT1  TST.B   PCIB_IN         WAIT FOR PC TO SEE CONDITION CODE
001A00 66FA                  BNE.S   INTWAIT1         AND RESET IT TO ZERO
001A02 247C80000040          MOVEA.L #ACSW,A2
001A08 7204                  MOVEQ   #$04,D1         SET BY-PASS PAT BIT FOR NO TRANSLATE
001A0A 82386106              OR.B    SAVE_CNTL,D1       TO ACCESS LOW STORE
001A0E 11C15FE1              MOVE.B  D1,SYS_CNTL
001A12 2489                  MOVE.L  A1,(A2)         STORE PCIB ADDRESS INTO CSW
001A14 11FC00FD5F90          MOVE.B  #PC_RESET,INTR_REG
                     *
001A1A 4EB82476    IO_INTR   JSR     FETCHPSW        GET PSW FROM PC AND PSR
                     *                               RESET TRANSLATE BIT EARLIER
001A1E 42386104              CLR.B   IO_INT_PND
                     *
001A22 247C80000038          MOVEA.L #AIOOLD,A2      GET MAIN STORAGE ADDRESS FOR OLD PSW
001A28 287C80000078          MOVEA.L #AIONEW,A4      GET MAIN STORAGE ADDRESS FOR NEW PSW
001A2E 24F86030              MOVE.L  PSW,(A2)+       STORE CURRENT PSW AS OLD
001A32 24B86034              MOVE.L  PSW+4,(A2)
001A36 083800036031          BTST    PSW_EC,PSW+1
001A3C 6708                  BEQ.S   IOBCCODE
001A3E 39420042              MOVE.W  D2,IOINT-IONEW(A4)
                     *
001A42 4EF81EF6    IO1       JMP     IENDINT         GO TO LOAD PSW AND END
                     *
001A46 3502        IOBCCODE  MOVE.W  D2,-(A2)        STORE INTERRUPTION CODE
001A48 60F8                  BRA.S   IO1
```

```
************************************************
*                                              *
*     MACHINE CHECK INTERRUPTS                  *
*                                              *
*       D2 HAS MACHINE CHECK CODE               *
*                                              *
*   1. FLOATING-POINT, GENERAL, AND CONTROL REGISTERS ARE STORED *
*      IN THEIR RESPECTIVE LOCATIONS            *
*   2. THE CPU TIMER AND CLOCK COMPARATOR ARE NOT STORED, AND ARE *
*      MARKED AS INVALID IN THE MACHINE-CHECK INTERRUPTION CODE. *
*   3. THE FAILING STORAGE ADDRESS IS STORED    *
*   4. THE MACHINE-CHECK INTERRUPTION CODE IS STORED *
*   5. CURRENT PSW IS STORED IN MACHINE CHECK OLD PSW LOCATION *
*   6. THE MACHINE-CHECK NEW PSW IS LOADED, AND PROCESSING CONTINUES*
*                                              *
*   IF MACHINE CHECKS ARE NOT ENABLED IN THE CURRENT PSW, *
*   GO TO HARDSTOP.  D2 IS PUT INTO REFCODE.    *
*                                              *
*   THE INSTRUCTION MUST BE NULLIFIED FOR RECOVERY TO BE *
*   POSSIBLE.                                   *
*                                              *
************************************************
*
001A4A 343CA600      A_ENG_MC  MOVE.W   #$A600,D2        A-ENGINE DETECTED MACHINE CHECK
001A4E 6004                    BRA.S    MACH_CHK
              *
              *
001A50 343C0016      BUSERR    MOVE     #PAR_CHK,D2      MICROCODE DETECTED PAT PARITY
              *  THIS ERROR IS DETECTED WHEN THE MICROCODE READS THE PAT, AND THE
              *  HIGH ORDER BIT IS SET IN THE DATA.
              *
              *
       00001A54      MACH_CHK  EQU      *
001A54 4EB82476                JSR      FETCHPSW         GET PSW FROM PC AND PSR
001A58 31C2605C                MOVE.W   D2,REFCODE       SAVE MACHINE CHECK CODE
001A5C 083800026031            BTST     PSW_MCK,PSW+1    SEE IF MACHINE CHECKS ARE MASKED ON
001A62 6604                    BNE.S    MACH_A           OK IF BIT IS ON
001A64 4EF81B72                JMP      HARDSTOP         OTHERWISE GO TO HARDSTOP

001A68 7204         MACH_A    MOVEQ    #$04,D1          SET BY-PASS PAT BIT FOR NO TRANSLATE
001A6A 82386106               OR.B     SAVE_CNTL,D1        TO ACCESS LOW STORE
001A6E 11C15FE1               MOVE.B   D1,SYS_CNTL
              *
001A72 4EB84800               JSR      FPRDISP          GET FLOATING-POINT REGS FROM CORNROW
001A76 247C80000160           MOVEA.L  #AMC_FPR,A2
001A7C 47F80180               LEA      FPRSAVE,A3
001A80 7607                   MOVEQ    #7,D3            COUNT OF 8
001A82 24DB         MACH_B    MOVE.L   (A3)+,(A2)+      MOVE REGISTERS TO SAVE AREA
001A84 51CBFFFC               DBRA     D3,MACH_B
              *
001A88 4EB818A6               JSR      GPRDISP          GET GENERAL PURPOSE REGISTERS
001A8C 47F80140               LEA      GPRSAVE,A3
001A90 760F                   MOVEQ    #$F,D3           COUNT OF 16
001A92 24DB         MACH_C    MOVE.L   (A3)+,(A2)+      MOVE REGISTERS TO SAVE AREA
001A94 51CBFFFC               DBRA     D3,MACH_C
              *
001A98 47F80100               LEA      CTRL_REG,A3      MOVE CONTROL REGISTERS
001A9C 760F                   MOVEQ    #$F,D3           COUNT OF 16
001A9E 24DB         MACH_D    MOVE.L   (A3)+,(A2)+      MOVE REGISTERS TO SAVE AREA
001AA0 51CBFFFC               DBRA     D3,MACH_D
              *
001AA4 247C800000F8           MOVEA.L  #AMC_FADR,A2
001AAA 24B86202               MOVE.L   BECB_ADR,(A2)    STORE FAILING ADDRESS
001AAE 4212                   CLR.B    (A2)             CLEAR HIGH-ORDER BYTE
              *
001AB0 95FC00000010           SUBA.L   #$10,A2          POINT TO INTR CODE ADDRESS
001AB6 0C420016               CMPI.W   #PAR_CHK,D2      SEE IF IT'S PAT PARITY
001ABA 6628                   BNE.S    MACH_E
              *
001ABC 24F81B04               MOVE.L   PAT_MCIC,(A2)+   MOVE PAT ERROR INTERRUPT CODE
001AC0 24B81B08               MOVE.L   PAT_MCIC+4,(A2)
001AC4 26386034               MOVE.L   PSW+4,D3
001AC8 5583                   SUBQ.L   #2,D3            NULLIFY THE INSTRUCTION BY FINDING
001ACA 3210                   MOVE.W   (A0),D1             THE BEGINNING USING THE ILC,
001ACC 6A0A                   BPL.S    MACH_D1             AND POINT THE PC BACK TO IT.
001ACE 5583                   SUBQ.L   #2,D3
```

```
001AD0 0801000E              BTST     PSR_ILC1,D1
001AD4 6702                  BEQ.S    MACH_D1
001AD6 5583                  SUBQ.L   #2,D3
001AD8 31C36036   MACH_D1    MOVE.W   D3,PSW+6         STORE PSW BACK, WITHOUT
001ADC 4843                  SWAP     D3                 DISTURBING BYTE 4
001ADE 11C36035              MOVE.B   D3,PSW+5
001AE2 6008                  BRA.S    MACH_F
              *
001AE4 24F81B0C   MACH_E     MOVE.L   MCIC,(A2)+       MOVE ERROR INTERRUPT CODE
001AE8 24881B10              MOVE.L   MCIC+4,(A2)
              *
001AEC 247C80000030 MACH_F   MOVEA.L  #AMCHKOLD,A2     GET MAIN STORAGE ADDRESS FOR OLD PSW
001AF2 287C80000070          MOVEA.L  #AMCHKNEW,A4     GET MAIN STORAGE ADDRESS FOR NEW PSW
001AF8 24F86030              MOVE.L   PSW,(A2)+        STORE CURRENT PSW AS OLD
001AFC 24886034              MOVE.L   PSW+4,(A2)
              *
001B00 4EF81EF6              JMP      IENDINT          GO TO LOAD PSW AND END
              *
              *
001B04 40022F9C   PAT_MCIC   DC.L     $40022F9C
001B08 00000000              DC.L     $00000000
001B0C 80000000   MCIC       DC.L     $80000000        SYSTEM DAMAGE
001B10 00000000              DC.L     $00000000
001B14 31FC3030605C INVOP    MOVE.W   #$3030,REFCODE   STORE RETURN CODE
001B1A 6056                  BRA.S    HARDSTOP
              *
001B1C 31FC5010605C BR_TO_ZERO MOVE.W #$5010,REFCODE   UNEXPECTED BRANCH TO ZERO
001B22 604E                  BRA.S    HARDSTOP
              *
001B24 31FC000C605C ADRERROR MOVE.W   #$000C,REFCODE   STORE RETURN CODE
001B2A 6046                  BRA.S    HARDSTOP
              *
001B2C 31FC0010605C ILLINSTR MOVE.W   #$0010,REFCODE
001B32 603E                  BRA.S    HARDSTOP
              *
001B34 31FC0014605C ZERODIV  MOVE.W   #$0014,REFCODE
001B3A 6036                  BRA.S    HARDSTOP
              *
001B3C 31FC0018605C CHKINST  MOVE.W   #$0018,REFCODE
001B42 602E                  BRA.S    HARDSTOP
              *
001B44 31FC001C605C TRAPV    MOVE.W   #$001C,REFCODE
001B4A 6026                  BRA.S    HARDSTOP
              *
001B4C 31FC0020605C PRIVVIOL MOVE.W   #$0020,REFCODE
001B52 601E                  BRA.S    HARDSTOP
              *
001B54 31FC0024605C ETRACE   MOVE.W   #$0024,REFCODE
001B5A 6016                  BRA.S    HARDSTOP
              *
001B5C 31FC0028605C LINE1010 MOVE.W   #$0028,REFCODE
001B62 600E                  BRA.S    HARDSTOP
              *
001B64 31FC002C605C LINE1111 MOVE.W   #$002C,REFCODE
001B6A 6006                  BRA.S    HARDSTOP
              *
001B6C 31FC0030605C INTR_ERR MOVE.W   #$0030,REFCODE   UNEXPECTED E-ENGINE INTERRUPT
              *
001B72 48F8FFFF6800 HARDSTOP MOVEM.L  D0-A7,M68_SAVE   SAVE 68000 REGISTERS
001B78 08F800026038          BSET     PST_ERR,PUSTAT   SET 'HARDSTOP'
001B7E 32385F90   HARD_LP    MOVE.W   CC_INT_REG,D1
001B82 6BFA                  BMI.S    HARD_LP          WAIT UNTIL INTERRUPT MAY BE SET
              *
001B84 21F860B86054          MOVE.L   MAN_CBADR,PCIB_OUT POINT TO MANOP PCIB
001B88 11FC007F5F90          MOVE.B   #INT_8088,INTR_REG SET INTERRUPT TO PC
              *
001B90 4EF81DA2              JMP      STOP_PUA         GO TO ASYNCHRONOUS PU STOP

* * * * * * * * * * * * * * * * * * * * * * * * * * * * * * * * * *
        *                                                                 *
        *           MANOPS SUBROUTINES                                    *
        *                                                                 *
        * * * * * * * * * * * * * * * * * * * * * * * * * * * * * * * * * *
              *
       00001B94  MANOPINT EQU     *
001B94 3229001A              MOVE.W   26(A1),D1        GET COMMAND OUT OF PCIB
001B98 21E900086028          MOVE.L   ADDR1(A1),ADDRESS1 COPY ADDRESS1 FIELD TO MANOP_CB
```

```
001B9E 4A386038              TST.B    PUSTAT               ARE WE ALREADY STOPPED?
001BA2 6A0C                  BPL.S    MANOPFET             BR IF NO, DONT UPDATE PSW
001BA4 21E900106030          MOVE.L   PSW1(A1),PSW         COPY PSW FROM MANOP_CB
001BAA 21E900146034          MOVE.L   PSW2(A1),PSW+4
001BB0 45F81BBA     MANOPFET LEA      MANOPTAB,A2
001BB4 34721000              MOVEA.W  0(A2,D1),A2          GO TO APPROPRIATE ROUTINE
001BB8 4ED2                  JMP      (A2)
                          *
       00001BBA      MANOPTAB EQU     *
001BBA 1BFA                  DC       NO_CMD               X'00' - NO COMMAND
001BBC 256E                  DC       RESET1               X'02' - PROGRAM RESET
001BBE 256E                  DC       RESET1               X'04' - CLEAR RESET
001BC0 1E0E                  DC       ISTEP                X'06' - INSTRUCTION STEP ON
001BC2 1BDE                  DC       SET_EXT              X'08' - SET EXT INTERRUPT (INTR KEY)
001BC4 1C60                  DC       ADDRCOMP             X'0A' - ADDRESS COMPARE SETUP
001BC6 1C94                  DC       ADRCMPOFF            X'0C' - ADDRESS COMPARE OFF
001BC8 1CF8                  DC       DISP_PAT             X'0E' - DISPLAY PAT BYTE
001BCA 1D44                  DC       ALT_PAT              X'10' - ALTER PAT BYTE
001BCC 1E06                  DC       START_PU             X'12' - START PU
001BCE 1DA8                  DC       STOP_PU              X'14' - STOP PU
001BD0 1C9E                  DC       TRAN_VA              X'16' - TRANSLATE VIRTUAL ADDRESS
001BD2 256E                  DC       IPL                  X'18' - IPL  (SIO)
001BD4 2F28                  DC       SET_ATTN             X'1A' - SET ATTN INTERRUPT (01F)
001BD6 1BFA                  DC       NO_CMD               X'1C' -
001BD8 1BFA                  DC       NO_CMD               X'1E' -
001BDA 1C0A                  DC       NOOP                 X'20' - DIAGNOSTIC NOOP
001BDC 1618                  DC       FP_DIAG              X'22' - PU HARDWARE DIAGNOSTIC
                          *
                          *
                          *    INTERRUPT KEY MAY BE SET FROM PC MANOPS
                          *
001BDE 08F800066103 SET_EXT  BSET     INTKEY,EXT_INT_PND+1 SET INTERRUPT PENDING
001BE4 42786022     ATTN_RTN CLR.W    MANOP_CB+2           SET GOOD RETURN CODE
001BE8 4A386038              TST.B    PUSTAT               ARE WE ALREADY IN STOPPED STATE?
001BEC 6B0001D2              BMI      STOPP                YES, RETURN TO MANOPS
001BF0 11FC00FD5F90          MOVE.B   #PC_RESET,INTR_REG   RESET INTERRUPT FROM PC
001BF6 4EF81DE4              JMP      INTR_PC              GO SET PC INTERRUPT, THEN CONTINUE
                          *                                   NORMAL OPERATION
                          *
001BFA 31FC00016022 NO_CMD   MOVE.W   #$0001,MANOP_CB+2    STORE 'INVALID REQUEST' RETURN CODE
001C00 11FC00FD5F90          MOVE.B   #PC_RESET,INTR_REG
001C06 4EF81DE4              JMP      INTR_PC              GO BACK TO PC
                          *
                          *
001C0A 11FC00FD5F90 NOOP     MOVE.B   #PC_RESET,INTR_REG   RESET INTERRUPT FROM PC
001C10 343C03E8              MOVE.W   #1000,D2
001C14 32385F90     NOOP1    MOVE.W   CC_INT_REG,D1        WAIT TIL INTERFACE IS FREE
001C18 6A0E                  BPL.S    NOOP2                BRANCH IF OK TO SET INTERRUPT
001C1A 51CAFFF8              DBRA     D2,NOOP1             TIME OUT IN CASE WE CAN'T GET THROUGH
001C1E 31FCDEAF605C          MOVE.W   #$DEAF,REFCODE
001C24 4EF81B72              JMP      HARDSTOP
                          *
001C28 21F860B86054 NOOP2    MOVE.L   MAN_CBADR,PCIB_OUT   POINT TO MANOP PCIB
001C2E 11FC007F5F90          MOVE.B   #INT_8088,INTR_REG   SET INTERRUPT TO PC
001C34 4A386054     NOOPWAIT TST.B    PCIB_OUT             CHECK IF PC HAS SET CC
001C38 67FA                  BEQ.S    NOOPWAIT
001C3A 42386054              CLR.B    PCIB_OUT             CLEAR BYTE AGAIN
                          *
001C3E 4EF818D2              JMP      STOP_LP              GO TO INTERRUPT HANDLER
                          *
       00001C42      UN_ADSTOP EQU    *
001C42 24386008              MOVE.L   ADS_ADDR,D2          GET COMPARE ADDRESS
001C46 6716                  BEQ.S    UN1                  IF ZERO, NO COMPARE ACTIVE
                          *
001C48 7204         UN_ADSTX MOVEQ    #$04,D1              SET BY-PASS PAT BIT FOR NO TRANSLATE
001C4A 82386106              OR.B     SAVE_CNTL,D1             TO ACCESS LOW STORE
001C4E 11C15FE1              MOVE.B   D1,SYS_CNTL
001C52 2442                  MOVE.L   D2,A2
001C54 34B860D6              MOVE.W   ADS_INSTR,(A2)       PUT INSTRUCTION HALFWORD BACK
001C58 11F861065FE1          MOVE.B   SAVE_CNTL,SYS_CNTL   RESTORE TRANSLATE BIT FOR EXECUTION
                          *                                   OF THIS INSTRUCTION
001C5E 4E75         UN1      RTS
                             PAGE
001C60 24690008     ADDRCOMP MOVE.L   ADDR1(A1),A2
001C64 B5FC00058000          CMPA.L   #MAIN_STR,A2         MAKE SURE IT'S IN MAIN-STORE RANGE
001C6A 6A000084              BPL      SET_RC02             IF NOT, SET RETURN CODE OF X'02'
```

```
001C6E 7204              MOVEQ    #$04,D1              SET BY-PASS PAT BIT FOR NO TRANSLATE
001C70 82386106          OR.B     SAVE_CNTL,D1            TO ACCESS LOW STORE
001C74 11C15FE1          MOVE.B   D1,SYS_CNTL
001C78 D5FC80000000      ADDA.L   #MS_ACC,A2
001C7E 21CA60D8          MOVE.L   A2,ADS_ADDR          SAVE ADDRESS
001C82 31D260D6          MOVE.W   (A2),ADS_INSTR       GET INSTRUCTION
001C86 11F861065FE1      MOVE.B   SAVE_CNTL,SYS_CNTL   RESTORE TRANSLATE BIT
001C8C 42786022          CLR.W    MANOP_CB+2           SET GOOD RETURN CODE
001C90 4EF81DC0          JMP      STOPP                GO BACK TO PC
                *
                *
                *
001C94 42B860D8  ADRCMPOFF CLR.L  ADS_ADDR
001C98 427860D6          CLR.W    ADS_INSTR
001C9C 6044              BRA.S    SET_RC00             GO BACK TO PC
                *
                *
                *
       00001C9E  TRAN_VA EQU      *
001C9E 22386028          MOVE.L   ADDRESS1,D1          GET ADDRESS FROM PCIB
001CA2 3401              MOVE.W   D1,D2
001CA4 0C8100400000      CMPI.L   #VIRT_STR,D1         MAKE SURE IT'S IN 4-MEG RANGE
001CAA 6A44              BPL.S    SET_RC02             IF NOT, SET RETURN CODE OF X'02'
                *
001CAC 7608              MOVEQ    #$08,D3              SET PAT_MOD BIT = 1 TO ALLOW
001CAE 86386106          OR.B     SAVE_CNTL,D3            PAT ACCESS
001CB2 11C35FE1          MOVE.B   D3,SYS_CNTL
                *
001CB6 028100FFF000      ANDI.L   #$00FFF000,D1        ENSURE EXTRA BITS ARE OFF
001CBC 068100800000      ADDI.L   #PAT,D1              TURN ON BIT 23
001CC2 2241              MOVEA.L  D1,A1
001CC4 4281              CLR.L    D1
001CC6 3211              MOVE.W   (A1),D1              GET PAT ENTRY
001CC8 0801000A          BTST     PF_BIT,D1            IF THE PAGE IS INVALID,
001CCC 6622              BNE.S    SET_RC02                SET RETURN CODE X'02'
001CCE 0241007F          ANDI.W   #$007F,D1
001CD2 E149              LSL.W    8,D1                 ALIGN ADDRESS PROPERLY
001CD4 E989              LSL.L    4,D1                 ALIGN ADDRESS PROPERLY
001CD6 028200000FFF      ANDI.L   #$00000FFF,D2        ISOLATE DISPLACEMENT
001CDC D282              ADD.L    D2,D1
001CDE 21C1602C          MOVE.L   D1,ADDRESS2          PUT ADDRESS BACK INTO PCIB
001CE2 42786022  SET_RC00 CLR.W   MANOP_CB+2           SET GOOD RETURN CODE
001CE6 11FC00FD5F90 SRC  MOVE.B   #PC_RESET,INTR_REG   RESET PC INTERRUPT
001CEC 4EF81DE4          JMP      INTR_PC              GO BACK TO PC
                *
                *
001CF0 31FC00026022 SET_RC02 MOVE.W #$0002,MANOP_CB+2  SET 'INVALID ADDRESS' RETURN CODE
001CF6 60EE              BRA.S    SRC                  GO BACK TO PC
                *
       00001CF8  DISP_PAT EQU     *
001CF8 22386028          MOVE.L   ADDRESS1,D1          GET ADDRESS FROM PCIB
001CFC 0C8100400000      CMPI.L   #VIRT_STR,D1         MAKE SURE IT'S IN 4-K RANGE
001D02 6AEC              BPL.S    SET_RC02             IF NOT, SET RETURN CODE OF X'02'
                *
001D04 028100FFF000      ANDI.L   #$00FFF000,D1        ENSURE EXTRA BITS ARE OFF
001D0A 068100800000      ADDI.L   #PAT,D1
001D10 2241              MOVEA.L  D1,A1
001D12 45F86108          LEA      PAT_BUFF,A2          ADDRESS TO STORE PAT ENTRIES
001D16 21CA602C          MOVE.L   A2,ADDRESS2          PUT ADDRESS INTO PCIB
001D1A 243C00001000      MOVE.L   #$00001000,D2        ADDRESS INCREMENT FOR NEXT ENTRY
001D20 760B              MOVEQ    #$0B,D3              ONLY GET 12 ENTRIES AT A TIME
001D22 3A3C8F7F          MOVE.W   #$8F7F,D5
001D26 7808              MOVEQ    #$08,D4              SET PAT_MOD BIT = 1 TO ALLOW
001D28 88386106          OR.B     SAVE_CNTL,D4            PAT ACCESS
001D2C 11C45FE1          MOVE.B   D4,SYS_CNTL
                *
001D30 3211      DIS_LOOP MOVE.W  (A1),D1              GET PAT ENTRY
001D32 C245              AND.W    D5,D1                TURN OFF UNPREDICTABLE BITS
001D34 34C1              MOVE.W   D1,(A2)+             PUT PAT ENTRY INTO BUFFER
001D36 D3C2              ADDA.L   D2,A1                POINT TO NEXT ONE
001D38 51CBFFF6          DBRA     D3,DIS_LOOP
                *
001D3C 11F861065FE1      MOVE.B   SAVE_CNTL,SYS_CNTL
001D42 609E              BRA.S    SET_RC00
                *
                *
```

```
            00001D44   ALT_PAT  EQU      *
001D44 22386028                 MOVE.L   ADDRESS1,D1       GET ADDRESS FROM PCIB
001D48 0C8100400000             CMPI.L   #VIRT_STR,D1      MAKE SURE IT'S IN 4-K RANGE
001D4E 6AA0                     BPL.S    SET_RC02          IF NOT, SET RETURN CODE OF X'02'
            *
001D50 028100FFF000             ANDI.L   #$00FFF000,D1     ENSURE EXTRA BITS ARE OFF
001D56 068100800000             ADDI.L   #PAT,D1
001D5C 2241                     MOVEA.L  D1,A1
001D5E 45F86108                 LEA      PAT_BUFF,A2       GET BUFFER ADDRESS
001D62 243C00001000             MOVE.L   #$00001000,D2     ADDRESS INCREMENT FOR NEXT ENTRY
001D68 760B                     MOVEQ    #$0B,D3           ONLY 12 ENTRIES AT A TIME
001D6A 7808                     MOVEQ    #$08,D4           SET PAT_MOD BIT = 1 TO ALLOW
001D6C 88386106                 OR.B     SAVE_CNTL,D4           PAT ACCESS
001D70 11C45FE1                 MOVE.B   D4,SYS_CNTL
            *
001D74 329A      ALT_LOOP MOVE.W  (A2)+,(A1)              GET PAT ENTRY
001D76 D3C2                     ADDA.L   D2,A1             POINT TO NEXT ONE
001D78 51CBFFFA                 DBRA     D3,ALT_LOOP
            *
001D7C 11F861065FE1             MOVE.B   SAVE_CNTL,SYS_CNTL
001D82 42786022                 CLR.W    MANOP_CB+2        SET GOOD RETURN CODE
001D86 6020                     BRA.S    STOP_PU
            *
            ********************************************
            *                                          *
            *    STOP PU - WILL COME HERE ON 'STOP PU' INTERRUPT ...  *
            *         NEED TO GET GPRS FROM A-ENGINE, UPDATE PSW,     *
            *         THEN SET BIT IN 'PUSTAT' AND WAIT FOR START PU  *
            *         REQUEST.                                        *
            *    START PU - THIS ROUTINE WILL LOAD THE GPRS TO THE A--ENGINE, *
            *         LOAD THE NEW PSW, AND CONTINUE RUNNING.         *
            *                                          *
            ********************************************
            *
            *
            00001D88   ADSTOP   EQU      *                COME HERE ON 'B20E' INSTRUCTIONS
001D88 243860D8                 MOVE.L   ADS_ADDR,D2      GET COMPARE ADDRESS
001D8C 67000596                 BEQ      OPEXCP1          IF ZERO, NO ADSTOP ACTIVE, OP EXCPT
001D90 59B86002                 SUBQ.L   #4,PC            DECREMENT PC TO POINT TO BEGINNING
            *                                                OF B2 INSTRUCTION;
001D94 4EB81C48                 JSR      UN_ADSTX         PUT ORIGINAL INSTRUCTION BACK
001D98 08F800046038             BSET     #PST_ADST,PUSTAT SET ADSTOP FLAG
001D9E 4EF81EA2                 JMP      IENDTRON         GO TO IEND TO EXECUTE TARGET INST
            *
            *
001DA2 11FC00016021 STOP_PUA MOVE.B  #$01,MANOP_CB+1     SET 'ASYNCHRONOUS INTERRUPT' FLAG
            *
            00001DA8   STOP_PU  EQU      *
001DA8 08B800046001             BCLR     #PSR_TRACE,PSR+1 TURN OFF TRACE BIT
001DAE 48F8FFFF6800             MOVEM.L  D0-A7,M68_SAVE   SAVE 68000 REGISTERS (E-ENGINE)
001DB4 4EB82476                 JSR      FETCHPSW         UPDATE CURRENT PSW
001DB8 4EB84800                 JSR      FPRDISP
001DBC 4EB818A6                 JSR      GPRDISP          GET GPRS FROM A-ENGINE
            *
001DC0 4EB81C42   STOPP    JSR      UN_ADSTOP            TAKE OUT ADSTOPS
001DC4 7204                     MOVEQ    #$04,D1          SET BY-PASS PAT BIT FOR NO TRANSLATE
001DC6 82386106                 OR.B     SAVE_CNTL,D1         TO ACCESS LOW STORE
001DCA 11C15FE1                 MOVE.B   D1,SYS_CNTL
001DCE 08F800076038             BSET     #PST_STOP,PUSTAT TURN ON 'PU-STOPPED' BIT
001DD4 4A386021                 TST.B    MANOP_CB+1       IS THIS AN ASYNCHRONOUS INTR TO PC?
001DD8 6606                     BNE.S    STOPP2           YES, DON'T RESET PC INTERRUPT
001DDA 11FC00FD5F90             MOVE.B   #PC_RESET,INTR_REG  RESET PC INTERRUPT
            *
            00001DE0   STOPP2   EQU      *
            *
            *----------------------------------------------------------
001DE0 4EB82F10                 JSR      AD_CALL          TEST FOR A/D REQUEST FROM DEBUG CARD
            *----------------------------------------------------------
            *         RETURN FROM DEBUG TEST - NO DEBUG CARD
            *
```

```
************************************
*                                  *
*   INTERRUPT PC ROUTINE - PRESENT INTERRUPT TO PC   *
*                                  *
************************************
*
001DE4 32385F90    INTR_PC   MOVE.W   CC_INT_REG,D1
001DE8 6BFA                  BMI.S    INTR_PC         WAIT UNTIL INTERRUPT MAY BE SET
                   *
001DEA 21F860B86054           MOVE.L   MAN_CBADR,PCIB_OUT  POINT TO MANOP PCIB
001DF0 11FC007F5F90           MOVE.B   #INT_8088,INTR_REG  SET INTERRUPT TO PC
                   *
                   *
001DF6 4A386038              TST.B    PUSTAT          ARE WE IN STOPPED STATE
001DFA 6A0000C4              BPL      IENDNPER        NO, CONTINUE RUNNING
                   *
001DFE 42386021              CLR.B    MANOP_CB+1      CLEAR ID
001E02 4EF818E6              JMP      WAIT_LP         GO WAIT FOR PC/DEBUG INTERRUPT
************************************
*                                  *
*   START PU ROUTINE -             *
*                                  *
************************************
*
001E06 08B800066038 START_PU BCLR     PST_ISTEP,PUSTAT  RESET I-STEP
001E0C 6012                  BRA.S    START_P1
                   *
                   *
001E0E 08F8000760E9 ISTEP    BSET     #7,EXECFLAG+1    TURN ON ISTEP AND START FLAG
001E14 08F800066038          BSET     PST_ISTEP,PUSTAT
001E1A 31F602A6142           MOVE.W   ADDRESS1+2,I_COUNT  SAVE INSTRUCTION COUNT
                   *
001E20 4EB81896    START_P1 JSR      GPRALTER        RESTORE GPRS IN CASE THEY CHANGED
001E24 4EB84868              JSR      FPRALTER        RESTORE FPRS IN CASE THEY CHANGED
001E28 11FC00FD5F90          MOVE.B   #PC_RESET,INTR_REG  RESET PC INTERRUPT
                   *
001E2E 0238006F6038          ANDI.B   #$6F,PUSTAT     RESET STOPPED AND ADR COMP BITS
001E34 21F860B86054          MOVE.L   MAN_CBADR,PCIB_OUT  POINT TO MANOP PCIB
001E3A 11FC007F5F90          MOVE.B   #INT_8088,INTR_REG  SET INTERRUPT TO PC
001E40 4A385F90    ST_LOOP  TST.B    CC_INT_REG      WAIT UNTIL PC SEES INTERRUPT
001E44 6BFA                  BMI.S    ST_LOOP         (IN CASE WE RETURN AGAIN TOO SOON)
                   *
                   *  RESET PER IF IT WAS ACTIVE
                   *
001E46 4A7860EA              TST.W    PERFLAG         PER - IF PER WAS ACTIVE BEFORE, TURN
001E4A 6704                  BEQ.S    ST_ACS          PER -   IT OFF, AND START FRESH
001E4C 4EB822D0              JSR      PER_STOP        PER -
                   *
                   *  SET UP ADDRESS COMPARE STOP
                   *
001E50 243860D8    ST_ACS   MOVE.L   ADS_ADDR,D2     GET COMPARE ADDRESS
001E54 670A                  BEQ.S    ST_NOACS        BR IF IT IS ZERO
001E56 2442                  MOVE.L   D2,A2
001E58 31D260D6              MOVE.W   (A2),ADS_INSTR  SAVE INSTRUCTION
001E5C 34BCB20E              MOVE.W   #$B20E,(A2)     PUT IN ADDRESS COMPARE OP CODE
                   *
001E60 2C386030    ST_NOACS MOVE.L   PSW,D6
001E64 4EB824D2              JSR      PSW_LDST        VERIFY AND LOAD NEW PSW
                   *
001E68 083800066030          BTST     #PSW_PER,PSW    PER - IS PER ACTIVE IN NEW PSW?
001E6E 6750                  BEQ.S    IENDNPER        PER - IF NOT, ALL SET
001E70 4EF81FF6              JMP      PERSETUP        PER - GO SET UP PER
                   *
************************************
*                                  *
*   COMMON RETURN LOOP FOR INSTRUCTION END   *
*                                  *
************************************
*
001E74 083800046038 IENDEXCP BTST    PST_ADST,PUSTAT  TEST IF RETURN FROM ADDR-COMP STOP
001E7A 6622                  BNE.S    IENDSTOP        BR IF YES, GO TO STOP
001E7C 083800056038          BTST     PST_WAIT,PUSTAT IS WAIT STATE ON ?
001E82 670C                  BEQ.S    IENDSTEP        BR IF NO, IT IS ISTEP
001E84 083800066038          BTST     PST_ISTEP,PUSTAT IS ISTEP ON ?
001E8A 6612                  BNE.S    IENDSTOP        BR IF YES, GO TO STOP
```

```
001E8C  4EF818E6                JMP     WAIT_LP             GO TO WAIT FOR PC/DEBUG INTERRUPT
                        *
001E90  08B8000760E9  IENDSTEP  BCLR    #7,EXECFLAG+1       CLEAR AND TEST START FLAG
001E96  660A                    BNE.S   IENDTRON            BR IF IT WAS ON, DO ONE INST
                        *
001E98  53786142                SUBQ.W  #1,I_COUNT          DECREMENT ISTEP COUNT
001E9C  6604                    BNE.S   IENDTRON            BR IF NOT ZERO, DO ONE MORE INST
001E9E  4EF81DA2      IENDSTOP  JMP     STOP_PUA            GO TO ASYNCHRONOUS PU STOP
                        *
001EA2  343CC0C0      IENDTRON  MOVE.W  #$C0C0,D2           SET UP TO CLEAR TPEND ON RETURN
001EA6  08F800046001            BSET    PSR_TRACE,PSR+1     SET PSR TRACE FOR A-ENGINE RETURN
001EAC  4EB80202                JSR     RETURNEX            GO TO RETURN, STACK ADDRESS FOR RTN
                        *
                        *       RETURN AFTER INSTRUCTION EXECUTION - ISTEP, ADSTOP, PER
                        *
001EB0  08B800046001  IENDTSTP  BCLR    PSR_TRACE,PSR+1     CLEAR PSR TRACE ON RETURN
001EB6  4A3860EA                TST.B   PERFLAG             PER - SHORT HIT, LONG ACTIVE ?
001EBA  6704                    BEQ.S   IENDNPER            PER - BR IF NO, BYPASS PER TEST
                        *
001EBC  4EB82172                JSR     PERTST              PER - GO TO TEST FOR PER EVENT
                        *
001EC0  083800006030  IENDNPER  BTST    PSW_EXT,PSW         IS EXTERNAL MASK ON?
001EC6  6704                    BEQ.S   IENDNEXT            BR IF NO
                        *
001EC8  4EB817E0                JSR     EX_INT              GO TO TEST FOR EXT INTERRUPT
                        *
001ECC  123860E2      IENDNEXT  MOVE.B  IOMASK,D1           GET SAVED IO MASK
001ED0  C2386104                AND.B   IO_INT_PND,D1       COMPARE WITH PENDING INTERRUPTS
001ED4  664C                    BNE.S   IENDIO              BR IF PENDING IO INTERRUPT
                        *
001ED6  4A386038      IENDNIO   TST.B   PUSTAT              ANY EXCEPTION IN PUSTAT ?
001EDA  6698                    BNE.S   IENDEXCP            BR IF YES, GO TO HANDLE
001EDC  4A3860EA                TST.B   PERFLAG             TEST FOR LONG PER
001EE0  66C0                    BNE.S   IENDTRON            BR IF YES, DO ANOTHER INST
001EE2  343CC0C0      IENDNTR   MOVE.W  #$C0C0,D2           SET UP FOR A-ENGINE RETURN
001EE6  4EF80202                JMP     RETURNEX            GO TO A-ENGINE, RESET TPEND
                        *
001EEA  083800066030  IENDLPSW  BTST    PSW_PER,PSW         PER - IS PER ACTIVE IN NEW PSW
001EF0  6712                    BEQ.S   IENDPOFF            PER - BR IF NO, BYPASS PER SETUP
                        *
001EF2  4EF81FF6                JMP     PERSETUP            PER - GO TO SET UP PER
                        *
001EF6  4EB824C8      IENDINT   JSR     PSW_LOAD            LOAD PSW
                        *
001EFA  4A7860EA      IENDSVCA  TST.W   PERFLAG             PER - WAS PER ACTIVE IN OLD PSW?
001EFE  6704                    BEQ.S   IENDPOFF            PER - NO, OK
                        *
001F00  4EB822D0                JSR     PER_STOP            PER - GO TURN PER OFF
                        *
001F04  08B800046001  IENDPOFF  BCLR    PSR_TRACE,PSR+1     CLEAR PSR TRACE
001F0A  67B4                    BEQ.S   IENDNPER            BR IF IT WAS OFF, BYPASS PER TEST
001F0C  584F                    ADDQ.W  #4,A7               ADJUST STACK TO REMOVE TR ADDR
001F0E  60B0                    BRA.S   IENDNPER            BYPASS PER TEST
                        *
001F10  4EB824C8      IENDSVC   JSR     PSW_LOAD            TEST AND LOAD PSW
001F14  4A3860EA                TST.B   PERFLAG             PER - SHORT HIT, LONG ACTIVE ?
001F18  67E0                    BEQ.S   IENDSVCA            PER - BR IF NO, GO TO CORRECT STACK
001F1A  08F8000160EA            BSET    PSWSWAP,PERFLAG     PER - SET PSW SWAP FLAG
001F20  4E75                    RTS     *                   PER - GO TO 'IENDTRTN' FOR PER TEST
                        *
001F22  42386104      IENDIO    CLR.B   IO_INT_PND          CLEAR 'PENDING INTERRUPT'
                        *
                        *-------------------------------------------------------
001F26  4EB82F20                JSR     INTTEST             TEST FOR SIO CODE IO INTERRUPT
                        *-------------------------------------------------------
                        *
                        *       RETURN FROM SIO CODE TEST - DIAGNOSE INTERRUPT OR NO SIO CODE
                        *
001F2A  32385F90      IO_UNSTK  MOVE.W  CC_INT_REG,D1
001F2E  6BFA                    BMI.S   IO_UNSTK            WAIT UNTIL INTERRUPT MAY BE SET
001F30  21F860BC6054            MOVE.L  MSK_CBADR,PCIB_OUT  POINT TO MASK CHANGE PCIB
001F36  11FC00D0609C            MOVE.B  #MASK_ALL,INT_MASK  ANY INTERRUPTS ARE ALLOWED
001F3C  11FC007F5F90            MOVE.B  #INT_8088,INTR_REG  SET INTERRUPT TO PC
                        *
001F42  083800015F90  IO_WAIT   BTST    PC_INTR,CC_INT_REG  WAIT FOR ANY PC INTERRUPT
001F48  66F8                    BNE.S   IO_WAIT
                        *
001F4A  4EF8195A                JMP     INTFRPC             GO TO INTERRUPT HANDLER
```

```
************************************************
*                                              *
*         PURGE PAT SUBROUTINE                 *
*                                              *
************************************************
*
            00001F4E    PURGE    EQU     *
001F4E 227C00800000              MOVEA.L  #PAT,A1
001F54 323C0400                  MOVE.W   #$0400,D1       PAGE FAULT BIT
001F58 243C00001000              MOVE.L   #$00001000,D2   ADDRESS INCREMENT FOR NEXT ENTRY
001F5E 7657                      MOVEQ    #$57,D3         LOAD COUNT FOR REAL STORE SIZE
001F60 7808                      MOVEQ    #$08,D4         SET PAT_MOD BIT = 1 TO ALLOW
001F62 88386106                  OR.B     SAVE_CNTL,D4        PAT ACCESS
001F66 11C45FE1                  MOVE.B   D4,SYS_CNTL
                        *
001F6A 3281             PUR_LOOP MOVE.W   D1,(A1)         PURGE ENTRY
001F6C D3C2                      ADDA.L   D2,A1           POINT TO NEXT ONE
001F6E 51CBFFFA                  DBRA     D3,PUR_LOOP     FIRST PURGE ALL PAGES IN REAL STORE
                        *
                        *
001F72 363C03A7                  MOVE.W   #$3A7,D3        COUNT FOR REST OF ENTRIES
001F76 323C0C00                  MOVE.W   #$0C00,D1       SET 'REAL OUT OF BOUNDS' BIT
                        *                                     AND PAGE FAULT BIT
001F7A 3281             PUR_LP2  MOVE.W   D1,(A1)         PURGE ENTRY
001F7C D3C2                      ADDA.L   D2,A1           POINT TO NEXT ONE
001F7E 51CBFFFA                  DBRA     D3,PUR_LP2      CONTINUE UNTIL ENTIRE PAT PURGED
                        *
001F82 11F861065FE1              MOVE.B   SAVE_CNTL,SYS_CNTL  RESTORE ORIGINAL SYS CONTROL REG
001F88 4E75                      RTS
                        *
                        *
************************************************
*                                              *
*     DUMP PAT SUBROUTINE - FOR DEBUG PURPOSES *
*         JUMP TO THIS SUBROUTINE FROM STOP PU ROUTINE *
************************************************
*
            00001F8A    DUMP_PAT EQU     *
001F8A 227C00800000              MOVEA.L  #PAT,A1
001F90 247C00005000              MOVE.L   #$5000,A2       ADDRESS TO STORE PAT ENTRIES
001F96 243C00001000              MOVE.L   #$00001000,D2   ADDRESS INCREMENT FOR NEXT ENTRY
001F9C 363C03FF                  MOVE.W   #$3FF,D3
001FA0 7808                      MOVEQ    #$08,D4         SET PAT_MOD BIT = 1 TO ALLOW
001FA2 88386106                  OR.B     SAVE_CNTL,D4        PAT ACCESS
001FA6 11C45FE1                  MOVE.B   D4,SYS_CNTL
                        *
001FAA 34D1             DMP_LOOP MOVE.W   (A1),(A2)+      GET PAT ENTRY
001FAC D3C2                      ADDA.L   D2,A1           POINT TO NEXT ONE
001FAE 51CBFFFA                  DBRA     D3,DMP_LOOP
                        *
001FB2 11F861065FE1              MOVE.B   SAVE_CNTL,SYS_CNTL  RESTORE ORIGINAL SYS CONTROL REG
001FB8 4E75                      RTS
************************************************
*                                              *
*       LOAD PAT SUBROUTINE  (VIRTUAL = REAL)  *
*                                              *
************************************************
*
            00001FBA    LOADPAT  EQU     *
001FBA 227C00800000              MOVEA.L  #PAT,A1
001FC0 7200                      MOVEQ    #$0000,D1       PAGE FAULT BIT
001FC2 243C00001000              MOVE.L   #$00001000,D2   ADDRESS INCREMENT FOR NEXT ENTRY
001FC8 7657                      MOVEQ    #$57,D3         LOAD COUNT FOR REAL STORE SIZE
001FCA 7808                      MOVEQ    #$08,D4         SET PAT_MOD BIT = 1 TO ALLOW
001FCC 88386106                  OR.B     SAVE_CNTL,D4        PAT ACCESS
001FD0 11C45FE1                  MOVE.B   D4,SYS_CNTL
                        *
001FD4 3281             PAT_LOOP MOVE.W   D1,(A1)         PURGE ENTRY
001FD6 5241                      ADDQ.W   #1,D1
001FD8 D3C2                      ADDA.L   D2,A1           POINT TO NEXT ONE
001FDA 51CBFFF8                  DBRA     D3,PAT_LOOP     FIRST PURGE ALL PAGES IN REAL STORE
                        *
                        *
001FDE 363C03A7                  MOVE.W   #$3A7,D3        COUNT FOR REST OF ENTRIES
001FE2 323C0C00                  MOVE.W   #$0C00,D1       SET 'REAL OUT OF BOUNDS' BIT
                        *                                     AND PAGE FAULT BIT
```

```
001FE6 3281              PAT_LP2  MOVE.W    D1,(A1)            PURGE ENTRY
001FE8 D3C2                       ADDA.L    D2,A1              POINT TO NEXT ONE
001FEA 51CBFFFA                   DBRA      D3,PAT_LP2         CONTINUE UNTIL ENTIRE PAT PURGED
                         *
001FEE 11F861065FE1                MOVE.B   SAVE_CNTL,SYS_CNTL  RESTORE ORIGINAL SYS CONTROL REG
001FF4 4E75                        RTS
                         *
                         **************************************
                         *                                    *
                         *  ROUTINES TO MAKE THE PER ACTIVE OR INACTIVE -  *
                         *     CALLED FROM LPSW AND OTHER PSW SWAPS        *
                         *                                    *
                         *                                    *
                         *  THERE ARE 2 KINDS OF PER -                     *
                         *    1) SHORT I-FETCH: ONLY ONE PARTICULAR INSTRUCTION  *
                         *       IS REQUESTED; ROUTINE PUTS 'B20F' INTO FIRST    *
                         *       HALFWORD OF INSTRUCTION, DOES NOT SET TRACE, AND *
                         *       DOES NOT SET 'PERFLAG'. NORMAL EXECUTION CONTINUES. *
                         *                                    *
                         *    2) 'NORMAL' PER: ANY EVENT MAY BE REQUESTED, AND     *
                         *       THE CPU IS I-STEPPED WITH A CHECK BETWEEN EACH    *
                         *       INSTRUCTION FOR AN EVENT.                        *
                         *                                    *
                         **************************************
                         *
       00001FF6          PERSETUP EQU       *
001FF6 21F860026128               MOVE.L    PC,PER_OLDPC        SAVE INSTRUCTION COUNTER
001FFC 11F860306131               MOVE.B    PSW,PER_XLAT        SAVE TRANSLATE BIT
                         *
002002 0C3800400124      PER_S1   CMPI.B    #$40,CREG9          TEST FOR IFETCH TRACE ONLY
002008 6662                       BNE.S     PER_S2              BR IF OTHER TRACE BITS ON
00200A 083800026106               BTST      BYP_PAT,SAVE_CNTL   IS TRANSLATE ON
002010 664C                       BNE.S     PER_S3              IF NOT, BYPASS SETUP
002012 24380128                   MOVE.L    CREG10,D2
002016 B4B8012C                   CMP.L     CREG11,D2           IF CREG10 = CREG11, DO SHORT I-FETCH
00201A 66000122                   BNE       PER_S5              BR IF LONG IFETCH RANGE
                         *
00201E 020200FE                   ANDI.B    #$FE,D2             MAKE THE ADDRESS EVEN
002022 2442                       MOVEA.L   D2,A2               SAVE IT FOR LATER
002024 0282003FF000               ANDI.L    #$003FF000,D2       MASK FOR PAT PAGE ACCESS
00202A 08C20017                   BSET      #$17,D2
00202E 2242                       MOVE.L    D2,A1
002030 7808                       MOVEQ     #$08,D4             SET PAT_MOD BIT = 1 TO ALLOW
002032 88386106                   OR.B      SAVE_CNTL,D4           PAT ACCESS
002036 11C45FE1                   MOVE.B    D4,SYS_CNTL
                         *
00203A 08110002                   BTST      #$2,(A1)            IS THE PAGE VALID ?
00203E 6622                       BNE.S     PER_S3A             BR IF INVALID
002040 11F861065FE1               MOVE.B    SAVE_CNTL,SYS_CNTL  RESTORE NORMAL ACCESS
002046 D5FC80000000               ADDA.L    #MS_ACC,A2          MAKE IT A MS ADDRESS
00204C 21CA613E                   MOVE.L    A2,PER_ADRS         SAVE THE INSTRUCTION ADDRESSD
002050 31D2613C                   MOVE.W    (A2),PER_INST       SAVE NEW INSTRUCTION HALFWORD
002054 34BCB20F                   MOVE.W    #$B20F,(A2)         REPLACE WITH CODED INSTRUCTION
002058 08F8000160EB               BSET      #PER_IFS,PERFLAG1   SET SHORT I-FETCH FLAG
00205E 4EF81F04          PER_S3   JMP       IENDPOFF            GO TO CLEAR STACK
                         *
002062 11F861065FE1      PER_S3A  MOVE.B    SAVE_CNTL,SYS_CNTL  RESTORE NORMAL ACCESS
002068 4EF81F04                   JMP       IENDPOFF            GO TO CLEAR STACK
                         *
00206C 16380124          PER_S2   MOVE.B    CREG9,D3            GET PER TRACE BITS
002070 EA0B                       LSR.B     5,D3
002072 643C                       BCC.S     PER_S4              BR IF GPR ALTERATION TRACE OFF
002074 50C4                       ST        D4                  SET REGISTER BYTE TO FF
002076 12380126                   MOVE.B    CREG9+2,D1          CHECK IF HIGH ORDER BYTE HAS BIT ON
00207A 6606                       BNE.S     SET2                BRANCH IF REGISTER NO. IS LESS THAN 8
00207C 5004                       ADDQ.B    #8,D4               CHANGE TO 07
00207E 12380127                   MOVE.B    CREG9+3,D1          IT MUST BE IN LOW ORDER BYTE
002082 7407              SET2     MOVEQ     #$7,D2
002084 5204              SET1     ADDQ.B    #1,D4               UPDATE THE REGISTER BYTE
002086 E309                       LSL.B     1,D1                CHECK IF THE CORRESPONDING BIT IS ON
002088 55CAFFFA                   DBCS      D2,SET1
00208C 641C                       BCC.S     SET3                BR IF NO REGISTER BIT ON
00208E E90C                       LSL.B     4,D4                MAKE IT A 4-BYTE GPR DISPACEMENT
002090 11C46130                   MOVE.B    D4,PER_GPRNO        SAVE GPR NUMBER
002094 4EB81842                   JSR       ST
002098 21F801A0612C               MOVE.L    GPR,PER_GPR         SAVE GPR CONTENTS
00209E 083800026106               BTST      BYP_PAT,SAVE_CNTL   IS TRANSLATE ON
```

```
0020A4 6712                         BEQ.S     PER_S4A              BR IF YES, SET UP OTHER EVENTS
0020A6 4EF8213E                     JMP       PER_S5               BR TO END OF SETUP
                         *
0020AA 0038000160EA  SET3           ORI.B     #$01,PERFLAG         SET GPR BYPASS FLAG, NO GPR SPECIFIED
                         *
0020B0 083800026106  PER_S4         BTST      BYP_PAT,SAVE_CNTL    IS TRANSLATE ON
0020B6 66A6                         BNE.S     PER_S3               BR IF NO, BYPASS SETUP
0020B8 E20B          PER_S4A        LSR.B     1,D3
0020BA 64000082                     BCC       PER_S5               BR IF STORAGE ALTERATION TRACE OFF
0020BE 223C003FF000                 MOVE.L    #$003FF000,D1        GET PAT ACCESS PAGE MASK
0020C4 2601                         MOVE.L    D1,D3
0020C6 C2B80128                     AND.L     CREG10,D1            GET THE STARTING ADDRESS PAGE
0020CA C6B8012C                     AND.L     CREG11,D3            GET THE ENDING ADDRESS PAGE
0020CE 7808                         MOVEQ     #$08,D4              SET PAT_MOD BIT = 1 TO ALLOW
0020D0 88386106                     OR.B      SAVE_CNTL,D4           PAT ACCESS
0020D4 11C45FE1                     MOVE.B    D4,SYS_CNTL
0020D8 21F801286138                 MOVE.L    CREG10,PER_ADDR      SAVE THE STARTING ADDRESS
0020DE B681                         CMP.L     D1,D3                ARE THE PAGES THE SAME ?
0020E0 6618                         BNE.S     PER_NE               BR IF NO
0020E2 08C10017                     BSET      #$17,D1              SET BIT 23
0020E6 2241                         MOVEA.L   D1,A1                GET PAT ADDRESS
0020E8 2638012C      PER_X8         MOVE.L    CREG11,D3            GET THE ENDING ADDRESS
0020EC 08110002                     BTST      #$2,(A1)             IS THE PAGE VALID ?
0020F0 6726                         BEQ.S     PER_X5               BR IF VALID
0020F2 31FC80006132                 MOVE.W    #$8000,PER_COUNT     MAKE INVALID COUNT
0020F8 6026                         BRA.S     PER_X6               GO TO END
0020FA 08C10017      PER_NE         BSET      #$17,D1              SET BIT 23
0020FE 2241                         MOVEA.L   D1,A1                GET 1ST PAGE PAT ADDRESS
002100 08110002                     BTST      #$2,(A1)             IS THE PAGE VALID ?
002104 D2FC1000                     ADDA.W    #$1000,A1            GET 2ND PAGE PAT ADDRESS
002108 6706                         BEQ.S     PER_X7               BR IF 1ST PAGE VALID
00210A 31C3613A                     MOVE.W    D3,PER_ADDR+2        SAVE THE START OF THE NEXT PAGE
00210E 6008                         BRA.S     PER_X8               BR TO TEST THE 2ND PAGE
002110 08110002      PER_X7         BTST      #$2,(A1)             IS THE PAGE VALID ?
002114 6702                         BEQ.S     PER_X5               BR IF BOTH VALID
002116 5383                         SUBQ.L    #1,D3                MAKE THE ENDING ADDRESS END OF PAGE
002118 9678613A      PER_X5         SUB.W     PER_ADDR+2,D3        GET COUNT (START ADDR - END ADDR)
00211C 31C36132                     MOVE.W    D3,PER_COUNT         STORE IT
002120 11F861065FE1  PER_X6         MOVE.B    SAVE_CNTL,SYS_CNTL   TURN OFF PAT ACCESS BIT
002126 4A43                         TST.W     D3                   IS THERE ANYTHING TO SAVE FOR COMP
002128 6B14                         BMI.S     PER_S5               BR IF NO PAGES VALID
00212A 11FC00806138                 MOVE.B    #$80,PER_ADDR        MAKE IT A MS ADDRESS
002130 22786138                     MOVEA.L   PER_ADDR,A1
002134 45F86134                     LEA       PER_DATA,A2
002138 14D9          PER_X9         MOVE.B    (A1)+,(A2)+          SAVE ONE BYTE AT A TIME
00213A 51CBFFFC                     DBRA      D3,PER_X9            BR UNTIL VALID BYTES GONE
                         *
                         *
00213E 0038004060EA  PER_S5         ORI.B     #$40,PERFLAG         SET PER FLAG
002144 08A800050001                 BCLR      PSR_EBIT,1(A0)       CLEAR E-BIT FOR S/BRANCH
00214A 4EF81F04                     JMP       IENDPOFF             GO TO CLEAR STACK

*--------------------------------------------------------------------
                         *         NOTE - PER CAN ALSO BE 'TURNED OFF' AFTER A PER EVENT IF
                         *         THE PROGRAM NEW PSW DOES NOT HAVE PER BIT SET.
                         *         CHECK AT LABEL 'PER_OFF'.
                         *--------------------------------------------------------------------
                         *
                         *
                         *
       0000214E       PER_ADST EQU  *                              COME HERE ON 'B2OF' INSTRUCTIONS
00214E 4A3860EB                     TST.B     PERFLAG+1            SHORT IF PER ACTIVE ?
002152 670001D0                     BEQ       OPEXCP1              BR IF NO, REAL OP EXCEPTION
002156 59B86002                     SUBQ.L    #4,PC                DECREMENT PC TO POINT TO BEGINNING
                         *                                           OF B2 INSTRUCTION;
00215A 21F860026128                 MOVE.L    PC,PER_OLDPC         SAVE PC ADDRESS FOR PER PROG CHECK
002160 2278613E                     MOVEA.L   PER_ADRS,A1          PUT ORIGINAL INSTRUCTION BACK
002164 32B8613C                     MOVE.W    PER_INST,(A1)
002168 08F80003608A                 BSET      #PER_SHRT,PERFLAG    SET BIT IN CASE OF PROGRAM CHECK
00216E 4EF81EA2                     JMP       IENDTRON             GO TO EXECUTE ONE INSTRUCTION
```

```
*****************************************
*                                        *
*    PROGRAM EVENT RECORDING             *
*                                        *
*    PER_OLDPC - USED FOR CHECKING RANGE *
*    PER_GPR   - USED FOR GPR ALTERATION CHECK *
*    PER_GPRNO - USED FOR GPR ALTERATION CHECK *
*    PER_DATA  - USED FOR STORAGE ALTERATION CHECK *
*    PER_ADDR  - USED FOR STORAGE ALTERATION CHECK *
*    PER_COUNT - USED FOR STORAGE ALTERATION CHECK *
*    PER_XLAT  - USED FOR CHECKING IF TRANSLATE WAS ON *
*                AFTER A PSW SWAP        *
*                                        *
*    D2 CONTAINS THE PROGRAM CHECK INTERRUPTION CODE IF *
*       ENTRY IS FROM PROGRAM CHECK HANDLER *
*                                        *
*****************************************
*
          00002172    PERTST   EQU    *
002172 083800005F90           BTST   FP_INTR,CC_INT_REG   FLOATING POINT INTERRUPT ?
002178 6606                   BNE.S  PERTST1              BR IF NONE
                       *
00217A 584F                   ADDQ.W #4,A7                REMOVE RETURN ADDRESS FROM STACK
00217C 4EF818F8               JMP    FP_TEST              GO TO TEST CORNROW EXCEPTION
                       *
002180 4242        PERTST1    CLR.W  D2                   ACCUMULATE PROGRAM CHECK CODE HERE
002182 4246        PERTSTX    CLR.W  D6
002184 08B8000036EA           BCLR   PER_SHRT,PERFLAG     CLEAR SHORT PER FLAG
00218A 660000F0               BNE    PERTSET2             BR IF IT WAS ON, TAKE PER EVENT
00218E 10380124               MOVE.B CREG9,D0
002192 6A58                   BPL.S  PERTGRA              BRANCH IF NO 'SUCCESSFUL BRANCH'
                       *
002194 22386128               MOVE.L PER_OLDPC,D1         GET ADDRESS OF EXECUTED INSTRUCTION
002198 B2B8012C               CMP.L  CREG11,D1            CHECK UPPER BOUNDARY
00219C 6E4E                   BGT.S  PERTGRA              IF IF INSTR GREATER, NO 'SBR' PER
00219E 92B80128               SUB.L  CREG10,D1            CHECK LOWER BOUNDARY
0021A2 6A10                   BPL.S  PERTSBR              IF INSTR EQUAL OR GREATER, 'SBR' PER
0021A4 263C000000C0           MOVE.L #$C0,D3              GET CURRENT INST LENGTH CODE
0021AA C6386000               AND.B  PSR,D3
0021AE E71B                   ROL.B  3,D3                 MAKE IT A BYTE COUNT
0021B0 D283                   ADD.L  D3,D1                IS ADDRESS WITHIN INST LENGTH ?
0021B2 6F38                   BLE.S  PERTGRA              BR IF MINUS/EQUAL, NO 'SBR' PER
0021B4 22786128    PERTSBR    MOVEA.L PER_OLDPC,A1        GET OLD INSTRUCTION ADDRESS,
0021B8 D3FC80000000           ADDA.L #MS_ACC,A1           POINT TO MAIN STORE
0021BE 3A3C0200               MOVE.W #$200,D5            LOAD LENGTH OF OPTABLE, TO POINT TO
0021C2 1A11                   MOVE.B (A1),D5               BETABLE + INSTRUCTION DISPLACEMENT
0021C4 7603                   MOVEQ  #03,D3
0021C6 C6355000               AND.B  0(A5,D5),D3          CHECK FOR BRANCH INSTRUCTIONS
0021CA 6720                   BEQ.S  PERTGRA              BRANCH IF NOT TO CHECK I/F EVENT
0021CC 0C030002               CMPI.B #02,D3               THIS BRANCH NEEDS SPECIAL CHECKING?
0021D0 6B0E                   BMI.S  PERTSBR1             NO, CHECK 'SUCCESSFUL BRANCH LATCH'
                       *
0021D2 0C050045               CMPI.B #$45,D5              TEST FOR BAL INSTRUCTION
0021D6 6708                   BEQ.S  PERTSBR1             BR IF 'BAL', DONT TEST R2
                       *
0021D8 7A0F                   MOVEQ  #$0F,D5              COME HERE FOR BCTR OR BALR
0021DA CA290001               AND.B  1(A1),D5             FIND OUT IF R2 IS ZERO
0021DE 670C                   BEQ.S  PERTGRA              IF SO, NO SUCCESSFUL BRANCH
                       *
0021E0 082800050001 PERTSBR1  BTST   PSR_EBIT,1(A0)       WAS THIS A SUCCESSFUL BRANCH?
0021E6 6704                   BEQ.S  PERTGRA              NO, TRY NEXT EVENT
                       *
0021E8 00468000    PERTSET1   ORI.W  #$8000,D6            SET PER INTERRUPT IN D2
                       *
                       *
                       *
          000021EC    PERTGRA  EQU    *      CHECKS FOR ALTERATION OF ONLY ONE REGISTER
0021EC EA08                   LSR.B  5,D0                 CHECK FOR GENERAL REGISTER ALTERATION
0021EE 641E                   BCC.S  PERTSTOR             BRANCH IF NOT ON
                       *
0021F0 0838000160EA           BTST   #$1,PERFLAG          WAS THERE ANY REGISTER SPECIFIED
0021F6 6616                   BNE.S  PERTSTOR             BR IF NO, BYPASS GPR COMPARE
0021F8 18386130               MOVE.B PER_GPRNO,D4         GET SAVED GPR NUMBER
0021FC 4EB81842               JSR    ST
002200 223801A0               MOVE.L GPR,D1
002204 B2B8612C               CMP.L  PER_GPR,D1           COMPARE NEW VALUE TO OLD
```

```
002208 6704                        BEQ.S     PERTSTOR        IF EQUAL, CONTINUE
                           *
00220A 00461000            PERTSET4 ORI.W    #$1000,D6       SET PER INTERRUPT IN D2
                           *
                           *
                           *
00220E 083800026030 PERTSTOR BTST    PSW_XLAT,PSW            IS TRANSLATE ON?
002214 661A                         BNE.S     PERTSA          YES, OK
002216 0838000160EA                 BTST      PSWSWAP,PERFLAG DID WE JUST SWAP PSWS?
00221C 6762                         BEQ.S     PERTDONE        NO, THEN DON'T CHECK
00221E 083800026131                 BTST      PSW_XLAT,PER_XLAT WAS PER ON IN OLD PSW?
002224 675A                         BEQ.S     PERTDONE        NO, CAN'T HAVE EVENT
                           *
002226 72FB                         MOVEQ     #$FB,D1         SET BYP_PAT BIT = 0 FOR TRANSLATE
002228 C2386106                     AND.B     SAVE_CNTL,D1      OF MAIN STORAGE ADDRESSES
00222C 11C15FE1                     MOVE.B    D1,SYS_CNTL
                           *
                           *
                           *
002230 E208         PERTSA          LSR.B     1,D0            CHECK FOR STORAGE ALTERATION
002232 6424                         BCC.S     PERTIF          BRANCH IF NOT ON
                           *
002234 32386132                     MOVE.W    PER_COUNT,D1    GET VARIABLE COUNT
002238 6B1E                         BMI.S     PERTIF          BR IF MINUS, NOTHING TO COMPARE
00223A 22786138                     MOVEA.L   PER_ADDR,A1     GET MAIN STORE ADDRESS
00223E 45F86134                     LEA       PER_DATA,A2     GET ADDRESS OF SAVED DATA
002242 B509         PERTSA1         CMPM.B    (A1)+,(A2)+     COMPARE ONE BYTE AT A TIME,
002244 56C9FFFC                     DBNE      D1,PERTSA1        UP TO FOUR BYTES
002248 670E                         BEQ.S     PERTIF
                           *
00224A 00462000     PERTSET3 ORI.W  #$2000,D6                 SET PER INTERRUPT IN D2
                           *
                           *         DATA CHANGED, SAVE IT FOR NEXT COMPARE
                           *
00224E 32386132                     MOVE.W    PER_COUNT,D1    GET VARIABLE COUNT
002252 1521         PERTSA2         MOVE.B    -(A1),-(A2)     MOVE ONE BYTE AT A TIME,
002254 51C9FFFC                     DBRA      D1,PERTSA2        UP TO FOUR BYTES
                           *
                           *
                           *
002258 E208         PERTIF          LSR.B     1,D0            CHECK FOR INSTRUCTION FETCH
00225A 6424                         BCC.S     PERTDONE        BRANCH IF NOT ON
                           *
00225C 22386128                     MOVE.L    PER_OLDPC,D1    GET ADDRESS OF EXECUTED INSTRUCTION
002260 B2B8012C                     CMP.L     CREG11,D1       CHECK UPPER BOUNDARY
002264 6E1A                         BGT.S     PERTDONE        IF IF INSTR GREATER, NO 'IF' PER
002266 92B80128                     SUB.L     CREG10,D1       CHECK LOWER BOUNDARY
00226A 6A10                         BPL.S     PERTSET2        IF INSTR EQUAL OR GREATER, 'IF' PER
00226C 263C000000C0                 MOVE.L    #$C0,D3         GET CURRENT INST LENGTH CODE
002272 C6386000                     AND.B     PSR,D3
002276 E71B                         ROL.B     3,D3            MAKE IT A BYTE COUNT
002278 D283                         ADD.L     D3,D1           IS ADDRESS WITHIN INST LENGTH ?
00227A 6F04                         BLE.S     PERTDONE        BR IF MINUS/EQUAL, NO 'IF' PER
00227C 00464000     PERTSET2 ORI.W  #$4000,D6                 SET PER INTERRUPT IN D2
                           *
                           *
002280 4A46         PERTDONE TST.W  D6                        DO WE HAVE AN EVENT TO REPORT?
002282 6726                         BEQ.S     PERTRET
002284 584F                         ADDQ.W    #4,A7           REMOVE RETURN ADDRESS FROM STACK
                           *
                           *
                           *----------------------------------------------------------------
                           *         PER EVENT DETECTED;  TAKE PER PROGRAM CHECK
                           *----------------------------------------------------------------
002286 227C80000096                 MOVEA.L   #APERCODE,A1    GET 370 LOW STORE ADDRESS
00228C 7204                         MOVEQ     #$04,D1         SET BY-PASS PAT BIT FOR NO TRANSLATE
00228E 82386106                     OR.B      SAVE_CNTL,D1      TO ACCESS LOW STORE
002292 11C15FE1                     MOVE.B    D1,SYS_CNTL
002296 32C6                         MOVE.W    D6,(A1)+        STORE PER INTERRUPTION CODE
002298 22B86128                     MOVE.L    PER_OLDPC,(A1)  STORE PER ADDRESS
00229C 4211                         CLR.B     (A1)            MAKE SURE HIGH ORDER BYTE IS ZERO
00229E 00420080                     ORI.W     #$0080,D2       SET PER INTERRUPT CODE
0022A2 4EB82476                     JSR       FETCHPSW        GET PSW FROM PC AND PSR
0022A6 4EF823F6                     JMP       PROGCHKA        GO TAKE PROGRAM CHECK
                           *
```

```
0022AA 08A800050001 PERTRET  BCLR     PSR_EBIT,1(A0)        MAKE SURE E_BIT IS OFF FOR S/BRANCH
0022B0 21F860026128           MOVE.L   PC,PER_OLDPC          SAVE PC
0022B6 11F860306131           MOVE.B   PSW,PER_XLAT          SAVE TRANSLATE BIT
0022BC 21F801A0612C           MOVE.L   GPR,PER_GPR           SAVE GPR CONTENTS
                       *
0022C2 11F861065FE1           MOVE.B   SAVE_CNTL,SYS_CNTL    RESTORE TRANSLATE BIT
                       *
0022C8 08B8000160EA           BCLR     #PSWSWAP,PERFLAG      WERE WE IN A PSW-SWAP INSTRUCTION?
0022CE 6730                   BEQ.S    PER_RTN               BR IF NO, RETURN
                       *
       000022D0        PER_STOP EQU    *
0022D0 4A3860EB               TST.B    PERFLAG+1             WAS IT SHORT I-FETCH?
0022D4 6726                   BEQ.S    PER_CLR               BR IF NO
0022D6 0838000360EA           BTST     #PER_SHRT,PERFLAG     HAD INSTRUCTION BEEN REACHED?
0022DC 661E                   BNE.S    PER_CLR               BR IF YES, INSTR ALREADY REPLACED
0022DE 72FB            PER_STS  MOVEQ  #$FB,D1               SET BYP_PAT BIT = 0 FOR TRANSLATE
0022E0 C2386106               AND.B    SAVE_CNTL,D1            OF MAIN STORAGE ADDRESSES
0022E4 11C15FE1               MOVE.B   D1,SYS_CNTL
0022E8 2278613E               MOVEA.L  PER_ADRS,A1           GET INSTRUCTION ADDRESS
0022EC 0C51B20F               CMPI.W   #$B20F,(A1)           IS THE INSTRUCTION STILL 'B20F' ?
0022F0 6604                   BNE.S    PER_ST1               BR IF NO, BYPASS INSTRUCTION RESTORE
0022F2 32B8613C               MOVE.W   PER_INST,(A1)         RESTORE INSTRUCTION
0022F6 11F861065FE1 PER_ST1   MOVE.B   SAVE_CNTL,SYS_CNTL    RESTORE ORIGINAL CONDITION
0022FC 427860EA     PER_CLR   CLR.W    PERFLAG               CLEAR PER FLAGS
002300 4E75         PER_RTN   RTS      *                     RETURN TO CALLER
002302 21C26202     PAGE_FLT  MOVE.L   D2,BECB_ADR           SAVE FAILING ADDRESS
002306 7411                   MOVEQ    #$0011,D2             (THESE ERRORS ARE DETECTED BY THE
002308 6074                   BRA.S    BRPROG                  MICROCODE IN KEY OPS)
                       *
00230A 21C36202     ADDR_ERR  MOVE.L   D3,BECB_ADR           SAVE FAILING ADDRESS
00230E 7405                   MOVEQ    #$0005,D2             (THESE ERRORS ARE DETECTED BY THE
002310 606C                   BRA.S    BRPROG                  MICROCODE IN MAD, MUN)
                       *
002312 72C0         OPEXCP    MOVEQ    #$C0,D1
002314 C210                   AND.B    (A0),D1
002316 6A0C                   BPL.S    OPEXCP1
002318 54B86002               ADDQ.L   #2,PC                 PC OK IF ONLY ILC = 1
00231C E309                   LSL.B    1,D1
00231E 6A04                   BPL.S    OPEXCP1
002320 54B86002               ADDQ.L   #2,PC
002324 7401         OPEXCP1   MOVEQ    #$0001,D2             OPERATION EXCEPTION
002326 6056                   BRA.S    BRPROG
                       *
                       *
002328 7402         PRIVEX    MOVEQ    #$0002,D2             IF IN PROBLEM STATE, PRIVILEGED
00232A 6052                   BRA.S    BRPROG                  OPERATION EXCEPTION
                       *
                       *
00232C 7403         EXECEX    MOVEQ    #$0003,D2             LOAD EXECUTE EXCEPTION CODE
00232E 604E                   BRA.S    BRPROG                RETURN WITH BAD CODE, PROGRAM CHECK
                       *
                       *
       00002330      ACCESSX1 EQU      *                     ACCESS EXCEPTION ON FIRST
002330 083800046001           BTST     PSR_TRACE,PSR+1         INSTRUCTION HALFWORD
002336 6714                   BEQ.S    ACCX1                 CHECK FOR PER OR I-STEP
002338 0878000060EB           BCHG     PERBUSER,PERFLAG1     SET/RESET BIT
00233E 660C                   BNE.S    ACCX1                 COME HERE EVERY OTHER TIME
002340 55B86002               SUBQ.L   #2,PC                 CORRECT PROGRAM COUNTER
002344 4EB82172               JSR      PERTST                PER - CHECK FOR PER EVENT
002348 4EF80200               JMP      RETURN                RETURN TO A-ENGINE, GET ERROR AGAIN
                       *
00234C 0210003F     ACCX1     ANDI.B   #$3F,(A0)
002350 00100040               ORI.B    #$40,(A0)             SET ILC OF 1
002354 7201                   MOVEQ    #1,D1
002356 C2386005               AND.B    PC+3,D1               CHECK IF PC IS ODD
00235A 6620                   BNE.S    SPECEX                IF IT IS, SPECIFICATION EXCEPTION
00235C 4EF81516               JMP      BUSERRA7
                       *
                       *
002360 72C0         SPECEXC   MOVEQ    #$C0,D1
002362 C210                   AND.B    (A0),D1
002364 6A16                   BPL.S    SPECEX                PC OK IF ONLY ILC = 1
002366 54B86002               ADDQ.L   #2,PC
00236A E309                   LSL.B    1,D1
00236C 6A0E                   BPL.S    SPECEX
```

```
00236E 54B86002          ADDQ.L  #2,PC
002372 6008              BRA.S   SPECEX
              *
              *
002374 0210003F  SPECEX2 ANDI.B  #$3F,(A0)
002378 00100080          ORI.B   #ILC2_MSK,(A0)   SET ILC2
00237C 7406      SPECEX  MOVEQ   #0006,D2         SET SPECIFICATION EXCEPTION
00237E 6062      BRPROG  BRA.S   PROGCHK
              *
              *
002380 7407      DATAEX  MOVEQ   #$0007,D2
002382 605E              BRA.S   PROGCHK
002384 55B86002  FIXPTOVF SUBQ.L #2,PC            CORRECT PROGRAM COUNTER
002388 08100003          BTST    PSR_FIXP,(A0)
00238C 674A              BEQ.S   NOPROGCK
00238E 7408              MOVEQ   #$0008,D2
002390 6050              BRA.S   PROGCHK
              *
              *
002392 7409      FIXPTDIV MOVEQ  #$0009,D2
002394 604C              BRA.S   PROGCHK
              *
              *
002396 55B86002  DECOVFX2 SUBQ.L #2,PC            CORRECT PROGRAM COUNTER
00239A 08100002  DECOVFEX BTST   PSR_DEC,(A0)     TEST IF MASK FOR INTERRUPT IS ON
00239E 6738              BEQ.S   NOPROGCK         IF NOT, NO PROGRAM CHECK; CONTINUE
0023A0 740A              MOVEQ   #$000A,D2
0023A2 603E              BRA.S   PROGCHK
              *
              *
0023A4 740B      DECDIVEX MOVEQ  #$000B,D2
0023A6 603A              BRA.S   PROGCHK
              *
              *
0023A8 55B86002  EXPOVFX2 SUBQ.L #2,PC            CORRECT PROGRAM COUNTER
0023AC 740C      EXPOVFEX MOVEQ  #$000C,D2
0023AE 6032              BRA.S   PROGCHK
              *
              *
0023B0 55B86002  EXPUNDX2 SUBQ.L #2,PC            CORRECT PROGRAM COUNTER
0023B4 08100001  EXPUNDEX BTST   PSR_EXPO,(A0)    TEST IF MASK FOR INTERRUPT IS ON
0023B8 671E              BEQ.S   NOPROGCK         IF NOT, NO PROGRAM CHECK; CONTINUE
0023BA 740D              MOVEQ   #$000D,D2
0023BC 6024              BRA.S   PROGCHK
              *
              *
0023BE 55B86002  SIGNIFX2 SUBQ.L #2,PC            CORRECT PROGRAM COUNTER
0023C2 08100000  SIGNIFEX BTST   PSR_SIG,(A0)
0023C6 6710              BEQ.S   NOPROGCK
0023C8 740E              MOVEQ   #$000E,D2
0023CA 6016              BRA.S   PROGCHK
              *
              *
0023CC 740F      FPDIVEX  MOVEQ  #$000F,D2
0023CE 6012              BRA.S   PROGCHK
              *
              *
0023D0 7412      TRANSPEX MOVEQ  #$0012,D2        SET TRANSLATION SPECIFICATION
0023D2 600E              BRA.S   PROGCHK            EXCEPTION CODE
              *
              *
0023D4 7413      SPOPEXCP MOVEQ  #$0013,D2        SET SPECIAL OPERATION EXCEPTION'
0023D6 600A              BRA.S   PROGCHK
              *
0023D8 4A3860E8  NOPROGCK TST.B  EXECFLAG         IS AN EXECUTE IN PROGRESS?
0023DC 6700DE22          BEQ     RETURN           NO, RETURN TO NSI
0023E0 4E75              RTS     .                RETURN TO EXECUTE RETURN
              ************************************************
              *                                              *
              *       PROGRAM INTERRUPT ROUTINE              *
              *                                              *
              *   COME HERE TO SWAP PROGRAM PSWS:            *
              *       TO PROGCHK IF PSW IN PRIVATE STORE IS NOT CURRENT  *
              *       TO PROGCHKA IF PSW IN PRIVATE STORE IS CURRENT     *
              *           D2 HAS PROGRAM CHECK INTERRUPTION CODE         *
              *                                              *
              ************************************************
              *
```

```
0023E2 4EB82476      PROGCHK  JSR      FETCHPSW           GET PSW FROM PC AND PSR
0023E6 4A3860EA               TST.B    PERFLAG            PER - LONG/SHORT DONE ?
0023EA 670A                   BEQ.S    PROGCHKA           PER - NO, BYPASS PER CHECK
0023EC 08020004               BTST     TRANEX,D2          PER - TRANSLATION EXCEPTION?
0023F0 6604                   BNE.S    PROGCHKA           PER - BR IF YES, BYPASS PER EVENT
0023F2 4EB82182      PROGPER  JSR      PERTSTX            PER - GO CHECK FOR PER EVENT
                     *
0023F6 247C80000028  PROGCHKA MOVEA.L  #APROGOLD,A2       GET MAIN STORAGE ADDRESS FOR OLD PSW
0023FC 287C80000068           MOVEA.L  #APROGNEW,A4       GET MAIN STORAGE ADDRESS FOR NEW PSW
002402 7204                   MOVEQ    #$04,D1            SET BY-PASS PAT BIT FOR NO TRANSLATE
002404 82386106               OR.B     SAVE_CNTL,D1            TO ACCESS LOW STORE
002408 11C15FE1               MOVE.B   D1,SYS_CNTL
                     *
00240C 31F8601A601C           MOVE.W   INSTSAVE,INSTSAVE2 MOVE LAST INSTRUCTION
002412 31FCC0FF601A           MOVE.W   #$C0FF,INSTSAVE    SPECIAL CODE FOR 'PROGRAM CHECK'
                     *                                    (IN CASE OF BUS ERROR)
002418 08020004               BTST     TRANEX,D2          IS THIS A TRANSLATION EXCEPTION?
00241C 672A                   BEQ.S    PROGCHKB
00241E 0C020012               CMPI.B   #$12,D2            IS IT TRANS SPEC OR SPECIAL OP EXCP?
002422 6A24                   BPL.S    PROGCHKB
                     *
002424 297862020028           MOVE.L   BECB_ADR,TRANSADR-PROGNEW(A4)  STORE FAILING ADDR
00242A 26386034               MOVE.L   PSW+4,D3
00242E 5583                   SUBQ.L   #2,D3              NULLIFY THE INSTRUCTION BY FINDING
002430 3210                   MOVE.W   (A0),D1                 THE BEGINNING USING THE ILC,
002432 6A0A                   BPL.S    PROGCHKC                AND POINT THE PC BACK TO IT.
002434 5583                   SUBQ.L   #2,D3
002436 0801000E               BTST     PSR_ILC1,D1
00243A 6702                   BEQ.S    PROGCHKC
00243C 5583                   SUBQ.L   #2,D3
00243E 31C36036      PROGCHKC MOVE.W   D3,PSW+6           STORE PSW BACK, WITHOUT
002442 4843                   SWAP     D3                      DISTURBING BYTE 4
002444 11C36035               MOVE.B   D3,PSW+5
                     *
                     *
002448 24F86030      PROGCHKB MOVE.L   PSW,(A2)+          STORE CURRENT PSW AS OLD
00244C 24B86034               MOVE.L   PSW+4,(A2)
002450 083800036031           BTST     PSW_EC,PSW+1
002456 6718                   BEQ.S    BCCODE
002458 39420026               MOVE.W   D2,PGMINT-PROGNEW(A4)                          *A
00245C 72C0                   MOVEQ    #$C0,D1
00245E C210                   AND.B    (A0),D1
002460 E719                   ROL.B    3,D1
002462 19410025               MOVE.B   D1,PGMILC-PROGNEW(A4)
                     *
002466 08F8000660E9           BSET     #6,EXECFLAG+1      SET PROG CHECK FLAG TO CAUSE
                     *                                         HARD STOP IF PSW INVALID
00246C 4EF81EF6               JMP      IENDINT            GO TO LOAD PSW AND END
                     *
002470 3502          BCCODE   MOVE.W   D2,-(A2)           STORE INTERRUPTION CODE
002472 4EF81EF6               JMP      IENDINT            GO TO LOAD PSW AND END
                     ********************************************
                     *                                          *
                     *  SUBROUTINE TO UPDATE PSW WITH INFORMATION FROM PC AND PSR  *
                     *                                          *
                     ********************************************
                     *
       00002476      FETCHPSW EQU      *
002476 225F                   MOVEA.L  (A7)+,A1           GET RETURN ADDRESS
002478 4A3860E8               TST.B    EXECFLAG           EXECUTE IN PROGRESS?
00247C 6720                   BEQ.S    FETCHOK
00247E 11F861065FE1           MOVE.B   SAVE_CNTL,SYS_CNTL CLEAR ANY OVERRIDES
002484 21F860EC6002           MOVE.L   SAV_PCEX,PC        RESTORE PROGRAM COUNTER
00248A 11F860FD6001           MOVE.B   SAV_PSREX+1,PSR+1
002490 0210003F               ANDI.B   #ILC_RST,(A0)      RESET ILC,
002494 00100080               ORI.B    #ILC2_MSK,(A0)     SET TO REFLECT EXECUTE
002498 423860E8               CLR.B    EXECFLAG
00249C 584F                   ADDQ.W   #4,A7              POINT STACK PAST EXECUTE RETURN
00249E 083800036031  FETCHOK  BTST     PSW_EC,PSW+1
0024A4 6716                   BEQ.S    FETCHBC
0024A6 11F860036035           MOVE.B   PC+1,PSW+5         MOVE PROGRAM COUNTER
0024AC 31F860046036           MOVE.W   PC+2,PSW+6
0024B2 723F                   MOVEQ    #$3F,D1
0024B4 C210                   AND.B    (A0),D1            MOVE CC AND PROGRAM MASK
```

```
0024B6 11C16032              MOVE.B    D1,PSW+2
0024BA 4ED1         FETCH1    JMP      (A1)               RETURN
                    *
0024BC 21F860026034 FETCHBC   MOVE.L   PC,PSW+4           GET PROGRAM COUNTER
0024C2 11D06034               MOVE.B   (A0),PSW+4         MOVE ILC, CC, AND PROGRAM MASK
0024C6 4ED1                   JMP      (A1)               RETURN
                    *
                    ************************************************
                    *                                              *
                    *    L O A D   N E W   P S W   S U B R O U T I N E *
                    *                                              *
                    *    CALLED FROM:  PSW SWAPPING ROUTINES - LPSW, SVC, EXT INT, *
                    *                                  I/O INT, START,            *
                    *                                  PROG CHK, MACH CHK          *
                    *                                                              *
                    *    ENTRY:  AT 'PSW_LOAD'; A4 HAS ADDRESS OF NEW PSW           *
                    *                                                              *
                    *    EXIT:   NEW PSW LOADED, PSR AND PC UPDATED, INTERRUPT MASKS *
                    *            SET (PRGM, EXT I/O), TRANSLATION SET/RESET          *
                    *                                                              *
                    *    ERRORS: ACCESS EXCEPTIONS (BUS ERRORS) ON LPSW             *
                    *            SPECIFICATION EXCEPTION IF INVALID EC MODE PSW     *
                    *                                                              *
                    ************************************************
                    *
0024C8 2C1C         PSW_LOAD  MOVE.L   (A4)+,D6           FETCH 1ST DBL WORD INTO D6 IN
                    *                                     CASE OF STORAGE ACCESS ERROR
0024CA 21D46034               MOVE.L   (A4),PSW+4         PUT 2ND DBL WORD INTO THE PSW
0024CE 21C66030               MOVE.L   D6,PSW             PUT 1ST DBL WORD INTO THE PSW
0024D2 21F860346002 PSW_LDST  MOVE.L   PSW+4,PC           PUT THE INST ADDR INTO THE PROG CTR
0024D8 42386002               CLR.B    PC                 CLEAR THE HI BYTE OF THE PC
0024DC 08F800026106           BSET     BYP_PAT,SAVE_CNTL  TURN OFF TRANS FLAG IN SHADOW BYTE
0024E2 08060013               BTST     PSW_EC,D6          TEST FOR EC MODE IN NEW PSW
0024E6 6750                   BEQ.S    PSW_LDBC           BR IF BC MODE
                    *
0024E8 0806001A               BTST     PSW_XLAT,D6        TEST FOR TRANSLATE BIT IN NEW PSW
0024EC 6706                   BEQ.S    PSW_LDNX           BR IF OFF
0024EE 08B800026106           BCLR     BYP_PAT,SAVE_CNTL  TURN ON TRANS FLAG IN SHADOW BYTE
0024F4 4A386034     PSW_LDNX  TST.B    PSW+4              IF EC MODE, BITS 32-39 MUST BE ZERO
0024F8 6608                   BNE.S    PSW_LDEX           BR IF NOT ZERO
0024FA 0286B800C0FF           ANDI.L   #$B800C0FF,D6      ALSO, BITS 0,2-4,16-17, AND 24-31
002500 671E                   BEQ.S    PSW_LDEC             MUST BE ZERO.
002502 584F         PSW_LDEX  ADDQ.W   #4,A7              ADJUST STACK
002504 08B8000660E9           BCLR     #6,EXECFLAG+1      CLEAR AND TEST PROG CHK FLAG
00250A 660A                   BNE.S    PSW_LDHS           BR IF PROG CHK PSW SWAP
00250C 0210003F               ANDI.B   #ILC_RST,(A0)      SET ILC TO ZERO FOR PSW SPEC CHK
002510 7406                   MOVEQ    #$06,D2            SET SPECIFICATION CHECK
002512 4EF823F6               JMP      PROGCHKA           GO TO PROGRAM CHECK
                    *
002516 31FC3020605C PSW_LDHS  MOVE.W   #$3020,REFCODE     SET UP REFERENCE CODE
00251C 4EF81B72               JMP      HARDSTOP
                    *
002520 10B86032     PSW_LDEC  MOVE.B   PSW+2,(A0)         MOVE CC & PRGM MASK TO THE PSR
002524 427860E2               CLR.W    IOMASK             CLEAR I/O MASK REGISTER
002528 083800016030           BTST     PSW_IO,PSW         I/O INTERRUPTS MASKED OFF
00252E 6712                   BEQ.S    PSW_LEND           BR IF YES, FINISH PSW LOAD
002530 31F8010860E2           MOVE.W   CREG2,IOMASK       SET IOMASK FROM CTRL REG
002536 600A                   BRA.S    PSW_LEND           FINISH PSW LOAD
                    *
002538 10B86034     PSW_LDBC  MOVE.B   PSW+4,(A0)         MOVE CC & PRGM MASK TO THE PSR
00253C 11F8603060E2           MOVE.B   PSW,IOMASK         SET IOMASK FROM THE PSW
002542 11D06047     PSW_LEND  MOVE.B   (A0),PRGMMASK      SAVE THE CC & PRGM MASK IN PRIV STOR
002546 31FC76005FA2           MOVE.W   #FP_SMSK,FP_CMD    SET THE PRGM MASK IN THE FP ENGINE
00254C 31F860465FA0           MOVE.W   FP_MASK,FP_DATA
002552 11F861065FE1           MOVE.B   SAVE_CNTL,SYS_CNTL SET TRANS IN THE SYS CONTROL REG
                    *
002558 088800056038           BCLR     PST_WAIT,PUSTAT    CLEAR WAIT FLAG
00255E 083800016031           BTST     PSW_WAIT,PSW+1     TEST FOR WAIT IN NEW PSW
002564 6706                   BEQ.S    PSW_RTN            BR IF OFF
002566 08F800056038           BSET     PST_WAIT,PUSTAT    SET WAIT FLAG
00256C 4E75         PSW_RTN   RTS      *                  RETURN TO CALLING ROUTINE
```

```
***************************************
*                                      *
*   RESET ROUTINES - CLEAR RESET AND PROGRAM RESET   *
*                                      *
***************************************
*
         0000256E    IPL      EQU      *              ENTRY FOR DEBUG CARD IPL
00256E   08F800036038 RESET1  BSET     PST_RESET,PUSTAT MICROCODE RESET FROM PC - PUSTAT IS
         *                                            SAVED IN D0 AND TESTED LATER TO
         *                                            DETERMINE IF WE GO TO A-ENGINE
002574   4FF86700             LEA      STACKST,A7     RE-INITIALIZE STACK POINTER
002578   083800076048         BTST     PCMANOPS,CONFIG IS THIS REQUEST FROM THE PC?
00257E   6706                 BEQ.S    RESET          NO, BRANCH
002580   31E9001A603A         MOVE.W   26(A1),PU_CMD  GET CORRECT COMMAND OUT OF PCIB
         *
         00002586    RESET    EQU      *              ENTRY POINT FOR HARDWARE RESET
002586   10386038             MOVE.B   PUSTAT,D0      SAVE STATUS (IN CASE OF IPL)
00258A   3C38603A             MOVE.W   PU_CMD,D6
00258E   08F800036038         BSET     PST_RESET,PUSTAT SET BIT FOR INFORMATION ONLY
002594   41F86000             LEA      PSR,A0         POINT TO COMMUNICATION AREA
002598   42B860E6             CLR.L    SWITCHES       CLEAR VARIOUS 'MARKS ON THE WALL'
00259C   427860EA             CLR.W    PERFLAG
0025A0   4EB82476             JSR      FETCHPSW       MAKE PSW MATCH PC & PSR
0025A4   7234                 MOVEQ    #$34,D1
0025A6   11C16106             MOVE.B   D1,SAVE_CNTL
0025AA   11C15FE1             MOVE.B   D1,SYS_CNTL    * ENSURE WE'RE ACCESSING MAIN STORE
0025AE   31FC1001605C         MOVE.W   #$1001,REFCODE  SET RESET PROGRESS CODE
0025B4   4EB81F4E             JSR      PURGE          * CLEAR AND INITIALIZE PAT
0025B8   31FC1002605C         MOVE.W   #$1002,REFCODE  SET RESET PROGRESS CODE
0025BE   7200                 MOVEQ    #0,D1
0025C0   0C060004             CMPI.B   #CMD_CRST,D6   IS THIS A CLEAR RESET?
0025C4   666A                 BNE.S    RESCONT
         *
         *
0025C6   21C16030    CLRESET  MOVE.L   D1,PSW         CLEAR PSW/PC TO ZEROS
0025CA   21C16034             MOVE.L   D1,PSW+4
0025CE   21C16002             MOVE.L   D1,PC
0025D2   31C16000             MOVE.W   D1,PSR
         *
0025D6   760F                 MOVEQ    #15,D3         CLEAR CONTROL REGISTER, GPRS AND FPRS
0025D8   43F80100             LEA      CREG0,A1       START WITH CONTROL REG 0
0025DC   45F80140             LEA      GPR0,A2        START WITH GENERAL PURPOSE REG 0
0025E0   47F80180             LEA      FPR0,A3        START WITH FLOATING POINT REG 0
0025E4   22C1        CLRES1   MOVE.L   D1,(A1)+       CLEAR OUT ALL CONTROL REGISTERS
0025E6   24C1                 MOVE.L   D1,(A2)+       CLEAR OUT ALL GPRS TOO
0025E8   36C1                 MOVE.W   D1,(A3)+       CLEAR OUT ALL FPRS TOO
0025EA   51CBFFF8             DBRA     D3,CLRES1
         *
         *    THE GPRS NEED TO BE LOADED INTO THE A-ENGINE;  IT MUST HAVE A
         *    CHANCE TO GET RESET FIRST, THEN DO 'GPRALTER' AT LABEL 'RESGPR'
0025EE   21FCFFFFFFFF
         0108                 MOVE.L   #$FFFFFFFF,CREG2 INITIALIZE CHANNEL MASKS TO ALL ON
0025F6   11FC00E00103         MOVE.B   #$E0,CREG0+3     INITIALIZE CONTROL REG 0
0025FC   11FC00C20138         MOVE.B   #$C2,CREG14      REG 14 INITIAL VALUE
002602   31FC0200013E         MOVE.W   #$0200,CREG15+2  REG 15 INITIAL VALUE
002608   31FC1003605C         MOVE.W   #$1003,REFCODE   SET RESET PROGRESS CODE
         *
00260E   247C80000000         MOVEA.L  #ARSTRT_N,A2   LOAD MAIN STORE ADDRESS 0
002614   24C1        CLRSTORE MOVE.L   D1,(A2)+
002616   60FC                 BRA.S    CLRSTORE       CLEAR MAIN STORAGE
002618   31FC1004605C         MOVE.W   #$1004,REFCODE  SET RESET PROGRESS CODE
00261E   0C7800056200         CMPI.W   #$0005,BECB    CHECK FOR ADDRESSING EXCEPTION
002624   670A                 BEQ.S    RESCONT        CONTINUE WITH RESET CODE
002626   31FC1005605C         MOVE.W   #$1005,REFCODE
00262C   4EF81B72             JMP      HARDSTOP       GO TO HARDSTOP IF VALIDATE
                                                      IS UNSUCCESSFUL
         *
         *
002630   31FC00016040 RESCONT MOVE.W   #$0001,$6040   FLOATING POINT PROCESSOR IS PRESENT
002636   31C16042             MOVE.W   D1,$6042       THESE BYTES ARE CHECKED BY THE A-ENG
00263A   21C16044             MOVE.L   D1,$6044       ON RESET FOR DIAGNOSTIC PURPOSES
00263E   31FC1006605C         MOVE.W   #$1006,REFCODE  SET RESET PROGRESS CODE
002644   31FC66005FA2         MOVE.W   #FP_INIT,FP_CMD * INITIALIZE THE FP PROCESSOR
00264A   21C160E2             MOVE.L   D1,IOMASK      CLEAR MASKS (IO AND EXTERNAL)
00264E   31C16038             MOVE.W   D1,PUSTAT
002652   21C16102             MOVE.L   D1,TMR_INT_PND  ( TIMER AND I/O INTERRUPTS )
002656   31C1601A             MOVE.W   D1,INSTSAVE
```

```
00265A 21C1601C              MOVE.L  D1,INSTSAVE2
00265E 31C160D6              MOVE.W  D1,ADS_INSTR
002662 21C160D8              MOVE.L  D1,ADS_ADDR
              *
002666 4BF83C00              LEA     OPTABLE,A5        GET OP ADDRESS TABLE
00266A 08000003              BTST    PST_RESET,D0      IS THIS A MICROCODE-ONLY RESET?
              *                                         (IPL OR ALTER/DISPLAY)
00266E 6620                  BNE.S   RES3              IF SO, DON'T GO TO A-ENGINE
002670 31FC1007605C          MOVE.W  #$1007,REFCODE    SET RESET PROGRESS CODE
              *---------------------------------------------------------------
002676 31C15FF0              MOVE.W  D1,ENGINE_A     * GO TO A-ENGINE FOR RESET
              *---------------------------------------------------------------
00267A 21F860346002          MOVE.L  PSW+4,PC          RESTORE PC AFTER RESET
002680 30B86032              MOVE.W  PSW+2,(A0)        SET UP PSR
002684 083800036031          BTST    PSW_EC,PSW+1
00268A 6604                  BNE.S   RES3
00268C 30B86034              MOVE.W  PSW+4,(A0)
002690 11C16001      RES3    MOVE.B  D1,PSR+1          CLEAR PSR STATUS BITS
              *
002694 0C060004              CMPI.B  #CMD_CRST,D6      IS THIS A CLEAR RESET?
002698 6614                  BNE.S   RES5
00269A 31FC1008605C  RESGPR  MOVE.W  #$1008,REFCODE    SET RESET PROGRESS CODE
0026A0 4EB81896              JSR     GPRALTER          LOAD GPRS
0026A4 31FC1009605C          MOVE.W  #$1009,REFCODE    SET RESET PROGRESS CODE
0026AA 4EB84868              JSR     FPRALTER          LOAD FPRS
0026AE 31FC100A605C  RES5    MOVE.W  #$100A,REFCODE    SET RESET FINISHED CODE
0026B4 11FC00FD5F90          MOVE.B  #PC_RESET,INTR_REG CLEAR PC INTERRUPTS
              *---------------------------------------------------------------
0026BA 4EB82F18              JSR     RST_CALL          GO TO RESET SIO CODE/DEBUG CARD
              *---------------------------------------------------------------
              *
              *     RETURN FROM RESET - NO IPL, NO SIO CODE OR NO DEBUG CARD
              *
0026BE 4EF818D2              JMP     STOP_LP           GO TO WAIT FOR PC/DEBUG INTERRUPT
              ***************************************************************
              *                                                             *
              *     PC INTERFACE LOOP FOR TIMER HANDLING                    *
              *                                                             *
              ***************************************************************
              *
0026C2 32385F90      TIMERS  MOVE.W  CC_INT_REG,D1
0026C6 6BFA                  BMI.S   TIMERS            WAIT UNTIL INTERRUPT MAY BE SET
              *
0026C8 31FCFFFF6062          MOVE.W  #$FFFF,TIMER_CB+2 INIT RETURN CODE
0026CE 21F860B46054          MOVE.L  TIM_CBADR,PCIB_OUT POINT TO TIMER PCIB
0026D4 11FC007F5F90          MOVE.B  #INT_8088,INTR_REG SET INTERRUPT TO PC
0026DA 32385F90      TIM_WAIT MOVE.W CC_INT_REG,D1
0026DE 08010009              BTST    PC_INTR,D1        CHECK IF PC IS SENDING SOMETHING
0026E2 66F6                  BNE.S   TIM_WAIT          INTERRUPT IS PENDING WHEN = 0
              *
0026E4 22786050              MOVEA.L PCIB_IN,A1        GET PCIB ADDRESS
0026E8 B3FC0005E074          CMPA.L  #ASYNC_MO+MAIN_STR,A1  CHECK IF IT'S A MANOP REQUEST
0026EE 670E                  BEQ.S   TIMSTACK
0026F0 B3FC00058000          CMPA.L  #MAIN_STR,A1      CHECK IF IT'S IN MAIN STORE
0026F6 6A26                  BPL.S   TIM_GO            IF GREATER, THEN IT'S A TIMER INTR
0026F8 003800806104          ORI.B   #$80,IO_INT_PND
0026FE 11FC00A06051  TIMSTACK MOVE.B #MASK_TIM+MASK_E,PCIB_IN+1
002704 11FC00406050          MOVE.B  #STACK,PCIB_IN
00270A 4A386050      TIM_W1  TST.B   PCIB_IN           WAIT FOR PC TO SEE CONDITION CODE
00270E 66FA                  BNE.S   TIM_W1            AND RESET IT TO ZERO
002710 11FC00FD5F90          MOVE.B  #PC_RESET,INTR_REG RESET PC INTERRUPT
002716 08F800076105          BSET    #7,IO_INT_PND+1   SET 'INTERRUPT STACKED' FLAG
00271C 60BC                  BRA.S   TIM_WAIT
              *
              *
00271E 11FC00806050  TIM_GO  MOVE.B  #GO_AHEAD,PCIB_IN SET CONDITION CODE BIT FOR PC
002724 93FC00058000          SUBA.L  #MAIN_STR,A1         SO IT CAN TRANSFER THE PCIB
00272A 4A386050      TIM_W2  TST.B   PCIB_IN           WAIT FOR PC TO SEE CONDITION CODE
00272E 66FA                  BNE.S   TIM_W2               AND RESET IT TO ZERO
002730 11FC00FD5F90          MOVE.B  #PC_RESET,INTR_REG
002736 0C2900FF0001          CMPI.B  #$FF,1(A1)        IS THIS AN ASYNCHRONOUS INTR
00273C 679C                  BEQ.S   TIM_WAIT          YES, GO WAIT SOME MORE
              *
00273E 4A386105      TIM_RESP TST.B  IO_INT_PND+1      CHECK IF WE HAVE STACKED AN INTR
002742 671E                  BEQ.S   TIM_R2            IF NOT, DONE; OTHERWISE SEND
              *                                         MASK-CHANGE REQUEST
```

```
002744 11FC00D0609C           MOVE.B   #MASK_ALL,INT_MASK   MASK ON INTERRUPTS AGAIN
00274A 4A3860E2                TST.B    IOMASK              CHECK I/O INTERRUPTS
00274E 6606                    BNE.S    TIM_R1              IF ENABLED, OK
002750 04380040609C            SUBI.B   #MASK_IO,INT_MASK   TURN OFF I/O MASK
002756 21F860BC6054  TIM_R1    MOVE.L   MSK_CBADR,PCIB_OUT  POINT TO MASK CHANGE PCIB
00275C 11FC007F5F90            MOVE.B   #INT_8088,INTR_REG  SET INTERRUPT TO PC
002762 4E75          TIM_R2    RTS
```

***********************************************
*                                              *
*   SUBROUTINE TO GO TO THE A-ENGINE AND RETURN AFTER  *
*       EXECUTING ONE INSTRUCTION              *
*                                              *
***********************************************

```
        00002764  TRACERET EQU  *
002764 55B86002             SUBQ.L  #2,PC          PC WAS UPDATED BY NEXT IFETCH
002768 4E75                 RTS     *                         ADJUST IT
```

***********************************************
*                                              *
*   S U P E R    T R A C E                     *
*                                              *
*   SUPER TRACE IS AN AID FOR DEBUGGING THE 68000 MICROCODE. *
*   IT IS ACTIVE WHEN THE CONTROL TABLE AT TRACETCB HAS VALID *
*   DATA IN IT.  THE REQUESTED INSTRUCTIONS ARE REPLACED WITH *
*   AN INVALID INSTRUCTION OF X'FFXX', WHICH WILL CAUSE A *
*   LINE1111 EXCEPTION WHEN EXECUTED.  THE INSTRUCTION WHICH *
*   WAS OVERLAID IS PUT BACK, AND EXECUTED WITH THE TRACE BIT *
*   ON IN THE STATUS REGISTER.  THEN THE TRACE VECTOR AND THE *
*   INSTRUCTION LOCATION ARE RESTORED TO THEIR PREVIOUS VALUES, *
*   AND THE EVENT IS STORED IN THE TRACE TABLE, ALONG WITH *
*   ANY REQUESTED REGISTER CONTENTS OR STORAGE LOCATION. *
*                                              *
*   TRACETCB - TRACE CONTROL BLOCK             *
*                                              *
*        +0   | CURRENT POINTER IN TRACE AREA |*
*        +2   | STARTING ADDR OF TRACE AREA  |*
*        +4   | ENDING ADDRESS OF TRACE AREA |*
*        +6   | TR 0 - ORIGINAL INSTRUCTION  |*
*        +8   | TR 0 - TRACED ADDRESS        |*
*        +A   | TR 0 - REGISTER MASK         |*
*        +C   | TR 0 - STORAGE ADDRESS COUNT |*
*             | . . . . .                    |*
*        +E   | TR 1 - 7 ENTRIES             |*
*        +46  | TR 0 - STORAGE TABLE ENTRIES |  8 2-BYTES ADDRS *
*             | . . . . .                    |*
*        +56  | TR 1 - 7 ENTRIES             |*
*                                              *
*   TRVSAVE  - CONTENTS OF TRACE VECTOR (0024) AT SUPER TRACE *
*              ENTRY. SAVE TO RESTORE.         *
*                                              *

```
*       TRACREGS - FOUR FULLWORDS TO SAVE D0, D1, A0 AND A1 BETWEEN  *
*                  THE 1ST AND 2ND ENTRIES HANDLING AN INTERRUPT.    *
*                                                                    *
*       REGSAVE  - SIXTEEN FULLWORDS TO SAVE ALL USER'S REGISTERS    *
*                  ON SECOND ENTRY (D0 - D7, A0 - A7)                *
*                                                                    *
*       REGSAVEA - POINTER TO ADDRESS REGISTERS SAVED ABOVE          *
*                                                                    *
**********************************************************************
*
         0000276A        SUPERTR  EQU       *
00276A 4A78693A                   TST.W     TRACETCB          IS 'SUPERTRACE' RUNNING?
00276E 6604                       BNE.S     SUPER0            YES, CONTINUE
002770 4EF81B64        L1111      JMP       LINE1111          NO, INVALID OP CODE
*
002774 48E7C0C0        SUPER0     MOVEM.L   D0-D1/A0-A1,-(A7) STACK CONTENTS OF D0, D1, A0, A1
002778 206F0012                   MOVEA.L   18(A7),A0         GET ADDRESS OF CODED OP FROM STACK
00277C 3010                       MOVE.W    (A0),D0           GET CODED OP
00277E 7207                       MOVEQ     #$07,D1           MAKE CODED OP TABLE INDEX
002780 C240                       AND.W     D0,D1
002782 E749                       LSL.W     #3,D1
002784 43F86940                   LEA       TRACEDEF,A1       POINT TO TRACE DEFINITION TABLE
002788 B0F11002                   CMPA.W    2(A1,D1),A0       COMPARE DEFINITION ADDR TO TRAP ADDR
00278C 66E2                       BNE.S     L1111             ERROR IF NO COMPARE
*
00278E 30B11000                   MOVE.W    0(A1,D1),(A0)     RESTORE INSTRUCTION FOR EXECUTION
002792 4AEF0010                   TAS       16(A7)            TURN ON TRACE BIT IN STATUS REG
002796 48F80303283A               MOVEM.L   D0-D1/A0-A1,TRACREGS  SAVE REGISTERS
00279C 4CDF0303                   MOVEM.L   (A7)+,D0-D1/A0-A1 UNSTACK CONTENTS OF D0-D1, A0-A1
0027A0 21F800242836               MOVE.L    TRACEV,TRVSAVE    SAVE CURRENT TRACE VECTOR
0027A6 21FC000027B0
       0024                       MOVE.L    #SUPERRET,TRACEV
0027AE 4E73                       RTE
*
*
*
0027B0 08970007        SUPERRET   BCLR      #$7,(A7)          CLEAR TRACE BIT IN SAVED STATUS
0027B4 21F828360024               MOVE.L    TRVSAVE,TRACEV    RESTORE VECTOR TRACE VECTOR
0027BA 48F8FFFF284A               MOVEM.L   D0-A7,REGSAVE     SAVE REGISTERS
0027C0 4CF80303283A               MOVEM.L   TRACREGS,D0-D1/A0-A1   GET SAVED TRACE REGISTERS
*
0027C6 3080                       MOVE.W    D0,(A0)           RESTORE CODED OP
0027C8 3078693A                   MOVEA.W   TRACETCB,A0       GET ADDRESS OF NEXT TRACE ENTRY
0027CC 3478693E                   MOVEA.W   TRACEEND,A2       GET ENDING ADDRESS OF TRACE AREA
0027D0 30C0                       MOVE.W    D0,(A0)+          TRACE OCCURRENCE
0027D2 B4C8                       CMPA.W    A0,A2             ARE WE AT THE END OF TRACE AREA?
0027D4 6604                       BNE.S     SUPER1            BR IF NO
0027D6 3078693C                   MOVEA.W   TRACEBEG,A0       LOAD TABLE START ADDRESS
*
0027DA 34311004        SUPER1     MOVE.W    4(A1,D1),D2       GET REGISTER MASKS
0027DE 6726                       BEQ.S     SUPER4            SKIP IF NO REGS TO BE TRACED
0027E0 700F                       MOVEQ     #15,D0            COUNT FOR 16 REGISTERS
0027E2 47F8284A                   LEA       REGSAVE,A3        ADDRESS OF REGISTER SAVE AREA '
0027E6 E34A            SUPERLP    LSL.W     1,D2              CHECK IF TRACE NEXT REGISTER
0027E8 6416                       BCC.S     SUPER3            BRANCH IF BIT IS NOT ON
0027EA 30D3                       MOVE.W    (A3),(A0)+        MOVE REGISTER CONTENTS TO TRACE AREA
0027EC B4C8                       CMPA.W    A0,A2             ARE WE AT THE END OF TRACE AREA?
0027EE 6604                       BNE.S     SUPER2            BR IF NO
0027F0 3078693C                   MOVE.W    TRACEBEG,A0       LOAD TABLE START ADDRESS
*
0027F4 30EB0002        SUPER2     MOVE.W    2(A3),(A0)+       MOVE REGISTER CONTENTS TO TRACE AREA
0027F8 B4C8                       CMPA.W    A0,A2             ARE WE AT THE END OF TRACE AREA?
0027FA 6604                       BNE.S     SUPER3            BR IF NO
0027FC 3078693C                   MOVE.W    TRACEBEG,A0       LOAD TABLE START ADDRESS
*
002800 5848            SUPER3     ADDQ.W    #4,A3             POINT TO NEXT REGISTER
002802 51C8FFE2                   DBRA      D0,SUPERLP        CONTINUE FOR EACH REGISTER
*
*
*
         00002806     SUPER4      EQU       *
002806 34311006                   MOVE.W    6(A1,D1),D2       GET STORAGE TABLE COUNT
00280A E349                       LSL.W     #1,D1             ADJUST INDEX FOR STORAGE TABLE
00280C 47F11040                   LEA       64(A1,D1),A3      GET START OF STORAGE ENTRIES
002810 51CA0004        SUPER5     DBRA      D2,SUPER6         BR IF IT WAS NO ZERO
002814 600E                       BRA.S     SUPER7            END OF TRACE
*
```

```
002816 325B         SUPER6    MOVEA.W  (A3)+,A1           GET TRACE ADDRESS
002818 30D1                   MOVE.W   (A1),(A0)+         MOVE DATA TO TRACE AREA
00281A B4C8                   CMPA.W   A0,A2              ARE WE AT THE END OF TRACE AREA?
00281C 66F2                   BNE.S    SUPER5             BR IF NO
00281E 3078693C               MOVE.W   TRACEBEG,A0        LOAD TABLE START ADDRESS
002822 60EC                   BRA.S    SUPER5
                   *
002824 31C8693A     SUPER7    MOVE.W   A0,TRACETCB        SAVE POINTER
002828 4CF80007284A           MOVEM.L  REGSAVE,D0-D2      RESTORE REGISTERS
00282E 4CF80F00286A           MOVEM.L  REGSAVEA,A0-A3     RESTORE REGISTERS
002834 4E73                   RTE                         RETURN TO NORMAL EXECUTION
                   *
                   *
002836 0004         TRVSAVE   DS.L     1                  TRACE VECTOR SAVE AREA
00283A 0004         TRACREGS  DS.L     1                  D0 - CODED OP
00283E 0004                   DS.L     1                  D1 - CODED OP TABLE INDEX
002842 0004                   DS.L     1                  A0 - CODED OP ADDRESS
002846 0004                   DS.L     1                  A1 - TRACE DEFINITION TABLE POINTER
00284A 0020         REGSAVE   DS.L     8                  DATA REGISTERS
00286A 0020         REGSAVEA  DS.L     8                  ADDRESS REGISTERS
                   *
       0000693A               ORG      $693A
                   *
00693A 0000         TRACETCB  DC.W     0                  CURRENT TRACE POINTER
00693C 6A00         TRACEBEG  DC.W     $6A00              TRACE TABLE START ADDRESS
00693E 7F00         TRACEEND  DC.W     $7F00              TRACE TABLE END ADDRESS
       00006940     TRACEDEF  EQU      *                  TRACE DEFINITION TABLE
006940 FF00                   DC.W     $FF00              TRACE 0 - ORIGINAL INSTRUCTION
006942 FFFF                   DC.W     $FFFF              TRACE 0 - TRACED ADDRESS
006944 0000                   DC.W     0                  TRACE 0 - REGISTER MASK
006946 0000                   DC.W     0                  TRACE 0 - STORAGE ADDR TABLE COUNT
006948 FF01                   DC.W     $FF01              TRACE 1 - DEFINITION
00694A FFFF                   DC.W     $FFFF
00694C 00000000               DC.L     0
006950 FF02                   DC.W     $FF02              TRACE 2 - DEFINITION
006952 FFFF                   DC.W     $FFFF
006954 00000000               DC.L     0
006958 FF03                   DC.W     $FF03              TRACE 3 - DEFINITION
00695A FFFF                   DC.W     $FFFF
00695C 00000000               DC.L     0
006960 FF04                   DC.W     $FF04              TRACE 4 - DEFINITION
006962 FFFF                   DC.W     $FFFF
006964 00000000               DC.L     0
006968 FF05                   DC.W     $FF05              TRACE 5 - DEFINITION
00696A FFFF                   DC.W     $FFFF
00696C 00000000               DC.L     0
006970 FF06                   DC.W     $FF06              TRACE 6 - DEFINITION
006972 FFFF                   DC.W     $FFFF
006974 00000000               DC.L     0
006978 FF07                   DC.W     $FF07              TRACE 7 - DEFINITION
00697A FFFF                   DC.W     $FFFF
00697C 00000000               DC.L     0
                   *
                   *          STORAGE ADDRESS TABLE
                   *
006980 FFFFFFFF               DC.L     $FFFFFFFF,$FFFFFFFF,$FFFFFFFF,$FFFFFFFF    TRACE 0
006984 FFFFFFFF
006988 FFFFFFFF
00698C FFFFFFFF
006990 FFFFFFFF               DC.L     $FFFFFFFF,$FFFFFFFF,$FFFFFFFF,$FFFFFFFF    TRACE 1
006994 FFFFFFFF
006998 FFFFFFFF
00699C FFFFFFFF
0069A0 FFFFFFFF               DC.L     $FFFFFFFF,$FFFFFFFF,$FFFFFFFF,$FFFFFFFF    TRACE 2
0069A4 FFFFFFFF
0069A8 FFFFFFFF
0069AC FFFFFFFF
0069B0 FFFFFFFF               DC.L     $FFFFFFFF,$FFFFFFFF,$FFFFFFFF,$FFFFFFFF    TRACE 3
0069B4 FFFFFFFF
0069B8 FFFFFFFF
0069BC FFFFFFFF
0069C0 FFFFFFFF               DC.L     $FFFFFFFF,$FFFFFFFF,$FFFFFFFF,$FFFFFFFF    TRACE 4
0069C4 FFFFFFFF
0069C8 FFFFFFFF
0069CC FFFFFFFF
0069D0 FFFFFFFF               DC.L     $FFFFFFFF,$FFFFFFFF,$FFFFFFFF,$FFFFFFFF    TRACE 5
```

```
0069D4 FFFFFFFF
0069D8 FFFFFFFF
0069DC FFFFFFFF
0069E0 FFFFFFFF          DC.L    $FFFFFFFF,$FFFFFFFF,$FFFFFFFF,$FFFFFFFF      TRACE 6
0069E4 FFFFFFFF
0069E8 FFFFFFFF
0069EC FFFFFFFF
0069F0 FFFFFFFF          DC.L    $FFFFFFFF,$FFFFFFFF,$FFFFFFFF,$FFFFFFFF      TRACE 7
0069F4 FFFFFFFF
0069F8 FFFFFFFF
0069FC FFFFFFFF
       00002D00          ORG     $2D00
*****************************************
*                                         *
*   SUBROUTINE TO TRACE DATA ON I/O INTERRUPTS  *
*                                         *
* 5000                                     *
*  _____     *
* 4    P S W    4    P C    4  PCIB_IN  4  *
* 4_____4_____4_____4 *
* 4EXT_PND4 IO_PND4 MAIN_ST X40 4 MAIN_ST X48 4 INST 4 PUSTAT4 *
* 4_____4_____4_____4_____4_SAVE_4_____4 *
* 4 IOMASK4      4            4            4      4       4 *
* 4_____4_____4_____4_____4_____4_____4 *
*                                          *
*                                          *
*****************************************
*
       00002D00  IOTRACE  EQU     *
002D00 47F85000           LEA     $5000,A3         POINT TO BUFFER AREA
002D04 26F86030           MOVE.L  PSW,(A3)+
002D08 26F86034           MOVE.L  PSW+4,(A3)+
002D0C 26F86002           MOVE.L  PC,(A3)+
002D10 26C9               MOVE.L  A1,(A3)+
002D12 26F86102           MOVE.L  EXT_INT_PND,(A3)+   (ALSO IO_INT_PND)
002D16 287C80000040       MOVEA.L #ACSW,A4
002D1C 26D4               MOVE.L  (A4),(A3)+
002D1E 26EC0008           MOVE.L  8(A4),(A3)+
002D22 36F8601A           MOVE.W  INSTSAVE,(A3)+
002D26 36F86038           MOVE.W  PUSTAT,(A3)+
002D2A 36F860E2           MOVE.W  IOMASK,(A3)+
002D2E 4E75               RTS
       00002E00           ORG     $2E00
002E00 00000000           DC.L    0,0,0,0,0,0,0,0,0,0,0,0,0,0,0,0
002E04 00000000
002E08 00000000
002E0C 00000000
002E10 00000000
002E14 00000000
002E18 00000000
002E1C 00000000
002E20 00000000
002E24 00000000
002E28 00000000
002E2C 00000000
002E30 00000000
002E34 00000000
002E38 00000000
002E3C 00000000
002E40 00000000           DC.L    0,0,0,0,0,0,0,0,0,0,0,0,0,0,0,0
002E44 00000000
002E48 00000000
002E4C 00000000
002E50 00000000
002E54 00000000
002E58 00000000
002E5C 00000000
002E60 00000000
002E64 00000000
002E68 00000000
002E6C 00000000
002E70 00000000
002E74 00000000
002E78 00000000
002E7C 00000000
002E80 00000000           DC.L    0,0,0,0,0,0,0,0,0,0,0,0,0,0,0,0
```

```
002E84 00000000
002E88 00000000
002E8C 00000000
002E90 00000000
002E94 00000000
002E98 00000000
002E9C 00000000
002EA0 00000000
002EA4 00000000
002EA8 00000000
002EAC 00000000
002EB0 00000000
002EB4 00000000
002EB8 00000000
002EBC 00000000
002EC0 00000000              DC.L    0,0,0,0,0,0,0,0,0,0,0,0,0,0,0,0
002EC4 00000000
002EC8 00000000
002ECC 00000000
002ED0 00000000
002ED4 00000000
       00002F40              ORG     $2F40
************************************************************
*                                                          *
*       ENTRY POINTS FOR SIO/DEBUG CODE TO RETURN TO ECODE *
*                                                          *
************************************************************
002F40 4EF82328   RTN_PREX JMP    PRIVEX        GO TO PRIVILEDGED OP EXCEPTION
002F44 4EF82476   RTN_FPSW JMP    FETCHPSW      GO TO FETCH PSW
002F48 4EF81810   RTN_EXTI JMP    EXT_INTR      GO TO EXTERNAL INTERRUPT
002F4C 4EF81B72   RTN_HSTP JMP    HARDSTOP      GO TO ERROR HARD STOP
002F50 4EF81ED6   RTN_NIO  JMP    IENDNIO       GO TO IO2 IN IO INTERRUPT
002F54 4EF81A1A   RTN_INTR JMP    IO_INTR       GO TO IO INTERRUPT
002F58 4EF81EF6   RTN_LPSW JMP    IENDINT       GO TO LOAD NEW PSW AND END
002F5C 4EF818E6   RTN_WAIT JMP    WAIT_LP       GO TO WAIT LOOP
002F60 4EF81BB0   RTN_MNOP JMP    MANOPFET      GO TO MANOP FETCH
002F64 4EF81BE4   RTN_ATTN JMP    ATTN_RTN      GO TO MANOPS RETURN
002F68 4EF81DE4   RTN_INPC JMP    INTR_PC       GO TO INTR_PC
002ED8 00000000
002EDC 00000000
002EE0 00000000
002EE4 00000000
002EE8 00000000
002EEC 00000000
002EF0 00000000
002EF4 00000000
002EF8 00000000
002EFC 00000000
************************************************************
*                                                          *
*       INTERFACE AREA TO/FROM CODE WHICH IS ASSOCIATED WITH *
*       THE DEBUG CARD OR SIO/TIO EMULATION. THE SIO/TIO EMULATION *
*       MAY BE TO EITHER PCIO OR TO A CHANNEL EMULATOR VIA THE *
*       PC ACIA. THIS CODE IS DESIGNED TO PROVIDE HOOKS TO THE *
*       CODE AND TO PROVIDE FIXED RETURN PATHS FROM THE CODE. *
*       IF THE DEBUG CARD OR SIO/TIO EMULATION IS PRESENT, THE HOOKS *
*       WILL BE OVERLAYED TO ALLOW ACCESS TO THE APPROPRIATE CODE. *
*                                                          *
************************************************************
       00002F00              ORG     $2F00
       00002F00   IPLOTST  EQU    *
002F00 4EF8190A              JMP    IPLO_ERR      RETURN FOR NO DEBUG CARD
*
*------------------------------------------------------------
*                                                          *
*       THE FOLLOWING INSTRUCTION WILL OVERLAY '2F00' WHEN THE *
*       DEBUG CARD CODE IS PRESENT.                        *
*                                                          *
*                    JMP    DEBUGINT      GO TO DEBUG CODE FOR EXT/ACIA *
*                                                          *
*------------------------------------------------------------
*
```

```
      00002F08              ORG     $2F08
      00002F08    IPL2TST    EQU     *
002F08 4EF81952              JMP     IPL2_ERR         RETURN FOR NO DEBUG CARD
                  *
                  *------------------------------------------------------------
                  *                                                           *
                  *    THE FOLLOWING INSTRUCTION WILL OVERLAY '2F08' WHEN THE *
                  *    DEBUG CARD CODE IS PRESENT.                            *
                  *                                                           *
                  *         JMP     DEBUGI2          GO TO DEBUG CODE FOR A/D REQUEST *
                  *                                                           *
                  *------------------------------------------------------------
                  *
      00002F10              ORG     $2F10
      00002F10    AD_CALL    EQU     *
002F10 4E75                  RTS     *                RETURN FOR NO DEBUG CARD
                  *
                  *------------------------------------------------------------
                  *                                                           *
                  *    THE FOLLOWING INSTRUCTION WILL OVERLAY '2F10' WHEN THE *
                  *    DEBUG CARD CODE IS PRESENT.                            *
                  *                                                           *
                  *         JMP     DEBUGAD          GO TO DEBUG CODE FOR A/D CALL *
                  *                                                           *
                  *------------------------------------------------------------
                  *
      00002F18              ORG     $2F18
      00002F18    RST_CALL   EQU     *
002F18 4E75                  RTS     *                RETURN FOR NO SIO/DEBUG CODE
                  *
                  *------------------------------------------------------------
                  *                                                           *
                  *    THE FOLLOWING INSTRUCTION WILL OVERLAY '2F18' WHEN THE *
                  *    SIO CODE OR DEBUG CARD IS PRESENT.                     *
                  *                                                           *
                  *         JMP     DEBUGRST         GO TO SIO/DEBUG CODE FOR RESET *
                  *                                                           *
                  *------------------------------------------------------------
                  *
      00002F20              ORG     $2F20
      00002F20    INTTEST    EQU     *
002F20 4E75                  RTS     *                RETURN FOR NO SIO CODE
                  *
                  *------------------------------------------------------------
                  *                                                           *
                  *    THE FOLLOWING INSTRUCTION WILL OVERLAY '2F20' WHEN THE *
                  *    SIO CODE IS PRESENT.                                   *
                  *                                                           *
                  *         JMP     INTTEST          GO TO SIO CODE FOR INTERRUPT TEST *
                  *                                                           *
                  *------------------------------------------------------------
                  *
      00002F28              ORG     $2F28
      00002F28    SET_ATTN   EQU     *
002F28 4EB81FBA              JSR     LOADPAT          INITIALIZE PAT (VIRTUAL = REAL)
002F2C 4EF81BFA              JMP     NO_CMD           RETURN FOR NO SIO CODE
                  *
                  *------------------------------------------------------------
                  *                                                           *
                  *    THE FOLLOWING INSTRUCTION WILL OVERLAY '2F2C' WHEN THE *
                  *    SIO CODE IS PRESENT.                                   *
                  *                                                           *
                  *         JMP     SET_ATTN         GO TO SIO CODE TO SET ATTENTION *
                  *                                                           *
                  *------------------------------------------------------------
                  *
      00002F30              ORG     $2F30
      00002F30    TMR_SIO    EQU     *
002F30 4E75                  RTS     *                RETURN FOR NO SIO CODE
                  *
                  *------------------------------------------------------------
                  *                                                           *
                  *    THE FOLLOWING INSTRUCTION WILL OVERLAY '2F30' WHEN THE *
                  *    SIO CODE IS PRESENT.                                   *
                  *                                                           *
                  *         JMP     TMR_SIO          GO TO TEST ASYNCH TIMER INTERRUPT *
                  *                                                           *
                  *------------------------------------------------------------
```

```
          00002F40                    ORG      $2F40
*****************************************************************************
*                                                                           *
*            ENTRY POINTS FOR SIO/DEBUG CODE TO RETURN TO ECODE             *
*                                                                           *
*****************************************************************************
*
002F40 4EF82328    RTN_PREX JMP   PRIVEX        GO TO PRIVILEDGED OP EXCEPTION
002F44 4EF82476    RTN_FPSW JMP   FETCHPSW      GO TO FETCH PSW
002F48 4EF81810    RTN_EXTI JMP   EXT_INTR      GO TO EXTERNAL INTERRUPT
002F4C 4EF81B72    RTN_HSTP JMP   HARDSTOP      GO TO ERROR HARD STOP
002F50 4EF81ED6    RTN_NIO  JMP   IENDNIO       GO TO IO2 IN IO INTERRUPT
002F54 4EF81A1A    RTN_INTR JMP   IO_INTR       GO TO IO INTERRUPT
002F58 4EF81EF6    RTN_LPSW JMP   IENDINT       GO TO LOAD NEW PSW AND END
002F5C 4EF818E6    RTN_WAIT JMP   WAIT_LP       GO TO WAIT LOOP
002F60 4EF81BB0    RTN_MNOP JMP   MANOPFET      GO TO MANOP FETCH
002F64 4EF81BE4    RTN_ATTN JMP   ATTN_RTN      GO TO MANOPS RETURN
002F68 4EF81DE4    RTN_INPC JMP   INTR_PC       GO TO INTR_PC

*****************************************************************************
*                                                                           *
*      THE OP TABLE IS A BRANCH ADDRESS TABLE USED TO ACCESS THE            *
*      APPROPRIATE ROUTINE WHEN CONTROL IS SWITCHED FROM THE                *
*      A-ENGINE TO THE E-ENGINE. A BYTE IN THE OBATCH REG IS USED           *
*      TO INDEX INTO THE TABLE. THE BYTE MAY INDICATE THE 370               *
*      INSTRUCTION WHICH MUST BE EMULATED IN THE E-ENGINE. IT MAY           *
*      ALSO BE AN EXCEPTION CODE WHICH INDICATES VARIOUS ERROR OR           *
*      CONTROL CONDITIONS WHICH MUST BE PROCESSED IN THE E-ENGINE.          *
*      MANY OF THE EXCEPTION CODES USED ARE FOR 370 INSTRUCTIONS            *
*      WHICH ARE EXECUTED WHOLLY IN THE A-ENGINE. THE TABLE WILL            *
*      INDICATE THE EXECUTION ENGINE. ANY CODE WHICH IS PROCESSED           *
*      IN THE A-ENGINE AND DOES NOT HAVE AN EXCEPTION FUNCTION              *
*      ASSIGNED WILL SET AN ERROR REFERENCE CODE.                           *
*                                                                           *
*****************************************************************************
          00003C00                    ORG      OPTABLE
                              *
003C00 1B14                    DC     INVOP       INVALID IN A-ENGINE          00  A
003C02 1B14                    DC     INVOP       INVALID IN A-ENGINE          01  A
003C04 1B14                    DC     INVOP       INVALID IN A-ENGINE          02  A
003C06 1B14                    DC     INVOP       INVALID IN A-ENGINE          03  A
003C08 0F7E                    DC     SPM         SET PROGRAM MASK      SPM    04  E
003C0A 1B14                    DC     INVOP       BRANCH AND LINK       BALR   05  A
003C0C 1B14                    DC     INVOP       BRANCH ON COUNT       BCTR   06  A
003C0E 1B14                    DC     INVOP       BRANCH ON CONDITION   BCR    07  A
003C10 0FFA                    DC     SSK         SET STORAGE KEY       SSK    08  E
003C12 09A0                    DC     ISK         INSERT STORAGE KEY    ISK    09  E
003C14 131E                    DC     SVC         SUPERVISOR CALL       SVC    0A  E
003C16 1B14                    DC     INVOP       INVALID IN A-ENGINE          0B  A
003C18 1B14                    DC     INVOP       INVALID IN A-ENGINE          0C  A
003C1A 1B14                    DC     INVOP       INVALID IN A-ENGINE   BASR   0D  A
003C1C 0C64                    DC     MVCL        MOVE LONG             MVCL   0E  E
003C1E 03FA                    DC     CLCL        COMPARE LOGICAL LONG  CLCL   0F  E
                              *
003C20 1B14                    DC     INVOP       LOAD POSITIVE         LPR    10  A
003C22 1B14                    DC     INVOP       LOAD NEGATIVE         LNR    11  A
003C24 1B14                    DC     INVOP       LOAD AND TEST         LTR    12  A
003C26 1B14                    DC     INVOP       LOAD COMPLEMENT       LCR    13  A
003C28 1B14                    DC     INVOP       AND                   NR     14  A
003C2A 1B14                    DC     INVOP       COMPARE LOGICAL       CLR    15  A
003C2C 1B14                    DC     INVOP       OR                    OR     16  A
003C2E 1B14                    DC     INVOP       EXCLUSIVE OR          XR     17  A
003C30 1B14                    DC     INVOP       LOAD                  LR     18  A
003C32 1B14                    DC     INVOP       COMPARE               CR     19  A
003C34 1B14                    DC     INVOP       ADD                   AR     1A  A
003C36 1B14                    DC     INVOP       SUBTRACT              SR     1B  A
003C38 1B14                    DC     INVOP       MULTIPLY              MR     1C  A
003C3A 1B14                    DC     INVOP       DIVIDE                DR     1D  A
003C3C 1B14                    DC     INVOP       ADD LOGICAL           ALR    1E  A
003C3E 1B14                    DC     INVOP       SUBTRACT LOGICAL      SLR    1F  A
003C40 1B14                    DC     INVOP       LOAD POSITIVE         LPDR   20  A
003C42 1B14                    DC     INVOP       LOAD NEGATIVE         LNDR   21  A
003C44 1B14                    DC     INVOP       LOAD AND TEST         LTDR   22  A
003C46 1B14                    DC     INVOP       LOAD COMPLEMENT       LCDR   23  A
003C48 1B14                    DC     INVOP       HALVE                 HDR    24  A
003C4A 147A                    DC     LRDR        LOAD ROUNDED          LRDR   25  E
003C4C 147A                    DC     MXR         MULTIPLY              MXR    26  E
```

| | | | | | | | |
|---|---|---|---|---|---|---|---|
| 003C4E 147A | | DC | MXDR | MULTIPLY | MXDR | 27 | E |
| 003C50 1B14 | | DC | INVOP | LOAD | LDR | 28 | A |
| 003C52 1B14 | | DC | INVOP | COMPARE | CDR | 29 | A |
| 003C54 1B14 | | DC | INVOP | ADD NORMALIZED | ADR | 2A | A |
| 003C56 1B14 | | DC | INVOP | SUBTRACT NORMALIZED | SDR | 2B | A |
| 003C58 1B14 | | DC | INVOP | MULTIPLY | MDR | 2C | A |
| 003C5A 1B14 | | DC | INVOP | DIVIDE | DDR | 2D | A |
| 003C5C 1B14 | | DC | INVOP | ADD UNNORMALIZED | AWR | 2E | A |
| 003C5E 1B14 | | DC | INVOP | SUBTRACT UNNORMALIZED | SWR | 2F | A |
| | * | | | | | | |
| 003C60 1B14 | | DC | INVOP | LOAD POSITIVE | LPER | 30 | A |
| 003C62 1B14 | | DC | INVOP | LOAD NEGATIVE | LNER | 31 | A |
| 003C64 1B14 | | DC | INVOP | LOAD AND TEST | LTER | 32 | A |
| 003C66 1B14 | | DC | INVOP | LOAD COMPLEMENT | LCER | 33 | A |
| 003C68 1B14 | | DC | INVOP | HALVE | HER | 34 | A |
| 003C6A 147A | | DC | LRER | LOAD ROUNDED | LRER | 35 | E |
| 003C6C 147A | | DC | AXR | ADD NORMALIZED | AXR | 36 | E |
| 003C6E 147A | | DC | SXR | SUBTRACT NORMALIZED | SXR | 37 | E |
| 003C70 1B14 | | DC | INVOP | LOAD | LER | 38 | A |
| 003C72 1B14 | | DC | INVOP | COMPARE | CER | 39 | A |
| 003C74 1B14 | | DC | INVOP | ADD NORMALIZED | AER | 3A | A |
| 003C76 1B14 | | DC | INVOP | SUBTRACT NORMALIZED | SER | 3B | A |
| 003C78 1B14 | | DC | INVOP | MULTIPLY | MER | 3C | A |
| 003C7A 1B14 | | DC | INVOP | DIVIDE | DER | 3D | A |
| 003C7C 1B14 | | DC | INVOP | ADD UNNORMALIZED | AUR | 3E | A |
| 003C7E 1B14 | | DC | INVOP | SUBTRACT UNNORMALIZED | SUR | 3F | A |
| 003C80 1B14 | | DC | INVOP | STORE HALFWORD | STH | 40 | A |
| 003C82 1B14 | | DC | INVOP | LOAD ADDRESS | LA | 41 | A |
| 003C84 1B14 | | DC | INVOP | STORE CHARACTER | STC | 42 | A |
| 003C86 1B14 | | DC | INVOP | INSERT CHARACTER | IC | 43 | A |
| 003C88 07A2 | | DC | EX | EXECUTE | EX | 44 | E |
| | * | | | BRANCH AND LINK | BAL | 45 | A |
| 003C8A 1512 | | DC | BUSERRET | BUS ERROR DURING CLCL/MVCL | | 45 | X |
| 003C8C 1B14 | | DC | INVOP | BRANCH ON COUNT | BCT | 46 | A |
| 003C8E 1B14 | | DC | INVOP | BRANCH ON CONDITION | BC | 47 | A |
| 003C90 1B14 | | DC | INVOP | LOAD HALFWORD | LH | 48 | A |
| | * | | | COMPARE HALFWORD | CH | 49 | A |
| 003C92 2392 | | DC | FIXPTDIV | FIXED POINT DIVIDE EXCEPTION | | 49 | X |
| | * | | | ADD HALFWORD | AH | 4A | A |
| 003C94 2396 | | DC | DECOVFX2 | DECIMAL OVERFLOW EXCEPTION | | 4A | X |
| 003C96 1B14 | | DC | INVOP | SUBTRACT HALFWORD | SH | 4B | A |
| | * | | | MULTIPLY HALFWORD | MH | 4C | A |
| 003C98 23A8 | | DC | EXPOVFX2 | EXPONENT OVERFLOW EXCEPTION | | 4C | X |
| 003C9A 1B14 | | DC | INVOP | INVALID IN A-ENGINE | BAS | 4D | A |
| 003C9C 147A | | DC | CVD | CONVERT TO DECIMAL | CVD | 4E | E |
| 003C9E 147A | | DC | CVB | CONVERT TO BINARY | CVB | 4F | E |
| | * | | | | | | |
| 003CA0 1B14 | | DC | INVOP | STORE | ST | 50 | A |
| 003CA2 1B14 | | DC | INVOP | INVALID IN A-ENGINE | | 51 | A |
| 003CA4 1B14 | | DC | INVOP | INVALID IN A-ENGINE | | 52 | A |
| 003CA6 1B14 | | DC | INVOP | INVALID IN A-ENGINE | | 53 | A |
| 003CA8 1B14 | | DC | INVOP | AND | N | 54 | A |
| 003CAA 1B14 | | DC | INVOP | COMPARE LOGICAL | CL | 55 | A |
| 003CAC 1B14 | | DC | INVOP | OR | O | 56 | A |
| 003CAE 1B14 | | DC | INVOP | EXCLUSIVE OR | X | 57 | A |
| 003CB0 1B14 | | DC | INVOP | LOAD | L | 58 | A |
| 003CB2 1B14 | | DC | INVOP | COMPARE | C | 59 | A |
| 003CB4 1B14 | | DC | INVOP | ADD | A | 5A | A |
| 003CB6 1B14 | | DC | INVOP | SUBTRACT | S | 5B | A |
| 003CB8 1B14 | | DC | INVOP | MULTIPLY | M | 5C | A |
| | * | | | DIVIDE | D | 5D | A |
| 003CBA 23B0 | | DC | EXPUNDX2 | EXPONENT UNDERFLOW EXCEPTION | | 5D | X |
| | * | | | ADD LOGICAL | AL | 5E | A |
| 003CBC 23BE | | DC | SIGNIFX2 | SIGNIFICANCE EXCEPTION | | 5E | X |
| 003CBE 1B14 | | DC | INVOP | SUBTRACT LOGICAL | SL | 5F | A |
| 003CC0 1B14 | | DC | INVOP | STORE | STD | 60 | A |
| 003CC2 1B14 | | DC | INVOP | INVALID IN A-ENGINE | | 61 | A |
| 003CC4 1B14 | | DC | INVOP | INVALID IN A-ENGINE | | 62 | A |
| 003CC6 1B14 | | DC | INVOP | INVALID IN A-ENGINE | | 63 | A |
| 003CC8 1B14 | | DC | INVOP | INVALID IN A-ENGINE | | 64 | A |
| 003CCA 1B14 | | DC | INVOP | INVALID IN A-ENGINE | | 65 | A |
| 003CCC 1B14 | | DC | INVOP | INVALID IN A-ENGINE | | 66 | A |
| 003CCE 147A | | DC | MXD | MULTIPLY | MXD | 67 | E |
| 003CD0 1B14 | | DC | INVOP | LOAD | LD | 68 | A |
| 003CD2 1B14 | | DC | INVOP | COMPARE | CD | 69 | A |
| 003CD4 1B14 | | DC | INVOP | ADD NORMALIZED | AD | 6A | A |

| | | | | | | | |
|---|---|---|---|---|---|---|---|
| 003CD6 1B14 | DC | INVOP | SUBTRACT NORMALIZED | SD | 6B | A |
| 003CD8 1B14 | DC | INVOP | MULTIPLY | MD | 6C | A |
| 003CDA 1B14 | DC | INVOP | DIVIDE | DD | 6D | A |
| 003CDC 1B14 | DC | INVOP | ADD UNNORMALIZED | AW | 6E | A |
| 003CDE 1B14 | DC | INVOP | SUBTRACT UNNORMALIZED | SW | 6F | A |
| * | | | | | | |
| 003CE0 1B14 | DC | INVOP | STORE | STE | 70 | A |
| 003CE2 1B14 | DC | INVOP | INVALID IN A-ENGINE | | 71 | A |
| 003CE4 1B14 | DC | INVOP | INVALID IN A-ENGINE | | 72 | A |
| 003CE6 1B14 | DC | INVOP | INVALID IN A-ENGINE | | 73 | A |
| 003CE8 1B14 | DC | INVOP | INVALID IN A-ENGINE | | 74 | A |
| 003CEA 1B14 | DC | INVOP | INVALID IN A-ENGINE | | 75 | A |
| 003CEC 1B14 | DC | INVOP | INVALID IN A-ENGINE | | 76 | A |
| 003CEE 1B14 | DC | INVOP | INVALID IN A-ENGINE | | 77 | A |
| 003CF0 1B14 | DC | INVOP | LOAD | LE | 78 | A |
| 003CF2 1B14 | DC | INVOP | COMPARE | CE | 79 | A |
| 003CF4 1B14 | DC | INVOP | ADD NORMALIZED | AE | 7A | A |
| 003CF6 1B14 | DC | INVOP | SUBTRACT NORMALIZED | SE | 7B | A |
| 003CF8 1B14 | DC | INVOP | MULTIPLY | ME | 7C | A |
| 003CFA 1B14 | DC | INVOP | DIVIDE | DE | 7D | A |
| 003CFC 1B14 | DC | INVOP | ADD UNNORMALIZED | AU | 7E | A |
| 003CFE 1B14 | DC | INVOP | SUBTRACT UNNORMALIZED | SU | 7F | A |
| * | | | | | | |
| 003D00 105C | DC | SSM | SET SYSTEM MASK | SSM | 80 | E |
| 003D02 1B14 | DC | INVOP | INVALID IN A-ENGINE | | 81 | A |
| 003D04 0A8A | DC | LPSW | LOAD PSW | LPSW | 82 | E |
| 003D06 062A | DC | DIAG | DIAGNOSE | | 83 | E |
| 003D08 2324 | DC | OPEXCP1 | INVALID IN E-ENGINE | WRD | 84 | E |
| 003D0A 2324 | DC | OPEXCP1 | INVALID IN E-ENGINE | RDD | 85 | E |
| 003D0C 1B14 | DC | INVOP | BRANCH ON INDEX HI | BXH | 86 | A |
| 003D0E 1B14 | DC | INVOP | BRANCH ON INDEX LO/EQ | BXLE | 87 | A |
| 003D10 1B14 | DC | INVOP | SHIFT RIGHT SNGL LOG | SRL | 88 | A |
| 003D12 1B14 | DC | INVOP | SHIFT LEFT SNGL LOG | SLL | 89 | A |
| 003D14 1B14 | DC | INVOP | SHIFT RIGHT SINGLE | SRA | 8A | A |
| 003D16 1B14 | DC | INVOP | SHIFT LEFT SINGLE | SLA | 8B | A |
| 003D18 1B14 | DC | INVOP | SHIFT RIGHT DBL LOG | SRDL | 8C | A |
| 003D1A 1B14 | DC | INVOP | SHIFT LEFT DBL LOG | SLDL | 8D | A |
| 003D1C 1B14 | DC | INVOP | SHIFT RIGHT DOUBLE | SRDA | 8E | A |
| 003D1E 1B14 | DC | INVOP | SHIFT LEFT DOUBLE | SLDA | 8F | A |
| 003D20 1B14 | DC | INVOP | STORE MULTIPLE | STM | 90 | A |
| 003D22 1B14 | DC | INVOP | TEST UNDER MASK | TM | 91 | A |
| 003D24 1B14 | DC | INVOP | MOVE IMMEDIATE | MVI | 92 | A |
| 003D26 13A0 | DC | TS | TEST AND SET | TS | 93 | E |
| 003D28 1B14 | DC | INVOP | AND IMMEDIATE | NI | 94 | A |
| 003D2A 1B14 | DC | INVOP | COMPARE LOGICAL IMMED | CLI | 95 | A |
| * | | | OR IMMEDIATE | OI | 96 | A |
| 003D2C 237C | DC | SPECEX | SPECIFICATION EXCEPTION | | 96 | X |
| 003D2E 1B14 | DC | INVOP | EXCLUSIVE OR IMMED | XI | 97 | A |
| 003D30 1B14 | DC | INVOP | LOAD MULTIPLE | LM | 98 | A |
| 003D32 1B14 | DC | INVOP | INVALID IN A-ENGINE | | 99 | A |
| 003D34 1B14 | DC | INVOP | INVALID IN A-ENGINE | | 9A | A |
| 003D36 1B14 | DC | INVOP | INVALID IN A-ENGINE | | 9B | A |
| 003D38 146C | DC | SIOSIOF | START I/O | SIO | 9C00 | E |
| * | | | START I/O FAST RELEASE | SIOF | 9C01 | E |
| * | | | RESUME I/O | RIO | 9C02 | E |
| 003D3A 146C | DC | TIOCLRIO | TEST I/O | TIO | 9D00 | E |
| * | | | CLEAR I/O | CLRIO | 9D01 | E |
| 003D3C 146C | DC | HIOHDV | HALT I/O | HIO | 9E00 | E |
| * | | | HALT DEVICE | HDV | 9E01 | E |
| 003D3E 146C | DC | TCHCLRCH | TEST CHANNEL | TCH | 9F00 | E |
| * | | | CLEAR CHANNEL | CLRCH | 9F01 | E |
| * | | | | | | |
| * | | | INVALID IN A-ENGINE | | A0 | A |
| 003D40 2330 | DC | ACCESSX1 | A-ENGINE IFETCH1 ACCESS ERROR | | A0 | X |
| * | | | INVALID IN A-ENGINE | | A1 | A |
| 003D42 1540 | DC | BUSERRA1 | A-ENGINE IFETCH2 ACCESS ERROR | | A1 | X |
| * | | | INVALID IN A-ENGINE | | A2 | A |
| 003D44 1550 | DC | BUSERRA2 | A-ENGINE PRIV/OPER ACC ERROR | | A2 | X |
| * | | | INVALID IN A-ENGINE | | A3 | A |
| 003D46 2764 | DC | TRACERET | PSR TRACE ACTIVE | | A3 | X |
| * | | | INVALID IN A-ENGINE | | A4 | A |
| 003D48 18B6 | DC | INTERUPT | INTERRUPT DETECTED | | A4 | X |
| * | | | INVALID IN A-ENGINE | | A5 | A |
| 003D4A 1B14 | DC | INVOP | ERRONEOUS A-ENGINE RESET RTN | | A5 | X |
| * | | | INVALID IN A-ENGINE | | A6 | A |
| 003D4C 1A4A | DC | A_ENG_MC | A-ENGINE MICROCODE BR ERROR | | A6 | X |

|          |      |    |          |                              |       |     |   |
|----------|------|----|----------|------------------------------|-------|-----|---|
|          |      |    |          | INVALID IN A-ENGINE          |       | A7  | A |
| 003D4E   | 1516 | DC | BUSERRA7 | BUS ERROR, DEC OR FLT PT     |       | A7  | X |
| 003D50   | 1B14 | DC | INVOP    | INVALID IN A-ENGINE          |       | A8  | A |
| 003D52   | 1B14 | DC | INVOP    | INVALID IN A-ENGINE          |       | A9  | A |
| 003D54   | 1B14 | DC | INVOP    | INVALID IN A-ENGINE          |       | AA  | A |
| 003D56   | 1B14 | DC | INVOP    | INVALID IN A-ENGINE          |       | AB  | A |
| 003D58   | 1298 | DC | STNSM    | STORE/AND SYS MASK           | STNSM | AC  | E |
| 003D5A   | 12BC | DC | STOSM    | STORE/OR SYS MASK            | STOSM | AD  | E |
| 003D5C   | 2324 | DC | OPEXCP1  | INVALID IN E-ENGINE          | SIGP  | AE  | E |
| 003D5E   | 0BFA | DC | MC       | MONITOR CALL                 | MC    | AF  | E |
| 003D60   | 1B14 | DC | INVOP    | INVALID IN A-ENGINE          |       | B0  | A |
| 003D62   | 0AB8 | DC | LRA      | LOAD REAL ADDRESS            | LRA   | B1  | E |
| 003D64   | 027E | DC | B2OPS    | B2 OPS SUB-TABLE             |       | B2  | E |

*
*   ALL SHOWN IN B2 OPERATION TABLE
*

|          |      |    |          |                              |       |     |   |
|----------|------|----|----------|------------------------------|-------|-----|---|
| 003D66   | 1B14 | DC | INVOP    | INVALID IN A-ENGINE          |       | B3  | A |
| 003D68   | 1B14 | DC | INVOP    | INVALID IN A-ENGINE          |       | B4  | A |
| 003D6A   | 1B14 | DC | INVOP    | INVALID IN A-ENGINE          |       | B5  | A |
| 003D6C   | 11F2 | DC | STCTL    | STORE CONTROL                | STCTL | B6  | E |
| 003D6E   | 0A06 | DC | LCTL     | LOAD CONTROL                 | LCTL  | B7  | E |
| 003D70   | 1B14 | DC | INVOP    | INVALID IN A-ENGINE          |       | B8  | A |
| 003D72   | 1B14 | DC | INVOP    | INVALID IN A-ENGINE          |       | B9  | A |
| 003D74   | 02D4 | DC | CS       | COMPARE AND SWAP             | CS    | BA  | E |
| 003D76   | 030C | DC | CDS      | COMPARE DBL AND SWAP         | CDS   | BB  | E |
| 003D78   | 1B14 | DC | INVOP    | INVALID IN A-ENGINE          |       | BC  | A |
| 003D7A   | 036C | DC | CLM      | COMPARE LOGICAL CHARS        | CLM   | BD  | E |
| 003D7C   | 114C | DC | STCM     | STORE CHARS UNDER MASK       | STCM  | BE  | E |
| 003D7E   | 088E | DC | ICM      | INSERT CHAR UNDER MASK       | ICM   | BF  | E |

*
*          INVALID IN A-ENGINE                             C0  A
003D80 0200    DC    RETURN    E-ENGINE HAD ABORT/ PSW SWAP      C0  X
*          INVALID IN A-ENGINE                             C1  A
003D82 2312    DC    OPEXCP    OPERATION EXCEPTION               C1  X
003D84 1B14    DC    INVOP     INVALID IN A-ENGINE               C2  A
003D86 1B14    DC    INVOP     INVALID IN A-ENGINE               C3  A
003D88 1B14    DC    INVOP     INVALID IN A-ENGINE               C4  A
003D8A 1B14    DC    INVOP     INVALID IN A-ENGINE               C5  A
*          INVALID IN A-ENGINE                             C6  A
003D8C 2360    DC    SPECEXC   SPECIFICATION EXCEPTION           C6  X
*          INVALID IN A-ENGINE                             C7  A
003D8E 2380    DC    DATAEX    DATA EXCEPTION                    C7  X
*          INVALID IN A-ENGINE                             C8  A
003D90 2384    DC    FIXPTOVF  FIXED-POINT OVERFLOW              C8  X
*          INVALID IN A -ENGINE                            C9  A
003D92 2392    DC    FIXPTDIV  FIXED-POINT DIVIDE EXCEPTION      C9  X
003D94 1B14    DC    INVOP     INVALID IN A-ENGINE               CA  A
*          INVALID IN A-ENGINE                             CB  A
003D96 23A4    DC    DECDIVEX  DECIMAL DIVIDE EXCEPTION          CB  X
*          INVALID IN A_ENGINE                             CC  A
003D98 23AC    DC    EXPOVFEX  EXPONENT OVERFLOW                 CC  X
*          INVALID IN A-ENGINE                             CD  A
003D9A 23B4    DC    EXPUNDEX  EXPONENT UNDERFLOW                CD  X
*          INVALID IN A-ENGINE                             CE  A
003D9C 23C2    DC    SIGNIFEX  SIGNIFICANCE EXCEPTION            CE  X
003D9E 1B14    DC    INVOP     INVALID IN A-ENGINE               CF  A

|          |      |    |          |                              |       |     |   |
|----------|------|----|----------|------------------------------|-------|-----|---|
| 003DA0   | 1B14 | DC | INVOP    | INVALID IN A-ENGINE          |       | D0  | A |
| 003DA2   | 1B14 | DC | INVOP    | MOVE NUMERICS                | MVN   | D1  | A |
| 003DA4   | 1B14 | DC | INVOP    | MOVE CHARACTER               | MVC   | D2  | A |
| 003DA6   | 1B14 | DC | INVOP    | MOVE ZONES                   | MVZ   | D3  | A |
| 003DA8   | 1B14 | DC | INVOP    | AND CHARACTER                | NC    | D4  | A |
| 003DAA   | 1B14 | DC | INVOP    | COMPARE LOGICAL CHAR         | CLC   | D5  | A |
| 003DAC   | 1B14 | DC | INVOP    | OR CHARACTER                 | OC    | D6  | A |
| 003DAE   | 1B14 | DC | INVOP    | EXCLUSIVE OR CHAR            | XC    | D7  | A |
| 003DB0   | 1B14 | DC | INVOP    | INVALID IN A-ENGINE          |       | D8  | A |
| 003DB2   | 1B14 | DC | INVOP    | INVALID IN A-ENGINE          | MVCK  | D9  | A |
| 003DB4   | 1B14 | DC | INVOP    | INVALID IN A-ENGINE          | MVCP  | DA  | A |
| 003DB6   | 1B14 | DC | INVOP    | INVALID IN A-ENGINE          | MVCS  | DB  | A |
| 003DB8   | 13C2 | DC | TR       | TRANSLATE                    | TR    | DC  | E |
| 003DBA   | 141C | DC | TRT      | TRANSLATE AND TEST           | TRT   | DD  | E |
| 003DBC   | 0698 | DC | ED       | EDIT                         | ED    | DE  | E |
| 003DBE   | 0698 | DC | EDMK     | EDIT AND MARK                | EDMK  | DF  | E |

*
|          |      |    |          |                              |     |   |
|----------|------|----|----------|------------------------------|-----|---|
| 003DC0   | 1B14 | DC | INVOP    | INVALID IN A-ENGINE          | E0  | A |
| 003DC2   | 1B14 | DC | INVOP    | INVALID IN A-ENGINE          | E1  | A |
| 003DC4   | 1B14 | DC | INVOP    | INVALID IN A-ENGINE          | E2  | A |
| 003DC6   | 1B14 | DC | INVOP    | INVALID IN A-ENGINE          | F3  | A |

```
003DC8 1B14           DC    INVOP      INVALID IN A-ENGINE              E4   A
003DCA 1B14           DC    INVOP      INVALID IN A-ENGINE     LASP     E500 A
       *                               INVALID IN A-ENGINE     TPROT    E501 A
003DCC 1B14           DC    INVOP      INVALID IN A-ENGINE              E6   A
003DCE 1B14           DC    INVOP      INVALID IN A-ENGINE              E7   A
003DD0 0C36           DC    MVCIN      MOVE CHAR INVERSE       MVCIN    E8   E
003DD2 1B14           DC    INVOP      INVALID IN A-ENGINE              E9   A
003DD4 1B14           DC    INVOP      INVALID IN A-ENGINE              EA   A
003DD6 1B14           DC    INVOP      INVALID IN A-ENGINE              EB   A
003DD8 1B14           DC    INVOP      INVALID IN A-ENGINE              EC   A
003DDA 1B14           DC    INVOP      INVALID IN A-ENGINE              ED   A
003DDC 1B14           DC    INVOP      INVALID IN A-ENGINE              EE   A
003DDE 1B14           DC    INVOP      INVALID IN A-ENGINE              EF   A
       *
003DE0 147A           DC    SRP        SHIFT AND ROUND DEC     SRP      F0   E
003DE2 1B14           DC    INVOP      MOVE WITH OFFSET        MVO      F1   A
003DE4 1B14           DC    INVOP      PACK                    PACK     F2   A
003DE6 1B14           DC    INVOP      UNPACK                  UNPK     F3   A
003DE8 1B14           DC    INVOP      INVALID IN A-ENGINE              F4   A
003DEA 1B14           DC    INVOP      INVALID IN A-ENGINE              F5   A
003DEC 1B14           DC    INVOP      INVALID IN A-ENGINE              F6   A
003DEE 1B14           DC    INVOP      INVALID IN A-ENGINE              F7   A
003DF0 147A           DC    ZAP        ZERO AND ADD            ZAP      F8   E
003DF2 147A           DC    CP         COMPARE DECIMAL         CP       F9   E
003DF4 147A           DC    AP         ADD DECIMAL             AP       FA   E
003DF6 147A           DC    SUBDEC     SUBTRACT DECIMAL        SP       FB   E
003DF8 147A           DC    MP         MULTIPLY DECIMAL        MP       FC   E
003DFA 147A           DC    DP         DIVIDE DECIMAL          DP       FD   E
003DFC 1B14           DC    INVOP      INVALID IN A-ENGINE              FE   A
003DFE 1B14           DC    INVOP      INVALID IN A-ENGINE              FF   A

*****************************************************************
*                                                                *
*      FLAGS                                                     *
*  BIT 7 - PC/PSR INVALID (DECIMAL OR FP OP) ON BUS ERROR        *
*      6 - SPECIAL PROCESSING FOR CLCL/MVCL BUS ERRORS           *
*      5 - MACHINE CHECK CONDITION - BUS ERROR DURING EXCEPTION  *
*      4 - INVALID OP FOR E-ENGINE                               *
*      3 - SPARE                                                 *
*      2 - SPARE                                                 *
*      1 - BRANCH INSTRUCTION - SPECIAL EXECUTE/PER HANDLING     *
*      0 - BRANCH INSTRUCTION - SPECIAL EXECUTE/PER HANDLING     *
*                                                                *
*****************************************************************

00003E00       ORG   BETABLE
003E00 10             DC.B  $10        .              00
003E01 10             DC.B  $10        .              01
003E02 10             DC.B  $10        .              02
003E03 10             DC.B  $10        .              03
003E04 00             DC.B  $00        SPM            04
003E05 13             DC.B  $13        BALR           05
003E06 12             DC.B  $12        BCTR           06
003E07 11             DC.B  $11        BCR            07
003E08 00             DC.B  $00        SSK            08
003E09 00             DC.B  $00        ISK            09
003E0A 00             DC.B  $00        SVC            0A
003E0B 10             DC.B  $10        .              0B
003E0C 10             DC.B  $10        .              0C
003E0D 10             DC.B  $10        .              0D
003E0E 40             DC.B  $40        MVCL           0E
003E0F 40             DC.B  $40        CLCL           0F
       *
003E10 10             DC.B  $10        LPR            10
003E11 10             DC.B  $10        LNR            11
003E12 10             DC.B  $10        LTR            12
003E13 10             DC.B  $10        LCR            13
003E14 10             DC.B  $10        NR             14
003E15 10             DC.B  $10        CLR            15
003E16 10             DC.B  $10        OR             16
003E17 10             DC.B  $10        XR             17
003E18 10             DC.B  $10        LR             18
003E19 10             DC.B  $10        CR             19
003E1A 10             DC.B  $10        AR             1A
003E1B 10             DC.B  $10        SR             1B
003E1C 10             DC.B  $10        MR             1C
003E1D 10             DC.B  $10        DR             1D
003E1E 10             DC.B  $10        ALR            1E
003E1F 10             DC.B  $10        SLR            1F
       *
```

| | | | | |
|---|---|---|---|---|
| 003E20 10 | | DC.B | $10 | LPDR 20 |
| 003E21 10 | | DC.B | $10 | LNDR 21 |
| 003E22 10 | | DC.B | $10 | LTDR 22 |
| 003E23 10 | | DC.B | $10 | LCDR 23 |
| 003E24 10 | | DC.B | $10 | HDR 24 |
| 003E25 80 | | DC.B | $80 | LRDR 25 |
| 003E26 80 | | DC.B | $80 | MXR 26 |
| 003E27 80 | | DC.B | $80 | MXDR 27 |
| 003E28 10 | | DC.B | $10 | LDR 28 |
| 003E29 10 | | DC.B | $10 | CDR 29 |
| 003E2A 10 | | DC.B | $10 | ADR 2A |
| 003E2B 10 | | DC.B | $10 | SDR 2B |
| 003E2C 10 | | DC.B | $10 | MDR 2C |
| 003E2D 10 | | DC.B | $10 | DDR 2D |
| 003E2E 10 | | DC.B | $10 | AWR 2E |
| 003E2F 10 | | DC.B | $10 | SWR 2F |
| | * | | | |
| 003E30 10 | | DC.B | $10 | LPER 30 |
| 003E31 10 | | DC.B | $10 | LNER 31 |
| 003E32 10 | | DC.B | $10 | LTER 32 |
| 003E33 10 | | DC.B | $10 | LCER 33 |
| 003E34 10 | | DC.B | $10 | HER 34 |
| 003E35 80 | | DC.B | $80 | LRER 35 |
| 003E36 80 | | DC.B | $80 | AXR 36 |
| 003E37 80 | | DC.B | $80 | SXR 37 |
| 003E38 10 | | DC.B | $10 | LER 38 |
| 003E39 10 | | DC.B | $10 | CER 39 |
| 003E3A 10 | | DC.B | $10 | AER 3A |
| 003E3B 10 | | DC.B | $10 | SER 3B |
| 003E3C 10 | | DC.B | $10 | MER 3C |
| 003E3D 10 | | DC.B | $10 | DER 3D |
| 003E3E 10 | | DC.B | $10 | AUR 3E |
| 003E3F 10 | | DC.B | $10 | SUR 3F |
| | * | | | |
| 003E40 10 | | DC.B | $10 | STH 40 |
| 003E41 10 | | DC.B | $10 | LA 41 |
| 003E42 10 | | DC.B | $10 | STC 42 |
| 003E43 10 | | DC.B | $10 | IC 43 |
| 003E44 00 | | DC.B | $00 | EX 44 |
| 003E45 13 | | DC.B | $13 | BAL 45 |
| 003E46 11 | | DC.B | $11 | BCT 46 |
| 003E47 11 | | DC.B | $11 | BC 47 |
| 003E48 10 | | DC.B | $10 | LH 48 |
| 003E49 30 | | DC.B | $30 | FIXP DIV 49 |
| 003E4A 30 | | DC.B | $30 | DEC OVFLOW 4A |
| 003E4B 10 | | DC.B | $10 | . 4B |
| 003E4C 30 | | DC.B | $30 | EXP OVFLOW 4C |
| 003E4D 10 | | DC.B | $10 | . 4D |
| 003E4E 80 | | DC.B | $80 | CVD 4E |
| 003E4F 80 | | DC.B | $80 | CVB 4F |
| | * | | | |
| | * | | | |
| 003E50 10 | | DC.B | $10 | ST 50 |
| 003E51 10 | | DC.B | $10 | . 51 |
| 003E52 10 | | DC.B | $10 | . 52 |
| 003E53 10 | | DC.B | $10 | . 53 |
| 003E54 10 | | DC.B | $10 | N 54 |
| 003E55 10 | | DC.B | $10 | CL 55 |
| 003E56 10 | | DC.B | $10 | O 56 |
| 003E57 10 | | DC.B | $10 | X 57 |
| 003E58 10 | | DC.B | $10 | L 58 |
| 003E59 10 | | DC.B | $10 | C 59 |
| 003E5A 10 | | DC.B | $10 | A 5A |
| 003E5B 10 | | DC.B | $10 | S 5B |
| 003E5C 10 | | DC.B | $10 | M 5C |
| 003E5D 30 | | DC.B | $30 | EXP UNDFLW 5D |
| 003E5E 30 | | DC.B | $30 | SIGNIF XCP 5E |
| 003E5F 10 | | DC.B | $10 | SL 5F |
| | * | | | |
| 003E60 10 | | DC.B | $10 | STD 60 |
| 003E61 10 | | DC.B | $10 | . 61 |
| 003E62 10 | | DC.B | $10 | . 62 |
| 003E63 10 | | DC.B | $10 | . 63 |
| 003E64 10 | | DC.B | $10 | . 64 |
| 003E65 10 | | DC.B | $10 | . 65 |
| 003E66 10 | | DC.B | $10 | . 66 |
| 003E67 80 | | DC.B | $80 | MXD 67 |

| | | | | |
|---|---|---|---|---|
| 003E68 10 | | DC.B | $10 | LD 68 |
| 003E69 10 | | DC.B | $10 | CD 69 |
| 003E6A 10 | | DC.B | $10 | AD 6A |
| 003E6B 10 | | DC.B | $10 | SD 6B |
| 003E6C 10 | | DC.B | $10 | MD 6C |
| 003E6D 10 | | DC.B | $10 | DD 6D |
| 003E6E 10 | | DC.B | $10 | AW 6E |
| 003E6F 10 | | DC.B | $10 | SW 6F |
| | * | | | |
| 003E70 10 | | DC.B | $10 | STE 70 |
| 003E71 10 | | DC.B | $10 | . 71 |
| 003E72 10 | | DC.B | $10 | . 72 |
| 003E73 10 | | DC.B | $10 | . 73 |
| 003E74 10 | | DC.B | $10 | . 74 |
| 003E75 10 | | DC.B | $10 | . 75 |
| 003E76 10 | | DC.B | $10 | . 76 |
| 003E77 10 | | DC.B | $10 | . 77 |
| 003E78 10 | | DC.B | $10 | LE 78 |
| 003E79 10 | | DC.B | $10 | CE 79 |
| 003E7A 10 | | DC.B | $10 | AE 7A |
| 003E7B 10 | | DC.B | $10 | SE 7B |
| 003E7C 10 | | DC.B | $10 | ME 7C |
| 003E7D 10 | | DC.B | $10 | DE 7D |
| 003E7E 10 | | DC.B | $10 | AU 7E |
| 003E7F 10 | | DC.B | $10 | SU 7F |
| | * | | | |
| 003E80 00 | | DC.B | $00 | SSM 80 |
| 003E81 10 | | DC.B | $10 | . 81 |
| 003E82 00 | | DC.B | $00 | LPSW 82 |
| 003E83 00 | | DC.B | $00 | DIAG 83 |
| 003E84 00 | | DC.B | $00 | WRD 84 |
| 003E85 00 | | DC.B | $00 | RDD 85 |
| 003E86 11 | | DC.B | $11 | BXH 86 |
| 003E87 11 | | DC.B | $11 | BXLE 87 |
| 003E88 10 | | DC.B | $10 | SRL 88 |
| 003E89 10 | | DC.B | $10 | SLL 89 |
| 003E8A 10 | | DC.B | $10 | SRA 8A |
| 003E8B 10 | | DC.B | $10 | SLA 8B |
| 003E8C 10 | | DC.B | $10 | SRDL 8C |
| 003E8D 10 | | DC.B | $10 | SLDL 8D |
| 003E8E 10 | | DC.B | $10 | SRDA 8E |
| 003E8F 10 | | DC.B | $10 | SLDA 8F |
| | * | | | |
| 003E90 10 | | DC.B | $10 | STM 90 |
| 003E91 10 | | DC.B | $10 | TM 91 |
| 003E92 10 | | DC.B | $10 | MVI 92 |
| 003E93 00 | | DC.B | $00 | TS 93 |
| 003E94 10 | | DC.B | $10 | NI 94 |
| 003E95 10 | | DC.B | $10 | CLI 95 |
| 003E96 30 | | DC.B | $30 | SPEC EXCP 96 |
| 003E97 10 | | DC.B | $10 | XI 97 |
| 003E98 10 | | DC.B | $10 | LM 98 |
| 003E99 10 | | DC.B | $10 | . 99 |
| 003E9A 10 | | DC.B | $10 | . 9A |
| 003E9B 10 | | DC.B | $10 | . 9B |
| 003E9C 00 | | DC.B | $00 | SIO/SIOF 9C |
| 003E9D 00 | | DC.B | $00 | TIO/CLRIO 9D |
| 003E9E 00 | | DC.B | $00 | HIO/HDV 9E |
| 003E9F 00 | | DC.B | $00 | TCH/CLRCH 9F |
| | * | | | |
| 003EA0 30 | | DC.B | $30 | ACCERR A0 |
| 003EA1 30 | | DC.B | $30 | BUSERRA1 A1 |
| 003EA2 30 | | DC.B | $30 | BUSERRA2 A2 |
| 003EA3 00 | | DC.B | $00 | TRACE A3 |
| 003EA4 30 | | DC.B | $30 | INTERRUPT A4 |
| 003EA5 10 | | DC.B | $10 | . A5 |
| 003EA6 30 | | DC.B | $30 | AENGMC A6 |
| 003EA7 10 | | DC.B | $10 | BUSERRA7 A7 |
| 003EA8 10 | | DC.B | $10 | . A8 |
| 003EA9 10 | | DC.B | $10 | . A9 |
| 003EAA 10 | | DC.B | $10 | . AA |
| 003EAB 10 | | DC.B | $10 | . AB |
| 003EAC 00 | | DC.B | $00 | STNSM AC |
| 003EAD 00 | | DC.B | $00 | STOSM AD |
| 003EAE 00 | | DC.B | $00 | SIGP AE |
| 003EAF 00 | | DC.B | $00 | MC AF |
| | * | | | |

| | | | | |
|---|---|---|---|---|
| 003EB0 10 | DC.B | $10 | . | B0 |
| 003EB1 00 | DC.B | $00 | LRA | B1 |
| 003EB2 00 | DC.B | $00 | B2 OPS | B2 |
| 003EB3 10 | DC.B | $10 | . | B3 |
| 003EB4 10 | DC.B | $10 | . | B4 |
| 003EB5 10 | DC.B | $10 | . | B5 |
| 003EB6 00 | DC.B | $00 | STCTL | B6 |
| 003EB7 00 | DC.B | $00 | LCTL | B7 |
| 003EB8 10 | DC.B | $10 | . | B8 |
| 003EB9 10 | DC.B | $10 | . | B9 |
| 003EBA 00 | DC.B | $00 | CS | BA |
| 003EBB 00 | DC.B | $00 | CDS | BB |
| 003EBC 10 | DC.B | $10 | . | BC |
| 003EBD 00 | DC.B | $00 | CLM | BD |
| 003EBE 00 | DC.B | $00 | STCM | BE |
| 003EBF 00 | DC.B | $00 | ICM | BF |
| * | | | | |
| 003EC0 30 | DC.B | $30 | PSW SWAP | C0 |
| 003EC1 30 | DC.B | $30 | OP EXCP | C1 |
| 003EC2 10 | DC.B | $10 | A-ENG BUS | C2 |
| 003EC3 10 | DC.B | $10 | A-ENG BND | C3 |
| 003EC4 10 | DC.B | $10 | . | C4 |
| 003EC5 10 | DC.B | $10 | . | C5 |
| 003EC6 30 | DC.B | $30 | SPEC EXCP | C6 |
| 003EC7 30 | DC.B | $30 | DATA EXCP | C7 |
| 003EC8 30 | DC.B | $30 | FIX OVFLOW | C8 |
| 003EC9 30 | DC.B | $30 | FIX DIVIDE | C9 |
| 003ECA 10 | DC.B | $10 | . | CA |
| 003ECB 30 | DC.B | $30 | DEC DIVIDE | CB |
| 003ECC 30 | DC.B | $30 | EXP OVFLOW | CC |
| 003ECD 30 | DC.B | $30 | EXP UNFLOW | CD |
| 003ECE 30 | DC.B | $30 | SIGNIF | CE |
| 003ECF 10 | DC.B | $10 | . | CF |
| * | | | | |
| 003ED0 10 | DC.B | $10 | . | D0 |
| 003ED1 10 | DC.B | $10 | MVN | D1 |
| 003ED2 10 | DC.B | $10 | MVC | D2 |
| 003ED3 10 | DC.B | $10 | MVZ | D3 |
| 003ED4 10 | DC.B | $10 | NC | D4 |
| 003ED5 10 | DC.B | $10 | CLC | D5 |
| 003ED6 10 | DC.B | $10 | OC | D6 |
| 003ED7 10 | DC.B | $10 | XC | D7 |
| 003ED8 10 | DC.B | $10 | . | D8 |
| 003ED9 10 | DC.B | $10 | . | D9 |
| 003EDA 10 | DC.B | $10 | . | DA |
| 003EDB 10 | DC.B | $10 | . | DB |
| 003EDC 00 | DC.B | $00 | TR | DC |
| 003EDD 00 | DC.B | $00 | TRT | DD |
| 003EDE 00 | DC.B | $00 | ED | DE |
| 003EDF 00 | DC.B | $00 | EDMK | DF |
| * | | | | |
| 003EE0 10 | DC.B | $10 | . | E0 |
| 003EE1 10 | DC.B | $10 | . | E1 |
| 003EE2 10 | DC.B | $10 | . | E2 |
| 003EE3 10 | DC.B | $10 | . | E3 |
| 003EE4 10 | DC.B | $10 | . | E4 |
| 003EE5 10 | DC.B | $10 | . | E5 |
| 003EE6 10 | DC.B | $10 | . | E6 |
| 003EE7 10 | DC.B | $10 | . | E7 |
| 003EE8 00 | DC.B | $00 | MVCIN | E8 |
| 003EE9 10 | DC.B | $10 | . | E9 |
| 003EEA 10 | DC.B | $10 | . | EA |
| 003EEB 10 | DC.B | $10 | . | EB |
| 003EEC 10 | DC.B | $10 | . | EC |
| 003EED 10 | DC.B | $10 | . | ED |
| 003EEE 10 | DC.B | $10 | . | EE |
| 003EEF 10 | DC.B | $10 | . | EF |
| * | | | | |
| 003EF0 80 | DC.B | $80 | SRP | F0 |
| 003EF1 10 | DC.B | $10 | MVO | F1 |
| 003EF2 10 | DC.B | $10 | PACK | F2 |
| 003EF3 10 | DC.B | $10 | UNPK | F3 |
| 003EF4 10 | DC.B | $10 | . | F4 |
| 003EF5 10 | DC.B | $10 | . | F5 |
| 003EF6 10 | DC.B | $10 | . | F6 |
| 003EF7 10 | DC.B | $10 | . | F7 |

```
003EF8 80                    DC.B    $80             ZAP     F8
003EF9 80                    DC.B    $80             CP      F9
003EFA 80                    DC.B    $80             AP      FA
003EFB 80                    DC.B    $80             SP      FB
003EFC 80                    DC.B    $80             MP      FC
003EFD 80                    DC.B    $80             DP      FD
003EFE 10                    DC.B    $10             .       FE
003EFF 10                    DC.B    $10             .       FF
                     *
       00006020              ORG     PC_COMM1
                     *------------------------------------------------------------
006020 04000000              DC.L    $04000000       MANOP INITIALIZATION
006024 00000020              DC.L    $00000020
006028 00000000              DC.L    0,0,0,0,0
00602C 00000000
006030 00000000
006034 00000000
006038 00000000
00603C 00000100              DC.L    CTRL_REG
                     *
       00006048              ORG     PC_COMM2
006048 8000                  DC      $8000           CONFIGURATION BYTE
                     *
       00006050              ORG     PC_COMM2+$8
006050 00000000              DC.L    0               CONTROL BLOCK ADDRESS FOR INTERRUPTS
                     *                                 FROM PC
006054 00000000              DC.L    0               CONTROL BLOCK ADDRESS FOR REQUESTS
                     *                                 GOING TO PC
006058 00000000              DC.L    0               INTERRUPT MASK FOR PC
00605C 00000000              DC.L    0               REFERENCE CODE FOR ERRORS
                     *
       00006060              ORG     PC_COMM2+$18
006060 05000000              DC.L    $05000000       TIMER PCIB
006064 03000014              DC.L    $03000014
006068 00000000              DC.L    0
00606C 00000000              DC.L    0               TIMER DATA
006070 00000000              DC.L    0
                     *
006074 04000000              DC.L    $04000000       ASYNCHRONOUS MANOP PCIB
006078 00000020              DC.L    $00000020
00607C 00000000              DC.L    0
006080 00000000              DC.L    0
006084 00000000              DC.L    0
006088 00000000              DC.L    0
00608C 00000000              DC.L    0
006090 00000000              DC.L    0
                     *
006094 06000000              DC.L    $06000000       MASK
006098 0000000C              DC.L    $0000000C
00609C 00000000              DC.L    0
                     *
0060A0 05000000              DC.L    $05000000       ASYNCHRONOUS TIMER PCIB
0060A4 03000014              DC.L    $03000014
0060A8 00000000              DC.L    0
0060AC 00000000              DC.L    0
0060B0 00000000              DC.L    0
                     *
0060B4 8005E060              DC.L    TIMER_CB+MAIN_STR+$80000000    HIGH ORDER BIT IS
0060B8 8005E020              DC.L    MANOP_CB+MAIN_STR+$80000000      INTERRUPT FLAG FOR PC
0060BC 8005E094              DC.L    MASK_CB+MAIN_STR+$80000000
                     *
                     *
                     *
       000060C0              ORG     E_WORK
```

```
                  *
0060C0 5000       DC.W    $5000       STORE REGISTER
0060C2 01A0       DC.W    GPR
                  *
0060C4 900F       DC.W    $900F       STORE MULTIPLE
0060C6 0140       DC.W    GPRSAVE
                  *
0060C8 5800       DC.W    $5800       LOAD REGISTER FOR EXECUTE
0060CA 01A0       DC.W    GPR
                  *
0060CC 980F       DC.W    $980F       LOAD MULTIPLE
0060CE 0140       DC.W    GPRSAVE
                  *
0060D0 0000       DC.W    0           INSTRUCTION AREA FOR EXECUTE
0060D2 00000000   DC.L    0
0060D6 0000       DC.W    0           ADDRESS COMPARE STOP SAVE AREA
0060D8 00000000   DC.L    0
                  *
       00006128   ORG     PER_WORK
*--------------------------------------------------------------------
                  *
006128 00000000   DC.L    0           PER DATA AREAS
00612C 00000000   DC.L    0
006130 0000       DC      0
006132 0000       DC      0
006134 00000000   DC.L    0
006138 00000000   DC.L    0
00613C 0000       DC.W    0
00613E 00000000   DC.L    0
                  *
006142 0000       DC      0           SAVE AREA FOR I-STEP COUNT
                  *
                  END
* TOTAL ERRORS  0--   0 -- TOTAL LINES 6511
```

Having thus described our invention, what we claim as new and desire to secure by Letters Patent, is as follows:

1. A multiprocessor storage selection override data processing system, comprising:

primary processor means for generating an instruction fetch signal or an operand access signal indicative of the fetch of an instruction and the retrieval of an operand, respectively, and for executing a selected set of instructions;

secondary processor means for executing a set of instructions which is different than the set of instructions executed by said primary processor means;

processor switch means connected to said primary and secondary processor means on one side and to said primary and secondary processor means on the other side for switching on one of said processor means in response to an output signal from the other of said processor means thereby rendering idle said other of said processor means;

latch means connected to the primary and secondary processor means for switching to a set or a reset condition in response to an output signal from said one of said processor means;

logic circuit means connected to said latch means and to said primary and secondary processor means for developing an output signal in response to said set condition from said latch means and to said instruction fetch signal from said primary processor means or in response to said set condition from said latch means and to said operand access signal from said primary processor means or in response to an output signal from said primary or secondary processor means;

main storage means connected to said logic circuit means; and control storage means connected to said logic circuit means, said control storage means including private storage means, said primary processor means storing an address of a target instruction in said private storage means when said primary processor means attempts and fails to execute an instruction which is not within said selected set of instructions, said secondary processor means transferring said target instruction from said main storage means to said control storage means and setting said latch means to said set condition, said primary processor means reading said address of said target instruction from said private storage means and generating said instruction fetch signal or said operand access signal, said logic circuit means enabling said control storage means and disabling said main storage means in response to said instruction fetch signal or said operand access signal and when said latch means is in said set condition, said primary processor means retrieving said target instruction from said control storage means in response to the enabling of said control storage means by said logic circuit means.

2. The multiprocessor storage selection override data processing system of claim 1, wherein said primary processor means energizes said processor switch means thereby switching on said secondary processor means while rendering idle said primary processor means when said primary processor means completes the storage of said address of said target instruction in said private storage means.

3. The multiprocessor storage selection override data processing system of claim 2, wherein said secondary processor means energizes said processor switch means thereby switching on said primary processor means while rendering idle said secondary processor means when said secondary processor means completes the transfer of said target instruction from said main storage means to said control storage means.

* * * * *